US010332222B1

(12) United States Patent
Conboy

(10) Patent No.: US 10,332,222 B1
(45) Date of Patent: Jun. 25, 2019

(54) JUST-IN-TIME FACTORY METHODS, SYSTEM AND NETWORK FOR PREFABRICATING CLASS-A FIRE-PROTECTED WOOD-FRAMED BUILDINGS AND COMPONENTS USED TO CONSTRUCT THE SAME

(71) Applicant: M-Fire Suppression, Inc., Carlsbad, CA (US)

(72) Inventor: Stephen Conboy, Carlsbad, CA (US)

(73) Assignee: M-Fire Supression, Inc., Carlsbad, CA (US)

( * ) Notice: Subject to any disclaimer, the term of this patent is extended or adjusted under 35 U.S.C. 154(b) by 0 days.

(21) Appl. No.: 15/866,454

(22) Filed: Jan. 9, 2018

Related U.S. Application Data

(63) Continuation-in-part of application No. 15/829,914, filed on Dec. 2, 2017, now Pat. No. 10,260,232.

(51) Int. Cl.
  *E04B 1/10* (2006.01)
  *G06Q 50/08* (2012.01)
  (Continued)

(52) U.S. Cl.
  CPC ............. *G06Q 50/08* (2013.01); *B27K 3/025* (2013.01); *E04B 1/941* (2013.01); *G06Q 30/0635* (2013.01); *B27K 2240/30* (2013.01)

(58) Field of Classification Search
  CPC .. E04B 1/944; E04B 1/26; E04B 1/94; B27M 1/08
  See application file for complete search history.

(56) References Cited

U.S. PATENT DOCUMENTS

| 25,358 A | 9/1859 | Wilder |
|---|---|---|
| 1,185,154 A | 5/1916 | Wilds |

(Continued)

FOREIGN PATENT DOCUMENTS

| AU | 5986501 | 11/2001 |
|---|---|---|
| AU | 2001259865 | 2/2007 |

(Continued)

OTHER PUBLICATIONS

US 8,460,513 B2, 06/2013, Sealey (withdrawn)
(Continued)

*Primary Examiner* — Gisele D Ford
(74) *Attorney, Agent, or Firm* — Thomas J. Perkowski, Esq.

(57) ABSTRACT

A cloud-based system network for verifying and documenting prefabricating Class-A fire-protected wood-framed buildings produced from a prefabricated Class-A fire-protected wood-framed building factory system supporting multiple production lines for producing Class-A fire-protected wood-framed components including wall panels, floor panels, stair panels, floor trusses, and roof trusses for use in constructing custom and pre-specified prefabricated Class-A fire-protected wood-framed buildings. The system network includes (i) a data center with web, application and database servers for supporting a web-based site for hosting digital images of barcoded/RFID-tagged certificates attached to prefabricated Class-A fire-protected wood-framed building components, and other certification documents, and (ii) mobile smart-phones used to capture digital photographs and video recordings of Class-A fire-protected wood-framed building sections, and upload the captured digital images to the data center, for each prefabricated wood-framed building project, so that building purchasers, insurance companies, builders, architects and other stakeholders can review such (Continued)

certifications and documentations during the prefabrication of wood-framed buildings from the factory system.

18 Claims, 136 Drawing Sheets

(51) Int. Cl.
 *E04B 1/94* (2006.01)
 *B27K 3/02* (2006.01)
 *G06Q 30/06* (2012.01)

(56) References Cited

U.S. PATENT DOCUMENTS

| | | | |
|---|---|---|---|
| 1,293,377 A * | 2/1919 | Donaldson | E04B 1/2403 |
| | | | 52/236.5 |
| 1,504,454 A * | 8/1924 | Tyson | E04B 1/26 |
| | | | 52/236.6 |
| 1,634,462 A | 7/1927 | Hallauer | |
| 1,978,807 A | 10/1934 | Merritt | |
| 2,150,188 A | 3/1939 | Rippey | |
| 2,336,648 A | 12/1943 | Sparks | |
| 3,304,675 A * | 2/1967 | Graham-Wood | E04B 1/24 |
| | | | 52/169.9 |
| 3,470,062 A | 9/1969 | Ollinger | |
| 3,501,419 A | 3/1970 | Bridgeford | |
| 3,506,479 A | 4/1970 | Breens | |
| 3,508,872 A | 4/1970 | Stuetz | |
| 3,509,083 A | 4/1970 | Winebrenner | |
| 3,511,748 A | 5/1970 | Heeb | |
| 3,539,423 A | 11/1970 | Simison | |
| 3,607,811 A | 9/1971 | Hovd | |
| 3,650,820 A | 3/1972 | Dipietro | |
| 3,663,267 A | 5/1972 | Moran | |
| 3,703,394 A | 11/1972 | Hemming | |
| 3,734,191 A * | 5/1973 | Johnson | A62C 37/08 |
| | | | 169/5 |
| 3,755,448 A | 8/1973 | Merianos | |
| 3,795,637 A | 3/1974 | Kandler | |
| 3,934,066 A | 1/1976 | Murch | |
| 3,935,343 A | 1/1976 | Nuttall | |
| 3,944,688 A | 3/1976 | Inman | |
| 3,984,334 A | 10/1976 | Hopper | |
| 4,013,599 A | 3/1977 | Strauss | |
| 4,049,849 A | 9/1977 | Brown | |
| 4,065,413 A | 12/1977 | MacInnis | |
| 4,092,281 A | 5/1978 | Bertrand | |
| 4,104,073 A | 8/1978 | Koide | |
| 4,172,858 A | 10/1979 | Clubley | |
| 4,176,115 A | 11/1979 | Hartman | |
| 4,197,913 A | 4/1980 | Korenowski | |
| 4,198,328 A | 4/1980 | Bertelli | |
| 4,209,561 A | 6/1980 | Sawko | |
| 4,228,202 A | 10/1980 | Tjaennberg | |
| 4,237,182 A | 12/1980 | Fulmer | |
| 4,248,976 A | 2/1981 | Clubley | |
| 4,251,579 A | 2/1981 | Lee | |
| 4,254,177 A | 3/1981 | Fulmer | |
| 4,265,963 A | 5/1981 | Matalon | |
| 4,266,384 A | 5/1981 | Orals | |
| 4,364,987 A | 12/1982 | Goodwin | |
| 4,382,884 A | 5/1983 | Rohringer | |
| 4,392,994 A | 7/1983 | Wagener | |
| 4,514,327 A | 4/1985 | Rock | |
| 4,530,877 A | 7/1985 | Hadley | |
| 4,560,485 A | 12/1985 | Szekely | |
| 4,563,287 A | 1/1986 | Hisamoto | |
| 4,572,862 A | 2/1986 | Ellis | |
| 4,578,913 A | 4/1986 | Eich | |
| 4,659,381 A | 4/1987 | Walters | |
| 4,661,398 A | 4/1987 | Ellis | |
| 4,663,226 A | 5/1987 | Vajs | |
| 4,666,960 A | 5/1987 | Spain | |
| 4,690,859 A | 9/1987 | Porter | |
| 4,714,652 A | 12/1987 | Poletto | |
| 4,720,414 A | 1/1988 | Burga | |
| 4,724,250 A | 2/1988 | Schubert | |
| 4,737,406 A | 4/1988 | Bumpus | |
| 4,740,527 A | 4/1988 | Von Bonin | |
| 4,743,625 A | 5/1988 | Vajs | |
| 4,756,839 A | 7/1988 | Curzon | |
| 4,770,794 A | 9/1988 | Cundasawmy | |
| 4,810,741 A | 3/1989 | Kim | |
| 4,824,483 A | 4/1989 | Bumpus | |
| 4,824,484 A * | 4/1989 | Metzner | A01N 3/00 |
| | | | 106/14.12 |
| 4,861,397 A | 8/1989 | Hillstrom | |
| 4,871,477 A | 10/1989 | Dimanshteyn | |
| 4,879,320 A | 11/1989 | Hastings | |
| 4,888,136 A | 12/1989 | Chellapa | |
| 4,895,878 A | 1/1990 | Jourquin | |
| 4,965,296 A | 10/1990 | Hastings | |
| 5,021,484 A | 6/1991 | Schreiber | |
| 5,023,019 A | 6/1991 | Bumpus | |
| 5,032,446 A | 7/1991 | Sayles | |
| 5,039,454 A | 8/1991 | Policastro | |
| 5,053,147 A | 10/1991 | Kaylor | |
| 5,055,208 A | 10/1991 | Stewart | |
| 5,130,184 A | 7/1992 | Ellis | |
| 5,156,775 A | 10/1992 | Blount | |
| 5,162,394 A | 11/1992 | Trocino | |
| 5,182,049 A | 1/1993 | Von Bonin | |
| 5,185,214 A | 2/1993 | Levan | |
| 5,214,894 A | 6/1993 | Glesser-Lott | |
| 5,250,200 A | 10/1993 | Sallet | |
| 5,283,998 A | 2/1994 | Jong | |
| 5,284,700 A | 2/1994 | Strauss | |
| 5,333,426 A * | 8/1994 | Varoglu | E04B 1/26 |
| | | | 52/236.7 |
| 5,356,568 A | 10/1994 | Levine | |
| 5,391,246 A | 2/1995 | Stephens | |
| 5,393,437 A | 2/1995 | Bower | |
| 5,405,661 A | 4/1995 | Kim | |
| 5,491,022 A | 2/1996 | Smith | |
| 5,534,164 A | 7/1996 | Guglielmi | |
| 5,534,301 A | 7/1996 | Shutt | |
| 5,605,767 A | 2/1997 | Fuller | |
| 5,609,915 A | 3/1997 | Fuller | |
| 5,631,047 A | 5/1997 | Friloux | |
| 5,709,821 A | 1/1998 | Von Bonin | |
| 5,729,936 A | 3/1998 | Maxwell | |
| 5,738,924 A | 4/1998 | Sing | |
| 5,765,333 A * | 6/1998 | Cunningham | E04B 1/165 |
| | | | 52/281 |
| 5,833,874 A | 11/1998 | Stewart | |
| 5,834,535 A | 11/1998 | Abu-Isa | |
| 5,840,413 A | 11/1998 | Kajander | |
| 5,968,669 A | 10/1999 | Liu | |
| 6,000,189 A | 12/1999 | Breuer | |
| 6,024,889 A | 2/2000 | Holland | |
| 6,029,751 A | 2/2000 | Ford | |
| 6,042,639 A | 3/2000 | Valsoe | |
| 6,073,410 A | 6/2000 | Schimpf | |
| 6,146,544 A | 11/2000 | Guglielmi | |
| 6,146,557 A | 11/2000 | Inata | |
| 6,150,449 A | 11/2000 | Valkanas | |
| 6,153,682 A | 11/2000 | Bannat | |
| 6,202,755 B1 | 3/2001 | Hardge | |
| 6,245,842 B1 | 6/2001 | Buxton | |
| 6,271,156 B1 | 8/2001 | Gleason | |
| 6,309,746 B1 | 10/2001 | Broutier | |
| 6,385,931 B1 | 5/2002 | Risser | |
| 6,398,136 B1 | 6/2002 | Smith | |
| 6,401,487 B1 | 6/2002 | Kotliar | |
| 6,401,830 B1 | 6/2002 | Romanoff | |
| 6,415,571 B2 | 7/2002 | Risser | |
| 6,423,129 B1 | 7/2002 | Fitzgibbons, Jr. | |
| 6,423,251 B1 | 7/2002 | Blount | |
| 6,442,912 B1 | 9/2002 | Phillips | |
| 6,444,718 B1 | 9/2002 | Blount | |
| 6,464,903 B1 | 10/2002 | Blount | |
| 6,502,421 B2 | 1/2003 | Kotliar | |
| 6,517,748 B2 | 2/2003 | Richards | |

(56) References Cited

U.S. PATENT DOCUMENTS

| | | |
|---|---|---|
| 6,557,374 B2 | 5/2003 | Kotliar |
| 6,560,991 B1 | 5/2003 | Kotliar |
| 6,581,878 B1 | 6/2003 | Bennett |
| 6,608,123 B2 | 8/2003 | Galli |
| 6,613,391 B1 | 9/2003 | Gang |
| 6,706,774 B2 | 3/2004 | Muenzenberger |
| 6,713,411 B2 | 3/2004 | Cox |
| 6,736,989 B2 | 5/2004 | Stewart |
| 6,796,382 B2 | 9/2004 | Kaimart |
| 6,800,352 B1 | 10/2004 | Hejna |
| 6,869,669 B2 | 3/2005 | Jensen |
| 6,881,247 B2 | 4/2005 | Batdorf |
| 6,881,367 B1 | 4/2005 | Baker |
| 6,897,173 B2 | 5/2005 | Bernard |
| 6,930,138 B2 | 8/2005 | Schell |
| 6,982,049 B1 | 1/2006 | Mabey |
| 7,082,999 B2 | 8/2006 | Arnot |
| 7,083,000 B2 | 8/2006 | Edwards |
| 7,147,061 B2 | 12/2006 | Tsutaoka |
| 7,210,537 B1 | 5/2007 | McNeil |
| 7,261,165 B1 | 8/2007 | Black |
| 7,273,634 B2 | 9/2007 | Fitzgibbons, Jr. |
| 7,323,248 B2 | 1/2008 | Ramsey |
| 7,331,399 B2 | 2/2008 | Multer |
| 7,337,156 B2 | 2/2008 | Wippich |
| 7,341,113 B2 | 3/2008 | Fallis |
| 7,478,680 B2 | 1/2009 | Sridharan |
| 7,479,513 B2 | 1/2009 | Reinheimer |
| 7,482,395 B2 | 1/2009 | Mabey |
| 7,504,449 B2 | 3/2009 | Mazor |
| 7,560,041 B2 | 7/2009 | Yoon |
| 7,588,087 B2 | 9/2009 | Cafferata |
| 7,614,456 B2 | 11/2009 | Twum |
| 7,673,696 B1 | 3/2010 | Gunn |
| 7,686,093 B2 | 3/2010 | Reilly |
| 7,744,687 B2 | 6/2010 | Moreno |
| 7,748,662 B2 | 7/2010 | Hale |
| 7,754,808 B2 | 7/2010 | Goossens |
| 7,766,090 B2 | 8/2010 | Mohr |
| 7,767,010 B2 | 8/2010 | Curzon |
| 7,785,712 B2 | 8/2010 | Miller |
| 7,789,165 B1 | 9/2010 | Yen |
| 7,820,736 B2 | 10/2010 | Reinheimer |
| 7,824,583 B2 | 11/2010 | Gang |
| 7,828,069 B2 | 11/2010 | Lee |
| 7,832,492 B1 | 11/2010 | Eldridge |
| 7,837,009 B2 | 11/2010 | Gross |
| 7,849,542 B2 | 12/2010 | Defranks |
| 7,863,355 B2 | 1/2011 | Futterer |
| 7,886,836 B2 | 2/2011 | Haaland |
| 7,886,837 B1 | 2/2011 | Helfgott |
| 7,897,070 B2 | 3/2011 | Knocke |
| 7,897,673 B2 | 3/2011 | Flat |
| 7,900,709 B2 | 3/2011 | Kotliar |
| 7,934,564 B1 | 5/2011 | Stell |
| 8,006,447 B2 | 8/2011 | Beele |
| 8,080,186 B1 | 12/2011 | Pennartz |
| 8,088,310 B2 | 1/2012 | Orr |
| 8,141,649 B2 | 3/2012 | Kotliar |
| 8,148,315 B2 | 4/2012 | Baker |
| 8,206,620 B1 | 6/2012 | Bolton |
| 8,217,093 B2 | 7/2012 | Reinheimer |
| 8,226,017 B2 | 7/2012 | Cohen |
| 8,263,231 B2 | 9/2012 | Mesa |
| 8,273,813 B2 | 9/2012 | Beck |
| 8,276,679 B2 | 10/2012 | Bui |
| 8,281,550 B1 | 10/2012 | Bolton |
| 8,286,405 B2 | 10/2012 | Bolton |
| 8,291,990 B1 | 10/2012 | Mohr |
| 8,344,055 B1 | 1/2013 | Mabey |
| 8,366,955 B2 | 2/2013 | Thomas |
| 8,403,070 B1 | 3/2013 | Lowe |
| 8,409,479 B2 | 4/2013 | Alexander |
| 8,453,752 B2 | 6/2013 | Katsuraku |
| 8,458,971 B2 | 6/2013 | Winterowd |
| 8,465,833 B2 | 6/2013 | Lee |
| 8,534,370 B1 | 9/2013 | Al Azemi |
| 8,586,657 B2 | 11/2013 | Lopez |
| 8,603,231 B2 | 12/2013 | Wagh |
| 8,646,540 B2 | 2/2014 | Eckholm |
| 8,647,524 B2 | 2/2014 | Rueda-Nunez |
| 8,662,192 B2 | 3/2014 | Dunster |
| 8,663,427 B2 | 3/2014 | Sealey |
| 8,663,774 B2 | 3/2014 | Fernando |
| 8,663,788 B2 | 3/2014 | Oh |
| 8,668,988 B2 | 3/2014 | Schoots |
| 8,685,206 B2 | 4/2014 | Sealey |
| 8,698,634 B2 | 4/2014 | Guedes Lopes Da Fonseca |
| 8,746,355 B2 | 6/2014 | Demmitt |
| 8,746,357 B2 | 6/2014 | Butz |
| 8,778,213 B2 | 7/2014 | Guo |
| 8,789,769 B2 | 7/2014 | Fenton |
| 8,808,850 B2 | 8/2014 | Dion |
| 8,820,421 B2 | 9/2014 | Rahgozar |
| 8,871,053 B2 | 10/2014 | Sealey |
| 8,871,058 B2 | 10/2014 | Sealey |
| 8,893,814 B2 | 11/2014 | Bui |
| 8,944,174 B2 | 2/2015 | Thomas |
| 8,973,669 B2 | 3/2015 | Connery |
| 8,980,145 B2 | 3/2015 | Baroux |
| 9,005,396 B2 | 4/2015 | Baroux |
| 9,005,642 B2 | 4/2015 | Mabey |
| 9,027,303 B2 | 5/2015 | Lichtinger |
| 9,089,730 B2 | 7/2015 | Shalev |
| 9,120,570 B2 | 9/2015 | Hoisington |
| 9,174,074 B2 | 11/2015 | Medina |
| 9,187,674 B2 | 11/2015 | Ulcar |
| 9,199,108 B2 | 12/2015 | Guo |
| 9,249,021 B2 | 2/2016 | Mundheim |
| 9,265,978 B2 | 2/2016 | Klaffmo |
| 9,328,317 B2 | 5/2016 | Peng |
| 9,382,153 B2 | 7/2016 | Fisher |
| 9,409,045 B2 | 8/2016 | Berezovsky |
| 9,498,787 B2 | 11/2016 | Fenton |
| 9,597,538 B2 | 3/2017 | Langselius |
| 9,616,590 B2 | 4/2017 | Birkeland |
| 9,663,943 B2 | 5/2017 | Dimakis |
| 9,776,029 B2 | 10/2017 | Izumida |
| 9,782,944 B2 | 10/2017 | Martin |
| 9,851,718 B2 | 12/2017 | Booher |
| 9,920,250 B1 | 3/2018 | Vuozzo |
| 9,931,648 B2 | 4/2018 | Fenton |
| 9,956,446 B2 | 5/2018 | Connery |
| 2001/0000911 A1 | 5/2001 | Stewart |
| 2001/0025712 A1 | 10/2001 | Pagan |
| 2001/0029706 A1 | 10/2001 | Risser |
| 2001/0029750 A1 | 10/2001 | Kotliar |
| 2002/0005288 A1 | 1/2002 | Haase |
| 2002/0011593 A1 | 1/2002 | Richards |
| 2002/0023762 A1 | 2/2002 | Kotliar |
| 2002/0045688 A1 | 4/2002 | Galli |
| 2002/0079379 A1 | 6/2002 | Cheung |
| 2002/0096668 A1 | 7/2002 | Vandersall |
| 2002/0110696 A1 | 8/2002 | Slimak |
| 2002/0125016 A1 | 9/2002 | Cofield |
| 2002/0139056 A1 | 10/2002 | Finnell |
| 2002/0168476 A1 | 11/2002 | Pasek |
| 2003/0029622 A1 | 2/2003 | Clauss |
| 2003/0047723 A1 | 3/2003 | Santoro |
| 2003/0051886 A1 | 3/2003 | Adiga |
| 2003/0066990 A1 | 4/2003 | Vandersall |
| 2003/0132425 A1 | 7/2003 | Curzon |
| 2003/0136879 A1 | 7/2003 | Grabow |
| 2003/0146843 A1 | 8/2003 | Dittmer |
| 2003/0155133 A1 | 8/2003 | Matsukawa |
| 2003/0159836 A1 | 8/2003 | Kashiki |
| 2003/0160111 A1 | 8/2003 | Multer |
| 2003/0168225 A1 | 9/2003 | Denne |
| 2003/0170317 A1 | 9/2003 | Curzon |
| 2004/0003569 A1 | 1/2004 | Frederickson |
| 2004/0051086 A1 | 3/2004 | Pasek |
| 2004/0099178 A1 | 5/2004 | Jones |
| 2004/0109853 A1 | 6/2004 | McDaniel |
| 2004/0134378 A1 | 7/2004 | Batdorf |

(56) References Cited

U.S. PATENT DOCUMENTS

| | | | |
|---|---|---|---|
| 2004/0163825 A1 | 8/2004 | Dunster et al. | |
| 2004/0173783 A1 | 9/2004 | Curzon | |
| 2004/0175407 A1 | 9/2004 | McDaniel | |
| 2004/0194657 A1 | 10/2004 | Lally | |
| 2004/0209982 A1 | 10/2004 | Horacek | |
| 2004/0231252 A1* | 11/2004 | Benjamin | E04F 13/04 52/79.1 |
| 2005/0009965 A1 | 1/2005 | Schell | |
| 2005/0009966 A1 | 1/2005 | Rowen | |
| 2005/0011652 A1 | 1/2005 | Hua | |
| 2005/0022466 A1* | 2/2005 | Kish | C09K 21/14 52/741.3 |
| 2005/0058689 A1 | 3/2005 | McDaniel | |
| 2005/0066619 A1 | 3/2005 | McDonald | |
| 2005/0103507 A1 | 5/2005 | Brown | |
| 2005/0139363 A1 | 6/2005 | Thomas | |
| 2005/0229809 A1 | 10/2005 | Lally | |
| 2005/0235598 A1* | 10/2005 | Liggins | E04B 2/707 52/745.19 |
| 2005/0263298 A1 | 12/2005 | Kotliar | |
| 2005/0269109 A1 | 12/2005 | Maguire | |
| 2005/0279972 A1 | 12/2005 | Santoro | |
| 2006/0037277 A1 | 2/2006 | Fitzgibbons, Jr. | |
| 2006/0048466 A1 | 3/2006 | Darnell | |
| 2006/0131035 A1 | 6/2006 | French | |
| 2006/0157668 A1 | 7/2006 | Erdner | |
| 2006/0167131 A1 | 7/2006 | Mabey | |
| 2006/0168906 A1 | 8/2006 | Tonyan | |
| 2006/0196681 A1 | 9/2006 | Adiga | |
| 2006/0208236 A1 | 9/2006 | Gang | |
| 2006/0213672 A1 | 9/2006 | Mohr | |
| 2007/0084554 A1 | 4/2007 | Miller | |
| 2007/0090322 A1 | 4/2007 | Yoon | |
| 2007/0119334 A1 | 5/2007 | Atkinson | |
| 2007/0125880 A1 | 6/2007 | Palle | |
| 2007/0176156 A1 | 8/2007 | Mabey | |
| 2007/0193753 A1 | 8/2007 | Adiga | |
| 2007/0194289 A1 | 8/2007 | Anglin | |
| 2007/0197112 A1 | 8/2007 | Mazor | |
| 2007/0227085 A1* | 10/2007 | Mader | E04B 1/26 52/233 |
| 2007/0232731 A1 | 10/2007 | Knocke | |
| 2007/0289709 A1 | 12/2007 | Chong | |
| 2007/0289752 A1 | 12/2007 | Beck | |
| 2008/0000649 A1 | 1/2008 | Guirguis | |
| 2008/0050578 A1 | 2/2008 | Sinclair | |
| 2008/0054230 A1 | 3/2008 | Mabey | |
| 2008/0115949 A1 | 5/2008 | Li | |
| 2008/0168798 A1 | 7/2008 | Kotliar | |
| 2008/0179067 A1 | 7/2008 | Ho | |
| 2008/0184642 A1 | 8/2008 | Sebastian | |
| 2009/0107064 A1* | 4/2009 | Bowman | E04B 1/26 52/238.1 |
| 2009/0145075 A1* | 6/2009 | Oakley | E04B 1/10 52/690 |
| 2009/0188567 A1 | 7/2009 | McHugh | |
| 2009/0215926 A1 | 8/2009 | Kozlowski | |
| 2009/0249556 A1 | 10/2009 | Dermeik | |
| 2009/0266025 A1 | 10/2009 | Toas | |
| 2009/0280345 A1 | 11/2009 | Maynard | |
| 2009/0301001 A1 | 12/2009 | Kish | |
| 2009/0313931 A1 | 12/2009 | Porter | |
| 2009/0314500 A1 | 12/2009 | Fenton | |
| 2009/0326117 A1 | 12/2009 | Benussi | |
| 2010/0032175 A1 | 2/2010 | Boyd | |
| 2010/0062153 A1 | 3/2010 | Curzon | |
| 2010/0069488 A1 | 3/2010 | Mabey | |
| 2010/0175897 A1 | 7/2010 | Crump | |
| 2010/0176353 A1 | 7/2010 | Hanna | |
| 2010/0181084 A1 | 7/2010 | Carmo | |
| 2010/0200819 A1 | 8/2010 | Mans Fibla | |
| 2010/0267853 A1 | 10/2010 | Edry | |
| 2010/0281784 A1* | 11/2010 | Leo | E04B 1/0023 52/16 |
| 2010/0314138 A1 | 12/2010 | Weatherspoon | |
| 2010/0326677 A1 | 12/2010 | Jepsen | |
| 2011/0000142 A1 | 1/2011 | Bui | |
| 2011/0061336 A1 | 3/2011 | Thomas | |
| 2011/0073331 A1 | 3/2011 | Xu | |
| 2011/0089386 A1 | 4/2011 | Berry | |
| 2011/0091713 A1 | 4/2011 | Miller | |
| 2011/0146173 A1 | 6/2011 | Visser | |
| 2011/0203813 A1 | 8/2011 | Fenton | |
| 2011/0266486 A1 | 11/2011 | Orr | |
| 2011/0284250 A1 | 11/2011 | Thomas | |
| 2011/0315406 A1 | 12/2011 | Connery | |
| 2012/0045584 A1 | 2/2012 | Dettbarn | |
| 2012/0073228 A1* | 3/2012 | Fork | B32B 9/046 52/309.13 |
| 2012/0121809 A1 | 5/2012 | Vuozzo | |
| 2012/0145418 A1 | 6/2012 | Su | |
| 2012/0168185 A1 | 7/2012 | Yount | |
| 2012/0199781 A1 | 8/2012 | Rueda-Nunez | |
| 2012/0241535 A1 | 9/2012 | Carriere | |
| 2012/0256143 A1 | 10/2012 | Ulcar | |
| 2012/0258327 A1 | 10/2012 | McArthur | |
| 2012/0295996 A1 | 11/2012 | Wang | |
| 2012/0308631 A1 | 12/2012 | Shirley | |
| 2013/0000239 A1 | 1/2013 | Winterowd | |
| 2013/0101839 A1 | 4/2013 | Dion | |
| 2013/0149548 A1* | 6/2013 | Williams | C09K 21/14 428/532 |
| 2013/0239848 A1 | 9/2013 | Fisher | |
| 2013/0288031 A1 | 10/2013 | Labock | |
| 2014/0079942 A1 | 3/2014 | Lally | |
| 2014/0123572 A1* | 5/2014 | Segall | G09B 9/003 52/79.5 |
| 2014/0202716 A1 | 7/2014 | Klaffmo | |
| 2014/0202717 A1 | 7/2014 | Klaffmo | |
| 2014/0206767 A1 | 7/2014 | Klaffmo | |
| 2014/0239123 A1 | 8/2014 | Hoisington | |
| 2014/0245696 A1 | 9/2014 | Anderson | |
| 2014/0284067 A1 | 9/2014 | Klaffmo | |
| 2014/0284511 A1 | 9/2014 | Klaffmo | |
| 2014/0284512 A1 | 9/2014 | Klaffmo | |
| 2014/0290970 A1 | 10/2014 | Izumida | |
| 2014/0295164 A1 | 10/2014 | Parker | |
| 2014/0299339 A1 | 10/2014 | Klaffmo | |
| 2014/0322548 A1 | 10/2014 | Boldizsar | |
| 2015/0020476 A1 | 1/2015 | Winterowd | |
| 2015/0021053 A1 | 1/2015 | Klaffmo | |
| 2015/0021055 A1 | 1/2015 | Klaffmo | |
| 2015/0147478 A1 | 5/2015 | Shutt | |
| 2015/0224352 A1 | 8/2015 | Klaffmo | |
| 2015/0314564 A1 | 11/2015 | Mancini | |
| 2015/0322668 A1* | 11/2015 | Quinn | E04B 1/24 52/236.9 |
| 2015/0335926 A1 | 11/2015 | Klaffmo | |
| 2015/0335928 A1 | 11/2015 | Klaffmo | |
| 2015/0354199 A1* | 12/2015 | Segall | E04B 1/34315 52/127.6 |
| 2015/0368560 A1 | 12/2015 | Pascal | |
| 2016/0024779 A1* | 1/2016 | Clus | E04B 1/19 52/79.1 |
| 2016/0107014 A1 | 4/2016 | Klaffmo | |
| 2016/0137853 A1 | 5/2016 | Lopez | |
| 2016/0243789 A1 | 8/2016 | Baroux | |
| 2017/0029632 A1 | 2/2017 | Couturier | |
| 2017/0056698 A1 | 3/2017 | Pai | |
| 2017/0081844 A1* | 3/2017 | Dimakis | E04B 1/26 |
| 2017/0120089 A1* | 5/2017 | Fisher | A62C 3/002 |
| 2017/0121965 A1 | 5/2017 | Dettbarn | |
| 2017/0138049 A1 | 5/2017 | King | |
| 2017/0182341 A1 | 6/2017 | Libal | |
| 2017/0210098 A1 | 7/2017 | Moore | |
| 2017/0321418 A1* | 11/2017 | Tremblay | C09K 21/02 |
| 2018/0023283 A1* | 1/2018 | Dunster | E04B 7/024 52/220.1 |

(56) References Cited

U.S. PATENT DOCUMENTS

| | | | | |
|---|---|---|---|---|
| 2018/0087270 A1* | 3/2018 | Miller | | E04B 9/225 |
| 2018/0119421 A1* | 5/2018 | Pospisil | | E04B 1/24 |

FOREIGN PATENT DOCUMENTS

| | | |
|---|---|---|
| AU | 2005220194 | 4/2007 |
| AU | 2005220196 | 4/2007 |
| AU | 2002240521 | 12/2007 |
| AU | 2011244837 | 5/2012 |
| CA | 2212076 | 7/1997 |
| CA | 2593435 | 8/2006 |
| CA | 2653817 | 12/2007 |
| CA | 2811358 | 1/2013 |
| CA | 2846076 | 9/2014 |
| CA | 2862380 | 4/2015 |
| CA | 2868719 | 6/2015 |
| CN | 1397613 | 2/2003 |
| CN | 101293752 | 10/2008 |
| CN | 101434760 | 5/2009 |
| CN | 202045944 | 11/2011 |
| CN | 102337770 | 2/2012 |
| CN | 103562079 | 2/2014 |
| CN | 104540556 | 4/2015 |
| EP | 2898925 | 7/2015 |
| EP | 2902077 | 8/2015 |
| GB | 2301122 | 11/1996 |
| WO | 8704145 | 7/1987 |
| WO | 9010668 | 9/1990 |
| WO | 9100327 | 1/1991 |
| WO | 0166669 | 9/2001 |
| WO | 0243812 | 6/2002 |
| WO | 0244305 | 6/2002 |
| WO | 2005014115 | 2/2005 |
| WO | 2006006829 | 1/2006 |
| WO | 2006010667 | 2/2006 |
| WO | 2006013180 | 2/2006 |
| WO | 2006032130 | 3/2006 |
| WO | 2006056379 | 6/2006 |
| WO | 2006072672 | 7/2006 |
| WO | 2006081596 | 8/2006 |
| WO | 2006097962 | 9/2006 |
| WO | 2006126181 | 11/2006 |
| WO | 2007030982 | 3/2007 |
| WO | 2007048149 | 5/2007 |
| WO | 2007140676 | 12/2007 |
| WO | 2008031559 | 3/2008 |
| WO | 2008150157 | 12/2008 |
| WO | 2009012546 | 1/2009 |
| WO | 2009020251 | 2/2009 |
| WO | 2009057104 | 5/2009 |
| WO | 2010028416 | 3/2010 |
| WO | 2010041228 | 4/2010 |
| WO | 2010046696 | 4/2010 |
| WO | 2010061059 | 6/2010 |
| WO | 2010089604 | 8/2010 |
| WO | 2010139124 | 12/2010 |
| WO | 2011016773 | 2/2011 |
| WO | 2011042609 | 4/2011 |
| WO | 2011054345 | 5/2011 |
| WO | 2011078728 | 6/2011 |
| WO | 2011116450 | 9/2011 |
| WO | 2012031762 | 3/2012 |
| WO | 2012060491 | 5/2012 |
| WO | 2012071577 | 5/2012 |
| WO | 2012076905 | 6/2012 |
| WO | 2012164478 | 12/2012 |
| WO | 2013003097 | 1/2013 |
| WO | 2013062295 | 5/2013 |
| WO | 2013068260 | 5/2013 |
| WO | 2013098859 | 7/2013 |
| WO | 2013179218 | 12/2013 |
| WO | 2014001417 | 1/2014 |
| WO | 2014115036 | 7/2014 |
| WO | 2014115038 | 7/2014 |
| WO | 2014152528 | 9/2014 |
| WO | 2015020388 | 2/2015 |
| WO | 2015051917 | 4/2015 |
| WO | 2015061905 | 5/2015 |
| WO | 2015076842 | 5/2015 |
| WO | 2015126854 | 8/2015 |
| WO | 2015153843 | 10/2015 |
| WO | 2015168456 | 11/2015 |
| WO | 2015172619 | 11/2015 |
| WO | 2016075480 | 5/2016 |
| WO | 2016186450 | 11/2016 |
| WO | 2017014782 | 1/2017 |
| WO | 2017015585 | 1/2017 |
| WO | 2017016143 | 2/2017 |
| WO | 2017094918 | 6/2017 |

OTHER PUBLICATIONS

Office Action dated Jun. 1, 2018 for U.S. Appl. No. 15/829,914 (pp. 1-7).
Ledinek, "X-Press", Nov. 2017, (pp. 1-5).
Underwriters Laboratories Inc., "BPVV R7002 Lumber, Treated", Jan. 2011, (pp. 1-5).
Underwriters Laboratories Inc., BUGV R7003 Treated Plywood, Oct. 2011, (pp. 1-4).
Chemical Specialties Inc., "D-Blaze Fire Retardant Treated Wood, The New Generation Building Material", Mar. 2004, (pp. 1-2).
Treated Wood, "TimberSaver", Nov. 2017, (pp. 1-6).
Reed Construction Data, "Osmose Inc., FirePro Fire Retardant", Jan. 2004, (pp. 1-3).
ICC Evaluation Service Inc., "FirePro", Nov. 2005, (pp. 1-4).
Marketwired, "WoodSmart Solutions, Inc. Tests Hartindo AF21 in BluWood Solution", Nov. 2007, (pp. 1-2).
Marketwired, "Megola Announces AF21 Test Results", Aug. 2007, (pp. 1-2).
Marketwired, Megola Updates on Hartindo AF21, a Total Fire Inhibitor, Aug. 2010, (pp. 1-3).
Treated Wood, "Fire Retardant Treated Wood for Commercial and Residential Structures", Jan. 2012, (pp. 1-73).
Fire Retardant Coatings of Texas, "FX Lumber Guard", Nov. 2015, (pp. 1).
QAI Laboratories, "Test Report #T1003-1: FX Lumber Guard", Apr. 2015, (pp. 1-10).
Treated Wood, "D-Blaze: Fire Retardant Treated Wood", Jan. 2015, (pp. 1-13).
Arch Wood Protection Inc., "Dricon: Application Guide", Jan. 2016, (pp. 1-28).
ICC Evaluation Service Inc., "ICC-ES Listing Report: FX Lumber Guard/FX Lumber Guard XT Fire-Retardant Coatings", Oct. 2016, (pp. 1-3).
ICC Evaluation Service Inc., "ICC-ES Report: Pyro-Guard Fire Retardant-Treated Wood", Dec. 2016, (pp. 1-8).
Intelligent Wood Systems, "Treated Timber—Customer Information", Nov. 2016, (pp. 1-8).
Intelligent Wood Systems, "IWS FR Fire Retardant Treated Wood Corrosion Information", Jan. 2016, (pp. 1).
Intelligent Wood Systems, "Treated Timber—Consumer Information", Nov. 2016, (pp. 1-15).
Nelson Pine, "How LVL is Made", Nov. 2017, (pp. 1).
Eco Building Products Inc, "Eco Red Shield Material Safety Data Sheet : Wood Dust", Jun. 2005, (pp. 1-2).
LSU Agcenter Wood Durability Laboratory, "Eco Red Shield:Technical Specifications—Strength Testing", Aug. 2011, (pp. 1-21).
Eco Building Products, "Technical Bulletin: Corrosive Effects From Eco Red Shield Coatings", Jan. 2011, (pp. 1).
Underwriters Laboratories Inc., "Greenguard Certification Test for Eco Building Products, Inc.: Eco Red Shield—01", Mar. 2015, (pp. 1-21).
DRJ, "Technical Evaluation Report: Eco Red Shield Fire Treated Wood Protection Coating", Apr. 2016, (pp. 1-8).
Eco Building Products, "Safety Data Sheet: Eco Red Shield", May 2016, (pp. 1-6).
CSE Inc, "AC479: Proposed AC for Wood Structural Panels with Factory-Applied Fire-Retardant Coating", Feb. 2017, (pp. 1-101).

(56) References Cited

OTHER PUBLICATIONS

ASTM International, "Standard Test Method for Extended Duration Surface Burning Characteristics of Building Materials (30 min Tunnel Test), " Aug. 2011, (pp. 1-4).
American Wood Council, "Design for Code Acceptance: Flame Spread Performance of Wood Products Used for Interior Finish", Apr. 2014, (pp. 1-5).
Glenalmond Timber Company, "IWS FR Fire Retardant Treated Wood: Corrosion Information", Nov. 2017, (pp. 1).
Department of the Navy, "Military Specification: Lumber and Plywood", Jun. 1984, (pp. 1-16).
Bank Insurance, Michael D. White, "How Benjamin Franklin Became the 'Father of Insurance'", Dec. 1998, (pp. 1-3).
ASTM International, "Standard Test Methods for Fire Tests of Building Construction and Materials", Oct. 2000, (pp. 1-24).
ASTM International, "Standard Test Method for Evaluating the Flexural Properties of Fire-retardant Treated Softwood Plywood Exposed to Elevated Temperatures", May 2001, (pp. 1-7).
Treated Wood "D-Blaze Fire Retardant Treated Wood: The New Generation Building Material", Mar. 2004, (pp. 1-2).
Swiss Krono, "Swiss Krono 0SB: Prefabricated Construction" Nov. 2017, (pp. 1-6).
NRC CNRC, "Fire Performance of Houses. Phase I. Study of Unprotected Floor Assemblies in Basement Fire Scenarios. Summary Report", Dec. 2008, (pp. 1-55).
Underwriters Laboratories, "Report on Structural Stability of Engineered Lumber in Fire Conditions", Sep. 2008, (pp. 1-178).
Marketwire, "Megola Updates on Hartindo AF21, a Total Fire Inhibitor", Aug. 4, 2010, (pp. 1-3).
D.G. Fraser, "Break the Flame Chain Reaction", Jun. 1962, (pp. 1-3).
Green Building Advisor, Martin Holladay, "Is OSB Airtight?", Aug. 2015, (pp. 1-4).
National Fire Protection Association, "Standard for Fire Retardant-Treated Wood and Fire-Retardant Coatings for Building Materials", Jan. 2015, (pp. 1-16).
Underwriters Laboratories, "Project 90419—Greenguard and Greenguard Gold Annual Certification Test Results", Mar. 2015, (pp. 1-21).
Structural Building Components Association, "Fire Retardants and Truss Design", Jan. 2015, (pp. 1-48).
Western Wood Preservers Institute, "Fire Retardant Wood and the 2015 International Building Code", Jan. 2015, (pp. 1-2).
Structural Building Components Association, "Research Report: Lumber Use in Type III-A Buildings", Jul. 2016, (pp. 1-8).
ASTM International, "Standard Test Method for Evaluating the Effects of Fire-Retardant Treatments and Elevated Temperatures on Strength Properies of Fire-Retardant treated Lumber", Jul. 2010, (pp. 1-6).
ASTM International, "Standard Practice for Calculating Bending Strength Design Adjustment Factors for Fire-Retardant-Treated Plywood Roof Sheathing", Oct. 2015, (pp. 1-6).
ASTM International, "Standard Practice for Calculating Design Value Treatment Adjustment Factors for Fire-Retardant-Treated Lumber", Apr. 2016, (pp. 1-7).
American Wood Preservers' Association, "Standard Method of Determining Corrosion of Metal in Contact With Treated Wood", Jan. 2015, (pp. 1-4).
Trackabout, "Asset Tracking Industry Selection Guide", Nov. 2017, (pp. 1-8).
Trackabout, "Follow-On Tracking", Jan. 2013, (pp. 1-2).
Nordson Corporation, "Airless Spray Systems: The Efficient Choice for Many Liquid Painting Applications", Jan. 2004 (pp. 1-8).
Marketwired, "Megola Obtains Class A Rating for Hartindo AF31", Nov. 2007, (pp. 1-2).
Marketwire, "Megola Inc. Signs 'Hartindo AF21' Licensing Agreement with Eco Blu Products, Inc.", Nov. 2009, (Pags 1-2).
Conception R.P. Inc., "The Cutting Edge of Finger Jointing", Feb. 2005, (pp. 1-16).
Marketwired, "Megola Sells Hartindo AF21, a Total Fire Inhibitor, to One of the World's Largest Textile and Chemical Manufactures", Aug. 2010, (pp. 1-3).
Marketwired, "Megola Continues Sales of Hartindo AF21 to EcoBlu Products, Inc.", Dec. 2010, (pp. 1-2).
Woodworking Network, "Megola to Buy Wood-Protecting Hartindo AF21 Fire Inhibitor", Aug. 2011, (pp. 1-2).
Office Action dated Jun. 1, 2018 for U.S. Appl. No. 15/829,948 (pp. 1-13).
Hoover Inc., "Exterior Fire-X Treated Wood: Material Safety Data Sheet", Oct. 2005, (pp. 1-9).
USDA Forest Service, "Mass Laminated Timber in the United States: Past, Present, and Future", Nov. 2017, (pp. 1-13).
Western Wood Products Association, "Flame-spread Ratings & Smoke-Developed Indices; Conformance with Model Building codes", Nov. 2017, (pp. 1-2).
Robert H. White, Erik V. Nordheim, "Charring Rate of Wood for ASTM E 119 Exposure", Feb. 1992, (pp. 1-2).
Forest Products Laboratory, Robert H. White, Mark A. Dietenberger, "Chapter 17: Fire Safety", Feb. 1999, (pp. 1-17).
Hoover Wood Products, "Exterior Fire-X Material Safety Data Sheet", Oct. 2005, (pp. 1-5).
Hardwood Plywood & Veneer Association, "Report on Surface Burning Characteristics Determined by ASTM E 84 Twenty-Five Foot Tunnel Furnace Test Method", Jan. 2008, (pp. 1-7).
Chemical Online, "Mse Enviro-Tech Corp. Introduces Dectan", May 2007, (pp. 1).
Studiengemeinschaft Holzleimbau, "Building with Cross Laminated Timber", Jan. 2011, (pp. 1-36).
FP Innovations, M. Mohammad, "Connections in CLT Assemblies", Sep. 2011, (pp. 1-59).
MGB Achitecture & Design, "The Case for Tall Wood Buildings: How Mass Timber Offers a Safe, Economical, and Environmentally Friendly Altermative for Tall Building Structures", Feb. 2012, (pp. 1-240).
NY Times, "Building with Engineered Timber", Jun. 2012, (pp. 1-3).
Jerrold E. Winandy, Qingwen Wang, Robert E. White, "Fire-Retardant-Treated Strandboard: Properties and Fire Performance", May 2007, (pp. 1-10).
2012 CLT Handbook, Christian Dagenais, Robert H. White, Kuma Sumathipala, "Chapter 8—Fire", Nov. 2012, (pp. 1-55).
FPInnovations, "CLT Handbook: Cross-Laminated Timber", Jan. 2013, (pp. 1-572).
Siemens, "Transforming Timbers into Houses", Jan. 2013, (pp. 1-3).
Holzforschung Austria, "Construction with Cross-Laminated Timber in Multi-Storey Buildings: Focus on Building Physics", Apr. 2013, (pp. 1-160).
Fire Protection Research Foundation, Robert Gerard, David Barber, "Fire Safety Challenges of Tall Wood Buildings", Dec. 2013, (pp. 1-162).
Andrew Buchanan, Birgit Ostman, Andrea Frangi, "Fire Resistance of Timber Structures", Mar. 2014, (pp. 1-20).
American Wood Council, "2015 NDS Changes", Jul. 2015, (pp. 1-66).
Holzforshung Austria, "Short Report: Renewal of the abridged report on the fire resistance REI 60 according to EN 13501-2 of STORA ENSO CLT as load-carying cross-laminated timber wall elements ≥ 80 mm unplanked and planked with plaster boards", Dec. 2012, (pp. 1-5).
Charlotte Pipe and Foundry Company, "Technincal Bulletin: Understanding Flame Spread Index (FSI) and Smoke Developed Index (SDI) Ratings", Jan. 2016, (pp. 1-2).
DRJohnson Lumber Company, "Cross Laminated Timbers: Mass Timber Construction", Jan. 2016, (pp. 1).
Globe Advisors, "Study of Insurance Costs for Mid-Rise Wood Frame and Conrete Residential Buildings", Jan. 2016, (pp. 1-61).
Stora Enso, "CLT Engineer: The Stora Enso CLT Design Software User Manual,"Jan. 2016, (pp. 1-118).
Stora Enso, "CLT—Cross Laminated Timber: Fire Protection", Jan. 2016, (pp. 1-51).
Wood Works, "The Case for Cross Laminated Timber", Jan. 2016, (pp. 1-212).

(56) References Cited

OTHER PUBLICATIONS

Lendlease, Jeff Morrow, "More with Less: An Overview of the 1st CLT Hotel in the U.S.", Apr. 2016, (pp. 1-45).
DCI Engineers, "Cross-Laminate Timber", May 2016, (pp. 1-5).
Calgary Herald, Andrea Cox, "Homebuilder Wants Buyers to be in the Pink", Oct. 2011, (pp. 1-6).
Andrew Crampton, "Cross Laminated Timber: The Future of Mid-Rise Construction,"Jun. 2016, (pp. 1-5).
CALLISONRTKL, "Seattle Mass Timber Tower, Feasibility Study: Design and Construction Analysis " Aug. 2016, (pp. 1-34).
Fire Engineering, "Charred Wood and Fire Resistance", Oct. 2016, (pp. 1-6).
Rubner Holzbau, "Timber Engineering in the 21st Century", Jan. 2017, (pp. 1-21).
Metroscape, "Building the Future: New Technology and the Changing Workforce", Jan. 2017, (pp. 1-32).
Stora Enso, "Stora Enso CLT Technical Brochure", Feb. 2017, (pp. 1-32).
Spiritos Properties, "Mass Timber—101 and Beyond", Apr. 2017, (pp. 1-17).
Inland Marine Underwriters Association, "CLT and Builder's Risk", May 2017, (pp. 1-26).
Asia Pacific Fire, "Approaching the Flame Fire Fighting", Jun. 2017, (pp. 1-2).
Rubner Holzbau, "Wood Culture 21: Construction Expertise for Architects, Designers and Building Owners", Jul. 2017, (pp. 1-23).
Treehugger, Lloyd Alter, "Katerra to Build Giant New CLT Factory in Spokane, Washington", Sep. 2017, (pp. 1-16).
SFPE, Peter Johnson, "Fire Safety Engineering Education—Part of a Certification Framework", Jan. 2012, (pp. 1-11).
Fire Engineering, Phillip Paff, "Mass Timber Construction in High-Rise Residential Structures: How Safe is it?", Jan. 2018, (pp. 1-9).
Fire Engineeering, Len Garis, Karin Mark, "Tall Wood Buildings: Maximizing Their Safety Potential", Jan. 2018, (pp. 1-12).
XLam, "Technical: XLam Panel Specifications", Jan. 2018, (pp. 11).
Archpaper, Antonio Pacheco, "Katerra's approach could make factory construction a model for the future", Apr. 2018, (pp. 1-4).
AIG, "AIG Global Property Construction Risk Engineering", Nov. 2017, (pp. 1-6).
Firetect, "Safe-T-Guard Product Data Sheet", Apr. 2008, (pp. 1-6).
ICL Performance Products LP, "Material Safety Data Sheet", Jul. 2014, (pp. 1-6).
Treehugger, Lloyd Alter, "Wood Frame Construction is Safe, Really", Dec. 2014, (pp. 1-5).
LP Building Products, "Material Safety Data Sheet", May 2014, (pp. 1-4).
Lon H. Ferguson, Christopher A. Janicak, "Fundamentals of Fire Protection for the Safety Professional", Jul. 2005, (pp. 1-341).
Roseburg Forest Products, "Wood I-Joists", Jan. 2016, (pp. 1-6).
Spraying Systems Co., "Industrial Hydraulic Spray Products", Jan. 2015, (pp. 1-220).
Conrad Forest Products, "BLUWOOD: The Color of Protection", http://www.conradfp.com/building-products-bluwood.php, Nov. 2017, (pp. 1-8).
The University of Chicago, Salen Churi, Harrison Hawkes, Noah Driggs, "Internet of Things: Risk Manager Checklist, U.S.", Dec. 2016, (pp. 1-23).
DRJ, "AAF21 Fire Treated Wood Protection Coating Applied to Lumber", Sep. 2017, (pp. 1-8).
Roseburg Forest Products, "Roseburg EWP Commerical Design and Installation Guide", Mar. 2017, http://www.roseburg.com., (pp. 1-48).
Fire Retardant Coatings of Texas, "FX Lumber Guard XT: Technical Data Submittal Sheet", Aug. 2018, (pp. 1).
Fire Retardant Coatings of Texas, M. Mueller, "Residential Home Builders", Oct. 2016, (pp. 1-5).
Fire Retardant Coatings of Texas, M. Mueller, "Architects", Oct. 2016, (pp. 1-5).
Fire Retardant Coatings of Texas, "FX Lumber Guard: Technical Data Submittal Sheet", Aug. 2018, (pp. 1).
Trusjoist, Weyerhauser, "Fire-Rated Assemblies and Sprinkler Systems", May 2017, (pp. 1-24).
Office Action dated Oct. 12, 2018 for U.S. Appl. No. 15/874,874 (pp. 1-15).
NFPA, "Certified Fire Protection Specialist: Candidate Handbook", Apr. 2018, (pp. 1-34).
Hoover Inc., "Pyro-Guard, Exterior Fire-X", Dec. 2017, (pp. 1-12).
Coastal Forest Products, "Multi-Ply CP-LAM Beam Assembly", Nov. 2017, (pp. 1-5).
NFPA Journal, Jesse Roman, "Build. Burn. Repeat?", Feb. 2018, (pp. 1-9).
Kallesoe Machinery, "CLT Production Line", Nov. 2017, (pp. 1-5).
Hoover, "2hr Fire Resistant Load Bearing Wall", Nov. 2017, (pp. 1).
OSB, "Trust Joist 2JI 210 Screenshot", Jan. 2012, (pp. 1).
Mitsui Home America, "Mitsui Homes Inc. Website and Screenshots", Dec. 2012, (pp. 1-38).
Fire Retardant Coatings of Texas, "FlameStop Screenshots", Nov. 2017, (pp. 1-2).
Fire Retardant Coatings of Texas, "FX Flame Guard Screenshot", Nov. 2017, (pp. 1).
RDR Technologies, "BanFire Screenshot", Nov. 2017, (pp. 1).
RDR Technologies, Fire Retardant Coatings of Texas, "FX Lumber Guard Screenshots", Nov. 2017, (pp. 1-2).
Fire Retardant Coatings of Texas, "Product Certifications & Featured Products Screenshots", Nov. 2017, (pp. 1-4).
Fire Retardant Coatings of Texas, "Product Certifications Screenshot", Nov. 2017, (pp. 1).
Fire Retardant Coatings of Texas, "Safety Data Sheet Screenshot", Nov. 2017, (pp. 1).
Fire Retardant Coatings of Texas, "FX Lumber Guard Screenshot", (pp. 1).
Metsawood, "Kerto LVL Screenshot", Nov. 2017, (pp. 1).
Raute, "LVL Technology Screenshot", (pp. 1).
Newstar Chemicals, Hartindo Anti Fire Products, Nov. 2017, (pp. 1).
Natural Fire Solutions, "Website Screenshots", Nov. 2017, (pp. 1-4).
RFID Journal, Ask the Experts Forum, "How Is RFID Being Used in the Construction Industry ?", Jun. 27, 2013, (2 Pages).
Autodesk, Inc., "Autodesk® BIM 360 DOCS: A Cloud-Based Document Management Service for Construction Project and Project Teams," 2017 (3 Pages).
Autodesk, Inc., "Autodesk® BIM 360 DOCS: A Cloud-Based Document Management Service for Construction Project and Project Teams," 2016 (1 Pages).
Autodesk, Inc., "Autodesk® BIM 360 DOCS: A Cloud-Based Document Management Service for Construction Project and Project Teams," 2017 (2 Pages).
Autodesk, Inc., Sander Lijbers, AEC Industry Manager, Presentation at CADAC BIM Congres 2015 on Autodesk® BIM 360®, 2015 (33 Pages).
Procore Technologies, Inc, Brochure for Procore® Cloud-Based Construction Management Software, Nov. 2018, (11 Pages).
Woodworks, "Wood Brings the Savings Home", Jan. 2013, (pp. 1-8).
Procore Technologies, Inc, Brochure for Procore® Construction Operating System and Cloud-Based Construction Management System , 2018, (15 Pages).
Pendu Manufacturing, Inc., North Holland, PA, Slide Show of Youtube Video of a Pendu Automated Wood Board Dip Tank System in Operation, Feb. 8, 2012, (30 Pages).
Woodworks, "Case Study: UW West Campus Student Housing", Jan. 2013, (pp. 1-8).
Rethink Wood, "Mid-Rise Wood Construction", Apr. 2015, (pp. 1-12).
Rethink Wood, "Designing for Fire Protection: Expanding the Possibilities of Wood Design", Aug. 2015, (pp. 1-8).
Woodworks, "Design Example: Five-Story Wood-Frame structure Over Podium Slab", Sep. 2016, (pp. 1-79).
Agacad, "Wood Framing", Jan. 2016 (pp. 1-4).

(56) References Cited

OTHER PUBLICATIONS

Weyerhauser, Renee Strand, "Mid-Rise, Wood-Framed, Type III Construction—How to Frame the Floor to Wall Intersection at Exterior Walls", Apr. 2016, (pp. 1-8).
Louisiana-Pacific, "FlameBlock: Assemblies and Applications", Aug. 2017, (pp. 1-8).
Globenewswire, "Shazamstocks.com Announces Profile Launch of MSE Enviro-Tech Corp.", Feb. 2008, (pp. 1-3).
Benzinga, "Megola Inc. Files Application to Underwriter Laboratories for Certification", May 2010, (pp. 1-3).
Coastal Forest Products, "CP-LAM 2.0E Design Properties & Floor Beams", Nov. 2017, (pp. 1-5).
Kallesoe Machinery A/S, "System Solutions for Laminated Wood Products", Nov. 2017, (pp. 1-3).
Intertek, "Report of TESTING Fx Lumber Guard Fire Retardant for I-Joist, Truss Joist (TJI), FLoor Joist, Ceiling Joist, amd OSB", Mar. 2013, (pp. 1-9).
Intertek, "Report of Testing FX Lumber Guard", Nov. 2014, (pp. 1-9).
Intertek, "Report of Testing FX Lumber guard Fire Retardant Coating Applied to I-Joists in a Floor Celing Assembly", Aug. 2014, (pp. 1-6).
Intertek, "Report of Testing FX Lumber Guard on SPF Lumber", Jun. 2012, (pp. 1-6).
Intertek, "Report of Testing FX Lumber Guard (Dimensional Lumber)", Apr. 2015, (pp. 1-10).
Intertek, "Report of Testing FX Lumber Guard", Aug. 2015, (pp. 1-6).
Fire Retardant Coatings of Texas, "FX Lumber Guard", Sep. 2016, (pp. 1).
Fire Retardant Coatings of Texas, "Safety Data Sheet (SDS)" Mar. 2016, (pp. 1-7).
Intertek, "Building & Construction Information Bulletin: Introduction to ASTM E84 & Frequently Asked Questions", Jun. 2017, (pp. 1-2).
Hoover Inc., "Exterior-Fire X", Nov. 2017, (pp. 1).
Hoover Inc., "Pyro-Guard", Nov. 2017, (pp. 1).
John Packer, NZ Institute of Chemistry, "Chemistry in Fire Fighting" , Oct. 2017, (6 Pages).
Flamestop, "Flamestop II: Fire Retardant Spray for Wood", Jan. 2017, (pp. 1-3).
Flamestop, "Learn About Flamestop Inc.", Jan. 2017, (pp. 1-3).
Lousiana-Pacific, "FlameBlock: Assemblies and Applications", Aug. 2017, (pp. 1-8).
MagTech, "MagTech OSB", Nov. 2017, (pp. 1-2).
Hoover Inc., "Fasteners for Pyro-Guard: Interior Fire Retardant Treated Wood Products", Oct. 2013, (pp. 1).
Hoover Inc., "Code References: Fire-Retardant-Treated Wood", Mar. 2014, (pp. 1-2).
Hoover Inc., "Guidelines for Finishing and Use of Adhesives with Pyro-Guard Fire Retardant Treated Wood", Jan. 2014, (pp. 1).
Hoover Inc., "Specification for Pyro-Guard: Interior Fire Retardant Treated Wood", Apr. 2014, (pp. 1).
Hoover Inc., "Pyro-Guard Storage, Handling, and Installation Recommendations", Jan. 2014, (pp. 1).
Office Action dated Nov. 9, 2018 for U.S. Appl. No. 15/866,456 (pp. 1-11).
Dealer News, "SiteOne Introduces New LESCO Smart Guided Precision Spray System", Nov. 5, 2018, https://www.rurallifestyledealer.com/articles/7715-siteone-introduc , (4 Pages).
Erdal Ozkan, Ohio State University Professor and Extension Agriculture Engineer, "One-of-a-kind Intelligent Sprayer Being Developed in Ohio", Jun. 20, 2018, https://www.michfb.com/MI/Farm-News/One-of-a-kind-Intelligent-sprayer-being-developed-in-Ohio/, (6 Pages).
Chip Tuson, Ohio State News, "World's First "Intelligent" Sprayer", Aug. 2, 2018, https://news.osu.edu/the-worlds-first-intelligent-sprayer/, (4 Pages).
3M, Building and Commerical Services Division, "Brochure for 3M FireDam™ Spray 200 Sealing Agent", 2009,(2 Pages).
Wildfire Defense Systems, Inc., Web Brochure on WDSPRo Mobile Application for Wildfire Hazard Property Assessment, 2017, (3 Pages).
Wildfire Defense Systems, Inc., Web Brochure on WDSFire Wildfire Reporting Dashboard Service for Wildfire Risk During an Active Wildfire, 2017, (2 Pages).

\* cited by examiner

MULTI-STOREY WOOD FRAMED BUILDING
DURING CONSTRUCTION PHASE

| Summary of Test Samples ||||
|---|---|---|---|
| Test Assembly No. | Supports | Ceiling | Floor and Roof |
| 1 | 2 by 10s 16 inch centers | None | 1 by 6 subfloor & 1 by 4 finish floor |
| 2 | 12 inch deep "I" joist @ 24 inch centers | None | 23/32 inch OCB subfloor, carpet padding & carpet |
| 3 | 2 by 10s 16 inch centers | 1/2 inch regular gypsum wallboard | 1 by 6 subfloor & 1 by 4 finish floor |
| 4 | 12 inch deep "I" joist @ 24 inch centers | 1/2 inch regular gypsum wallboard | 23/32 inch OCB subfloor, carpet padding & carpet |
| 5 | Parallel chord truss with steel gusset plate connections, 14 inch deep @ 24 inch centers | 1/2 inch regular gypsum wallboard | 23/32 inch OCB subfloor, carpet padding & carpet |
| 6 | Parallel chord truss with glued connections, 14 inch deep @ 24 inch centers | 1/2 inch regular gypsum wallboard | 23/32 inch OCB subfloor, carpet padding & carpet |

FIG. 10A
(PRIOR ART)

| Summary of Test Results ASTM E119 ||||||
|---|---|---|---|---|---|
| Test Assembly No. | Time of 250°F avg. temperature rise on surface of floor / roof (min:sec) | Time of 325°F max. temperature rise on surface of floor / roof (min:sec) | Flame passage through floor / roof (min:sec) | Collapse (min:sec) | Fire resistance rating (min) |
| 1 | * | * | 18:30 | 18:45 | 19 |
| 2 | * | * | 06:00 | 06:03 | 6 |
| 3 | * | * | 44:15 | 44:45 | 44 |
| 4 | * | * | * | 26:45 | 27 |
| 5 | * | 29:15 | 28:40 | 29:15 | 29 |
| 6 | * | 24:15 | 26:00 | 26:45 | 24 |

FIG. 10B
(PRIOR ART)

Time to Failure ($t_f$) of Unprotected Floor Assemblies

| Assemblies tested | Open basement doorway | | Closed basement doorway | |
|---|---|---|---|---|
| | Test | $t_f$ (s) | Test | $t_f$ (s) |
| Solid wood joist (235 mm depth) | UF-01 | 740 | UF-02 | 1200 |
| Wood I-joist A (302 mm depth) | UF-03 | 490 | UF-09 | 778 |
| Steel C-joist (203 mm depth) | UF-04 | 462 | - | - |
| Metal-plate wood truss (305 mm depth) | UF-05 | 469 | - | - |
| Wood I-joist B (302 mm depth) | UF-06 | 382 | - | - |
| | UF-06R | 380 | - | - |
| | UF-06RR | 414 | - | - |
| Metal web wood truss (305 mm depth) | UF-07 | 325 | UF-08 | 474 |

FIG. 11
(PRIOR ART)

WOOD BEARING WALL SCHEDULE

| MARK<br>LEVEL | W1/W1A" | W2/W2A" | W3 | WE1/W1A | WE2 | WC1 | WC2 | WF1 |
|---|---|---|---|---|---|---|---|---|
| (WHERE OCCURS)<br>ROOF | 3x6 - 16, 2x6 - 9, 2x6 - 16, 2x6 - 16 | 3x6 - 16, 3x4 - 12, 3x4 - 16, 2x4 - 16 | 3x6 - 12, 2x6 - 16, 2x6 - 16, 2x6 - 16 | 3x5 - 16, 2x6 - 16, 2x6 - 16, 2x6 - 16 FRT | 3x5 - 16, 2x6 - 16, 2x6 - 16, 2x6 - 16 FRT | 2x5 - 12, 2x6 - 16, 2x6 - 12, 2x6 - 16 | 2x5 - 12, 2x6 - 16, 2x6 - 12, 2x6 - 16 | 3x6 - 16, 3x4 - 12, 3x4 - 16, 2x4 - 16 |
| 5 | | | | FRT | FRT | | | |
| 4 | | | | FRT | FRT | | | |
| 3 | | | | FRT | FRT | | | |
| 2 | | | | FRT | FRT | | | |
| GROUND | | | | | | | | |
| DETAIL | A | A | A | B | B | A | A | C |

(A) TYPICAL INTERIOR
(B) TYPICAL EXTERIOR
(C) FIRE WALL

DESIGNING, PRE-FABRICATING AND CONSTRUCTING A MULTI-STORY WOOD-FRAMED BUILDING TO DEMONSTRATE IMPROVED CLASS-A FIRE PROTECTION AND IMPROVED RESISTANCE TOTAL FIRE DESTRUCTION

PHASE 1: DURING THE ARCHITECTURAL DESIGN PHASE

SPECIFY THE NEW WOOD-FRAMED BUILDING TO USE:

(i) CLASS-A FIRE-PROTECTED LUMBER, OR RAW UNTREATED LUMBER,
(ii) CLASS-A FIRE-PROTECTED OSB SHEETING,
(iii) CLASS-A FIRE-PROTECTED OSB I-JOISTS,
(iv) CLASS-A FIRE-PROTECTED FLOOR TRUSSES,
(v) CLASS-A FIRE-PROTECTED ROOF TRUSSES, and
(vi) ON JOB-SITE CLASS-A FIRE-PROTECTED SPRAY COATING TREATMENT OF ALL RAW/UNTREATED AND TREATED LUMBER AFTER COMPLETION OF WOOD-FRAMED ASSEMBLIES SO AS TO ENSURE THE ADEQUATE FIRE-INHIBITING COATING OF ALL WOOD USED ON THE BUILDING CONSTRUCTION SITE.

PHASE 2: DURING THE CONSTRUCTION PHASE

PRODUCE IN A PREFABRICATED WOOD-FRAMED BUILDING FACTORY SYSTEM SUPPORTING MULTIPLE PRODUCTION LINES, PREFABRICATED CLASS-A FIRE-PROTECTED WOOD-FRAMED BUILDING COMPONENTS FOR USE IN CONSTRUCTING A PRE-SPECIFIED CLASS-A FIRE-PROTECTED WOOD-FRAMED BUILDING.

FLAME SPREAD AND SMOKE DEVELOPMENT INDICES OBTAINED THROUGH TESTING OF CLASS-A FIRE-PROTECTED LUMBER

| Flame Spread & Smoke Developed Indexes of AAF21 (FT) Protected Lumber | | |
|---|---|---|
| | Flame Spread | Smoke Developed |
| Spruce Pine Fir | 15 | 95 |
| Douglas Fir | 0 | 40 |

1. Tested in accordance with ASTM E84 and UL 723.
2. Additionally, the flame front did not progress more than 10.5 feet beyond the centerline of the burners at any time during the test.

FIG. 21

CLASS-A FIRE-PROTECTED CROSS-LAMINATED TIMBER (CLT) PRODUCTS ACCORDING TO THE PRESENT INVENTION

METHOD OF PRODUCING CLASS-A FIRE-PROTECTED CROSS-LAMINATED TIMBER (CLT) IN AN AUTOMATED LUMBER FACTORY

A: IN AN AUTOMATED LUMBER FACTORY, INSTALLING AND OPERATING A HIGH-SPEED FIRE-PROTECTED LUMBER PRODUCTION LINE, PROVIDED WITH A RESERVOIR TANK WITH A LARGE SUPPLY OF CLEAN FIRE-INHIBITING CHEMICAL (CFIC) LIQUID THAT IS CONTINUOUSLY SUPPLIED TO THE AUTOMATED IN-LINE HIGH-SPEED CFIC LIQUID DIP COATING STAGE OF THE LUMBER FACTORY, INSTALLED BETWEEN (I) A CROSS-LAMINATED TIMBER (CLT) PLANING AND FINISHING STAGE, AND (II) AN AUTOMATED PACKAGING AND LABELING STAGE AT THE END OF THE PRODUCTION LINE

B: CONTINUOUSLY LOADING A UNIFORM SUPPLY OF UNTREATED SHORT-LENGTH TIMBER ONTO THE HIGH-SPEED MULTI-STAGED CONVEYOR-CHAIN TRANSPORT MECHANISM INSTALLED ALONG AND BETWEEN THE STAGES OF THE PRODUCTION LINE.

C: CONTINUOUSLY LOADING THE UNTREATED SHORT-LENGTH LUMBER INTO THE CONTROLLED DRYING STAGE OF THE FIRE-PROTECTED LUMBER PRODUCTION LINE SO TO PRODUCE SUITABLY DRIED SHORT-LENGTH LUMBER FOR SUPPLY TO THE FINGER-JOINTING PROCESSING STAGE.

D: CONTINUOUSLY SUPPLYING CONTROLLABLY-DRIED SHORT-LENGTH LUMBER INTO THE FINGER-JOINTING PROCESSING STAGE, AND PRODUCING EXTENDED-LENGTH FINGER-JOINTED TIMBER PIECES.

FLAME SPREAD AND SMOKE DEVELOPMENT CHARACTERISTICS OF
FIRE-PROTECTED CROSS-LAMINATED TIMBER (CLT) PRODUCTS

Flame Spread & Smoke Developed Indexes of AAF21 (FT) Protected Lumber

| | Flame Spread | Smoke Developed |
|---|---|---|
| Spruce Pine Fir | 15 | 95 |
| Douglas Fir | 0 | 40 |

1. Tested in accordance with ASTM E84 and UL 723.
2. Additionally, the flame front did not progress more than 10.5 feet beyond the centerline of the burners at any time during the test.

FIG. 25

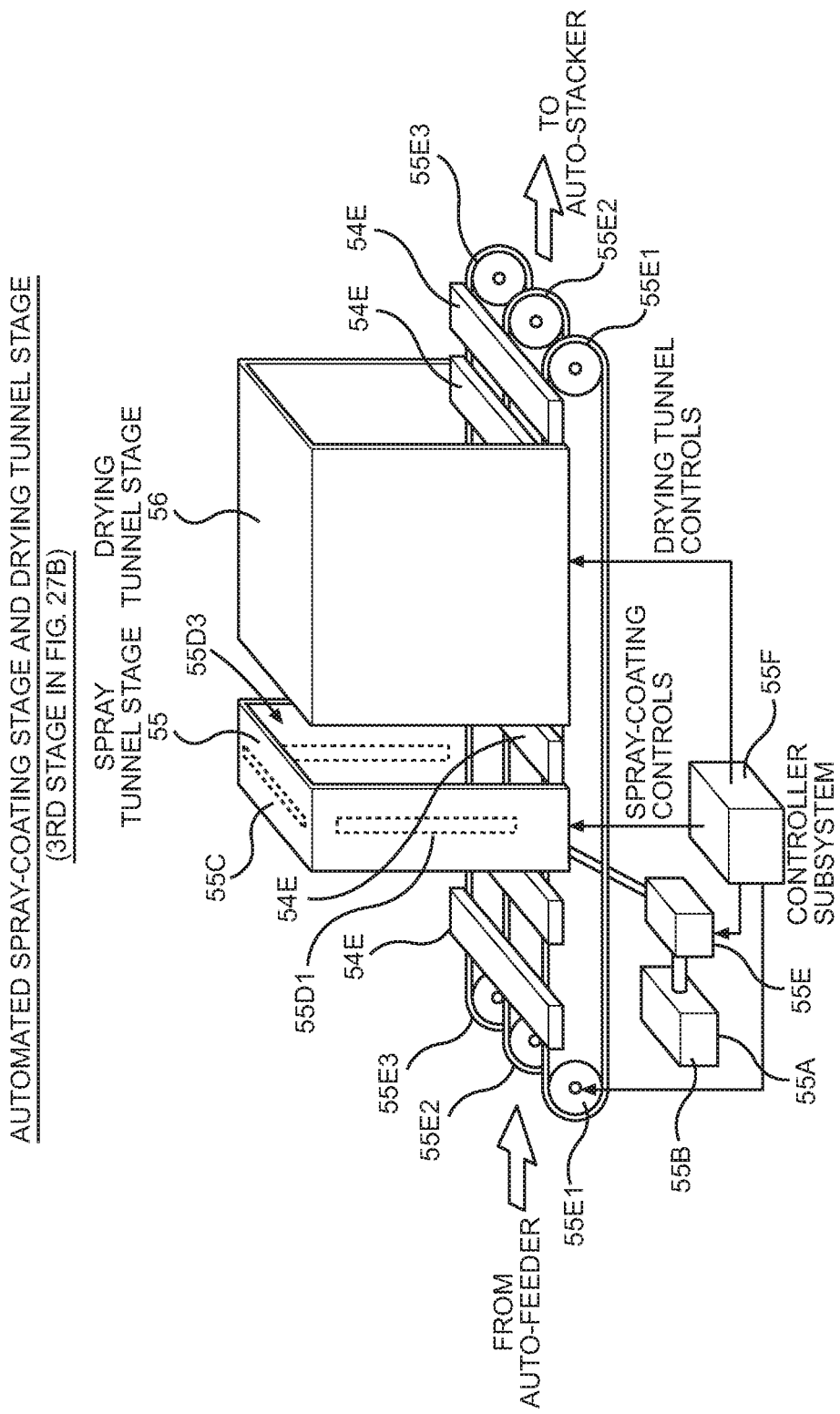

FLAME SPREAD AND SMOKE DEVELOPMENT CHARACTERISTICS OF CLASS-A
FIRE-PROTECTED LAMINATED VENEER LUMBER (LVL) PRODUCTS

Flame Spread & Smoke Developed Indexes of AAF21 (FT) Protected Lumber

| | Flame Spread | Smoke Developed |
|---|---|---|
| Spruce Pine Fir | 15 | 95 |
| Douglas Fir | 0 | 40 |

1. Tested in accordance with ASTM E84 and UL 723.
2. Additionally, the flame front did not progress more than 10.5 feet beyond the centerline of the burners at any time during the test.

FIG. 29

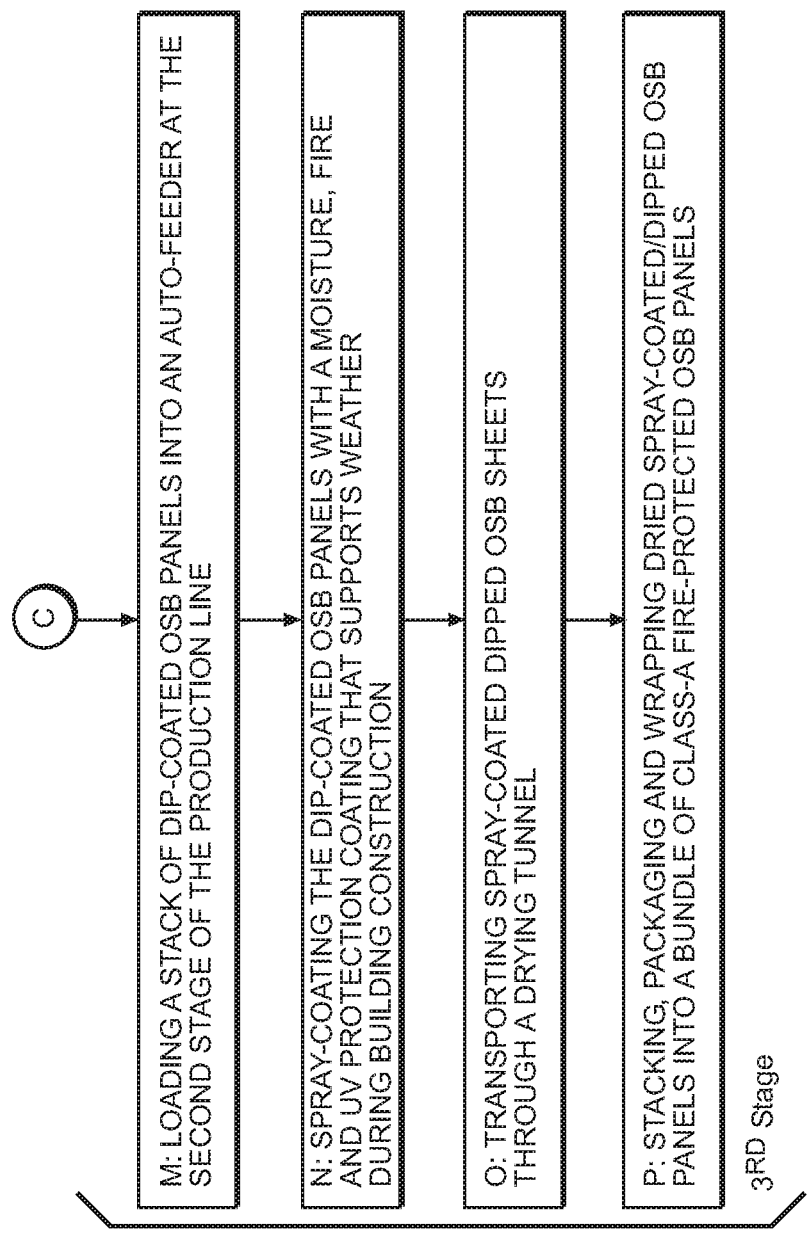

FLAME SPREAD AND SMOKE DEVELOPMENT CHARACTERISTICS OF CLASS-A
FIRE-PROTECTED CROSS-LAMINATED TIMBER (CLT) PRODUCTS

| Flame Spread & Smoke Developed Indexes of AAF21 (FT) Protected Lumber | | |
|---|---|---|
| | Flame Spread | Smoke Developed |
| Spruce Pine Fir | 15 | 95 |
| Douglas Fir | 0 | 40 |

1. Tested in accordance with ASTM E84 and UL 723.
2. Additionally, the flame front did not progress more than 10.5 feet beyond the centerline of the burners at any time during the test.

FIG. 39

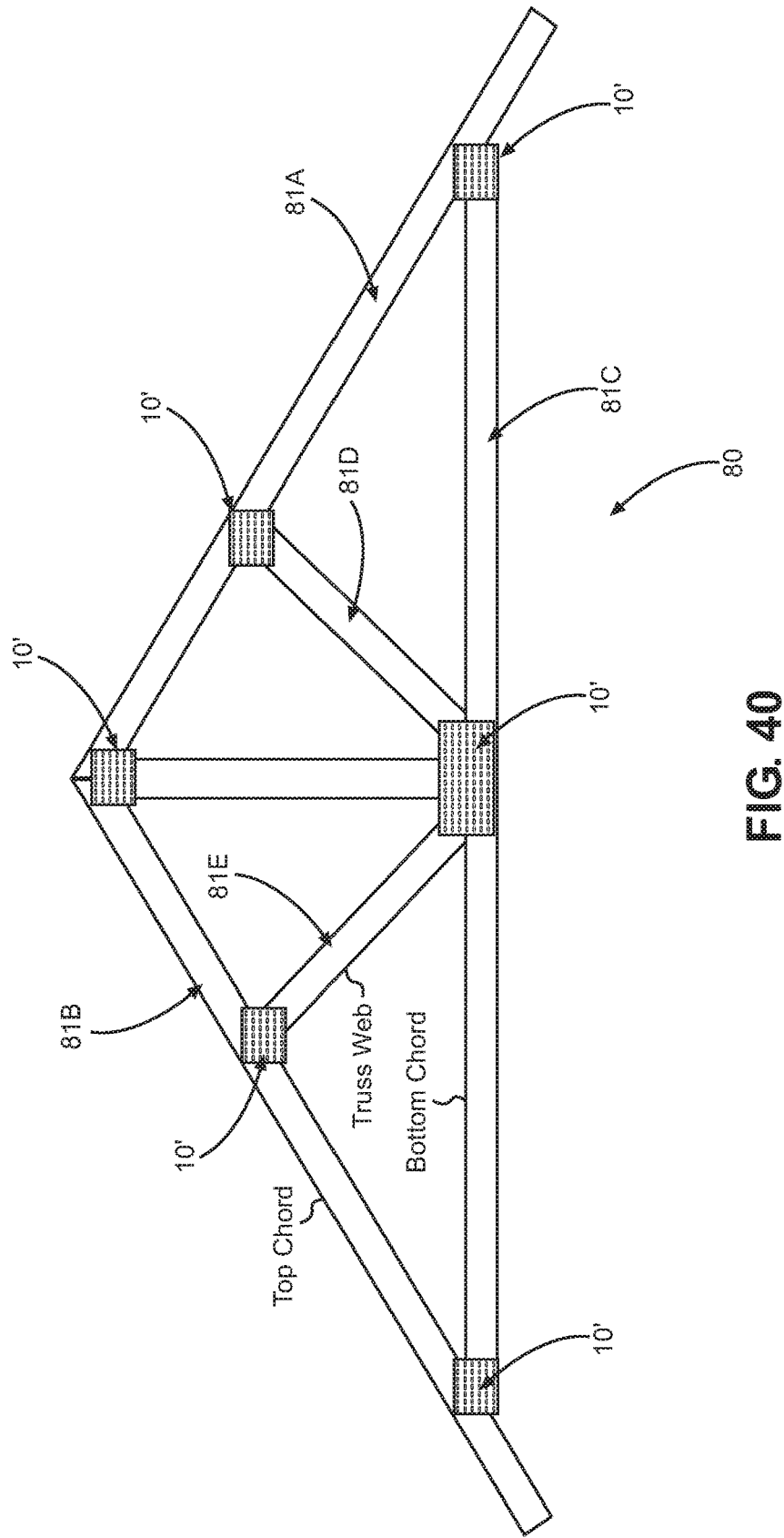

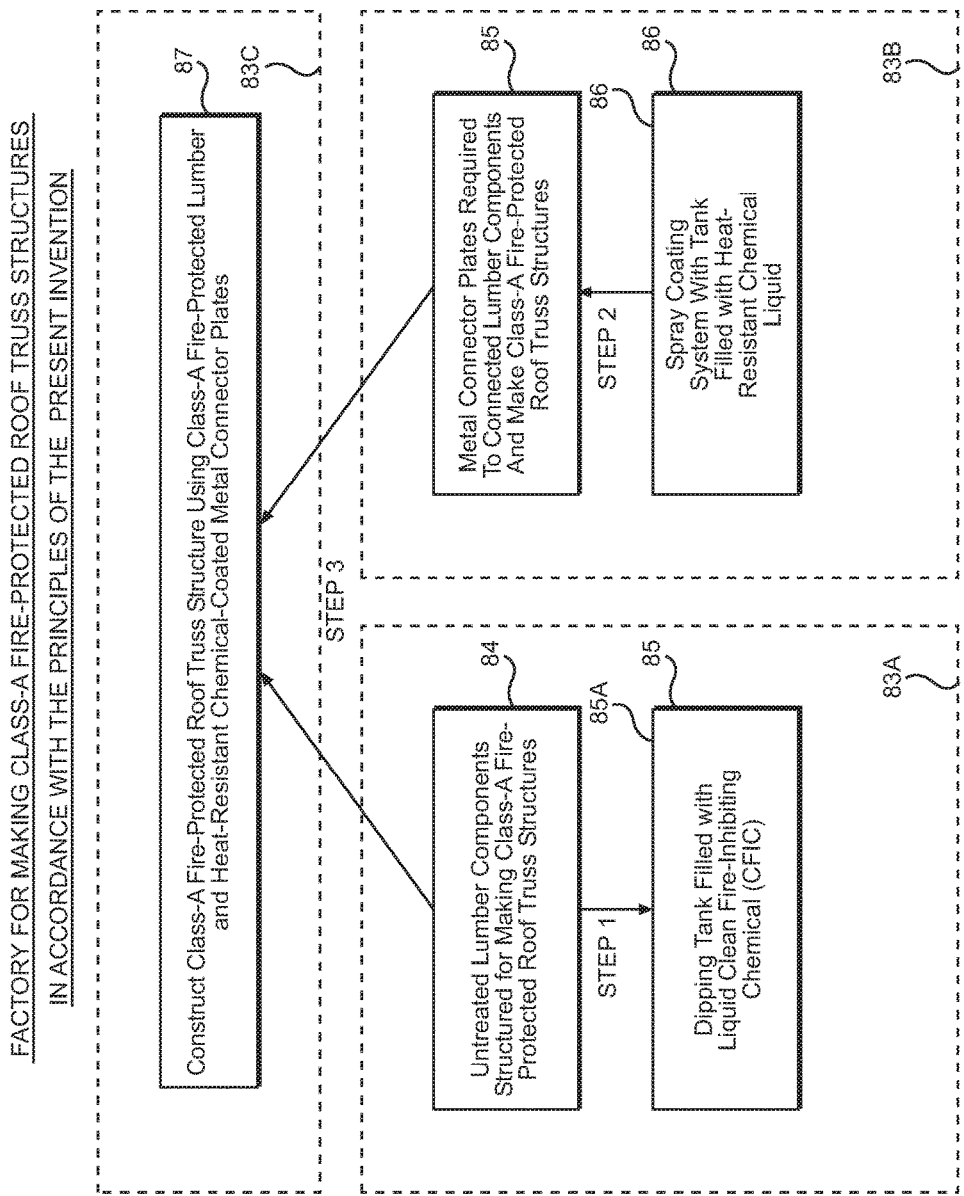

FLAME SPREAD AND SMOKE DEVELOPMENT CHARACTERISTICS OF
CLASS-A FIRE-PROTECTED ROOF TRUSS STRUCTURES

Flame Spread & Smoke Developed Indexes of AAF21 (FT) Protected Lumber

| | Flame Spread | Smoke Developed |
|---|---|---|
| Spruce Pine Fir | 15 | 95 |
| Douglas Fir | 0 | 40 |

1. Tested in accordance with ASTM E84 and UL 723
2. Additionally, the flame front did not progress more than 10.5 feet beyond the centerline of the burners at any time during the test.

FIG. 44

FLAME SPREAD AND SMOKE DEVELOPMENT CHARACTERISTICS OF CLASS-A FIRE-PROTECTED JOIST STRUCTURE OF PRESENT INVENTION

| Flame Spread & Smoke Developed Indexes of AAF21 (FT) Protected Lumber | | |
|---|---|---|
| | Flame Spread | Smoke Developed |
| Spruce Pine Fir | 15 | 95 |
| Douglas Fir | 0 | 40 |

1. Tested in accordance with ASTM E84 and UL 723.
2. Additionally, the flame front did not progress more than 10.5 feet beyond the centerline of the burners at any time during the test.

FIG. 48

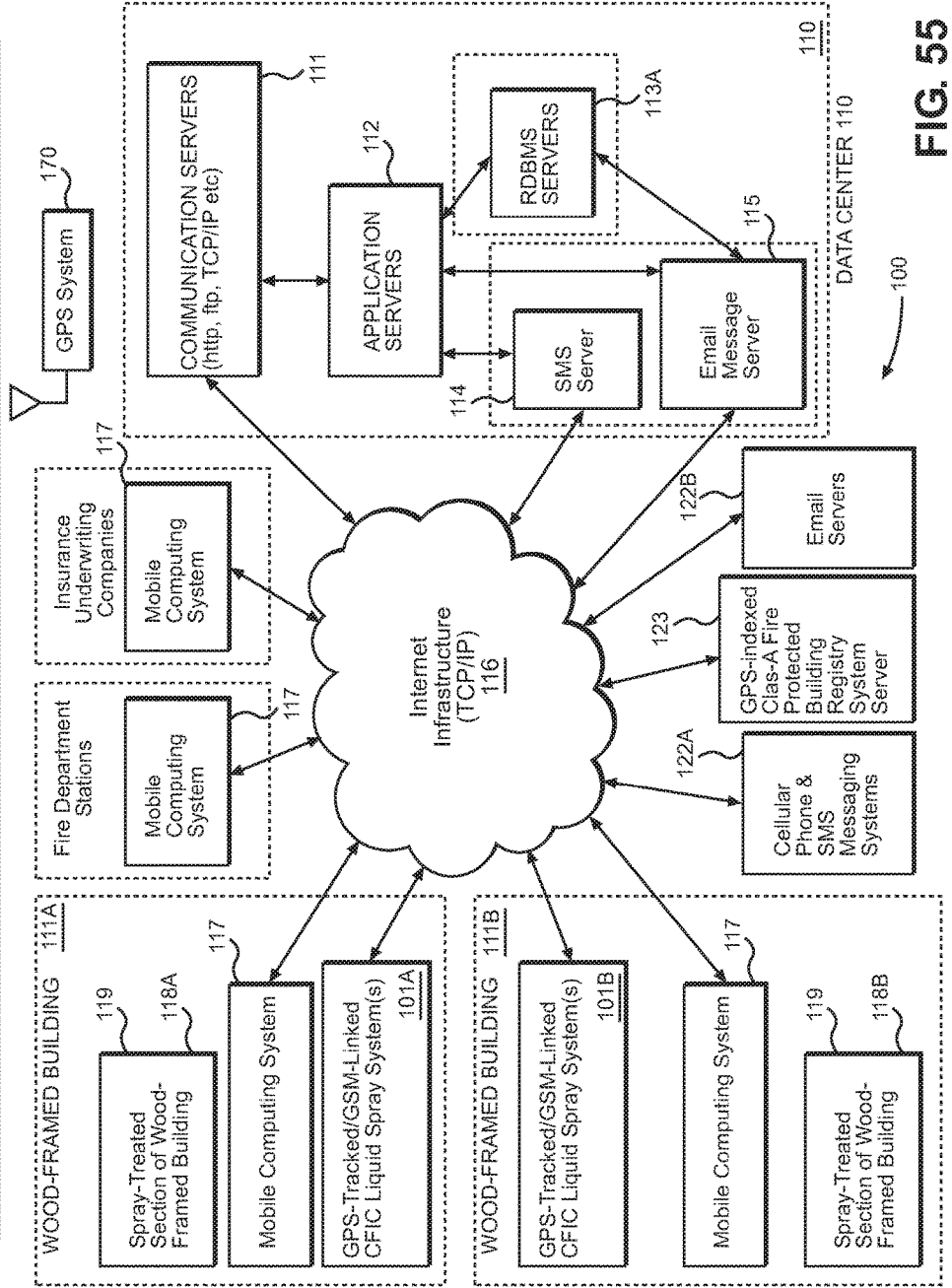

GRAPHICAL USER INTERFACE OF THE MOBILE APPLICATION FOR USE BY BUILDING/PROPERTY OWNERS, INSURANCE COMPANIES, AND OTHER STAKEHOLDERS TO UPDATE BUILDING PROFILE

**GRAPHICAL USER INTERFACE OF THE MOBILE APPLICATION
FOR USE BY BUILDING/PROPERTY OWNERS, INSURANCE COMPANIES, AND
OTHER STAKEHOLDERS TO REVIEW THE FIRE-PROTECTION STATUS
OF A WOOD-FRAMED BUILDING**

GRAPHICAL USER INTERFACE OF THE MOBILE APPLICATION
FOR USE BY BUILDING/PROPERTY OWNERS, INSURANCE COMPANIES,
AND OTHER STAKEHOLDERS TO REVIEW WHEN A PLANNED ONSITE
WOOD BUILDING SPRAY TREATMENT PROJECT IS PLANNED

GRAPHICAL USER INTERFACE OF THE MOBILE APPLICATION FOR USE BY ON-SITE FIRE-PROTECTION SPRAY ADMINISTRATORS AND TECHNICIANS TO REVIEW THE STATUS OF A PLANNED BUILDING FIRE-PROTECTION SPRAY PROJECT

GRAPHICAL USER INTERFACE OF THE MOBILE APPLICATION FOR USE BY ON-SITE FIRE-PROTECTION SPRAY ADMINISTRATORS AND TECHNICIANS TO GENERATE AND REVIEW REPORTS ON SUPPLIES USED IN FULFILLING ON-SITE CLASS-A FIRE-PROTECTION SPRAY PROJECTS MANAGED

METHOD OF VERIFYING AND DOCUMENTING ON-SITE SPRAY-APPLIED CLASS-A FIRE-PROTECTION OVER WOOD-FRAMED BUILDINGS DURING CONSTRUCTION

A: AFTER A BUILDER COMPLETES EACH PREDETERMINED SECTION OF A BUILDING WHERE WOOD FRAMING HAS BEEN CONSTRUCTED AND SHEATHING INSTALLED, BUT BEFORE ANY WALLBOARD HAS BEEN INSTALLED, THE SPRAY TECHNICIAN USES AN AIRLESS LIQUID SPRAYING SYSTEM FILLED WITH CLEAN FIRE INHIBITING CHEMICAL (CFIC) LIQUID TO SPRAY THE CFIC LIQUID OVER ALL EXPOSED INTERIOR WOOD SURFACES IN THE COMPLETED SECTION OF THE BUILDING.

B: WHEN THE COMPLETED SECTION OF THE BUILDING IS SPRAY COATED WITH CFIC LIQUID, THE COMPLETED BUILDING SECTION IS CERTIFIED AND MARKED AS CERTIFIED FOR VISUAL INSPECTION AND INSURANCE DOCUMENTATION PURPOSES.

C: AS EACH SECTION OF THE WOOD-FRAMED BUILDING IS CONSTRUCTED ACCORDING TO THE CONSTRUCTION SCHEDULE, THE SPRAY COATING TEAM CONTINUES TO SPRAY COAT THE COMPLETED SECTION, AND CERTIFY AND MARK (USING CERTIFICATES OR STAMPING) EACH SUCH COMPLETED SPRAY-COATED SECTION OF THE BUILDING UNDER CONSTRUCTION

D: THE SPRAY TECHNICAN THEN ISSUES A CERTIFICATE OF COMPLETION WITH RESPECT TO THE APPLICATION OF CLEAN FIRE INHIBITING CHEMICAL (CFIC) LIQUID TO ALL EXPOSED WOOD SURFACES ON THE INTERIOR OF THE WOOD FRAMED BUILDING DURING ITS CONSTRUCTION PHASE, THEREBY PROTECTING THE BUILDING FROM RISK OF TOTAL DESTRUCTION BY FIRE.

FIG. 60A

BARCODED/RFID-TAG ENCODED INSPECTION CHECKPOINT WITH INTEGRATED
CERTIFICATIONS BY SPRAY TECHNICIAN AND SPRAY SUPERVISOR

300

PROJECT #: _____
LOCATION: _____
BUILDING #: _____
SECTION #: _____
FLOOR #: _____
SUITE/ROOM #: _____
DATE: _____
SPRAY TECH: _____
SPRAY SUPERVISOR: _____
SITE SUPERVISOR: _____

CERTIFICATION BY SPRAY TECHNICIAN

I, _____, a Certified M-Fire Suppression Spray Technician, hereby certify that I sprayed the above-specified Wood-Framed Section of the named Building on the date specified above, using Clean Fire Inhibiting Chemical (CFIC) Liquid so as to provide with Building Section with Class-A Fire-Protection as certified by QAI Laboratories on _____ following ASTM E84-17a Engineering Test Standards.

Spray Technician Signature   Date: _____

CERTIFICATION BY SPRAY SUPERVISOR

I, _____, a Certified M-Fire Suppression Spray Supervisor, hereby certify that, under my direct supervision, the above-specified Wood-Framed Section of the named Building has been sprayed on the date specified above, using Clean Fire Inhibiting Chemical (CFIC) Liquid to provide with Building Section with Class-A Fire-Protection as Certified By QAI Laboratories on _____ following ASTM E84-17a Engineering Test Standards.

Spray Supervisor Signature   Date: _____

FIG. 63

GRAPHICAL USER INTERFACE OF THE MOBILE APPLICATION FOR USE BY PROJECT ADMINISTRATOR SHOWING DETAILS FOR AN ORDER FOR A PRE-SPECIFIED PREFABRICATED WOOD-FRAMED BUILDING, OR WOOD-FRAMED BUILDING COMPONENT

GRAPHICAL USER INTERFACE OF THE MOBILE APPLICATION FOR USE BY PROJECT ADMINISTRATOR SHOWING STATUS DETAILS FOR A PROJECT FOR A CUSTOM PREFABRICATED WOOD-FRAMED BUILDING, OR WOOD-FRAMED BUILDING COMPONENT

GRAPHICAL USER INTERFACE OF THE MOBILE APPLICATION FOR USE BY PROJECT ADMINISTRATOR SHOWING PROGRESS DETAILS FOR A PROJECT RELATING TO THE FACTORY-FABRICATION OF A WOOD-FRAMED BUILDING, OR WOOD-FRAMED BUILDING COMPONENT

GRAPHICAL USER INTERFACE OF THE MOBILE APPLICATION FOR USE BY PROJECT ADMINISTRATOR SHOWING THE STATUS OF A FACTORY PROJECT INVOLVING THE PREFABRICATION OF A CLASS-A FIRE-PROTECTED WOOD-FRAMED BUILDING, OR CLASS-A FIRE-PROTECTED WOOD-FRAMED BUILDING COMPONENT

GRAPHICAL USER INTERFACE OF THE MOBILE APPLICATION FOR USE BY PROJECT ADMINISTRATOR SHOWING A REPORT ON SUPPLIES REQUIRED FOR THE PREFABRICATION OF A CLASS-A FIRE-PROTECTED WOOD-FRAMED BUILDING, OR CLASS-A FIRE-PROTECTED WOOD-FRAMED BUILDING COMPONENT

JUST-IN-TIME FACTORY METHODS, SYSTEM AND NETWORK FOR PREFABRICATING CLASS-A FIRE-PROTECTED WOOD-FRAMED BUILDINGS AND COMPONENTS USED TO CONSTRUCT THE SAME

RELATED CASES

The present patent application is a Continuation-in-Part (CIP) of application Ser. No. 15/829,914 filed Dec. 2, 2017, commonly owned by M-Fire Suppression, Inc., and incorporated herein by reference as if fully set forth herein.

BACKGROUND OF INVENTION

Field of Invention

The present invention is directed toward improvements in building construction, and more particularly, the procurement, prefabrication and construction of multi-story buildings made from wood, lumber and wood-based products, offering improved defense against the ravaging and destructive forces of fire.

Brief Description of the State of Knowledge in the Art

Wood-framed construction offers a number of benefits for multi-residential and mixed-use projects. It allows developers to create high-density, high-quality housing that's also cost effective, with the added advantages of a shorter construction schedule and lighter carbon footprint. The detailing of mid-rise wood buildings plays a significant role in the ability to manage investment costs per unit and best use the lot configuration. Implementing a well-considered structural design requires understanding and coordination of several architectural design principles, such as fire/life safety, acoustics, building envelope and constructability.

Today, multi-story raw light wood-framed buildings under construction are burning down across the United States and Canada causing hundreds of millions of dollars worth of damage and disrupting the lives of thousands of people.

For example, in January 2017, in Maplewood, N.J., a nearly completed, four-story 235-unit apartment complex caught fire. The massive six-alarm fire required 120 fire fighters from two dozen fire companies to extinguish the fire before it got to the completed section.

In March 2017, in downtown Raleigh, Carolina, a seven story apartment building under construction caught fire. The five alarm fire was the largest fire the City has seen in 100 years and caused $12 million dollars in damage. The fire also damaged 10 nearby buildings, five of which were damaged severely.

In March 2017, in Overland Park, Kans., a four-story Apartment building under construction caught fire from a welder's torch. This was a massive eight-alarm fire which also caught 22 large homes in the neighborhood on fire.

In April 2017, in College Park, Md., a nearly completed, four story apartment building caught fire. The five alarm fire caused $39 million damage. The fire forced the closure of the nearby University of Maryland and the evacuation of a Senior Center and 200 firefighters were needed to contain the massive blaze.

On Dec. 8, 2014, a fire destroyed the seven-story Da Vinci Apartment complex that was under construction at the time. The massive fire also damaged nearby buildings and Interstate 110. The fire was set by arsonist, Dawud Abdulwali, who was convicted and sentenced to 15 years in prison. Prosecutors alleged he set the fire in anger over fatal police shootings of African Americans in Ferguson, Mo., and other cities. The spread of radiant heat from the fire was the primary cause of damages to nearby buildings, activating fire sprinklers and causing water damage. Great expenses were incurred by the City of Angeles due to firefighting activities necessary to put out the fire and prevent it from spreading to other properties.

These are just a few examples of where wood-framed buildings are catching on fire these days during construction, prior to sprinklers and drywall being installed in place and made active to protect the wood. Construction fires most frequently occur in buildings constructed without fire treated lumber, and the buildings which use fire treated lumber, only use it on the exterior walls, where such fire treated lumber offers little or no help on burning buildings.

In general, the definition of light wood frame construction is where the roof and floor trusses are made out of 2×4 or 2×6 lumber and Oriented Strand Board (OSB) sheathing as shown in FIGS. 5A and 5B, and engineered wood products or components (EWPs) such as I-joists as shown in FIGS. 6A and 6B. Building with these components requires builders to make best efforts to protect such components and assemblies made therefrom during construction, using full time security guards, and in some cases, temporary sprinkler systems. Today's OSB sheathing and EWPs ignite very fast and advance and spread beyond what fireman can contain by the time they arrive on site at the fire.

While environmentally-safe fire inhibitors are available to coat such OSB sheathing and EWPs, to contain the fire before it progresses to the critical stage, allowing fireman to put out the ignition source. However, as in many industries, the problem is that building and developing is a very competitive industry and developers are reluctant to add to their costs unless they are required to make their buildings safe to build and safer to live in. A similar example is the automobile industry where seat belts were non-existant or optional until Congress mandated minimum federal standards in 1963, and in 1966 finally passed the National Traffic and Motor Vehicle Safety Act. This federal law formally established Federal Motor Vehicle Saftey Standards ("FMVSS") providing minimum legally acceptable requirements for the manufacturing of vehicle components, including seat belts and seat belt buckles. This legislation also made the installation of seat belts mandatory by U.S. automakers.

Wood framed buildings are most vulnerable to fire during the framing stage of building construction—before sprinklers, firewalls or gypsum board linings are installed to protect the structure. There are many activities during construction that can cause a fire to start. Construction activities are a major cause of fire, but so is arson which seems to be on the rise across the USA.

There is a commonality in all the recent catastrophic fires in mid-rise multi-story apartment buildings 1A, 1B and 2, as schematically illustrated in FIGS. 1A, 1B and 2. All of these recent catastrophic fires used lighter roof and floor trusses or I joists and sheathed with OSB, instead of plywood, and when they caught fire, the rapid advance of the fire was beyond what could be controlled with water as a fire extinguishing agent. It will be helpful at this stage to review building codes allowed in such wood-framed multi-story apartment buildings 2, as illustrated in FIG. 3.

The International Building Code allows for five types of construction:

Type I & II: Where all building elements are made of non-combustible materials.

Type III: Where exterior walls are made of non-combustible materials, and the interior building elements are always raw lumber 3 as shown in FIG. 4, and permitted by the code.

Type IV: H.T. (Heavy Timber) Where exterior walls are made of non-combustible materials, and the interior building elements are made of solid or laminated wood without concealed spaces.

Type V: Structural elements, exterior and interior walls are made of any raw materials permitted by the code.

A. Fire-resistance rated construction.

B. Non-fire-resistance rated construction.

In the view the current International Building Code, clearly there is a major design flaw in the structural components and sheathing innovations introduced in the early 1980's, and now used to build high-density structures that are burning down in record numbers.

Since the boom after World War 2, the U.S. Government began limiting the cutting of old growth forests as they were being over harvested. Since then, US reforestation programs have been working very well, and the US has reforested millions of acres. Big saw mills and lumber producers were able to foresee having trouble keeping up with the forecasted housing starts, and that there was a big difference in reforested lumber in bending values and the ⅓ less veneers the juvenile lumber produces. This fact created opportunity for a number of much-needed wood construction products, namely: light-weight floors trusses as shown in FIGS. 7A, 7B and 7C and roof trusses in FIG. 9 constructed typically using untreated lumber shown in FIG. 4 and metal (truss) connector plates shown in FIGS. 7B, 8A and 8B; OSB sheathing shown in FIGS. 5A and 5B; I-Joists shown in FIGS. 6A and 6B; and other engineered wood products (EWPs).

While all of these wood products are great innovations and are needed to support housing starts, the big problem is that such wood products have serious design flaws when it comes to fire-protection, because (i) they ignite faster than old growth lumber, and (ii) the advance of fire is so rapid with these wood product that they have changed how our firemen handle fire rescue missions because roofs and floors collapse so fast building such fires fueled by these wood products.

Raw untreated oriented strand board (OSB) 4 as illustrated in FIG. 5A and described in U.S. Pat. No. 6,098,679 has had an enormous impact on the building industry in many ways. OSB is a wood-based construction sheathing product comprised of wood strands that are sliced from logs, dried, mixed with relatively small quantities of wax and resin, typically less than 3.5% by total weight, formed in mats with the orientation of the wood strands controlled in the length and width directions. The mats of wood strands are then pressed together under heat and pressure, and thermosetting polymeric bonds are created, binding together the adhesive and wood strands to achieve rigid, structural grade panels. It is during this pressing and consolidation process that the wood is compressed by a factor of 1.35 to 1.70 times its original density. The final panels are dry when made. When used in construction, they will often take on moisture from ambient air and/or precipitation, thus exerting swelling forces on the panel as it attempts to regain its natural form and density.

Research confirms that lightweight wood-framed buildings sheathed with OSB material ignite easier and burn faster, and lightweight trusses and I-joists collapse much faster than like building assemblies once constructed from old growth solid lumber. The fire performance characteristic of conventional building components as shown in the test data tables from a UL Report dated 8 Sep. 2008, set forth in FIGS. 10A, 10B and 11. The introduction of engineered wood products (EWPs) such as I-joists 6A, 6B, 6C and 6D and 7 shown in FIGS. 6A and 6B, metal plate connected roof and floor trusses 8, 11, 13 shown in FIGS. 7A, 7B, 7C and 9, and OSB sheathing 4 shown in FIG. 5A, are to blame for these buildings burning during construction. These fires are attacking the sustainable aspect of our renewable timber resources used for housing.

Since the 1980's, engineered wood products (EWPs) such as floor trusses and I-joists have been increasing in market share over solid timber joists in floors and roofs. These innovations were needed because open-concept planned houses required building products that could span longer. In addition, it was found that new-growth timber was not as strong as the old growth timber, especially in terms of bending strength. The need was great and all these new innovations satisfied the need and took market share. However, the fire problem increased, and in Chicago, firemen lost their lives in floor collapses.

The major design flaw in engineered wood products only started to be challenged in the mid-to-late 1990's, prompting, the two largest producers of OSB and I-joists, such as Lousiana & Pacific (LP), to introduce fire-rated products, such as its fire-rated FlameBlock® OSB 5 shown in FIG. 5B and FlameBlock® I-Joist 7 shown in FIG. 6B, to provide fire-rated OSB shealthing and fire-rated I-joists that help combat fire which challenges safefy. LP's FlameBlock® wood products use fire retardant coatings based on magnesium compounds which were originally disclosed by Harold Ellis in U.S. Pat. Nos. 4,572,862 and 5,130,184, incorporated herein by reference. A review of such product innovations should help illustrate both the advantages and drawbacks which fire retardant treated product provide.

Numerous manufacturers offer fire-retardant lumber products based on intumescent coatings, many similar to that used in LP's FlameBlock® wood products. One example is PKShield™ intumescent-coated wood products by Pinkwood, Ltd., of Calgary, AB Canada. http://www.pinkwood.ca/pkshield-us/

The advantages of PHShield™ wood is to delay the ignition of fire, and reduce the spread of fire. When wood coated with PKShield™ intumescent coating is exposed to flame, the coating begins to expand and forms a protective barrier between the ignition source and the wood. This barrier delays the time it takes for wood to actually ignite and sustain a flame compared to uncoated lumber. Should a fire occur, wood coated with PKShield™ intumescent coating slows the spread of flame to offer additional time for occupants to escape the building and firemen to combat the fire.

As shown in FIG. 6A, the web portion of a conventional untreated I-joist 6A, 6B, 6C and 6D is made from ⅜" thick (OSB) sheathing. In a fire, the OSB web portion will burn through in less than 6 minutes, which is approximately how long it takes for a fire department to arrive on the scene of a fire not be set up to defend. Once the web is burned away, an OSB I-joist has completely lost its load carrying capability. While the I-joist flange appears intact (as this part takes longer to burn through), the web portion is burned away, and from above the floor would appear to be intact. Firefighters arriving on scene would not expect that the floor doesn't have any structural strength as they are familiar with solid sawn 2×10 floor joists which take approximately 14 minutes to burn to failure. If a firefighter were to stand on the I-joist floor after six minutes or so burning, they are in danger of falling through the floor and being burned to death in the basement of the building. As shown in FIG. 6B, the white-colored Pyrotite® coated web portion of the LP's FlameBlock® I-Joist 7 offers an improved fire rating over the untreated conventional I-joist design 6A-6D shown in FIG. 6A.

As shown in FIGS. 7A, 7B and 9, most conventional top chord bearing floor and roof trusses 8 and 13 are built with 2×4 and 2×6 lumber sections which are connected together using punched metal connector plates 10, often having integrated teeth or nail spikes 10B projecting from its mounting plate 10A, as shown in FIGS. 8A and 8B. Typically, the teeth of the metal connector plates 10 are pressed into the lumber sections of the truss structure during manufacturing, so as to secure connect them together to form a very strong and light-weight truss structure. It is important to note here that these trusses were required to replace the depleting volume of old growth lumber of suitable length that could meet the spans of modern wood-framed buildings under construction. The design flaw with conventional wood-framed truss structures and assemblies 8 and 13 is that, in a fire, the short teeth 10A projecting from the metal truss plates 10 release from the lumber sections 9A and 9B as the lumber burns, as illustrated in FIG. 15. This failure results in the quick collapse of floor and roof structures constructed using such conventional building construction components.

During the ten years that these innovations have been taking hold of the building industry, fireman have been losing their lives in wood-framed building fires because they were not accustomed to the floors and the roofs collapsing so fast due to the fire burning characteristics of modern engineered wood products (EWPs) used to construct the floor and truss structures used in these buildings. Today, fireman are being better trained to assess such building structures before they run into a burning building on fire, but still are exposed to such risks posed by these conventional building technologies.

Perhaps one of the biggest problems in today's wood-framed buildings is related to the fact that OSB material fuels fire consumption in unprecented ways. As old growth timber was becoming more difficult to cut due to environmental issues and concerns, the price of old growth logs went up, causing the veneers used to make plywood to become more expensive than the small thin trees chopped down to make OSB. Consequently, due to its lower price advantage, OSB sheathing took over the building industry in production housing, despite its hidden fire design flaw.

The hidden, inconvenient truth behind wood-framed structures is that old homes built with solid lumber floor joists and roof rafters, sheathed with either 1×6 or plywood, is less vulnerable than today's light-weight wood products. This is a major issue for the fire fighting community and they have not been silent about it. The National Fire-protection Agency published an article in July 2009 issue of NFPA Journal, on the Dangers of Lightweight Construction, discussing the results of two studies and detailing the relationship between fire and engineered wood construction assemblies—notably, that they burn quicker and fail faster than their solid dimensional lumber counterparts.

In September of 2008, the Chicago Fire Department (CFD) championed a study by Underwriters Laboratories, Inc. (UL) entitled "Structural Stability of Engineered Lumber in Fire Conditions" (Project Number: 07CA42520). Summaries of Test Samples and Results (ASTM E119) are set forth in FIGS. 10A and 10B, summarizing the fire testing of floor and roof systems that were unprotected and protected with a layer of ½" gypsum board. The results confirmed what the fire fighters were reporting in the field, that I-joists and floor trusses burned faster than solid 2×10's.

In December of 2008, National Research Council of Canada (NRC) conducted similar testing and published a report with similar results to the UL report. An excerpt from the NRC Report reads as follows: "It must be pointed out that the times to reach structural failure for the wood I-joist, steel C-joist, metal plate and metal web wood truss assemblies were 35-60% shorter than that for the solid wood joist assembly resulting in smaller time difference between the onset of untenable conditions and structural failure of these engineered floor assemblies." Table 8 from the December 2008 NRC Report is set forth in FIG. 11 for convenience, summarizing the time of failure ($t_f$) of various unprotected floor assemblies tested.

The above identified studies by UL and the NRC, and numerous complaints from fire fighters, have resulted in changes to the International Residential Code in 2012, under section R501.3. While there are many special interest groups urging lawmakers to introduce legislation to mandate the use of concrete and steel for mid-rise construction, such measures would significantly (i) increase building cost, (ii) lengthen construction schedules, and (iii) decrease affordability at a time when the need to increase affordability is very great.

In general, economic cost has stalled the advance of defending more of the lumber in buildings. Some wood frame buildings call for the use of Fire Retardant Treated Lumber (FRT) which is covered under Clause 2303.2 of the 2015 International Building Code as follows: "Fire Retardant Treated lumber is any wood product which, when impregnated with chemicals by a process or other means during manufacture, shall have, when tested in accordance with ASTM E-84 or UL 723, a listed flame spread index of 25 or less and show no evidence of significant progressive combustion when the test is continued for an additional 20-minute period. Additionally, the flame front shall not progress more than 10½ feet (3200 mm) beyond the centerline of the burners at any time during the test."

Under National Fire Protection Association (NFPA) and International Building Code (IBC) specifications, tested fire-treated wood products shall receive a Class-A fire-protection rating provided that Flame Spread index measures in the range of 0 through 25, and Smoke Developed index measure in the range of less than or equal to 450. Tested fire-treated wood products shall receive a Class-B fire-protection provided that Flame Spread index measures in the range of 26 through 75, and Smoke Developed index measure in the range of less than or equal to 450. Also, tested fire-treated wood products shall receive a Class-C fire-protection provided that Flame Spread index measure in the range of 76 through 200, and Smoke Developed index also measure in the range of less than or equal to 450.

A major problem associated with the use of pressure-treated fire retardant treated (FRT) lumber is that the use of FRT chemicals during pressure-treatment lowers the PH of the wood, which results in acid hydrolysis, also known as acid catalyzed dehydration. This pressure-based process of fire retardant treatment attacks the fiber of the wood, causing it to become brittle and lose its strength. Significant losses in the modulus of elasticity (MOE), a measure of stiffness, the modulus of rupture (MOR), a measure of bending strength, and impact resistance, a measure of strength, can occur during the pressure-treatment process. These modes of failure include heavy checking parallel and perpendicular to the grain, splitting, and full cross grain breaks. Eventually the degradation continues to the point that the wood becomes so weak and brittle that it actually snaps under normal loading conditions. This process is insidious in that it is progressive, and latent.

There are many products on the market that are acceptable alternative products and can replace FRT lumber by means other than pressure impregnating. Such products include commercially available fire retardant and fire inhibitor products that work very well at stalling a fire's ignition, and are less than half the cost of trying to fire treat 100% of lumber and sheathing with the old, traditional pressure-impregnated fire retardants. These alternative fire inhibiting chemical products, even though not pressure-permeated or similarly processed, still perform to the level required by the code and can be used interchangeably with the FRT lumber or by themselves.

Examples of prior art fire-treated wood produced using non-pressure-treated methods include ECO RED SHIELD FT™ fire treated lumber by Eco Building Products, Inc. of San Diego, Calif. In 2014, ECO RED SHIELD FT™ fire treated lumber was produced using Eco Building Product's fire inhibitor formulated using a mixture of chemicals including liquid polymer, PW40 biocide, disodium octaborate tetrahydrate (DOT) for termites, and Hartindo AF21 total fire inhibitor from Hartindo Chemicatama Industri of Jakarta, Indonesia. It was later discovered that these chemical components interacted chemically in an undesired manner, to significantly reduce the fire-inhibiting performance of Hartindo AF21 fire inhibitor when used to treat to wood products.

Then, in 2016, Eco Building Product's changed its formula for ECO RED SHIELD FT™ fire treated lumber, and began using Eco Building Product's proprietary Eco AFL™ fire inhibitors, specifically its FRC12™ fire retarding chemical formulation, and wood surface film concentrate formulation (WSFC).

Eco Building Product's wood surface film concentrate formulations, and methods of preserving wood and inhibiting the emission of naturally occurring formaldehyde, are disclosed in pending U.S. patent application Ser. No. 15/238,463 entitled "Formulation and Method for Preserving Wood" filed on Nov. 4, 2016. Eco Building Product's fire retarding formulation and methods are disclosed in U.S. patent application Ser. No. 15/238,463 entitled "Fire Inhibitor Formulation" filed on Aug. 16, 2016. Both of these US patent applications are incorporated herein by reference.

There is another factor at work influencing high-density builders to defend all wood used on new building construction, and that is whether or not the builder has lost a building to fire. If so, then the primary option of such high-density builders is to demand their liability insurance providers to either reduce or not increase their insurance if they defend 100% of the lumber on new wood-framed building construction. If high-density builders and insurance companies work together, then there is a high likelihood that building codes will begin to adopt these new less expensive ways of defending lumber from fire, to the benefit of everyone.

A major problem with the current building code, and the way large, lightweight, wood-framed, multi-story buildings are designed, is that typically only the exterior walls require or specify the use of FRT lumber. This is illustrated in the wood bearing wall schedule and architectural plans set forth in FIGS. 11 and 12. As shown in FIG. 12, the architectural specification 14 provides a schedule where load-bearing walls made from FRT lumber are required. As shown in the architectural specification 15 in FIG. 13, only the exterior walls 16 are specified as FRT lumber. However, as experience has shown the world over, a fire can easily start on the untreated wood in the interior of a wood-framed building, and quickly spread to burn down the entire building structure, as shown in FIGS. 14A and 14B. As illustrated in the video footage of the Houston Apartment Fire on Mar. 25, 2014, the exterior walls made from FRT lumber can do a good job resisting the fire, but can only do so up to a certain point, and when the interior support is gone, the exterior FRT lumber walls fall as a unit, which is very hazardous to fire fighters.

Other factors operate allowing the industry to continue building high-density buildings with raw untreated lumber. For example, many building departments are relying on building permit revenue from such high-density buildings, and they are reluctant to encourage builders to move to other regions. Therefore, they allow them to rebuild high-density type construction, even after a fire in a building that was built with untreated lumber.

In effort to prevent total fire destruction of wood-framed buildings, it is helpful if not essential to understand the nature of the fire cycle before understanding how flame retardants, inhibitors and extinguishers work to suppress and extinguish fires.

In FIG. 16, the fire cycle 17 is graphically illustrated as having the following four essential components: (i) ignition source (e.g., heat, incandescent material, a small flame); (ii) fuel material (e.g., wood, wax, fuel, etc.); (iii) oxygen; and (iv) the free radicals (H+, OH−, O−) 18 associated with the process of combustion.

In general, the ignition source can be any energy source (e.g. heat, incandescent material, a small flame, a spark, etc.). The function of the ignition source is to start the material to burn and decompose (pyrolysis), releasing flammable gases. If solid materials in the ignition source do not break down into gases, they remain in a condensed phase. During this condensed phase, the material will slowly smolder and, often, self-extinguish, especially if the material beings to "char," meaning that the material creates a carbonated barrier between the flame and the underlying material.

In the gas phase, flammable gases released from the burning and decomposing material are mixed with oxygen, which is supplied from the ambient air. In the combustion zone, or the burning phase, fuel, oxygen and free radicals (i.e. H+, OH−, O−) 18 combine to create chemical reactions that produce visible flames to appear. The fire then becomes self-sustaining because, as it continues to burn the material, more flammable gases are released, feeding the combustion process.

In general, flame retardants, or fire inhabitants, act in three ways to stop the burning process, and consequently, can be classified by how these agents work to stop a burning flame. These three methods of flame retardation/inhibition/extinguishing are described below:

(i) Disrupting the combustion stage of a fire cycle, including avoiding or delaying "flashover," or the burst of flames that engulfs a room and makes it much more difficult to escape;

(ii) Limiting the process of decomposition by physically insulating the available fuel sources from the material source with a fire-resisting "char" layer; and (iii) Diluting the flammable gases and oxygen concentrations in the flame formation zone by emitting water, nitrogen or other inert gases.

One highly effective family of prior art clean fire inhibiting chemicals (CFIC) has been supplied by PT. Hartindo Chemicatamata Industri of Jakarta, Indonesia (a/k/a Hartindo Anti Fire Chemicals) for many years now, and used by many around the world in diverse anti-fire applications. Current chemical formulations marketed by Hartindo under AF11, AF21 and AF31 product designations, disrupt the combustion stage of the fire cycle by combining with the free radicals (H+, OH−, O−) that are produced during combustion.

Most prior art intumescent coatings, whether applied as paint or coatings on engineered wood products (EWPs), work differently from Hartindo's fire inhibiting chemicals, in that such intumescent coatings form a char layer when heated acting as an insulating layer to the substrate of fuel source, to prevent the fuel source from burning. Prior art Pyrotite® magnesium-based cementitious coatings, as used in LP's FlameBlock® fire-rated OSB sheathing (i.e. sheeting) shown in FIG. 5B, FlameBlock® I-Joists shown in FIG. 6B, and other FlameBlock® EWPs, release water when exposed to the heat of a fire, and thereby dilute the flammable gases and oxygen concentrations in the flame formation zone.

Clearly, there is a great and growing demand for better, higher performance, fire-rated building products for use in wood-framed buildings in the single-family, multi-family and light commercial construction markets. Also, there is a great need for ways of designing and constructing high-density multi-story wood-framed buildings so that such wood-framed building demonstrate improved defense and protection against total fire destruction, while overcoming the shortcomings and drawbacks of prior art methods and apparatus.

OBJECTS AND SUMMARY OF THE PRESENT INVENTION

Accordingly, a primary object of the present is to provide new and improved method of and system for designing, prefabricating and constructing high-density multi-story wood-framed buildings so that such wood-framed building demonstrates Class-A fire-protection and defense against total fire destruction, while overcoming the shortcomings and drawbacks of prior art methods and apparatus.

Another object of the present is to provide higher performance fire-rated building products for use in wood-framed buildings for single-family, multi-family, multi-story, as well as light commercial construction markets.

Another object of the present is to provide a novel system and method that addresses the epidemic of mid-rise building-under-construction fires across the United States, where the media, lobbyists and politicians are blaming wood-framed construction, arson, and job site accidents as the main causes of such building fires.

Another object of the present is to provide a novel method of mitigating the risk of mid-rise building-under-construction fires caused during the framing stage, when wood-framed buildings are most vulnerable to fire, because are such buildings are constructed using small section lumber (2×4 and 2×6), trusses, and OSB sheathing, and fire fighters cannot get to the scene of such fires fast enough to extinguish the fire, and once they do, they can only minimize the damage to the surrounding structures, and consequently, the damage caused is catastrophic and the disruption to people's lives and surrounding businesses is tragic.

Another object of the present is to provide a novel method of designing and constructing multi-story wood-framed buildings so that such wood-framed buildings demonstrate Class-A fire-protection and resistance against total fire destruction.

Another object of the present is to provide a new and improved Class-A fire-protected oriented strand board (OSB) sheathing comprising a core medium layer made of wood pump, binder and/or adhesive materials, a pair of OSB layers bonded to the core medium layer, a clean fire inhibiting chemical (CFIC) coatings deposited on the surface of each OSB layer and sides of the core medium layer, made from clean fire inhibiting chemical (CFIC) liquid solution applied to the surfaces by dipping the OSB sheathing into CFIC liquid in a dipping tank, allowing shallow surface absorption or impregnation into the OSB layers and ends of the core medium layer at atmospheric pressure, and thereafter, spraying a moisture, fire and UV radiation protection coating sprayed over the CFIC coating.

Another object of the present is to provide a Class-A fire-protected floor truss structure for installation in a wood-framed building housing one or more occupants, comprising: a set of lumber pieces treated with clean fire inhibiting chemical (CFIC) liquid to provide each the lumber piece with a Class-A fire-suppression rating; and a set of heat-resistant metal truss connector plates for connecting the treated pieces of lumber together to form the fire-protected floor truss structure; wherein each the heat-resistant metal truss connector plate is provided with a heat-resistant chemical coating deposited before the metal truss connector plate is used in constructing the fire-protected floor truss structure; and wherein the heat-resistant chemical coating provides significant reduction in heat transfer across the heat-resistant metal truss connector plate so as to significantly reduce (i) charring of wood behind the heat-resistant metal truss connector plate in the presence of a fire in the building, (ii) disconnection of the treated lumber pieces from the heat-resistant metal truss connector plate, and (iii) the risk of the fire-protected floor truss structure failing during fire in the wood-framed building, and any putting at risk, any of the occupants and any firemen trying to rescue the occupants and/or extinguish the fire in the wood-framed building.

Another object of the present is to provide a Class-A fire-protected floor joist structure for installation in a wood-framed building housing one or more occupants, comprising: a floor joist made from lumber treated with clean fire inhibiting chemical (CFIC) liquid to provide the joist with a Class-A fire-suppression rating; and a set of heat-resistant metal joist hangers for hanging the treated joist in the wood-framed building to form the fire-protected floor joist structure; wherein each the heat-resistant metal joist hanger is provided with a heat-resistant chemical coating deposited before the metal joist hanger is used in constructing the fire-protected floor joist structure; and wherein the heat-resistant chemical coating provides significant reduction in heat transfer across the heat-resistant metal joist hanger so as to significantly reduce (i) charring of wood behind the heat-resistant metal joist hanger in the presence of a fire in the building, (ii) disconnection of the joist from the heat-resistant metal joist hanger or lumber to which the heat-resistant metal joist hanger is connected, and (iii) the risk of the fire-protected floor joist structure failing during fire in the wood-framed building, and any putting at risk, any of the occupants and any firemen trying to rescue the occupants and/or extinguish the fire in the wood-framed building.

Another object of the present is to provide a factory for making Class-A fire-protected joist structures comprising: a first stage for dipping untreated lumber components in a dipping tank filled with clean fire inhibiting chemicals (CFIC) liquid to coat the untreated lumber components with liquid CFIC coating and form a Class-A fire treated lumber components; a second stage for spraying metal joist hangers with heat-resistant chemical liquid to produce metal hanger joists having a heat-resistant coating; and a third stage for assembling the Class-A fire-protected lumber components together using the heat-resistant metal joist plates so as to produce Class-A fire-protected joist structures.

Another object of the present is to provide a method of producing a Class-A fire-protected joist structure, comprising the steps: (a) producing a supply of water-based clean fire inhibiting chemical (CFIC) liquid; (b) filling a dipping tank with the supply of the water-based CFPC liquid; (c) filling a reservoir tank connected to a liquid spraying system with a quantity of heat-resistant chemical liquid; (d) dipping untreated joist lumber beams into the dipping tank so as to apply a coating of CFIC liquid over all the surfaces of each joist lumber beam and allowing the CFIC-coated joist lumber beam to dry so as to produce a Class-A fire-protected joist lumber beam; (e) using the liquid spraying system to coat metal joist hangers with heat-resistant chemical liquid in the reservoir tank, so as to produce heat-resistant metal joist hangers having a heat-resistant chemical coating, for use with the Class-A fire-protected joist lumber beams; (f) stacking and packaging one or more Class-A fire-protected joist lumber beams together into a bundle, using banding or other fasteners, and with the heat-resistant metal joist hangers, shipping the bundle and heat-resistant metal joist hangers to a destination site for use in construction of a wood-framed building; and (g) assembling the Class-A fire-protected joist lumber beams using the heat-resistant metal joist hangers so as to make a Class-A fire-protected joist structure in the wood-framed building.

Another object of the present is to provide a method of producing Class-A fire-protected finger-jointed lumber from an automated factory having a production line with a plurality of stages, the method comprising the steps of: (a) providing a reservoir tank containing a supply of clean fire inhibiting chemical (CFIC) liquid that is supplied to a dipping tank deployed in an in-line high-speed CFIC liquid dip-coating stage installed between (i) a lumber planing/dimensioning stage supplied by a finger-jointing stage, and (ii) an automated stacking, packaging, wrapping and banding stage installed at the end of the production line; (b) continuously loading a supply of untreated short-length lumber onto a multi-staged conveyor-chain transport mechanism installed along and between the stages of the production line; (c) loading the untreated short-length lumber into a controlled-drying stage so to produce suitably dried short-length lumber for supply to the finger-jointing stage; (d) continuously supplying controllably-dried short-length lumber into the finger-jointing stage for producing pieces of extended-length finger-jointed lumber in a highly-automated manner; (e) automatically transporting produced pieces of extended-length finger-jointed lumber into the planing/dimensioning stage, so that the finger-jointed lumber is planed/dimensioned into pieces of dimensioned finger-jointed lumber, and outputted onto the multi-stage chain-driven conveyor mechanism; (f) continuously transporting and submerging the dimensioned extended length finger-jointed lumber pieces through a dipping tank for sufficient coating in CFIC liquid, while being transported on the conveyor-chain transport mechanism; (g) continuously removing the wet dip-coated pieces of dimensioned finger-jointed lumber from the dipping tank, and automatically wet-stacking, packing, banding and wrapping the dip-coated pieces together to produce a packaged bundle of fire-protected finger-jointed lumber while the CFIC liquid coating on the dip-coated pieces of dimensioned finger-jointed lumber is still wet; (h) removing the packaged bundle of fire-protected finger-jointed lumber from the stacking, packaging, wrapping and banding stage, and storing in a storage location and allowed to dry; and (i) painting the ends of each stacked and packaged bundle of fire-protected finger-jointed lumber, using a paint containing clean fire-inhibited chemicals (CFIC), and applying trademarks and/or logos to the packaged bundle of Class-A fire-treated finger-jointed lumber.

Another object of the present is to provide an automated lumber production factory comprising: a production line supporting a finger-jointing stage, a planing and dimensioning stage, a clean fire inhibiting chemical (CFIC) dip-coating stage, and a stacking, packaging and wrapping stage, arranged in the order; wherein the production line supports an automated production process including the steps of: (a) continuously fabricating finger-jointed lumber pieces at the finger-jointing stage; (b) planing and dimensioning the finger-jointed lumber pieces at the planing and dimensioning stage; (c) after being planed and dimensioned, automatically conveying the finger-jointed lumber pieces from the planing and dimensioning stage to the CFIC dip-coating stage in a high-speed manner; (d) dip-coating the finger-jointed lumber pieces in a supply of clean fire inhibiting chemical (CFIC) liquid contained in a dipping tank maintained at the CFIC dip-coating stage, so as to produce Class-A fire-protected finger-jointed lumber pieces; and (e) stacking, packaging, wrapping and banding a bundle of the Class-A fire-protected finger-jointed lumber pieces.

Another object of the present is to provide such an automated lumber production factory, wherein each finger-jointed lumber piece is a finger-jointed lumber stud, and each bundle of Class-A fire-protected finger-jointed lumber pieces is a bundle of Class-A fire-protected finger-jointed lumber studs for use in wood-framed building construction.

Another object of the present is to provide a novel in-line CFIC-liquid dip-coating and spray-coating stage/subsystem for installation along a lumber production line in an automated lumber factory, for the rapid formation of a surface coating or surface film on the surface of each piece of LVL product dipped into a reservoir of CFIC liquid, and then over-coated with a protective coating providing protection to moisture, UV radiation from the sun, and added fire-inhibition.

Another object of the present is to provide an automated factory system for producing Class-A fire-protected laminated veneer lumber (LVL) products in a high volume manner comprising: a stage for continuously delivering clipped veneer to the front of the LVL production line; a veneer drying stage for receiving veneers from the supply and drying to reach a target moisture content; a conveyor for conveying the components and LVL products along subsequent stages of the production line; an automated veneer grading stage for automatically structurally and visually grading veneers; a veneer scarfing stage for scarfing veneer edges to a uniform thickness at the joints between veneers, during the subsequent laying-up stage and process; an adhesive application stage for applying adhesive to the veneers; a lay-up stage for lifting veneers onto the processing line, and stacking and skew aligning the veneers with adhesive coating until they are laid up into a veneer mat; a pre-pressing stage for pressing the veneer mat together; a hot-pressing and curing stage for continuous hot pressing the veneer mat; a cross-cutting and rip sawing stage for cross-cutting and rip sawing the veneer mat into LVL products (e.g. studs, beams, rim boards and other dimensioned LVL products); a print-marking system for marking each piece of LVL product with a logo and grade for clear visual identification; a CFIC liquid dip-coating stage having a dipping reservoir through which the chain-driven conveyor transports LVL product into the dipping reservoir and along its length while submerged under CFIC liquid during dip-coating operations, to form a CFIC coating on the surfaces of the LVL product, and removing the CFIC-coated LVL product from the dipping reservoir and wet-stacking and allow to dry; spray-coating a protective-coating over the surface of the dried dip-coated LVL product, and transporting the LVL product to the next stage along the production line; and a packaging and wrapping stage for stacking, packaging and wrapping the spray-coated/dip-coated LVL product.

Another object of the present is to provide such a new lumber factory supporting an automated laminated veneer lumber (LVL) process comprising the steps of: (a) installing and operating a lumber production line employing a controlled drying stage, a veneer grading stage, a veneer scarfing stage, a veneer laying-up stage, a veneer laying-up stage, a pre-pressing stage, a hot-pressing and curing stage, a cross-cutting and rip-sawing stage, an automated in-line dip-coating and spray-coating stage, a print-marking and paint spraying stage, and an automated packaging and wrapping stage, installed along the lumber production line in named order; (b) continuously providing a supply clipped veneers onto a conveyor installed along the lumber production line; (c) continuously providing the veneers to the controlled drying stage so to produce suitably dried veneers for supply to the veneer grading stage; (d) scarfing dried veneers at the veneer scarfing stage to prepare for the veneer laying-up stage where the leading and trailing edges of each sheet of veneer are scarfed to provide a flush joint when the veneer sheets are joined together at the laying-up stage; (e) applying adhesive material to scarfed veneers prior to the veneer laying-up stage; (f) vacuum lifting veneers onto the processing line and stacked and skew aligned with adhesive coating until the veneers are laid up into a veneer mat of a predetermined number of veneer layers; (g) pressing together the veneer mat at the pre-pressing stage; (h) hot pressing the veneer mat in a hot-pressing/curing machine to produce an LVL mat at the hot-pressing and curing stage; (i) cross-cutting and rip-sawing the produced LVL mat into LVL products (e.g. studs, beams, rim boards and other dimensioned LVL products) at the cross-cutting and rip sawing stage; (j) marking each piece of LVL product with a branded logo and grade for clear visual identification at the print-marking and paint spraying stage; (k) continuously transporting and submerging the cross-cut/rip-sawed LVL product through a dipping reservoir containing clean fire inhibiting chemical (CFIC) liquid, at the dip-coating stage and then wet stacking and allowed to dry; (l) continuously spray-coating the dip-coated LVL products with a protective coating at a spray-coating stage to produce Class-A fire-protected LVL products on the production line; and (m) stacking, packaging and wrapping the Class-A fire-protected LVL product at the stacking, packaging and wrapping stage.

Another object of the present is to provide new and improved Class-A fire-protected oriented strand board (OSB) sheeting, spray-coated with clean fire inhibiting chemical (CFIC) liquid.

Another object of the present is to provide new and improved Class-A fire-protected oriented strand board (OSB) Hoist spray-coated with clean fire inhibiting chemical (CFIC) liquid.

Another object of the present is to provide a new and improved fire-protected lumber roof trusses spray-coated with clean fire inhibiting chemical (CFIC) liquid.

Another object of the present is to provide new improved fire-protected lumber top chord bearing floor truss (TCBT) structure, spray-coated with clean fire inhibiting chemical (CFIC) liquid.

Another object of the present is to provide a new and improved fire-protected lumber floor joist structure, spray-coated with clean fire inhibiting chemical (CFIC) liquid.

Another object of the present invention is to provide a new and improved on-job-site method of spray treating wood, lumber, and engineered wood products (EWPs) with clean water-based fire inhibiting chemical (CFIC) that cling to the raw lumber and EPWs and acts as a flame retardant, preservative and water repellent, while improving the building's defense against both accidental fire and arson attack, and reducing the risk of fire to neighboring buildings should a fire occur in a wood frame building under construction.

Another object of the present invention is to provide new and improved engineered wood products (EWP) using clean fire suppression technologies to protect lumber and sheathing, without the shortcomings and drawbacks associated with pressure treatment methods which are well known to destroy wood fibers, and lower the strength and performance of such wood products.

Another object of the present invention is to provide a new and improved system for defending high-density multi-story wood-framed buildings from fire during the design and construction phase, so that the risks of wood-framed building burning down due to fire during construction is substantially mitigated to the benefit of all parties.

Another object of the present invention is to provide an Internet-based (i.e. cloud-based) system for verifying and documenting Class-A fire-protection treatment of a wood-framed building using on-site spraying of a clean fire inhibiting chemical (CFIC) liquid, comprising (i) a data center with web, application and database servers for supporting a web-based site for hosting images of certificates stamped on spray-treated wood surfaces, and other certification documents, and (ii) mobile smart-phones used to capture digital photographs and video recording of spray-treated wood-framed building sections during the on-site fire-protection spray process, and uploading the captured digital images to the data center, for each spray treatment project, so that insurance companies, builders, and other stakeholders can review such on-site spray completion certifications during the building construction phase of the wood-framed building.

Another object of the present invention is to provide such an Internet-based system for verifying and documenting Class-A fire-protection spray-applied treatment of a wood-framed building, wherein mobile client computing systems provided with a mobile application are used by on-site class-A fire-protection spray administrators and technicians capturing audio-video (AV) recordings of completed sections of the wood-framed building relating to projects during the construction phase so as to verify and document proper Class-A fire-protection of the wood surfaces employed therein.

Another object of the present invention is to provide such an Internet-based system for verifying and documenting Class-A fire-protection spray-applied treatment of a wood-framed building, wherein mobile client computing systems provided with a mobile application are used by property owners/building, insurance companies, and other stakeholders for tracking and managing projects involving on-site clean fire inhibiting chemical (CFIC) liquid spray treatment of wood-framed buildings during the construction phase so as to ensure Class-A fire-protection of the wood employed therein.

Another object of the present invention is to provide a just-in-time (JIT) wood-framed building factory system for prefabricating wood-framed buildings in response to customer orders, wherein the factory system supports multiple production lines for producing Class-A fire-protected wood-framed components including wall panels, floor panels, stair panels, floor trusses, roof trusses, and prefabricated roof sections, as needed, for use in constructing the custom or specified wood-framed building, and delivering such prefabricated wood-framed components in an RFID-tagged shipping container, to a destination property location where the prefabricated wood-framed building is to be constructed.

Another object of the present invention is to provide an Internet-based system network supporting a just-in-time (JIT) wood-framed building factory system, comprising (i) the just-in-time wood-framed building factory with multiple production lines for producing Class-A fire-protected building components, (ii) GPS-tracked ISO-shipping containers and code symbol/RFID tag reading mobile computing system, and (iii) a data center for factory system and supporting a network of mobile computing devices running a mobile application adapted to help track and manage orders for prefabricated Class-A fire-protected wood-framed buildings, and projects involving the same.

Another object of the present invention is to provide such an Internet-based system network for a just-in-time prefabrication wood-framed building factory system, wherein mobile client computing systems, supporting a mobile application are used by project administrators to track and manage customer orders for prefabricated wood-framed buildings, and related projects involving just-in-time fabrication of Class-A fire-protected wood-framed building components for these ordered wood-framed buildings.

Another object of the present invention is to provide such an Internet-based system network for a just-in-time prefabrication wood-framed building factory system, wherein mobile client computing systems, supporting a mobile application are used by customers to track and manage their orders and related projects involving just-in-time fabrication of Class-A fire-protected wood-framed building components for ordered prefabricated wood-framed buildings.

Another object of the present invention is to provide a new and improved method of protecting and defending multi-story wood-framed buildings from fire by chemically defending from fire, 100% of the lumber used in wood-framed buildings.

Another object of the present invention is provide a new and improved method of fire protecting multi-story wood-framed buildings from fire, by spraying coating, on the job site, before gypsum and wall board is installed over the framing, a clean fire inhibiting chemical (CFIC) liquid over all exposed surfaces of all lumber and wood products used in the construction of the building, with that treats the raw lumber to become Class-A fire-protected.

Another object of the present is to provide a new and improved method of protecting wood-framed buildings from interior fires by spraying all exposed wood surfaces with clean fire inhibiting chemical (CFIC) liquid so as to achieve A-Class fire-protection throughout the entire wood-framed building.

Another object of the present invention is to provide a novel system and method of protecting multi-story wood-framed buildings against fire, when such structures are most vulnerable during the construction stage, involving the spraying of clean fire inhibiting chemical (CFIC) liquid over all interior surfaces of a wood-framed building being treated, including raw untreated lumber, EWPs, OSB sheathing, plywood, composite boards, structural composite lumber and other materials, and tracking and certifying that each completed section of the wood-framed building was properly spray coated with the environmentally clean fire inhibiting chemical, and has achieved Class-A fire-protection.

Another object of the present invention is to provide a novel method of spray treating all surfaces of new raw/untreated and treated lumber and sheathing used to construct wood-framed multi-story buildings, using clean fire inhibiting chemical s (CFIC) that cling to the surface of wood during spray application and inhibit the start or ignition of a fire as well as fire progression and flame spread, wherein the fire inhibitor can be sprayed using a back-pack sprayer, or floor-supported pump sprayer system.

Another object of the present invention is to provide a novel method of spray treating all surfaces of lumber and sheathing used to construct wood-framed multi-story buildings, during framing and sheathing operations, floor by floor, with minor impact to the construction schedule, while minimizing the builder's risk of fire, making protecting 100% of the lumber in a building affordable.

Another object of the present is to provide an on-job-site spray system for coating of clean fire inhibiting liquid chemical (CFIC) liquid all over the interior surfaces of raw and treated lumber and sheathing used in a completed section of a wood-framed assemblies in a wood-framed building during its construction phase, wherein the on-job-site spray system comprises: a liquid spray pumping subsystem including a reservoir tank for containing a supply of CFIC liquid for spray-coating and treating wood surfaces to provide Class-A fire-protection within the wood-framed building; a hand-held liquid spray gun, operably connected to the reservoir tank using a sufficient length of flexible tubing, for holding in the hand of a spray-coating technician, and spraying CFIC liquid from the reservoir tank onto the exposed interior wood surfaces of lumber and sheathing used to construct each completed section of a wood-framed building construction, so as to form a CFIC coating on the treated interior wood surfaces providing Class-A fire-protection; and a spray-certification system for visually marking and certifying the exposed interior wood surfaces of each completed section of the wood-framed building construction has been properly spray-coated to provide Class-A fire-protection within each completed section of the wood-framed building.

Another object of the present invention is to provide a new and improved wireless information storage and retrieval system for remotely managing the spray-based Class-A fire-protection of wood-framed buildings by capturing and storing in a central network database system, under the spray project, (i) digital images and videos of certificates of completion stamped on completed wood-framed sections of the job-site that have been sprayed with Class-A fire-protective coating, and (ii) various kinds of documentation of events relating to the chain-of-custody of clean fire inhibiting chemical (CFIC) liquid materials blended at a remote location, shipped to the job-site, and then mixed with water to produce an aqueous-based CFIC liquid solution for use in on-site spraying of all exposed wood surfaces on the interior of the wood-framed building being spray-protected against fire.

Another object of the present invention is to provide such as a new and improved wireless information storage and retrieval system, wherein mobile applications are installed and run on a network of mobile computing devices to support a wide array of services provided to project administrators, spray-technicians and building owners, managers and insurance underwriters to help manage, monitor and review on-site Class-A fire-protection spray processes under building-specific projects managed on the system.

Another object of the present invention is to provide such as a new and improved wireless information storage and retrieval system, wherein the mobile application can be used by building/property owners, insurance companies, and other stakeholders, showing a menu of high-level services supported by the system network of the present invention.

Another object of the present invention is to provide such as a new and improved wireless information storage and retrieval system, wherein the mobile application supports a high-level menu of services for use by on-site fire-protection spray administrators and technicians supported by the system network of the present invention.

Another object of the present invention is to provide such as a new and improved wireless information storage and retrieval system, wherein the mobile application can be used by customers who place orders for prefabricated Class-A fire-protected wood-framed buildings using the system network of the present invention, with the option of also ordering on-site spraying of CFIC liquid over all exposed interior surfaces of Class-A fire-protected prefabricated wood-framed building after construction, so as to provide a double-layer of fire-protection and defense.

Another object of the present invention is to provide such as a new and improved wireless information storage and retrieval system, wherein the mobile application can be used by project administrators, managers, fabricators and technicians showing a high-level menu of services supported by the system network of the present invention.

Another object of the present is to providing new and improved methods of and apparatus for protecting wood-framed buildings from wild fires by automatically spraying water-based environmentally clean fire inhibiting chemical (CFIC) liquid over the exterior surfaces of the building, surrounding ground surfaces, shrubs, decking and the like, prior to wild fires reaching such buildings.

These and other benefits and advantages to be gained by using the features of the present invention will become more apparent hereinafter and in the appended Claims to Invention.

BRIEF DESCRIPTION OF THE DRAWINGS

The following Objects of the Present Invention will become more fully understood when read in conjunction of the Detailed Description of the Illustrative Embodiments, and the appended Drawings, wherein:

FIG. 10A is a table setting forth a summary of test samples in a conventional wood-framed building tested for fire resistance rating, flame passage, collapse time, and time of temperature rise, in the Underwriters Laboratories (UL) Report dated 8 Sep. 2008 entitled "Structural Stability Of Engineered Lumber In Fire Conditions" (Project Number: 07CA42520);

FIG. 10B is a table setting forth a summary of test results (ASTM E119) of the test samples identified in the table of FIG. 10A, in the Underwriters Laboratories (UL) Report dated 8 Sep. 2008 entitled "Structural Stability Of Engineered Lumber In Fire Conditions" (Project Number: 07CA42520);

FIG. 11 is table setting for time of failure of conventional unprotected floor assemblies during a wood-framed building fire with an open basement doorway, and also during a wood-framed building fire with a closed basement doorway;

FIG. 12 is a graphical representation of a wood bearing wall schedule for a conventional multi-story wood-framed building under construction, indicating that fire-treated sheathing has been specified only for outer wall structures by the building architects;

FIGS. 17A and 17B, taken together, sets forth a high-level flow chart describing the primary steps involved in the method of designing, prefabricating and constructing multi-story wood-framed buildings in accordance with the principles of the present invention so that such wood-framed buildings demonstrate improved fire resistance rating and protection against total fire destruction, comprising the steps of (i) during the architectural design phase of a new prefabricated multi-story building, specifying fire-protected lumber, or raw untreated lumber, Class-A fire-protected OSB sheeting, Class-A fire-protected OSB Hoists, Class-A fire-protected floor trusses, Class-A fire-protected roof trusses, and Class-A fire-protection on-job-site spray coating treatment of all lumber used on a building construction site, (ii) in a prefabricated wood-framed building factory system supporting multiple production lines, producing prefabricated Class-A fire-protected wood-framed building components for a prespecified Class-A fire-protected wood-framed building, and (iii) during the construction phase, constructing the Class-A fire-protected wood-framed building in accordance with the design specifications, using the prefabricated Class-A fire-protected wood-framed building components so as to provide a multi-story wood-framed building having Class-A fire-protection against total fire destruction;

FIG. 21 is a schematic table representation illustrating the flame spread and smoke development indices obtained through testing of Class-A fire-protected lumber produced using the method of the illustrative embodiment described in FIGS. 20A and 20B, and tested in accordance with test standards ASTM E84 and UL 723;

FIGS. 24A and 24B, taken together, set forth a flow chart describing the high level steps carried out when practicing the method of producing Class-A fire-protected cross-laminated timber (CLT) products in the automated fire-treated lumber factory illustrated in FIGS. 23 and 23A;

FIG. 25 is a schematic table representation illustrating the flame spread and smoke development indices obtained through testing of Class-A fire-protected cross-laminated timber (CLT) product produced using the method of the illustrative embodiment described in FIGS. 24A and 24B, and tested in accordance with the test standards ASTM E84 and UL 723;

FIG. 27B is a perspective view of the automatic laminated veneer lumber (LVL) spray-coating tunnel stage and drying tunnel stage deployed along the production line of the automated lumber fabrication factory shown in FIG. 27;

FIG. 29 is a table setting for flame spread and smoke development characteristics of Class-A fire-protected laminated veneer lumber (LVL) products (e.g. studs, beams, panels, etc.) produced using the method of the illustrative described in FIGS. 28A, 28B and 28C, and tested testing in accordance with the test standards ASTM E84 and UL 723;

FIGS. 32A, 32B and 32C, taken together, set forth a flow chart describing the high level steps carried out when practicing the method of producing clean Class-A fire-protected OSB sheathing in accordance with the present invention, comprising the steps of (a) in an automated lumber factory, installing and operating a Class-A fire-protected lumber production line, supporting an edge painting stage, an CFIC liquid dip coating stage, a spray coating tunnel stage and a drying tunnel, installed between the finishing stage and automated packaging and wrapping stage in the lumber factory, (b) sorting, soaking and debarking logs to prepare for the stranding stage, (c) processing the debarked logs to produce strands of wood having specific length, width and thickness, (d) collecting strands in large storage binds that allow for precise metering into the dryers, (e) drying the strands to a target moisture content and screening them to remove small particles for recycling, (f) coating the strands with resin and wax to enhance the finished panel's resistance to moisture and water absorption, (g) forming cross-directional layers of strands into strand-based mats, (h) heating and pressing the mats to consolidate the strands and cure the resins to form a rigid dense structural oriented strand board (OSB) panel, (i) trimming and cutting the structural OSB panel to size, and machining flooring and groove joints and applying edge sealants for moisture resistance, (j) applying Class-A fire-protective paint to the edges of the trimmed and cut OSB panels, (k) transporting and submerging OSB panels through the dipping tank of the dip coating stage for sufficient coating in CFIC liquid, while being transported on the conveyor-chain transport mechanism, (l) removing the wet dip-coated OSB panels from the dipping tank, and wet stacking the OSB panels in inventory for about 24 hours or so, to allow the wet CFIC liquid coating on the dipped OSB panels to penetrate into the panels and dry and produce Class-A fire-protected OSB panels, (m) loading a stack of dip-coated OSB panels to the second stage of the production line, (n) spray-coating the dip-coated OSB panels with a moisture, fire and UV protection coating that supports weather during building construction while protecting the Class-A fire protection properties of the OSB panels, (o) transporting spray-coated dipped OSB sheets through a drying tunnel, and (p) stacking, packaging and wrapping dried spray-coated/dipped OSB panels into a bundle of Class-A fire-protected OSB panels or sheets (i.e. sheathing);

FIG. 39 show a schematic table representation illustrating the flame spread and smoke development indices obtained through testing of Class-A fire-protected floor truss structure produced using the method of the illustrative embodiment described in FIGS. 36, 37 and 38, and tested in accordance with standards ASTM E84 and UL 723;

FIG. 40 is a schematic representation of Class-A fire-protected top chord bearing roof truss structure of the present invention, constructed in accordance with the method described in FIG. 41 in the automated factory illustrated in FIG. 42, using Class-A fire-protected lumber sections connected together using heat-resistant coated metal truss connector plates, indicating a 50% reduction in heat transfer during ASTM E119 Testing, which reduces charring in the wood behind the connector plates and prevented truss failure in the presence of fire;

FIG. 42 is a schematic representation of an automated factory for making Class-A fire-protected roof trusses in accordance with the method described in FIG. 41, wherein the factory comprises the components, including (a) a first stage for dipping untreated lumber components in a dipping tank filled with liquid clean fire inhibiting chemicals (CFIC), (b) a second stage for spraying metal connector plates with a heat-resistant chemical to produce heat-resistant metal connector plates, and (c) a third stage for assembling the Class-A fire-protected lumber components with the heat-resistant metal connector plates to form Class-A fire-protected roof trusses;

FIG. 44 shows a schematic table representation illustrating the flame spread and smoke development indices obtained through testing of Class-A fire-protected roof truss structure produced using the method described in FIGS. 41, 42, 43A and 43B, in accordance with ASTM E84 and UL 723;

FIG. 48 shows a schematic table representation illustrating the flame spread and smoke development indices obtained through testing of Class-A fire-protected floor joist structure produced using the method of the illustrative embodiment described in FIGS. 46 and 47, tested in accordance with standards ASTM E84 and UL 723;

FIGS. 60A and 60B, set forth a flow chart describing the primary steps involved in carrying out the method of verifying and documenting on-site spray-applied Class-A fire-protection over wood-framed buildings during construction;

FIG. 63 is a schematic representation of a barcoded/RFID-tag encoded inspection checkpoint, shown in FIG. 62, with integrated certifications by spray technician liquid and spray supervisor;

Figure 1A:
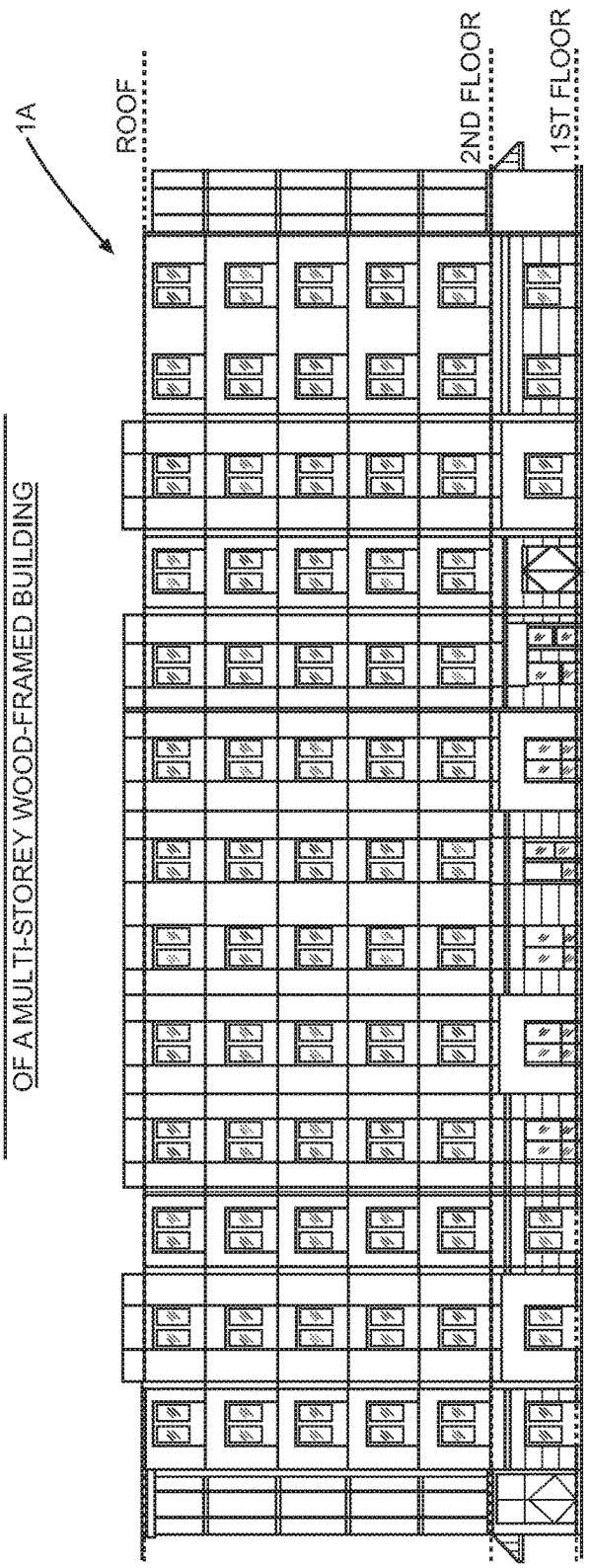
FIG. 1A is an elevation view of architectural drawings prepared for a conventional multi-story high-density housing wood-framed building being planned for construction.
Figure 1B:
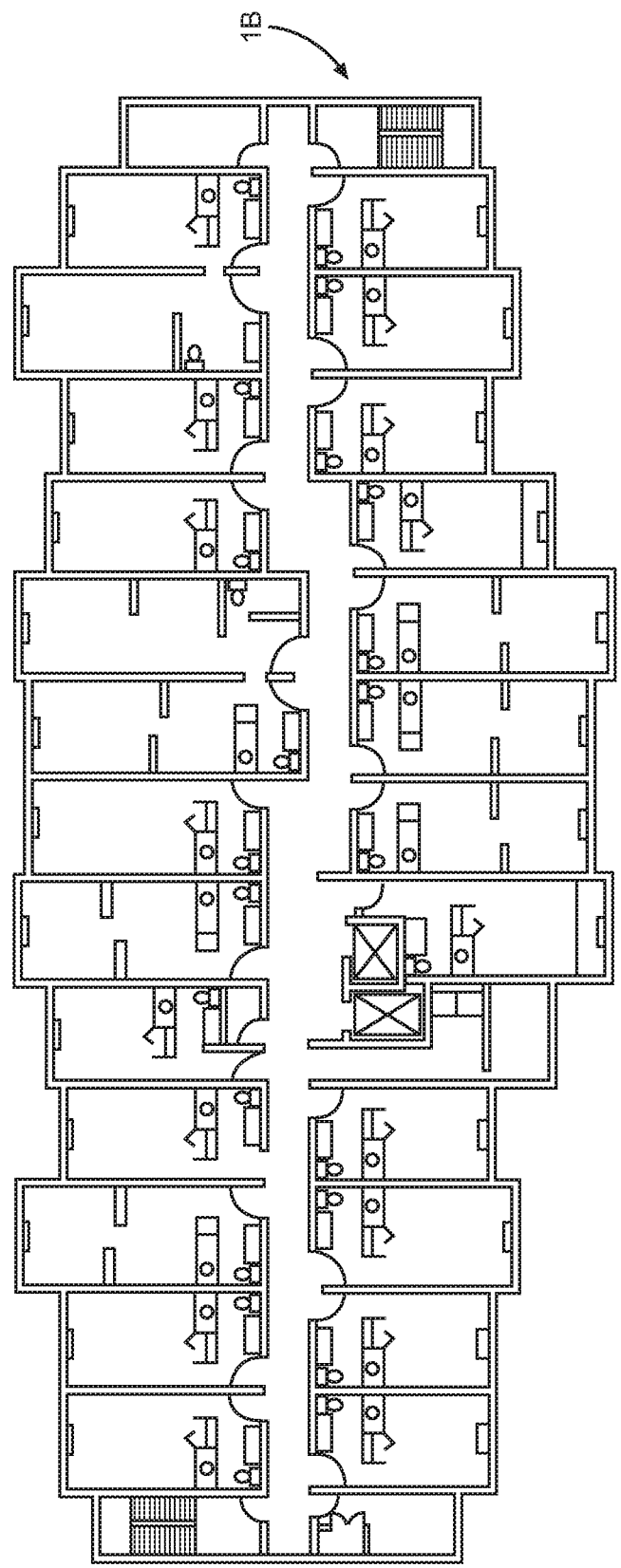
FIG. 1B is a plan view of architectural drawings prepared for the conventional multi-story high-density housing wood-framed building illustrated in FIG. 1A.
Figure 2:
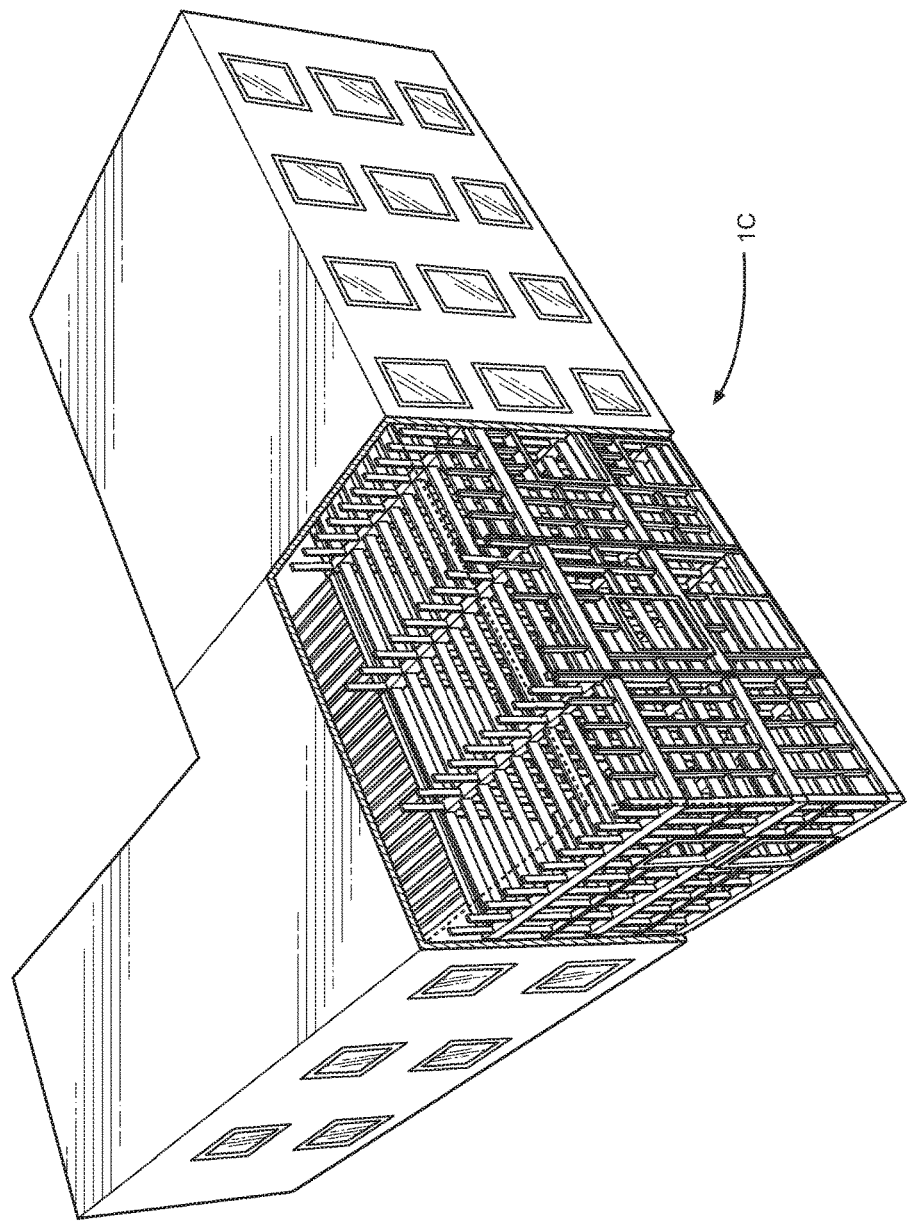
FIG. 2 is a perspective view of a 3D CAD-based geometrical building model of the conventional multi-story wood-framed building illustrated in FIGS. 1A and 1B, showing its multi-story wood-framed building structure, with wood sheathing being removed for purposes of illustration.
Figure 3:
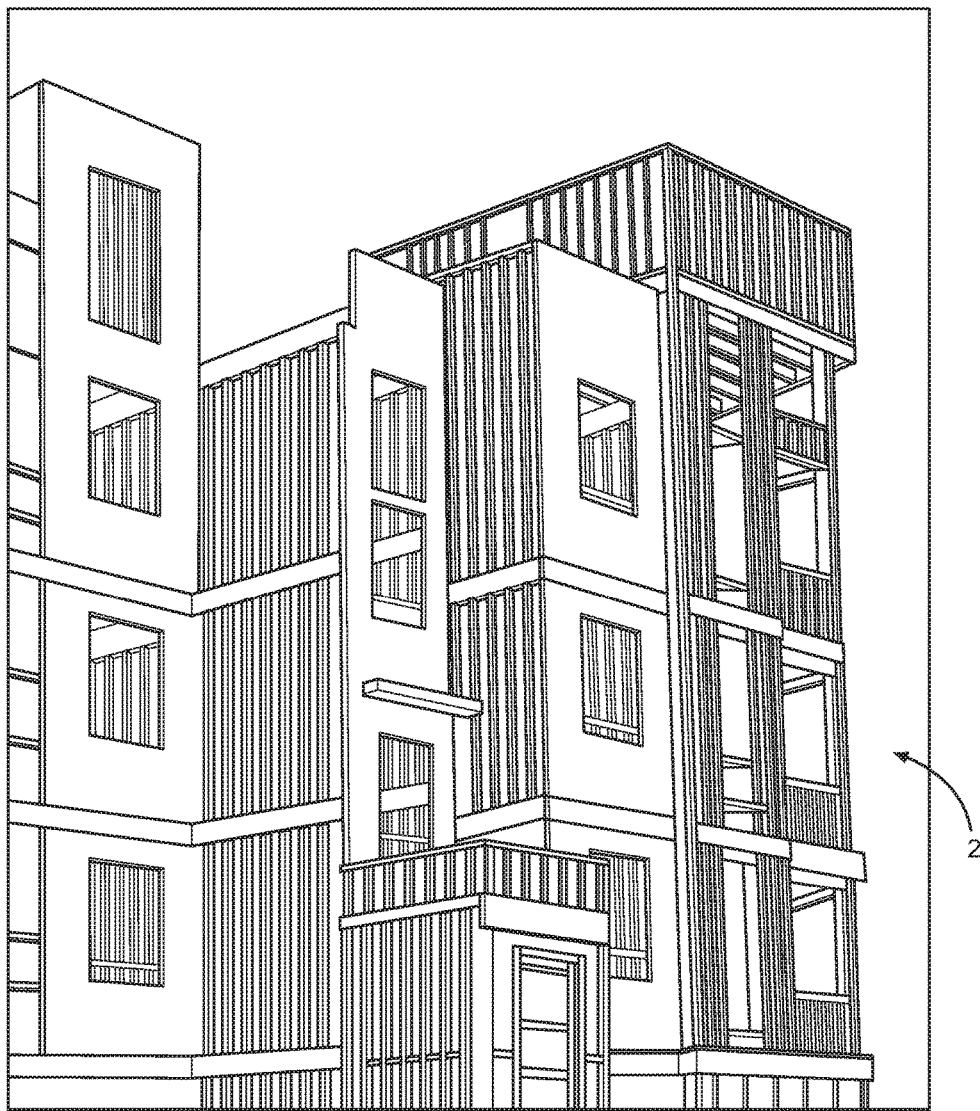
FIG. 3 is a photograph of a portion of the conventional multi-story wood-framed building of FIG. 2 under construction, with wood sheathing applied to a portion of the wood-framed building structure.
Figure 4:
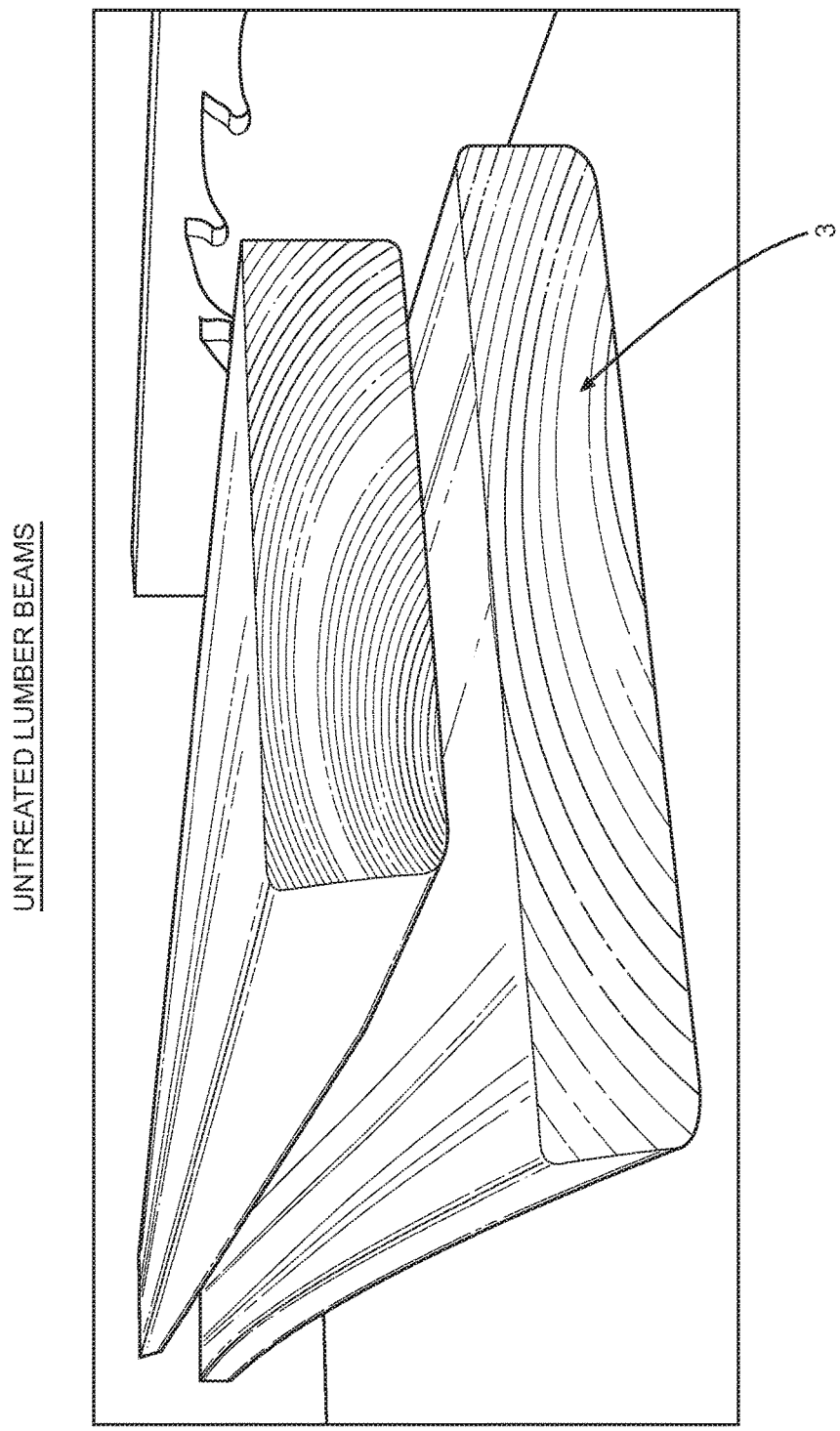
FIG. 4 is a perspective view of a several beams of conventional untreated lumber used in constructing conventional multi-story wood-framed buildings.
Figure 5A:
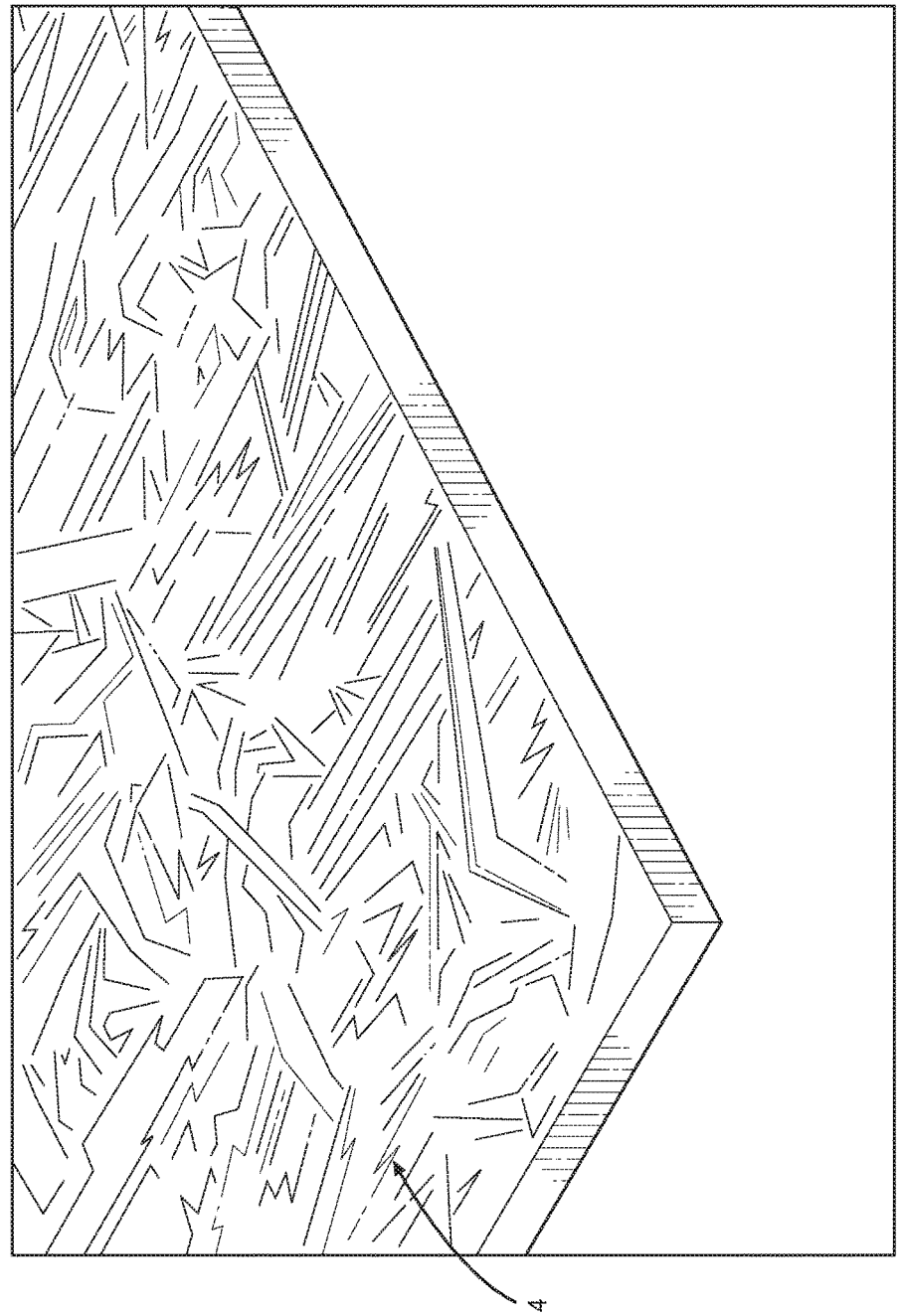
FIG. 5A is a perspective view of a cut-away portion of a sheet of conventional untreated OSB board used in sheathing wood-framed buildings.
Figure 5B:
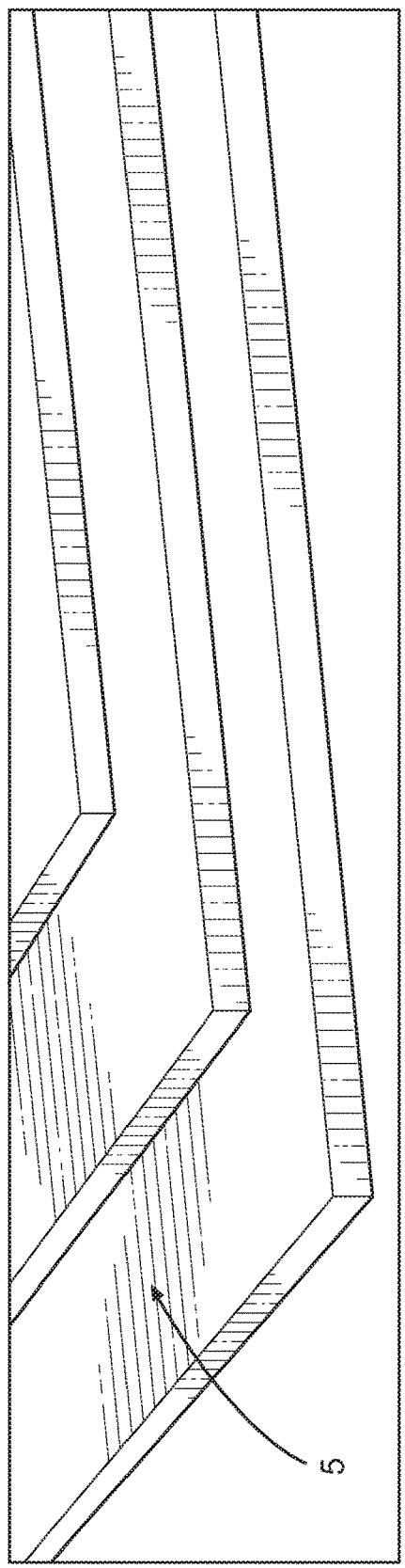
FIG. 5B is a perspective view of a cut-away portion of several sheets of conventional fire-treated OSB board used in sheathing wood-framed buildings.
Figure 6A:
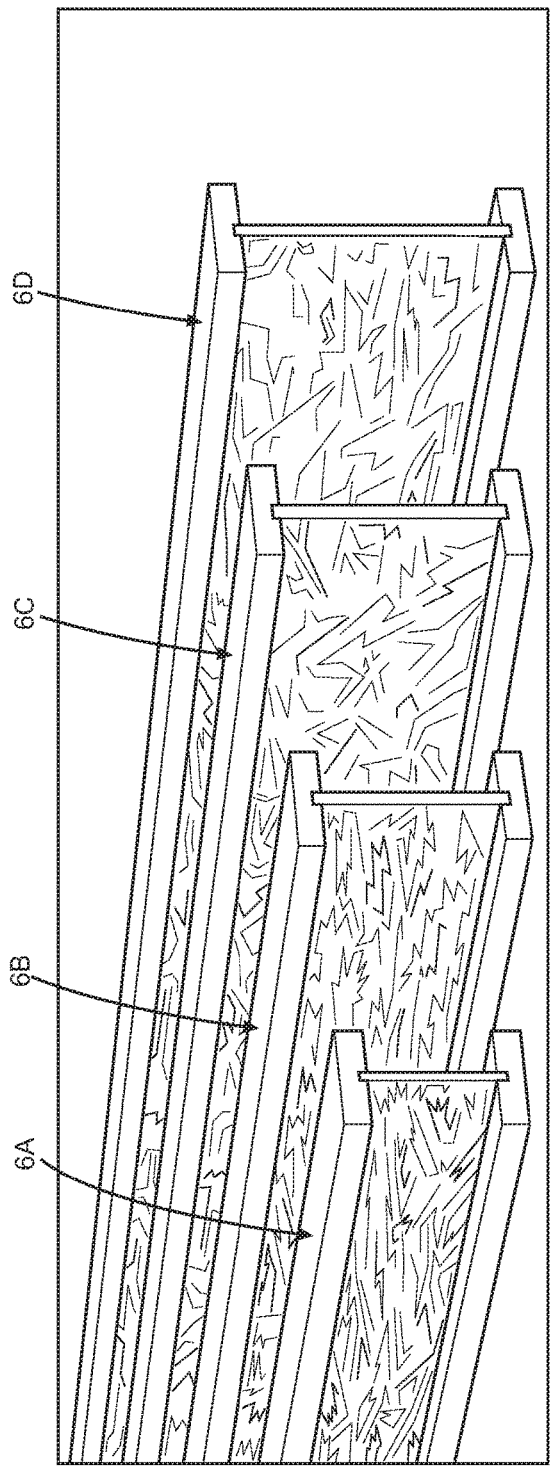
FIG. 6A is a perspective view of a cut-away portion of several conventional untreated OSB I-Joists used in the construction of wood-framed buildings.
Figure 6B:
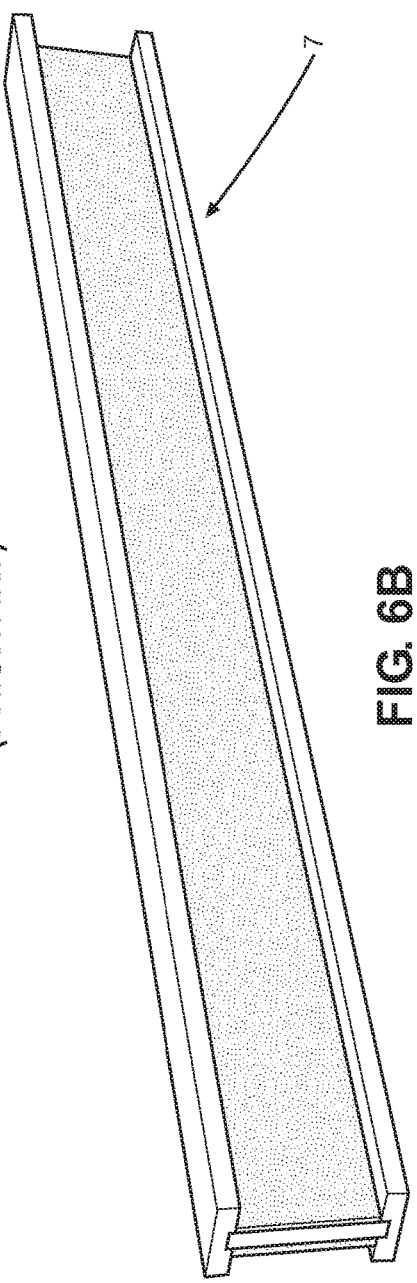
FIG. 6B is a perspective view of a cut-away portion of conventional fire-treated OSB I-Joist used in the construction of wood-framed buildings.
Figure 7A:
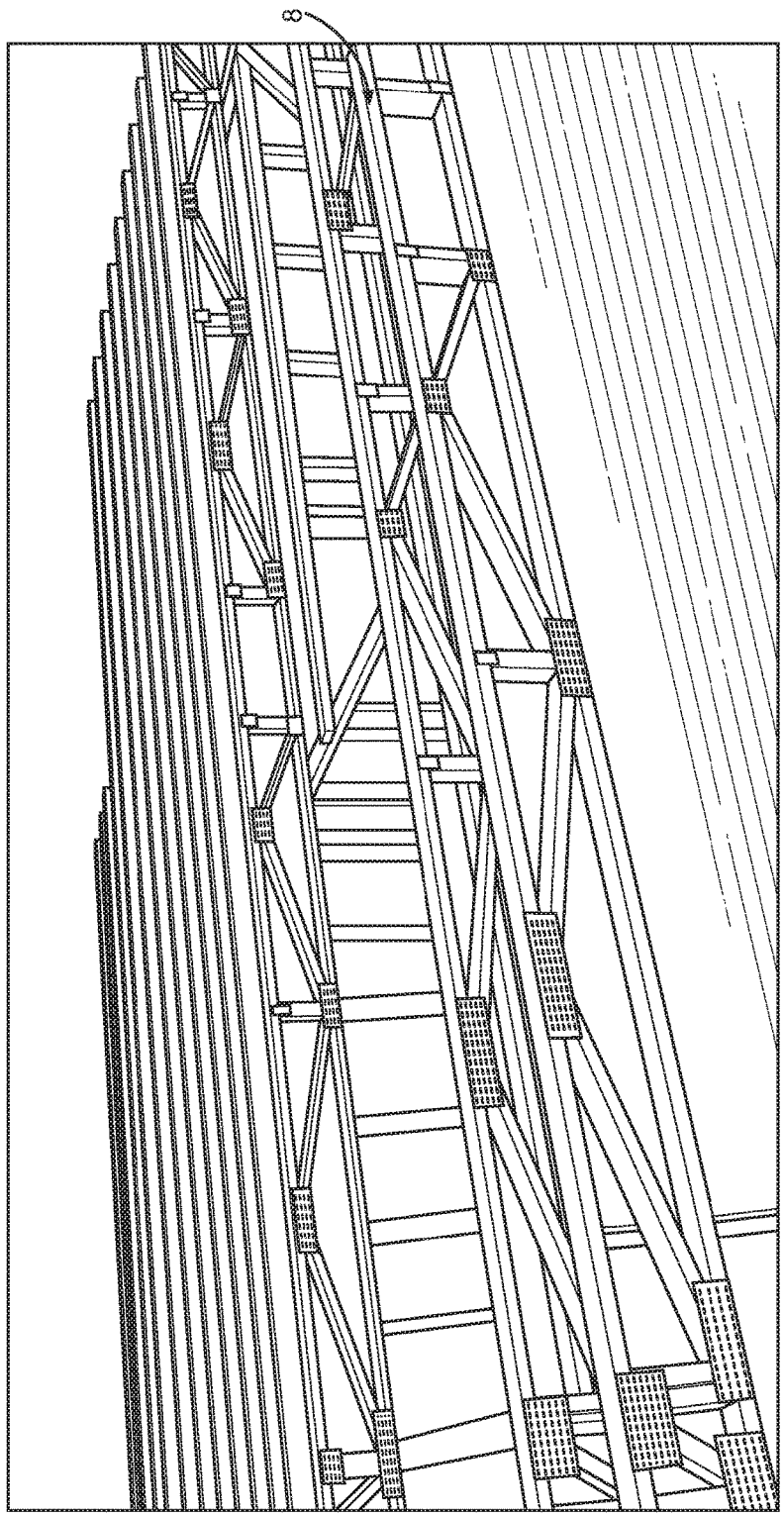
FIG. 7A is a perspective view of a several load bearing floor trusses (i.e. joints) constructed from untreated lumber connected using conventional metal truss connector plates.
Figure 7B:
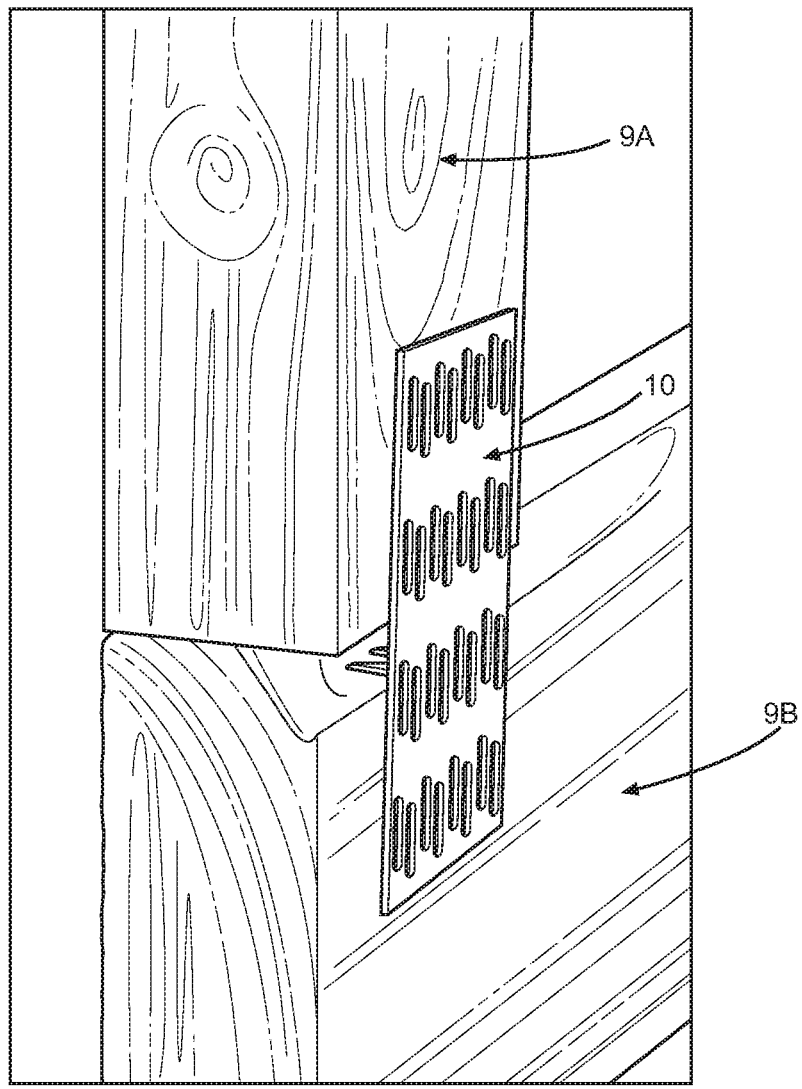
FIG. 7B is a perspective view of a cut-away portion of one of the floor trusses in FIG. 7A, showing a pair of conventional untreated lumber beams connected together using a conventional metal truss connector plate, as shown in FIGS. 8A and 8B.
Figure 7C:
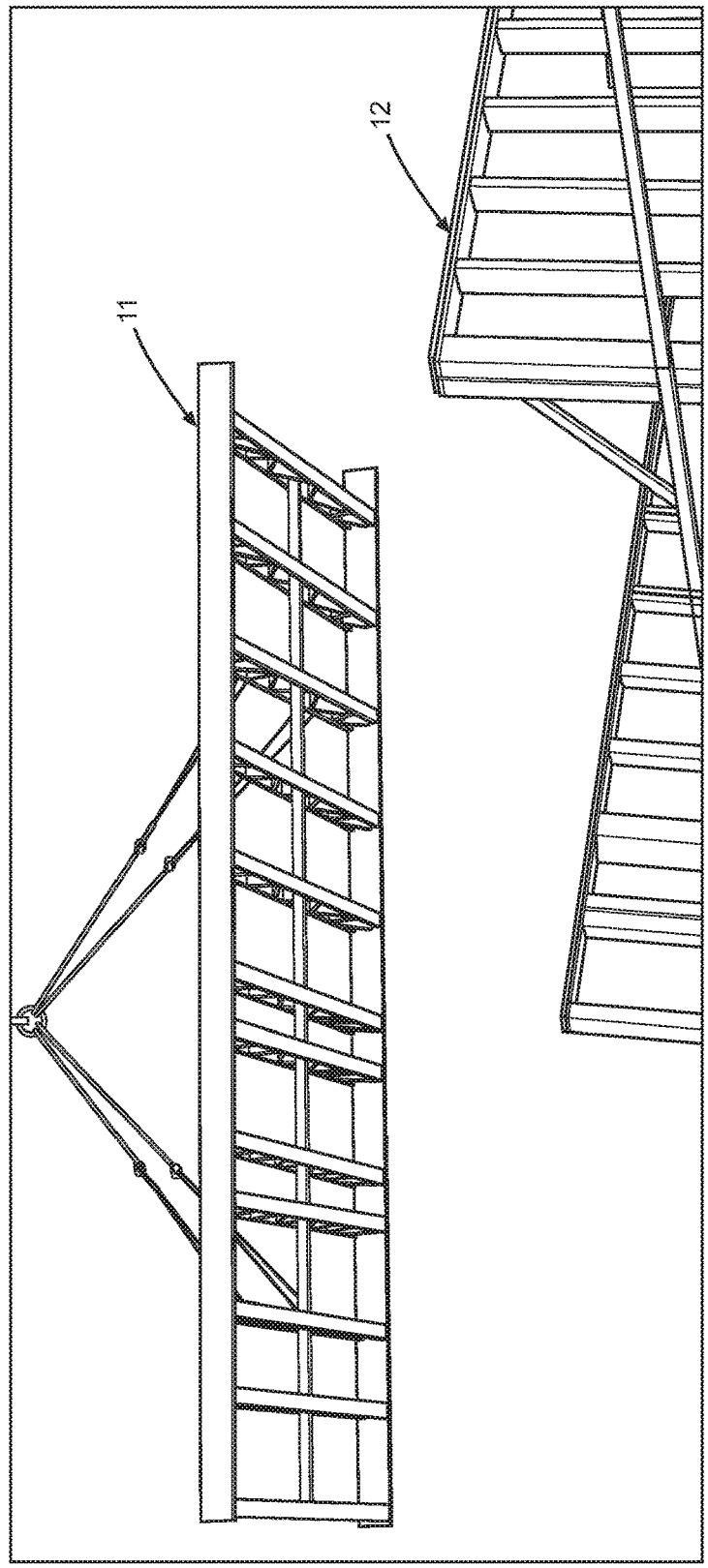
FIG. 7C is a perspective view of a preassembled floor system, being lifted into position on a multi-story wood-framed building, and constructed from a plurality of floor truss structures constructed using untreated lumber beams connected together using conventional metal connector plates.

DETAILED DESCRIPTION OF THE
ILLUSTRATIVE EMBODIMENTS OF THE
PRESENT INVENTION

Referring to the accompanying Drawings, like structures and elements shown throughout the figures thereof shall be indicated with like reference numerals.

Figure 17B:
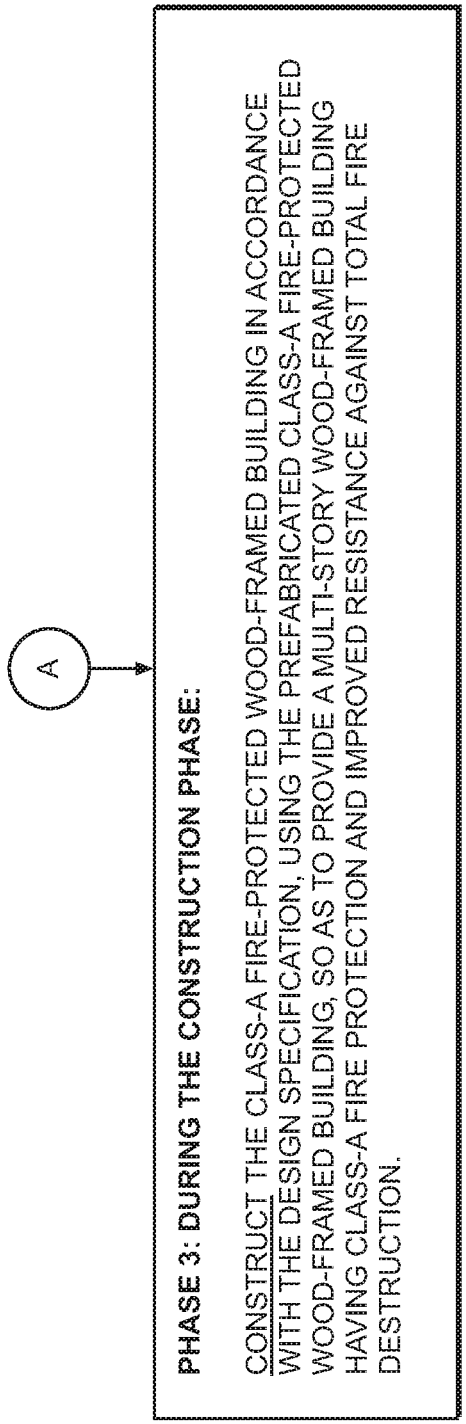

Specification of Method of Designing and Constructing Multi-Story Wood-Framed Buildings in Accordance with the Principles of the Present Invention so that Such Wood-Framed Building Demonstrate Class-A Fire-Protection and Improved Resistance Against Total Fire Destruction FIGS. 17A and 17B describes the primary steps involved in the method of designing and constructing multi-story wood-framed buildings in accordance with the principles of the present invention so that such wood-framed building demonstrate Class-A fire-protection and resistance against total fire destruction. As shown, the method comprises the two phases: an architectural design phase; and a building construction phase.

During the architectural design phase of a new multi-story building, the architect specifies the use of (i) Class-A fire-protected lumber, or raw untreated lumber, Class-A fire-protected OSB sheeting, Class-A fire-protected OSB Hoists, Class-A fire-protected floor trusses, and Class-A fire-protected roof trusses, and (i) on-job-site Class-A fire-protected spray coating treatment of all raw/untreated and treated lumber using CFIC liquid after each completed section of the wood-framed building, so as to ensure that a Class-A fire-protection coating is deposited or otherwise formed on the interior surface of all exposed wood surfaces within the wood-framed building under construction.

As shown in FIG. 17A, during the design phase, the building architect specifies the use of the on-job-site spray method and system of the present invention so that all (100%) of new construction lumber and sheathing used on the building is Class-A fire-protected with a CFIC coating or film, to prevent fire ignition and flame spread in the building, during the construction phase, as well as after construction of the building is completed. According to the present invention, the building architect also specifies that factory-applied Class-A fire-protective lumber be used on exterior walls, exterior face of the roof, walls and floor sheathing, as it offers extra UV and moisture protection, against the natural elements.

During the prefabrication/production phase shown in FIG. 17A, in a prefabricated wood-framed building factory system supporting multiple production lines, as illustrated in FIGS. 62A and 62B, prefabricated Class-A fire-protected wood-framed building components are produced for use in constructing a pre-specified Class-A fire-protected wood-framed building, managed and tracked using the system network 135 illustrated in FIG. 63.

During the construction phase shown in FIG. 17B, the builder constructs the building in accordance with the architect's design specifications so as to provide a single-story or multi-story wood-framed building having Class-A fire-protection and improved resistance against total fire destruction.

In order to carry out the method described above, it will be helpful to describe several new and improved methods of producing Class-A fire-protected lumber and wood-based building products in accordance with the principles of the present invention. Each of these improved Class-A fire-protected wood-framed building products can be used in the practice of the method described in FIGS. 17A and 17B, in combination with the practice of the method of spray-treating lumber and sheathing inside a prefabricated wood-framed building under construction, as described in FIGS. 41 through 52, so as to construct and provide a prefabricated wood-framed building with "double" Class-A fire-protection, having received in-factory and on-site Class-A fire-protection.

Figure 18:
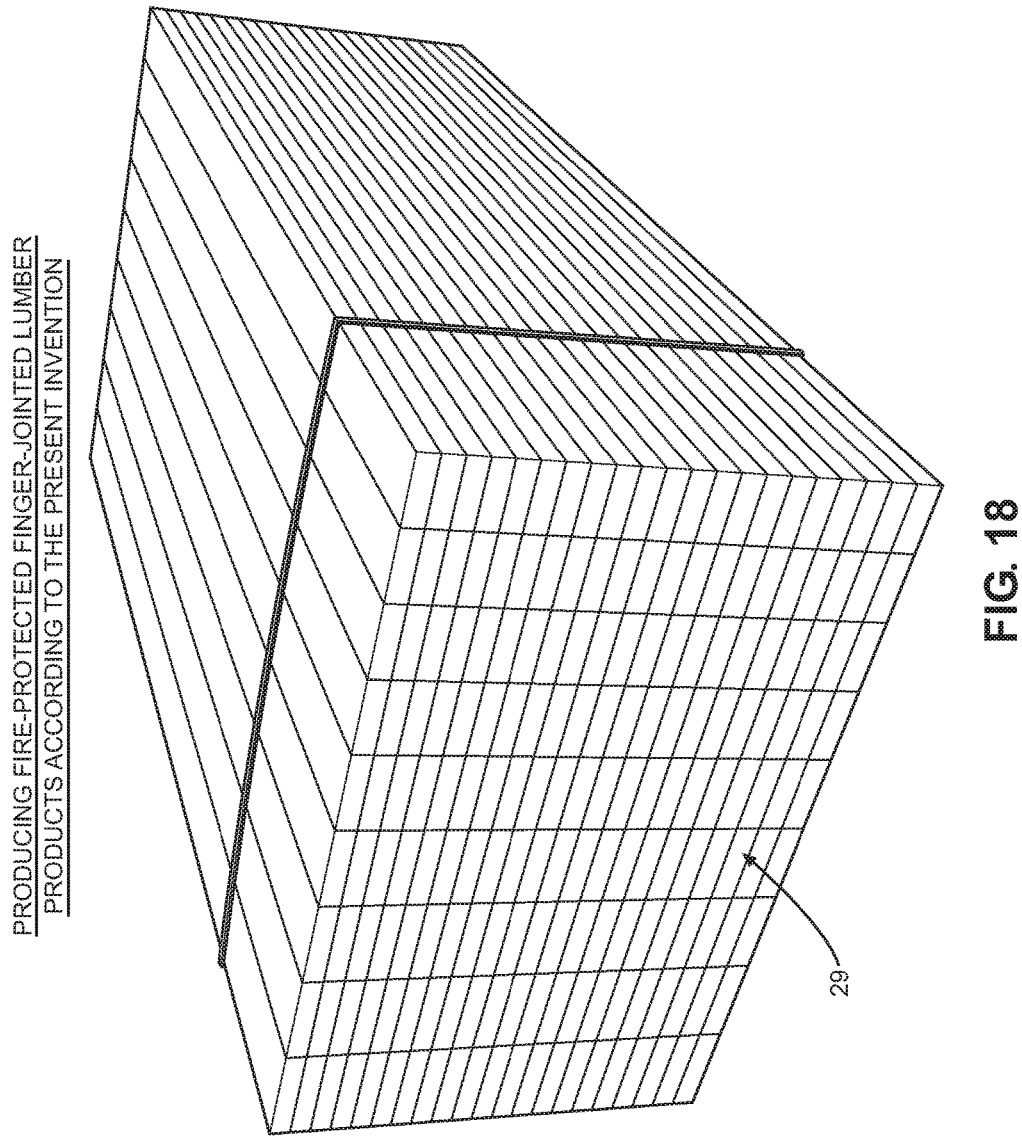
FIG. 18 is a perspective view of a bundle of Class-A fire-protected finger-jointed lumber produced along the production line in the automated fire-treated lumber factory illustrated in FIG. 19.

Specification of the Method of and Apparatus for Producing a Bundle of Class-A Fire-Protected Lumber Produced in Accordance with the Principles of the Present Invention While most fires start small, they often spread rapidly onto surrounding flammable surfaces. Before long, the phenomenon of flash over occurs, where superheated gases cause a whole room to erupt into flame within minutes. Class-A fire-protected lumber of the present invention, as shown in FIG. 18, bears a clear or transparent surface coating formed by dip-coating lumber pieces in clean fire inhibiting chemical (CFIC) liquid, preferably Hartindo AF21 Total Fire Inhibitor, developed by Hartindo Chemicatama Industri of Jakarta, Indonesia, and commercially-available from Newstar Chemicals (M) SDN. BHD of Selangor Darul Ehsan, Malaysia http://newstarchemicals.com/products.html. When so treated, Class-A fire-protected lumber products will prevent flames from spreading, and confine fire to the ignition source which can be readily extinguished, or go out by itself.

The primary chemical constituents of Hartindo AF21 include: monoammonium phosphate (MAP) ($NH_4H_2PO_4$); diammonium phosphate (DAP) ($NH_4)_2HPO_4$; ammonium sulphate ($NH_4)_2SO_4$; urea ($CH_4N_2O$); ammonium bromide (NH4Br); and tripotassium citrate $C_6H_5K_3O_7$. These chemicals are mixed together with water to form a clear aqueous solution that is environmentally-friendly (i.e. clean) non-toxic, but performs extremely well as a total fire inhibitor. In the presence of a flame, the chemical molecules in the CFIC-coating formed with Hartindo AF21 liquid on the surface of the fire-protected lumber, interferes with the free radicals (H+, OH−, O) involved in the free-radical chemical reactions within the combustion phase of a fire, and breaks these free-radical chemical reactions and extinguishes the fire's flames.

Figure 19:
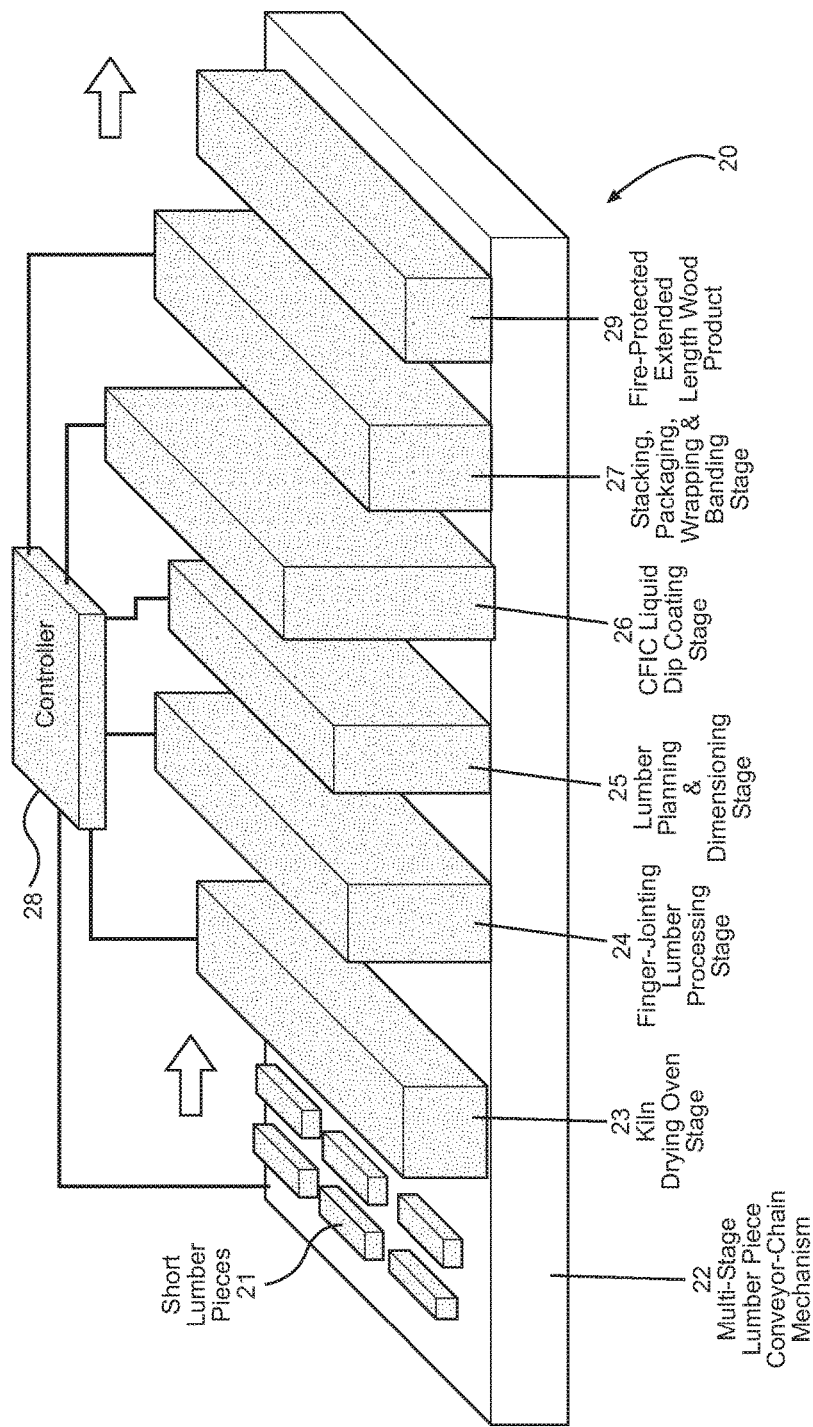
FIG. 19 is a perspective view of an automated lumber factory supporting an automated process for continuously fabricating Class-A fire-protected finger-jointed lumber products which, after the planning and dimensioning stage, are automatically dip-coated in a bath or reservoir of clean fire inhibiting chemical (CFIC) liquid, and then automatically packaged, stack-dried and wrapped in a high-speed and economical manner.

FIG. 18 shows a bundle of Class-A fire-protected finger-jointed lumber 29 produced using the method of and apparatus of the present invention. FIG. 19 shows an automated lumber factory system 20 for continuously fabricating wrapped and packaged bundles of Class-A fire-protected finger-jointed lumber product 29 in a high-speed manner, in accordance with the principles of the present invention. However, it is understood that this automated factory and production methods can be used to treat and protect solid wood and timber products, as well, so as to produce Class-A fire-protected solid wood products (e.g. studs, beams, boards, etc), as well as engineerered wood products.

Figure 19A:
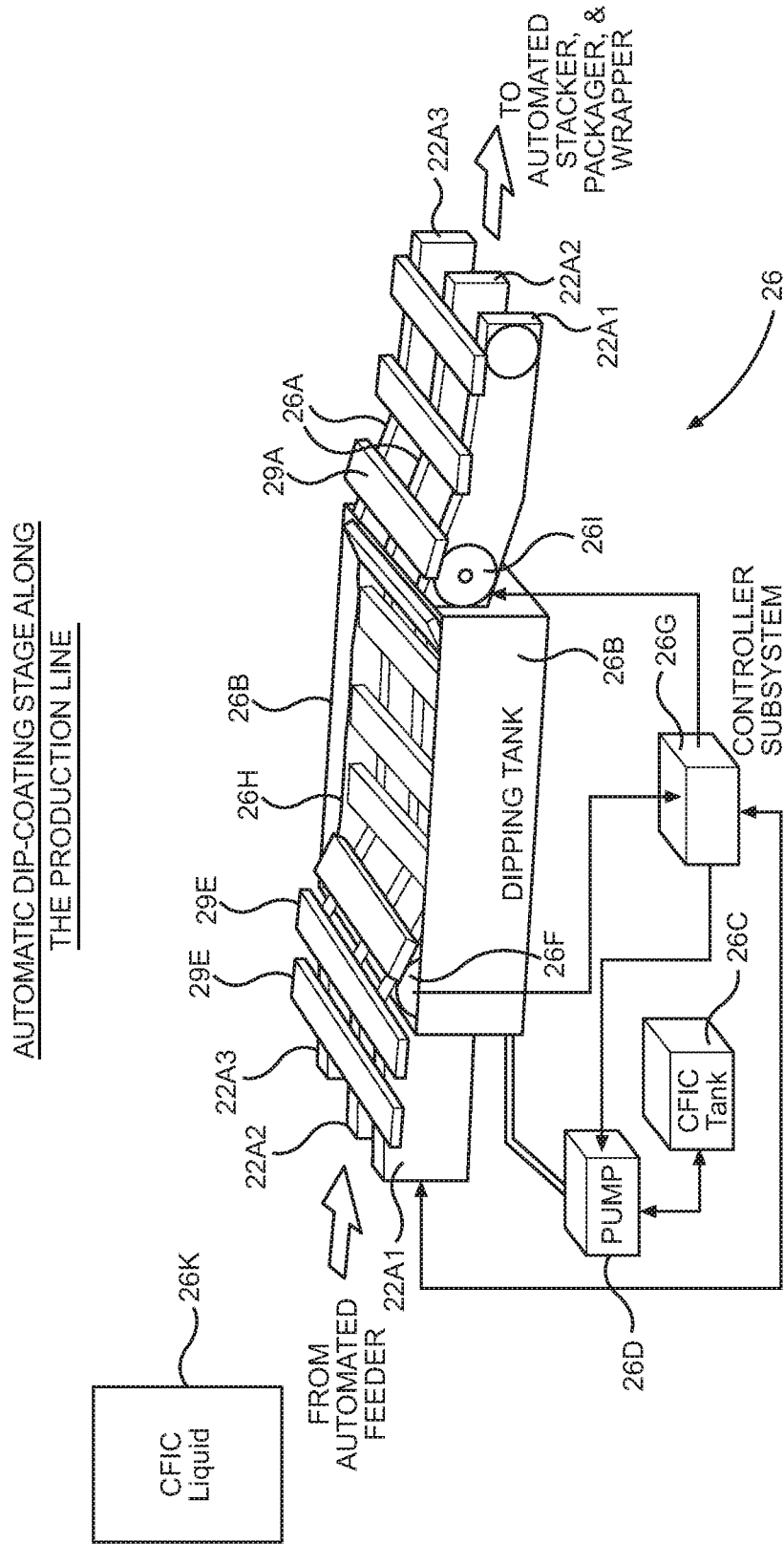
FIG. 19A is a perspective view of the high-speed CFIC dip-coating stage depicted in FIG. 19, showing the various components used to implement this subsystem along the production line of the automated lumber factory.

As shown in FIG. 19, the factory 20 comprises a number of automated industrial stages integrated together under automation and control of controller 28, namely: a high-speed multi-stage lumber piece conveyor-chain mechanism 22 having 6 primary stages in the illustrative embodiment shown in FIGS. 19 and 19A; a kiln-drying stage 23 receiving short pieces of lumber 21 from a supply warehouse maintained in or around the factory; a finger-jointing lumber processing stage 24, for processing short-length pieces of kiln-dried lumber and automatically fabricating extended-length finger-jointed pieces of lumber 29, as output from this stage; a lumber planing and dimensioning stage 25 for planing and dimensioning enlongated pieces of finger-jointed lumber into lumber pieces having lengths and dimensions for the product application at hand (e.g. studs); an in-line high-speed continuous CFIC liquid dip-coating stage 26, as further detailed in FIG. 19A; an automated stacking, packaging, wrapping and banding/strapping stage 27, from which bundles of packaged, wrapped and strapped Class-A fire-protected lumber product are produced in a high-speed automated manner.

In general, the kiln-drying stage 23 can be implemented in different ways. One way is providing a drying room with heaters that can be driven by electricity, natural or propane gas, and/or other combustible fuels which release heat energy required to dry short-length lumber pieces prior to the finger-joint wood processing stage. Batches of wood to be treated are loaded into the drying room and treated with heat energy over time to reduce the moisture content of the wood to a predetermined level (e.g. 19% moisture). In alternative embodiments, the kiln-drying stage 23 might be installed an elongated tunnel on the front end of the production line, having input and output ports, with one stage of the conveyor-chain mechanism 22 passing through the heating chamber, from its input port to output port, allowing short-length lumber to be kiln-dried as it passes through the chamber along its conveyor mechanism, in a speed-controlled and temperature-controlled manner. Other methods and apparatus can be used to realize this stage along the lumber production line, provided that the desired degree of moisture within the wood is removed at this stage of the process.

As illustrated in FIG. 19, the finger-jointing lumber processing stage 24 can be configured as generally disclosed in US Patent Application Publication Nos. US20070220825A1 and US20170138049A1, incorporated herein by reference. In general, this stage involves robotic wood-working machinery, automation and programmable controls, well known in the finger-jointing wood art, and transforms multiple smaller-pieces of kiln-dried lumber into an extended-length piece of finger-jointed lumber, which is then planed and dimensioned during the next planning/dimensioning stage of the production line. An example of commercial equipment that may be adapted for the finger-jointing processing stage 24 of the present invention may be the CRP 2500, CRP 2750 or CRP 3000 Finger Jointing System from Conception R.P., Inc., Quebec, Canada http://www.conceptionrp.com/fingerjointing-systems.

As illustrated in FIG. 19, the lumber planing and dimensioning stage 25 includes wood planing equipment, such industrial band or rotary saws designed to cut and dimension finger-jointed lumber pieces produced from the finger-jointing lumber processing stage 24, into lumber boards of a specified dimension and thickness, in an highly programmed and automated manner.

As shown in FIG. 19A, the dip-coating stage 26 of the factory system 20 comprises a number of components integrated together on the production line with suitable automation and controls, namely: a multi-stage chain-driven conveyor subsystem 22, supporting several parallel sets of chain-driven transport rails 22A1, 22A2 and 22A3, as shown, extending from the planing and dimensioning stage 25 towards the dipping tank 26B, and then running inside and along the bottom of the dipping tank 26B, and then running out thereof towards the stacking, packing, wrapping and banding/strapping stage 27, as shown, and having the capacity of transporting extend-length finger-jointed lumber pieces (i.e. boards) having a length as long as 30 or so feet; a dipping reservoir 26B having a width dimension to accommodate the width of the chain-driven conveyor rails 22A1, 22A2 and 22A3 mounted and running outside of and also within the dipping tank 26B, as shown, to transport up planed and dimensioned finger-jointed lumber pieces 29A supported upon the chain-driven rails 22A1, 22A2 and 22A3, while the boards are fully immersed and submerged at least 6 inches deep in CFIC liquid 26H contained in the dipping tank 26B, while moving at high speed, such as 300 feet/minute through the dipping tank 26B during the CFIC dip-coating process of the present invention; electrically-powered driven motors 26I for driving the chain-driven conveyors 22A1, 22A2 and 22A3 under computer control to transport finger-jointed pieces of lumber from stage to stage along the lumber production line; a level sensor 26F for sensing the level of CFIC liquid 26B in the dipping tank at any moment in time during production line operation; a reservoir tank 26C for containing a large volume or supply of CFIC liquid solution 26K; a computer controller 26G for controlling the conveyor subsystem 22, and an electric pump 26D for pumping CFIC liquid into the dipping tank 26B to maintain a constant supply level during system operation in response to the liquid level measured by the level sensor 26F.

The high-speed CFIC liquid dip-coating subsystem 26 shown in FIG. 19A may also include additional apparatus including, for example, liquid heaters, circulation pumps and controls for (i) maintaining the temperature of CFIC liquid solution in the dipping tank 26B, and (ii) controlling the circulation of CFIC liquid around submerged pieces of finger-jointed lumber 29A being transported through the dipping tank 26B in a submerged manner during a CFIC coating process. Controlling such dip-coating parameters may be used to control the amount and degree of absorption of CFIC liquid within the surface fibers of the finger-jointed lumber 29A as it is rapidly transported through the dipping tank 26B between the lumber planing and dimensioning stage 25 and the lumber stacking, packaging, wrapping and banding/strapping stage 27 of the lumber production line. Notably, the dip coating process of the present invention allows for the rapid formation a surface coating, or surface barrier, on the surface of each piece of dipped lumber, and in the presence of the surfactant in the CFIC liquid in the dipping tank, shallow impregnation of CFIC liquid 26H to occur into the surface fibers of each piece of lumber 29A near atmospheric pressure (i.e. below 6 inches of liquid CFIC in the dipping tank) during the dip-coated process according to the principles of the present invention. It is understood that drip pans may also be provided beyond the dipping tank 26B, installed beneath the chain-driven conveyor subsystem arranged between the dripping tank 26B and the stacking, packaging, wrapping and banding/strapping stage 27, to recover excess CFIC liquid dripping from the dip-coated lumber pieces 29A and returning this recovered CFIC liquid to the dipping tank 26B after appropriate filtering of the CFIC liquid if and as necessary.

As illustrated in FIG. 19, the stacking, packaging, wrapping and banding stage 27 includes equipment designed to automatically receive CFIC-coated finger-jointed lumber pieces 29A while still dripping and wet from CFIC liquid 26H, and wet stacking a predetermined number of lumber pieces into a package, and then wrapping the package of lumber with a sheet of wrapping material (e.g. TVEK or like material) that covers the top portion and at least half way down each side of the lumber package, and then banding or strapping the wrapped package with fiberglass or steel banding, well known in the art. The wrapping will typically be preprinted with trademarks and logos of the lumber manufacturer's brand. Finally, the ends of the lumber pieces in the strapped, wrapped lumber package are painted with a fire-protective paint also containing CFIC liquid (e.g. Hartindo AF21 Total Fire Inhibitor) in amounts to be effective in Class-A fire suppression.

Figure 20A:
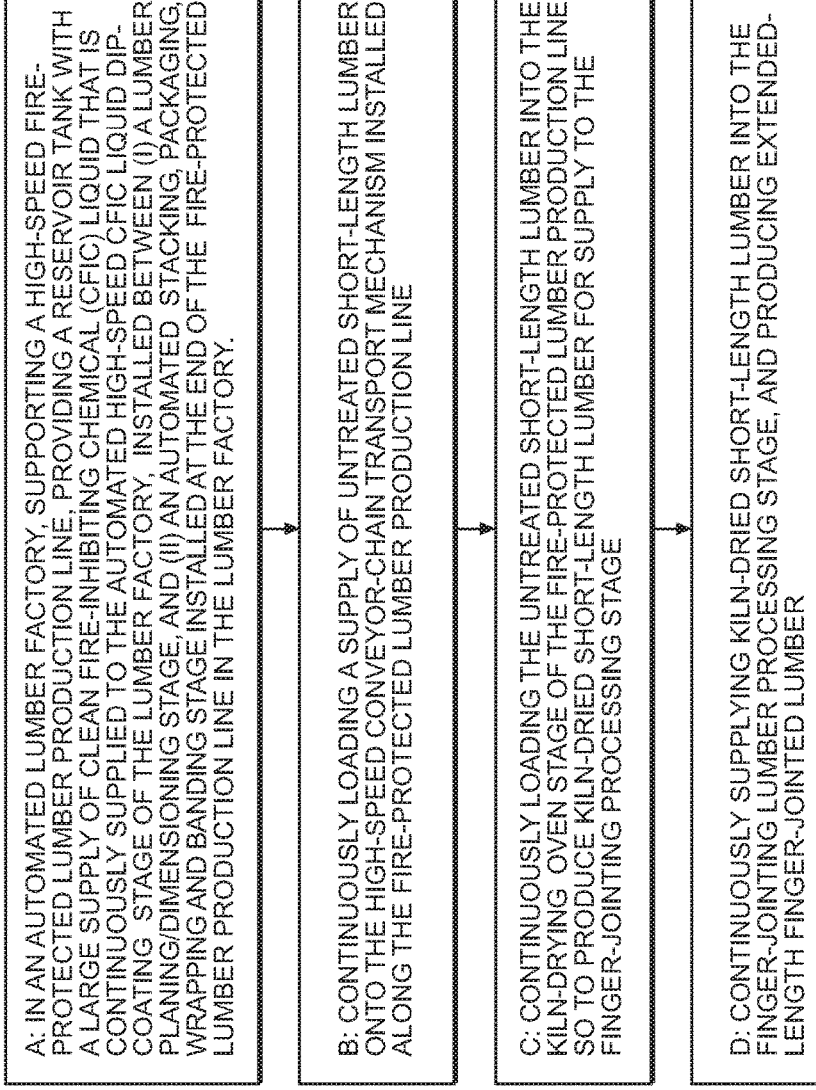
FIGS. 20A and 20B, taken together, set forth a flow chart describing the high level steps carried out when practicing the method of producing Class-A fire-protected finger-jointed lumber pieces (e.g. studs or beams) in the automated fire-treated lumber factory shown in FIGS. 19 and 19A.
Figure 20B:
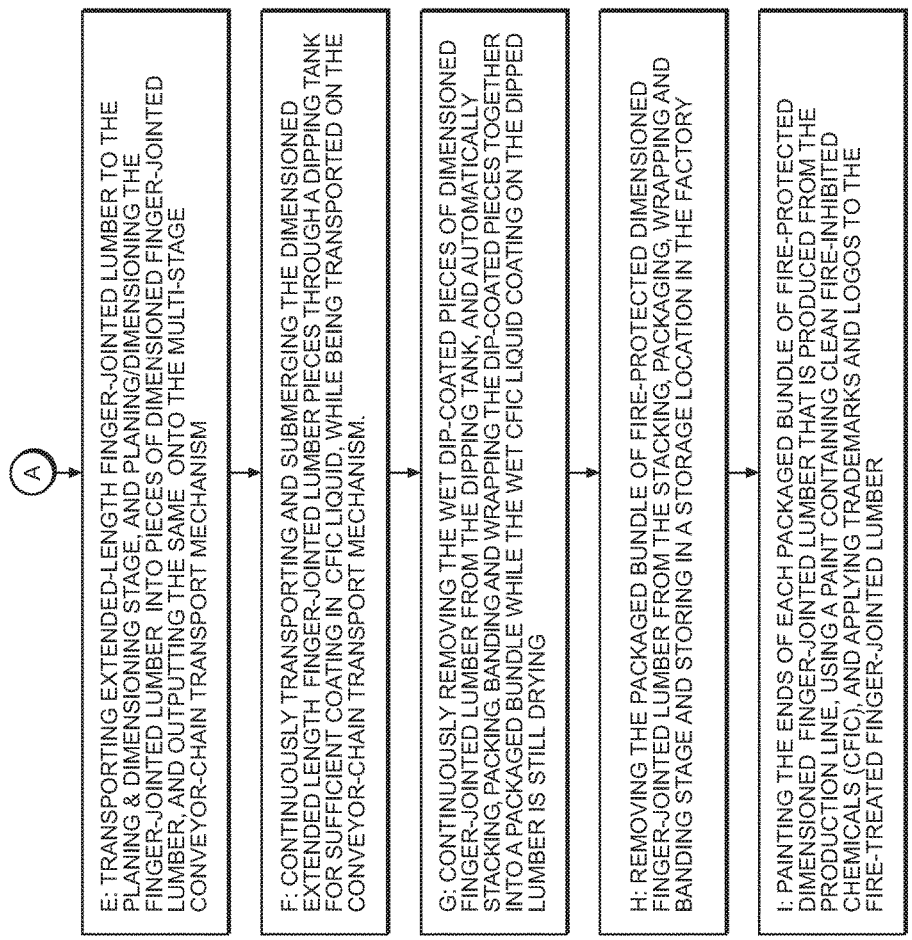

FIGS. 20A and 20B describe the high level steps carried out when practicing the method of producing bundles of Class-A fire-protected finger-jointed lumber 29 for use in fire-protected building construction.

As indicated at Block A in FIG. 20A, in an automated lumber factory, a high-speed Class-A fire-protected lumber production line is installed and operated, with a reservoir tank 26C containing a large supply of clean fire inhibiting chemical (CFIC) liquid 26K (e.g. Hartindo AF21 Total Fire Inhibitor) that is supplied to the automated CFIC liquid dip-coating stage 26 of the lumber factory 20, installed between (i) the lumber planing/dimensioning stage 25, and (ii) an automated stacking, packaging, wrapping and banding stage 27 in the lumber factory 20.

As indicated at Block B in FIG. 20A, a supply of untreated short-length lumber is loaded onto the high-speed conveyor-chain transport mechanism 22 and auto-feeder installed along and between the stages of the lumber production line.

As indicated at Block C in FIG. 20A, the untreated short-length lumber is loaded into the controlled-drying stage 23 of the fire-protected lumber production line so to produce suitably dried short-pieces of lumber for supply to the finger-jointing processing stage 24. This stage can be performed by loading batches of short length lumber into the drying room or oven, whose temperature and humidity are strictly controlled using electric heaters and other equipment under computer control. Alternatively, short-length lumber pieces can be controllably dried by moving batches of short-length lumber through a tunnel-like drying room or chamber, through which chain-driven conveyor mechanism 22 passes, like other stages along the lumber production line, while the temperature and humidity of the environment is controlled using electric-driven or gas-combusting heaters under computer control in a manner well known in the art.

As indicated at Block D in FIG. 20A, the controllably-dried short-length lumber is continuously supplied into the finger-jointing lumber processing stage 24, for producing pieces of extended-length finger-jointed lumber in a highly automated manner.

As indicated at Block E in FIG. 20B, produced pieces of extended-length finger-jointed lumber are automatically transported to the planing/dimensioning stage 25 so that the finger-jointed lumber can be planed/dimensioned into pieces of dimensioned finger-jointed lumber 29A, and outputted onto the multi-stage conveyor-chain transport mechanism 22.

As indicated at Block F in FIG. 20B, the dimensioned finger-jointed lumber pieces 29A are continuously transported and submerged through an automated dipping tank 26B for sufficient coating in CFIC liquid (e.g. Hartindo AF21 liquid) while being transported on the conveyor-chain transport mechanism 22.

As indicated at Block G in FIG. 20B, the wet dip-coated pieces of dimensioned finger-jointed lumber are continuously removed from the dipping tank 26B, and automatically wet-stacking, packing, wrapping and banding the wet dip-coated pieces into a packaged bundle of Class-A fire-protected finger-jointed lumber.

As indicated at Block H in FIG. 20B, the packaged bundle of Class-A fire-protected finger-jointed lumber is removed from the stacking, packaging, wrapping and banding stage 27 and stored in a storage location in the factory 20. The strapping the bundle material used may be made of high-strength fiberglass plastic or metal banding material.

As indicated at Block I in FIG. 20B, the ends of each packaged bundle of fire-protected dimensioned finger-jointed lumber 29, produced from the production line, are painted using a Class-A fire-protected paint containing clean fire-inhibited chemicals (CFIC) (e.g. 25% Hartindo AF21 liquid, 75% liquid polymer binder, and black liquid pigment) and applying trademarks and logos to the wrapped package of Class-A fire-protected finger-jointed lumber.

In the illustrative embodiment, Hartindo AF21 Total Fire Inhibitor liquid is used as the CFIC liquid 26H that is deposited as a CFIC surface coating during the dip-coating of wood/lumber products on the production line of the present invention described above. The surfactants in Hartindo AF21 liquid formulation break the surface tension and allow its chemical molecules to impregnate ever so slightly the surface of the treated wood. This way, in the presence of a flame, the chemical molecules in the CFIC-coating on the surface of the fire-protected lumber, interferes with the free radicals (H+, OH−, O−) produced during the combustion phase of a fire, and breaks the fire's chemical reaction and extinguishes its flame. This is a primary fire suppression mechanism implemented by the CFIC-coatings deposited on wood surfaces in accordance with the various principles of invention disclosed and taught herein.

The table in FIG. 21 illustrates the flame spread and smoke development indices of fire-protected lumber 29 produced using the method of the illustrative embodiment, using Hartindo AF21 as a CFIC liquid dip coating material, described in FIGS. 20A and 20B. As shown in the table, the flame spread index for Spruce Pine Fir (SPF) was measured to be 15, whereas the smoke development index measured to be 95. The flame spread index for Douglas Fir was measured to be 0, whereas the smoke development index measured to be 40.

Figure 22:
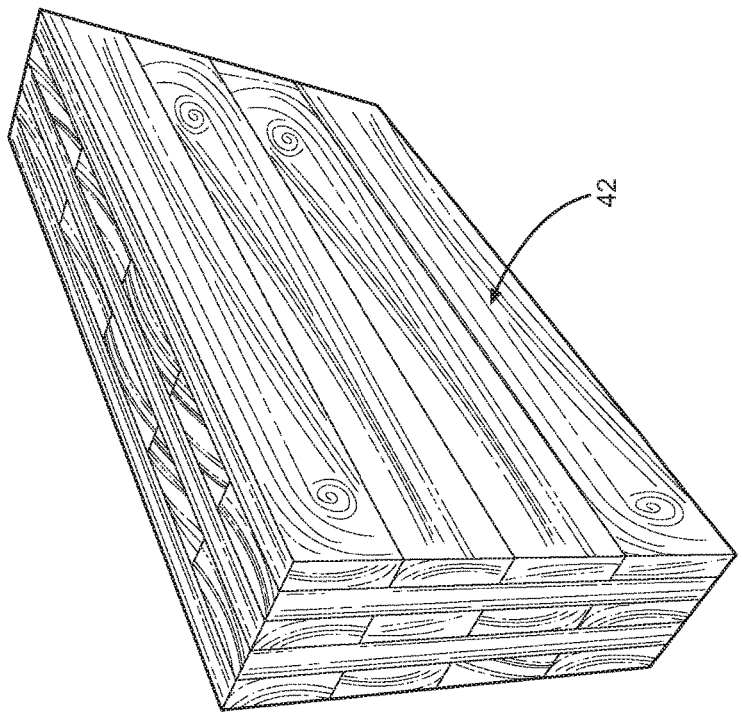
FIG. 22 is a perspective view of a Class-A fire-protected cross-laminated-timber (CLT) product (e.g. panel, stud, beam, etc.) fabricated along the production line of the automated lumber fabrication factory shown in FIGS. 23 and 23A.

Specification of the Method of and Apparatus for Producing Class-A Fire-Protected Cross-Laminated Timber (CLT) Panels in Accordance with the Principles of the Present Invention FIG. 22 shows a bundle of fire-protected cross-laminated timber (CLT) products (e.g. panels 42) produced using the method and apparatus of the present invention. The Class-A fire-protected cross-laminated timber (CLT) of the present invention 42 bears a surface coating of clean fire inhibiting chemical (CFIC) liquid (e.g. Hartindo AF21 Total Fire Inhibitor). This CFIC coating prevents flames from spreading by breaking the free radical chemical reaction within the combustion phase of fire, and confining the fire to the ignition source which can be readily extinguished, or go out by itself. When practicing the present invention, it is important that other fungicides, biocides, wood preservatives, and/or mildew agents are not added to the CFIC solution 39H (i.e. Hartindo AF21) in the CFIC dip coating tank 32B because it has been discovered that such agents will chemically interfere with and adversely effect the fire-inhibiting properties and characteristics of the Hartindo AF21 fire-inhibiting chemicals, proven by E84 flame spread test results.

Figure 23:
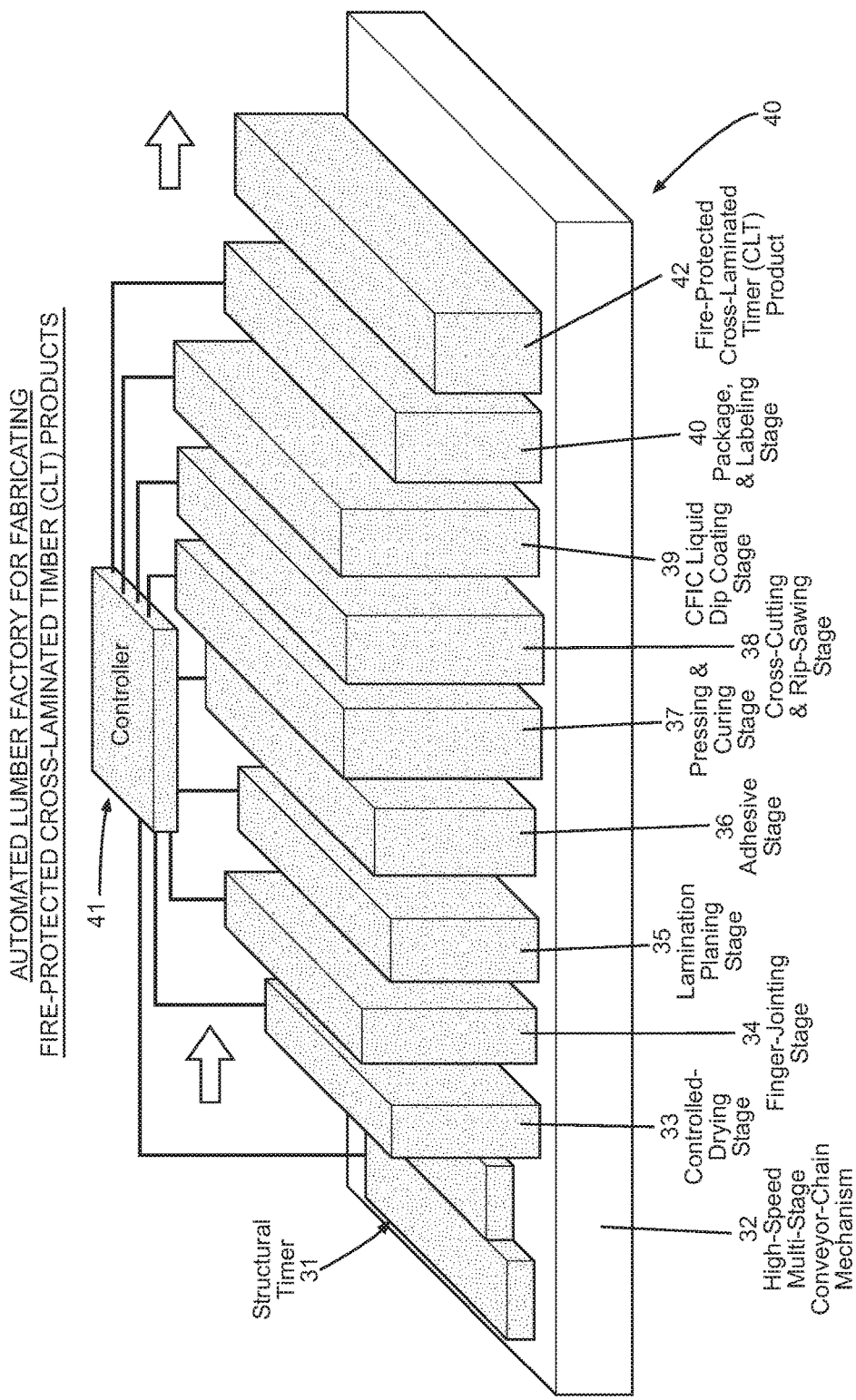
FIG. 23 is a perspective view of an automated lumber fabrication factory supporting an automated process for continuously fabricating cross-laminated timber (CLT) products which, after the planning and dimensioning stage, are automatically dip-coated in a bath of clean fire inhibiting chemical (CFIC) liquid, and then stacked, packaged and wrapped in a high-speed manner to produce Class-A fire-protected CLT products.

FIG. 23 shows an automated factory system 30 for producing Class-A fire-protected cross-laminated timber (CLT) panels, beams, and other products 42 in a high volume manner. As shown in FIG. 23, the factory 30 comprises a number of automated stages integrated together under automation and control, namely: a multi-stage conveyor-chain mechanism 32 having numerous primary stages in the illustrative embodiment shown in FIGS. 23 and 23A; a controlled-drying stage 33 receiving short pieces of lumber from a supply warehouse maintained in or around the factory and drying them in a controlled manner well known in the art; a finger-jointing stage 34, for processing short-length pieces of dried timber (i.e. lumber) and automatically fabricating extended-length finger-jointed pieces of timber, as output from this stage; a lamination planing stage 35 for planing finger-jointed pieces of timber to produce finger-jointed timber laminations; an automated adhesive stage 36 for applying adhesive to the finger-jointed timer laminations; a pressing and curing stage 37 where the finger-jointed laminations with adhesive are stacked in a cross-directional manner and then placed in pressing machine where the adhesive is cured under pressure to produce a cross-laminated timber (CLT) panel, beam or other product; cross-cutting and rip-sawing stage 38 for cutting and ripping cross-laminated timber (CLT) panels into CLT products 42A; a chain-driven conveyor 32 for conveying the CLT product 42A along the next few stages of the production line; an in-line CFIC liquid dip-coating stage 39, as further detailed in FIG. 23A, supporting an elongated dipping tank 39B through which the chain-driven conveyor 32 transports CLT product into the dipping tank 39H and along its length while submerged under CFIC liquid (e.g. Hartindo AF21 Total Fire Inhibitor) 39H during dip-coating operations, to form a CFIC coating on the surfaces of the CLT product, and removing the CFIC-coated CLT product from the dipping tank and transport it to the next stage along the production line; a packaging and wrapping/labeling stage 40 for packaging and wrapping/labeling CLT product 42A either after it has dried, or while the CFIC-coated CLT product is still wet and allowed to dry in its wrapping.

In general, the controlled-drying stage 33 will include drying room with heaters that can be driven by electricity, natural or propane gas, or other combustible fuels which produce heat energy required to dry short-length lumber prior to the finger-joint wood processing stage. Some alternative embodiments, the controlled-drying stage 33 might be installed on the front end of the production line as shown in FIG. 23, and having input and output ports, with one stage of the conveyor-chain mechanism 32 passing through the heating chamber, from its input port to output port, allowing short-length lumber to be kiln-dried as it passes through the chamber along its conveyor mechanism. Other methods and apparatus can be used to realize this stage of the lumber production line of the present invention, provided that the desired degree of moisture within the wood is removed with heat or radiant energy at this stage of the process.

As illustrated in FIG. 23, the finger-jointing lumber processing stage 34 can be configured as generally disclosed in US Patent Application Publication Nos. US20070220825A1 and US20170138049A1, incorporated herein by reference. In general, this stage involves robotic wood-working machinery, automation and programmable controls, well known in the finger-jointing wood art, and transforms multiple smaller-pieces of kiln-dried lumber into an extended-length piece of finger-jointed lumber, which is then planed and dimensioned during the next planning/dimensioning stage of the production line. An example of commercial equipment that may be adapted for the finger-jointing processing stage 34 of the present invention may be the CRP 2500, CRP 2750 or CRP 3000 Finger Jointing System from Conception R.P., Inc., Quebec, Canada http://www.conceptionrp.com/fingerjointing-systems.

As illustrated in FIG. 23, the laminating planing stage 35 includes wood lamination planing equipment, such industrial band or rotary saws designed to cut, plane and dimension finger-jointed lumber pieces produced from the finger-jointing stage 34, into finger-jointed timber laminations of a specified dimension and thickness.

As illustrated in FIG. 23, the lamination planing stage 35 can be realized using a band or radial saw as may be required to produce finger-jointed laminations.

As illustrated in FIG. 23, the adhesive application stage 36 can be realized using automated adhesive applicators well known in the art to apply a predetermined controlled amount of adhesive to each finger-jointed timber lamination during the automated finger-jointing process.

As illustrated in FIG. 23, the pressing and curing stage 37 can be realized using an automated pressing and curing machine well known in the art to apply a predetermined controlled amount of pressure to the timber laminations after they have been cross-configured, and placed into the machine for pressing and subsequent curing operations.

Figure 23A:
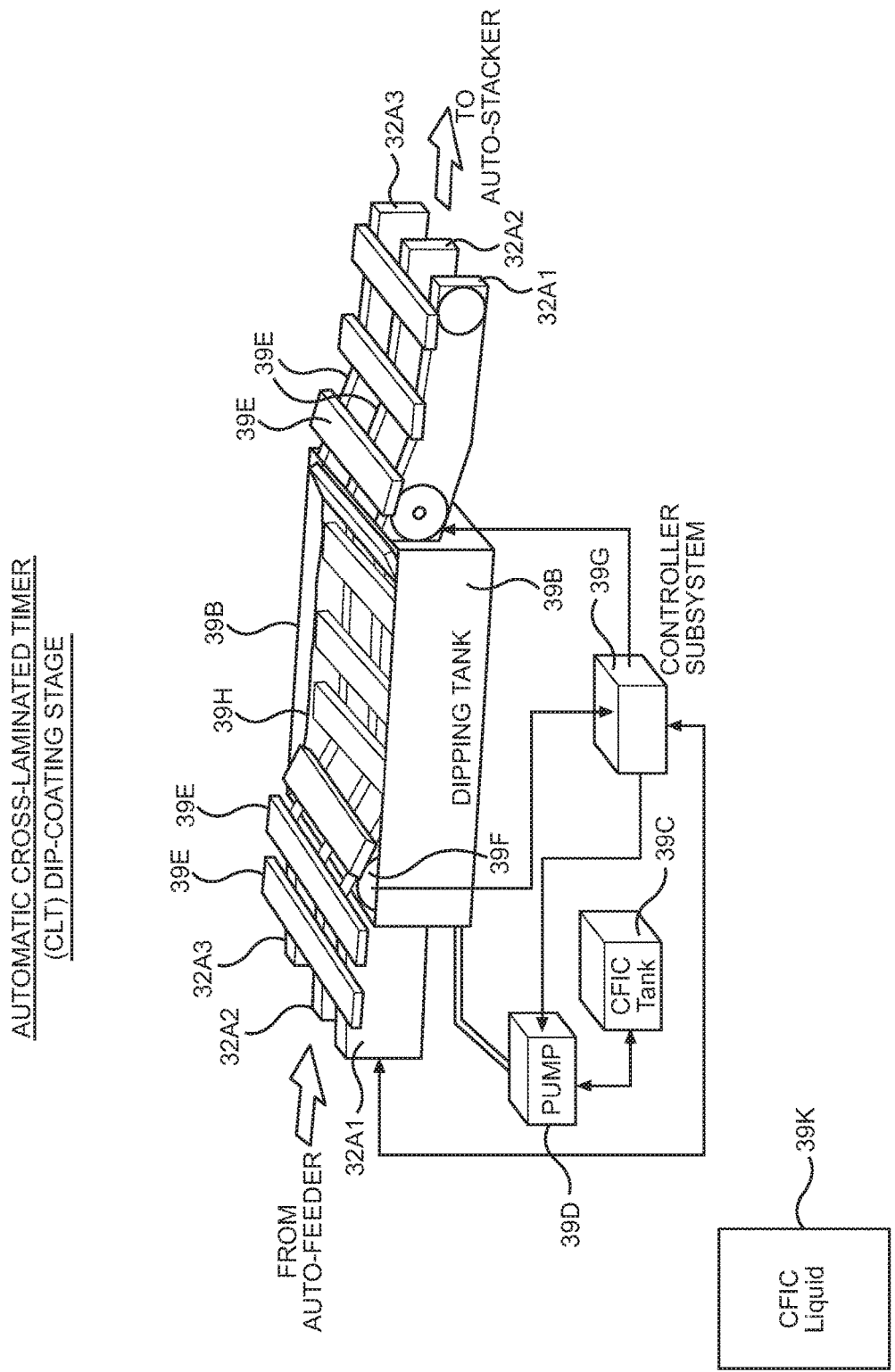
FIG. 23A is a perspective view of the automatic cross-laminated timber (CLT) dip-coating stage deployed along the production line of the automated lumber fabrication factory shown in FIG. 23.

LEDINEK Engineering, do.o.o, of Hoce, Slovenia, offers complete turnkey CLT production lines for high-volume automated production of cross-laminated timber (CLT) panels. Such systems comprise: lamination planers; finger jointing machines; presses & curing machines; and automation and controllers. Such technologies and machines can be used to implement many of the stages described above in the CLT panel production line of the present invention. https://www.ledinek.com/engineered-timber As shown in FIG. 23A, the in-line high-speed continuous CFIC liquid dip-coating stage 39 of the production line comprises a number of components integrated together, with suitable automation and controls, namely: a multi-stage lumber board chain-driven conveyor subsystem 32, supporting several parallel sets of chain-driven transport rails 32A1, 32A2 and 32A3, as shown, extending from the pressing and curing stage 39 towards a dipping tank 39B, and then running inside and along the bottom of the dipping tank 39B, and then running out thereof, towards the packing and wrapping stage 40, as shown, and having the capacity of transporting CLT panels and boards having a length up to 30 or so feet.

In the illustrative embodiment, the dipping tank 39B has a width dimension of 32 or so feet to accommodate the width of the CLT product being transported on chain-driven conveyor rails 32A1, 32A2 and 32A3 mounted and running outside of and also within the dipping tank 39B, as shown. As shown, the CLT products 42A are supported upon the chain driven rails 32A1, 32A2 and 32A3 while the CLT products are transported through the dipping tank 39B while fully immersed and submerged at least 6 inches deep in CFIC liquid 39H contained in the dipping tank 39B, moving lumber in and out of the dipping tank 39B in just a few seconds during the CFIC dip-coating process of the present invention. Electrically-powered driven motors 391 are provided for the purpose of driving the chain-driven conveyors 32A1, 32A2 and 32A3 under computer control to transport CLT products 39E from stage to stage along the production line. A level sensor 39F is used for real-time sensing and control of the liquid level of CFIC liquid 39H in the dipping tank 39B at any moment in time during production line operation. A reservoir tank 39C is provided for containing a large volume or supply of made up CFIC liquid solution (e.g. Hartindo AF21 Total Fire Inhibitor). Also, a computer controller 39G is used for controlling the conveyor subsystem 32, and an electric pump 39D for pumping CFIC liquid into the dipping tank 39B to maintain a constant supply level during system operation in response to the liquid level measured by the level sensor 39F and supplied to the control computer 39G.

The high-speed dip-coating subsystem 39 may also include additional apparatus including, for example, liquid heaters, circulation pumps and controls for (i) maintaining the temperature of CFIC liquid solution in the dipping tank 39B, and (ii) controlling the circulation of CFIC liquid around submerged CLT product 39E being transported through the dipping tank in a submerged manner during a CFIC coating process. Controlling such dip coating parameters may be used to control the amount and degree of absorption of CFIC liquid within the surface fibers of the CLT product, as it is rapidly transported through the dipping tank 39B. Notably, the dip coating process allows for the rapid formation a surface coating, or surface barrier, on the surface of each piece of dipped CLT product 39E, and in the presence of a surfactant in the CFIC liquid in the dipping tank 39B, shallow impregnation of CFIC liquid 39H (e.g. Hartindo AF21) can occur into the surface fibers of each CLT piece 42A near atmospheric pressure (i.e. below 6 inches of liquid CFIC in the dipping tank). It is understood that drip pans may also be provided beyond the dipping tank 39B, installed beneath the chain-driven conveyor subsystem 32 arranged between the dripping tank 39B and the packaging and wrapping stage 40, so as to recover excess CFIC liquid dripping from the dip-coated lumber pieces and returning this recovered CFIC liquid to the dipping tank 39B after appropriate filtering of the CFIC liquid if and as necessary.

As illustrated in FIG. 23, the packaging and wrapping stage 40 includes equipment designed to receive CFIC-coated CLT product while still dripping and wet from CFIC liquid, and wrapping the CLT product 42A with a sheet of wrapping material (e.g. TVEK or like material) that covers the top portion and at least half way down each side of the CLT product, and then banding or strapping the wrapped package 42 with fiberglass or steel banding, well known in the art. The wrapping will typically be preprinted with trademarks and logos of the lumber manufacturer's brand. Finally, the ends of the lumber pieces in the strapped, wrapped lumber package 42 are painted with a fire-protective paint also containing CFIC liquid material, in amounts to be effective in fire suppression.

Figure 24B:
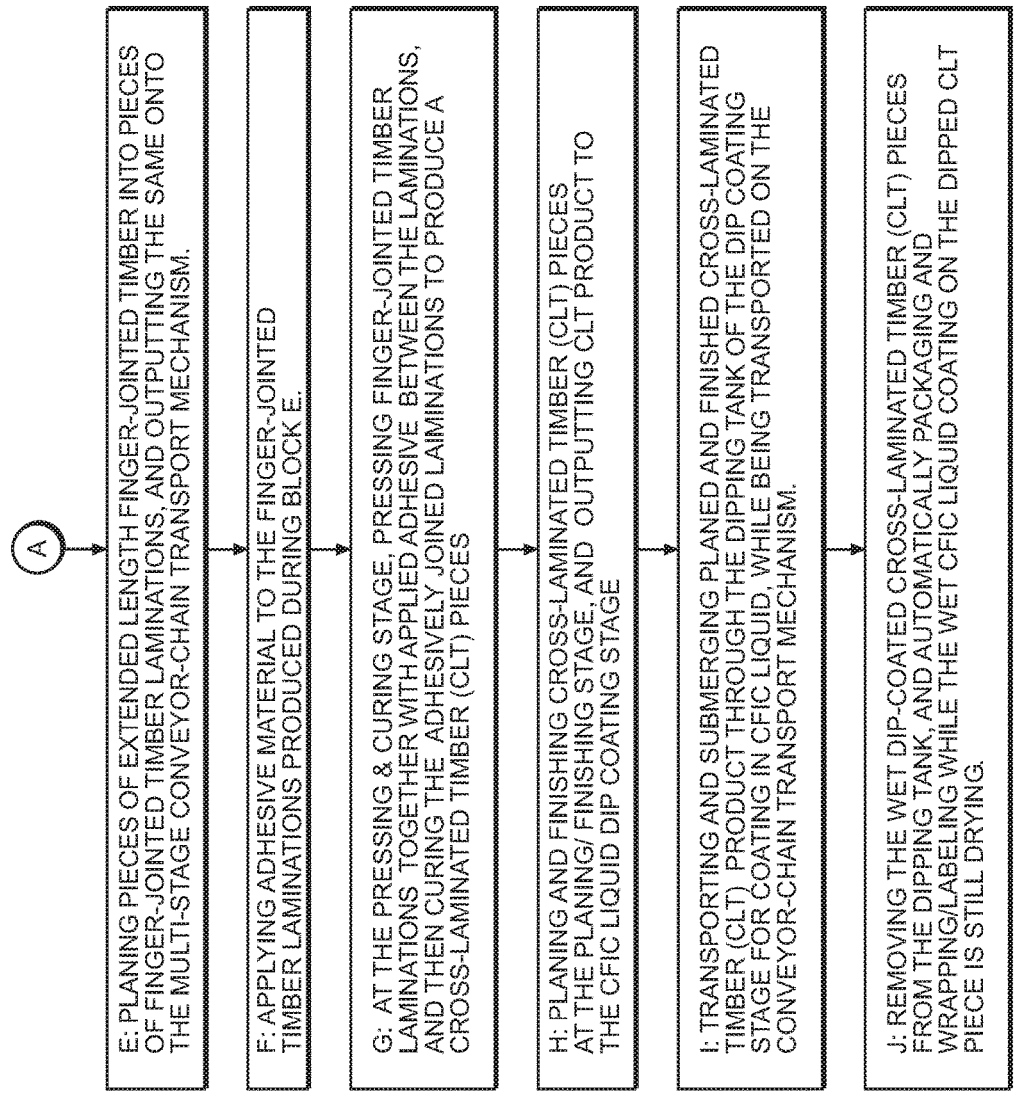

FIGS. 24A and 24B describe the high level steps carried out when practicing the method of producing bundles of Class-A fire-protected cross-laminated timber (CLT) 42 for use in fire-protected building construction.

As indicated at Block A in FIG. 24A, in an automated lumber factory, a high-speed Class-A fire-protected lumber production line is installed and operated, with a reservoir tank 39B containing a large supply of clean fire inhibiting chemical (CFIC) liquid 39H that is continuously supplied to the automated high-speed CFIC liquid dip-coating stage 39 of the lumber factory, installed between (i) a cross-cutting and rip-sawing stage 38, and (ii) an automated stacking, packaging, wrapping and banding/strapping stage 40 installed at the end of the production line in the factory.

As indicated at Block B in FIG. 24A, a supply of untreated short-length lumber is loaded onto the conveyor-chain transport mechanism 32 installed along and between the stages of the production line.

As indicated at Block C in FIG. 24A, the untreated short-length lumber is loaded into the controlled-drying stage of the production line so to produce suitably dried short-length lumber for supply to the finger-jointing processing stage 34. This stage can be performed by loading batches of short length lumber into the drying room or oven, whose temperature and humidity are strictly controlled using electric heaters and other equipment under computer control. Alternatively, short-length lumber pieces can be controllably dried by moving batches of short-length lumber through a tunnel-like drying room or chamber, through which chain-driven conveyor mechanism 32 passes, like other stages along the lumber production line of the present invention, while the temperature and humidity of the environment is controlled using electric-driven or gas-combusting space heaters under computer control in a manner well known in the art.

As indicated at Block D in FIG. 24A, the controllably-dried short-length lumber is continuously supplied into the finger-jointing stage 34, for producing pieces of extended-length finger-jointed timber (lumber) in a highly automated manner.

As indicated at Block E in FIG. 24B, pieces of extended length finger-jointed timber are planed and dimensioned into pieces of finger-jointed timber laminations, and outputting the same onto the conveyor-chain transport mechanism 32.

As indicated at Block F in FIG. 24B, adhesive material is applied to the finger-jointed timber laminations produced during Block E.

As indicated at Block G in FIG. 24B, at the pressing & curing stage 37, pressing a plurality of finger-jointed timber laminations together with applied adhesive between the laminations, and then curing the adhesively joined laminations to produce a cross-laminated timber (CLT) pieces.

As indicated at Block H in FIG. 24B, cross-laminated timber (CLT) pieces are planed and finished at the cross-cutting and rip-sawing stage 38, and outputting finished CLT product to the CFIC liquid dip coating stage 39.

As indicated at Block I in FIG. 24B, the finished CLT products are continuously transported and submerged through the dipping tank 39B of the dip coating stage 39 for sufficient coating in CFIC liquid (e.g. Hartindo AF21 Total Fire Inhibitor) 39H, while being transported on the conveyor-chain transport mechanism 32.

As indicated at Block I in FIG. 24B, continuously removing the wet dip-coated cross-laminated timber (CLT) pieces are continuously removed from the dipping tank 39B, and automatically stacked, packaged and wrapped/labeled while wet with CFIC liquid coating, and allowed to dry within the package wrapping.

In the illustrative embodiment, Hartindo AF21 Total Fire Inhibitor is used as the CFIC liquid solution 34H to form the CFIC surface coating onto treated wood/lumber products produced on the production line of the factory described above. The clinging agent in the Hartindo AF21 CFIC liquid enables its chemical molecules to cling to the surface of the CFIC-coated wood, while its surfactants help to break the surface tension and allow chemical molecules to impregnate ever so slightly the surface of the treated wood. This way, in the presence of a flame, the chemical molecules in the CFIC-coating on the surface of the fire-protected lumber, interferes with the free radicals (H+, OH−, O−) of the chemical reaction produced within the combustion phase of a fire, and breaks the fire's chemical reaction and extinguishes its flame. This is a primary fire suppression mechanism deployed or rather implemented by the CFIC-coatings deposited on wood surfaces in accordance with the various principles of invention, disclosed and taught herein.

The table in FIG. 25 illustrates the flame spread and smoke development indices of fire-protected lumber produced using the method of the illustrative embodiment described in FIGS. 20A and 20B. As shown in the table, the flame spread index for Spruce Pine Fir (SPF) was measured to be 15, whereas the smoke development index measured to be 95. The flame-spread index for Douglas fir was measured to be 0, whereas the smoke development index measured to be 40.

Specification of the Method of and Apparatus for Producing Class-A Fire-Protected Laminated Veneer Lumber (LVL) Products (i.e. Studs and Boards) in Accordance with the Principles of the Present Invention In many ways, LVL (Laminated Veneer Lumber) beams, headers, columns and studs provide a better alternative than traditional solid sawn lumber pieces, as such engineered wood products (EWPs) are a stronger, stiffer, more consistent and more predictable building material. Also, when compared to similar sized sections, fire-protected LVL products can support heavier loads and allow greater spans than conventional lumber. Every LVL product is made from sheets of veneer. When these sheets are combined into a continuous billet or piece of LVL, the effects of flaws in individual sheets are negated because they are spread throughout the cross-section of the billet, rather than being concentrated in specific locations, such as is the case with sawn lumber. For example, a flaw in a single sheet of veneer laid up into a 15-ply mat or billet of LVL will effectively be 1/15. The challenge facing LVL producers is how to make the strongest possible LVL from their available raw material using smart grading techniques to sort their veneers. LVL is produced and used in a variety of different lengths, thicknesses and widths. In general, the LVL process is based on a combination of continuous lay-up and cycle-type hot pressing that is suitable for the production of LVL products in all lengths.

Figure 26:
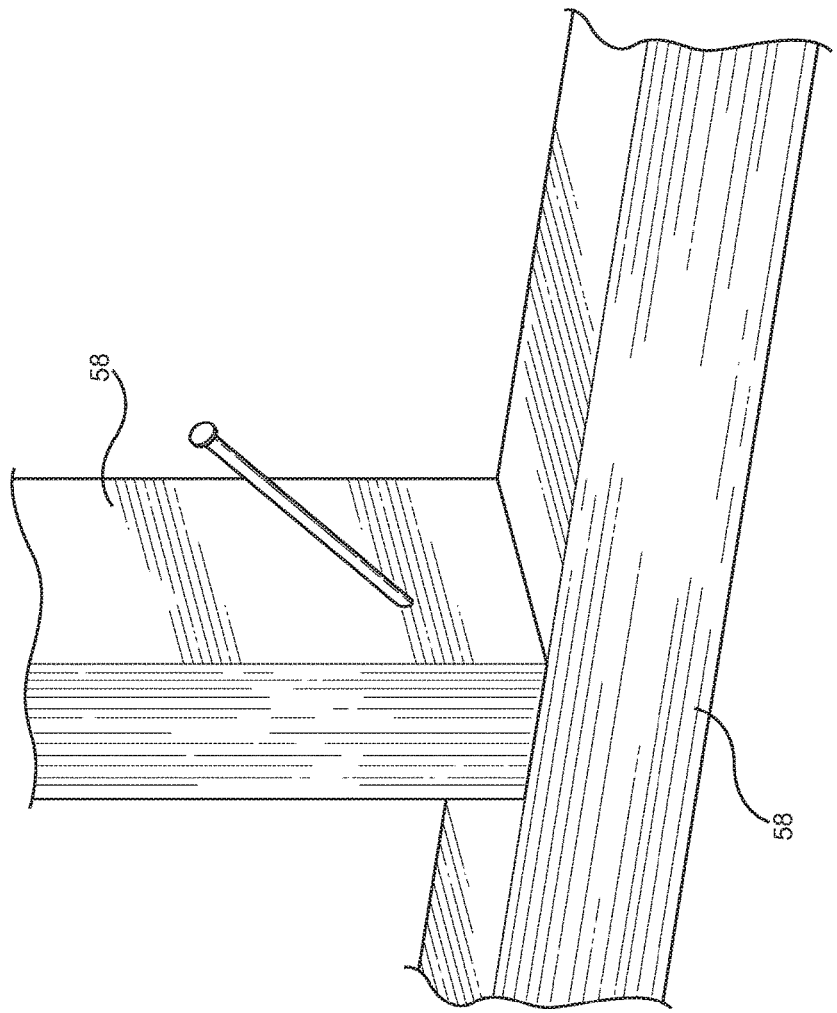
FIG. 26 is a perspective view of Class-A fire-protected laminated veneer lumber (LVL) products, such as studs in load-bearing and non load-bearing walls as well as in long-span roof and floor beams.
Figure 27:
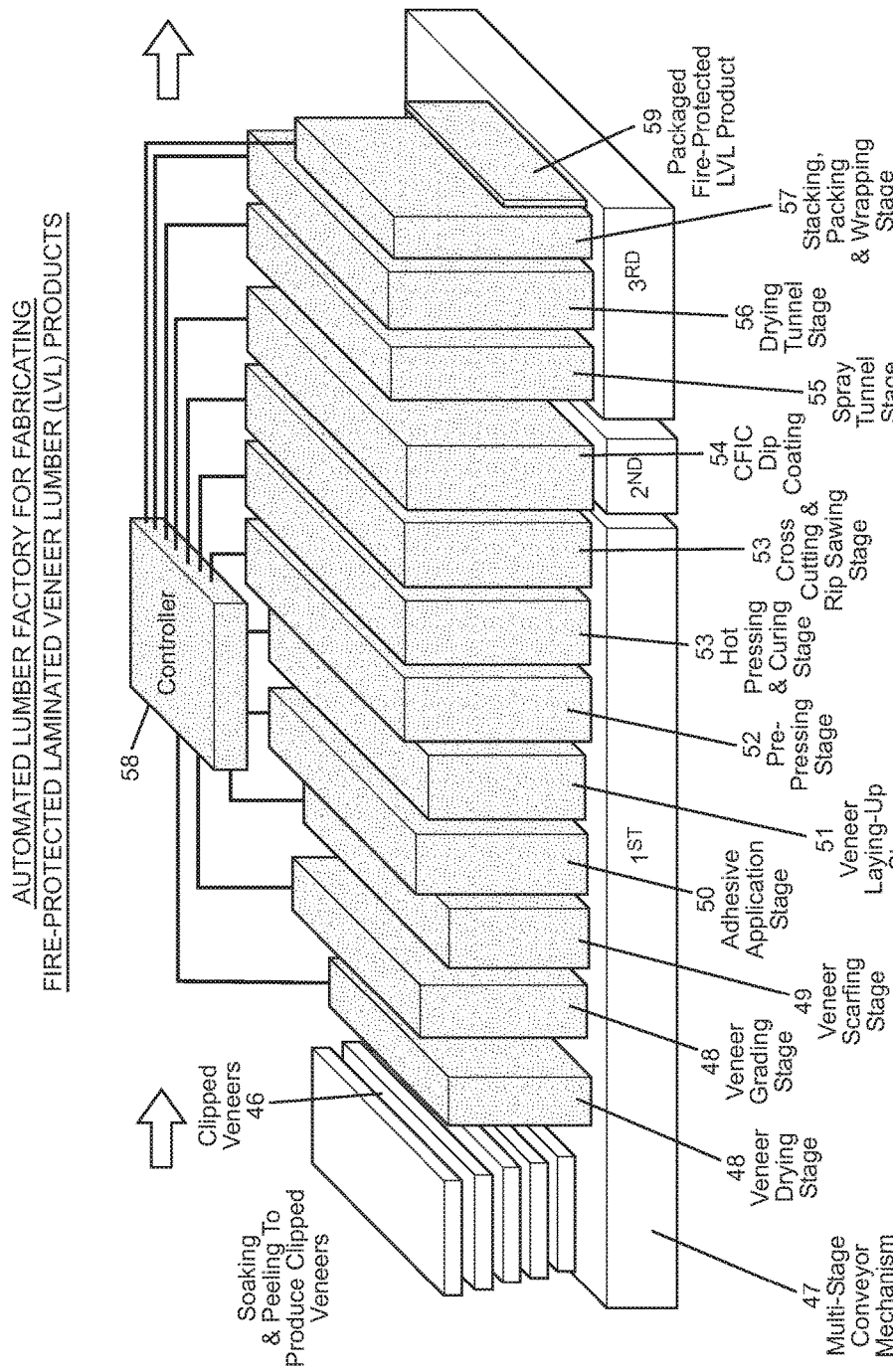
FIG. 27 is schematic representation of an automated lumber factory for fabricating Class-A fire-protected laminated veneer lumber (LVL) products along a multi-stage production line.
Figure 27A:
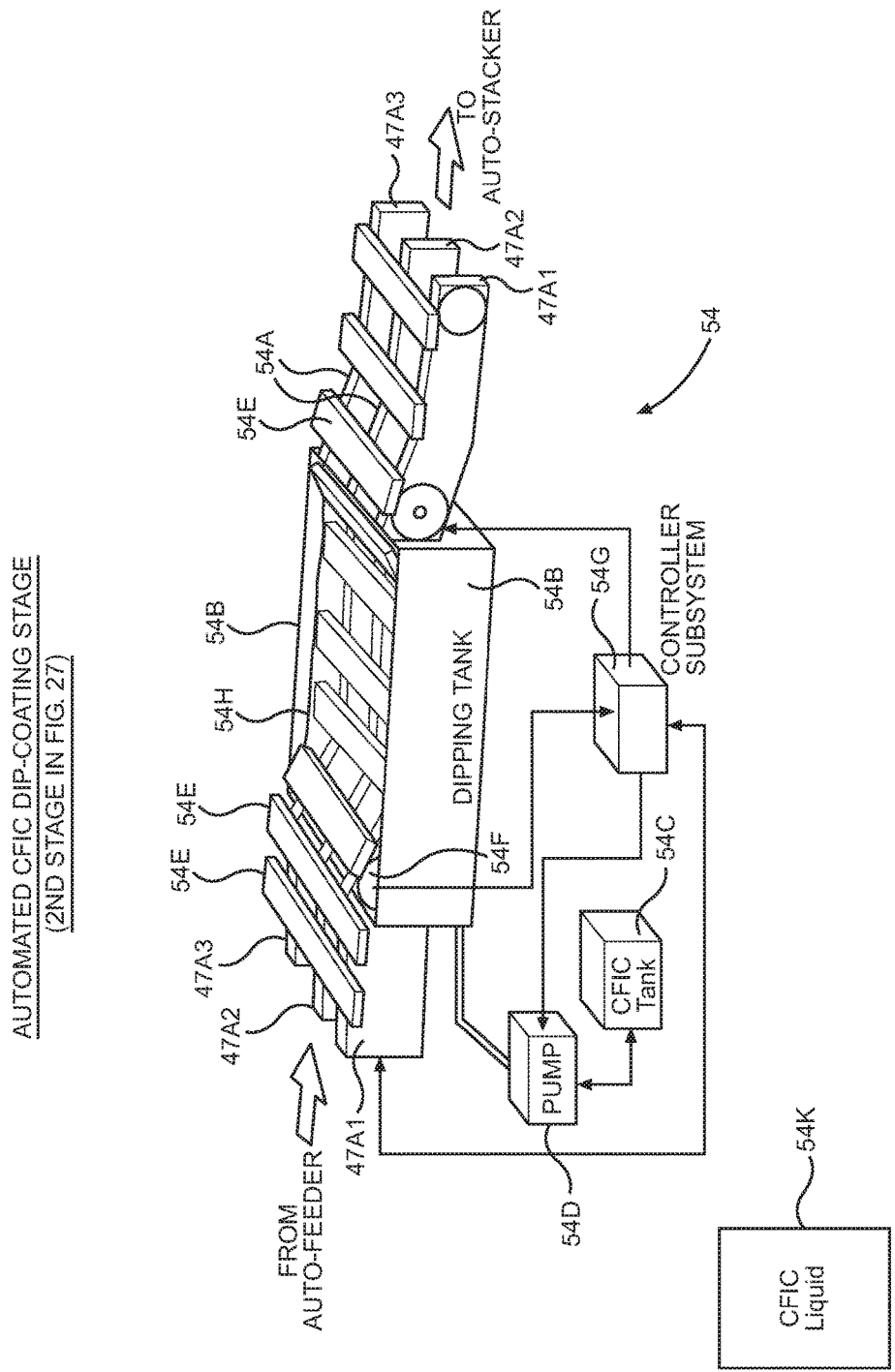
FIG. 27A is a perspective view of the automatic laminated veneer lumber (LVL) dip-coating stage deployed along the production line of the automated lumber fabrication factory shown in FIG. 27.

FIG. 26 shows a stack of Class-A fire-protected laminated veneer lumber (LVL) products (i.e. beams, headers, columns, studs and rim boards) 57A produced using the method and automated factory system 45 shown in FIGS. 27 and 27A. The Class-A fire-protected laminated veneer lumber (LVL) products 57A bear two coatings: (i) an under-layer surface-coating of Class-A fire-protection provided by a dip-coating of CFIC fire-inhibiting chemical (e.g. Hartindo AF21 Total Fire Inhibitor) which is allowed to stack-dry (e.g. for 24 hours or so); and (ii) a top-layer moisture, fire and UV protective coating that is spray-coated over the CFIC dip-coated, using a spraying tunnel 55, to deposit a moisture, fire and UV protection coating over the Class-A fire-protection coating over the LVL product.

In the illustrative embodiment, the top protective coating is formulated as follows: 75% by volume of Dectan chemical by Hartindo Chemicatama Industri; 25% by volume of Hartindo AF21 Total Fire Inhibitor; and 1.0-0.75 [cups/gallon] ceramic microsphere dust mixed in as an additive, where 1 cup=8.0 US fluid ounces. This rugged top protective coating, which Applicant will trademark under Gator Skin™, protects the CFIC coating (e.g. Hartindo AF21 fire inhibitor coating) from being washed out under outdoor weather conditions expected during building construction when roof, wall and floor sheeting is exposed to and impacted by the natural environment until the building is "dried in."

FIG. 27 shows an automated factory system 45 for producing Class-A fire-protected laminated veneer lumber (LVL) products in a high volume manner in accordance with the principles of the present invention. As shown in FIG. 27, the factory 45 comprises a number of automated stages integrated together under automation and control, namely: a conveyor-chain mechanism 47 having numerous stages in the illustrative embodiment shown in FIGS. 27 and 27A, and a stage for delivering clipped veneer to the front of the LVL production line. The stage that delivers the continuous supply of clipped veneer is supported by five preceding stages, starting in the log yard, where veneer logs are delivered to the log yard for the LVL process. There, the logs, graded A and J and suitable for peeling, are debarked at a log debarking stage, and then bathed in a hot bath at the hot log bath stage, to increase the core temperature of the logs up to about 65 degrees Celsius. Such hot log bath equipment can be obtained from the Southern Cross Engineering Co. Then, at a lathe peeling stage, the wood lathe scans the log profile using multiple lasers, then centers the log for the most efficient recovery of material and peels the logs to a core diameter (e.g. 78 mm for the Raute Wood Lathe) to produce peeled veneers. Raute Corporation of Nastola, Finland supplies lathe peeling equipment for this stage. At the clipping stage, the peeled veneers are clipped to a wet width of approximately 1.4 meters and then stacked according to their moisture content. Equipment for supporting this stage is supplied by Babcock & Wilcox.

As shown in FIG. 27, the LVL production line comprises, beyond its veneer delivery stage, an arrangement of stages, namely: a veneer drying stage 47 for receiving veneers from the supply and drying them in a controlled manner using, for example, a Babcock BSH, 22 bar, steam heated, six deck, roller veneer drier, supporting three stages of drying to reach a target moisture content of between 8 and 10%; a chain-driven conveyor 47 for conveying the components and LVL products along subsequent stages of the production line; an automated veneer grading stage 48 for automatically structurally and visually grading veneers using a Babcock NovaScan 4000 camera for surface appearance, a Metriguard 2650 DFX for ultrasonic propagation time, and an Elliot Bay Cypress 2000 moisture detection system; a veneer scarfing stage 49 for scarfing veneer edges to a uniform thickness at the joints between veneers, during the subsequent laying-up stage and process; adhesive application stage 50 for curtain coating veneers with phenol formaldehyde, an exterior grade adhesive, using a Koch (1400 mm curtain coater, with adhesive resin supplied by Dynea NZ Ltd.; a lay-up stage (i.e. station) 51 for vacuum lifting veneers (core sheets, face sheets and make-up sheets) onto the processing line according to the press recipe, and stacking and skew aligning the veneers with adhesive coating until they are laid up into a veneer mat; a pre-pressing stage 52 for pressing the veneer mat together; a hot-pressing and curing stage 53 for continuous hot pressing (over an extending length (e.g. 40 meters) using a Dieffenbacher hot press with hot oil platens to complete cure of the adhesive resin applied to the pressed veneers, and produce an LVL mat having a length up to 18m long in size, a width of up to 1.2m, and a thickness between 12 and 120 mm; a cross-cutting and rip sawing stage 53 for cross-cutting and rip sawing the produced LVL mat into LVL products such as studs, beams, rim boards and other dimensioned LVL products; an optional sanding stage, employing orbital sanders; an inkjet print-marking and paint spraying system for marking each piece of LVL product (e.g. LVL stud, board etc.) an with a branded logo and grade for clear visual identification; a CFIC liquid dip-coating stage 54, as shown in FIG. 27A, having a dipping tank 54B through which the chain-driven conveyor 47 transports LVL product into the dipping tank 54B and along its length while submerged under CFIC liquid 54H (e.g. Hartindo AFF21 Total Fire Inhibitor from Newstar Chemicals, of Malaysia, or Hartindo Chemicatama Industri) during dip-coating operations, so as to form a CFIC coating on the surfaces of the LVL product, and removing the CFIC-coated LVL product from the dipping tank, and wet-stacking the LVL product and setting aside to dry for 24 hours or so to produce Class-A fire-protective LVL product 54E; a spray tunnel 55 for spray-coating Class-A fire-protective LVL product 54E (feed with an auto-feeder) with a moisture, fire and UV protective coating while the LVL product is being passed through a spraying tunnel 55 in a high-speed manner, and then quick-dried in a drying tunnel 56 and then passed onto the final stage 57; a stacking, packaging and wrapping/labeling stage 57 using Dieffenbacher, Signode equipment, for packaging and wrapping/labeling the Class-A fire-protected LVL product in its wrapping, ready for forklift handling. Notably, a liquid dye can be added to the CFIC dip-coating liquid 54H without adversely effecting its chemical properties.

KALLESOE MACHINERY A/S of Bredgade, Denmark, offers complete turnkey LVL production lines for high-volume automated production of LVL products. Such systems comprise: presses & curing machines; automation and controllers. Such technologies and machines can be used to implement many of the stages described above in the LVL product production line of the present invention.

As shown in FIG. 27A, the dip-coating stage 54 comprises a chain-driven conveyor subsystem 47, supporting several parallel sets of chain-driven transport rails 47A1, 47A2 and 47A3 as shown, extending from the pressing and curing stage 53 towards a dipping tank 54B, and then running inside and along the bottom of the dipping tank 54B, and then running out thereof towards the stacking, packing and wrapping stage 57, as shown, having the capacity of handling studs and boards having a length up to 18 feet (6 m) or so, as the production application may require.

In the illustrative embodiment, the dipping tank 55B has a width dimension of up to 32 feet to accommodate the width of the LVL product 54E being transported on chain-driven conveyor rails 47A1, 47A2 and 47A3 mounted and running outside of and also within the dipping tank 54B, as shown, and allowing sufficient dwell time in the CFIC liquid 54H during the dip-coating process. As shown, the LVL products 54E are supported upon the chain driven rails 47A1, 47A2 and 47A3 while the LVL products 54E are transported through the dipping tank 54B while fully immersed and submerged at least 6 inches deep in CFIC liquid 54H contained in the dipping tank 54B, moving at the linear rate of 300 feet/minute through the dipping tank 54B during the CFIC dip-coating process of the present invention. Electrically-powered driven motors are provided for the purpose of driving the chain-driven conveyors 47A1, 47A2, and 47A3 under computer control to transport LVL products along the production line. A level sensor 54F is used for real-time sensing the level of CFIC liquid 54H in the dipping tank 54B during production line operation. A reservoir tank 54K is provided for containing a large volume or supply of made up CFIC liquid 54H. Also, a computer controller 54G is used for controlling the conveyor subsystem 47, and an electric pump 54D is provided for pumping CFIC liquid 54H into the dipping tank 54B to maintain a constant supply level during system operation in response to the liquid level measured by the level sensor 54F and controlled by the controller 54G.

The high-speed dip-coating stage 54 may also include additional apparatus including, for example, liquid heaters, circulation pumps and controls for (i) maintaining the temperature of CFIC liquid solution 54H in the dipping tank 54B, and (ii) controlling the circulation of CFIC liquid around submerged LVL product 54E being transported through the dipping tank in a submerged manner during the CFIC dip-coating process. Controlling such dip coating parameters may be used to control the amount and degree of absorption of CFIC liquid within the surface fibers of the LVL product as it is rapidly transported through the dipping tank 54B between the cross-cutting and rip-sawing stage 53 and the lumber packaging and wrapping stage 57 of the production line.

Notably, the dip coating process of the present invention allows for the rapid formation a surface coating, or surface barrier, on the surface of each piece of dipped LVL product, or in the presence of a surfactant added to the CFIC liquid in the dipping tank 54B, shallow impregnation of CFIC liquid 54H to occur into the surface fibers of each LVL piece 57A near atmospheric pressure (i.e. below 6 inches of liquid CFIC in the dipping tank) during the dip-coated process. It is understood that drip pans may also be provided beyond the dipping tank 54B, installed beneath the chain-driven conveyor subsystem 47 arranged between the dripping tank 54B and the packaging and wrapping stage 57 so as to recover excess CFIC liquid dripping from the dip-coated lumber pieces and returning this recovered CFIC liquid to the dipping tank after appropriate filtering of the CFIC liquid if and as necessary.

As shown in FIG. 27B, the moisture, fire and UV protection is provided using the spray tunnel stage 55 deployed immediately after the CFIC-liquid dip-coating stage 54. As shown, the spray tunnel stage 55 comprises: a storage tank 55A for storing a large supply of moisture/fire/UV-protective liquid chemical 55B; a spray tunnel 55C for supporting an array of spray nozzles 55D arranged about the conveyor rails 55E1, 55E2 and 55E3, operably connected to a liquid pump 55E connected to the storage tank 55A under controller 55F, to provide a 360 degrees of spray coverage in the tunnel 55C, for spray-coating dip-coated LVL products within a controlled plane of moisture/fire/UV-protection liquid sprayed to cover 100% of surfaces of such LVL products 54E as they are being transported through the spray tunnel 55 at high-speed; and a drying tunnel stage 56 installed after the spray tunnel stage 55, for quick drying of spray-coated Class-A fire-protected LVL products, as they move through the drying tunnel 56 towards the automated stacking, packaging and wrapping stage 57 under the control of the subsystem controller 58. In the preferred embodiment, the moisture/fire/UV protection liquid 55B sprayed in the spray tunnel 55 is formulated as follows: 25% by volume Hartindo AF21 liquid; 75% by volume Dectan Chemical from Hartindo Chemicatama Industri of Indonesia, or its distributed Newstar Chemicals of Malaysia; and 1.0-0.75 [cups/gallon] of Hy-Tech ceramic microsphere dust, as an additive.

As illustrated in FIG. 27, the automated stacking, packaging and wrapping stage 57 includes equipment designed to receive Class-A fire-protected LVL product 54E, automatically stack the fire-protected LVL product, package and wrap the product within a sheet of wrapping material (e.g. plastic, TVEK or other wrapping material) covering the top portion and at least half way down each side of the LVL product package 59, and then banding or strapping the wrapped package 59 with fiberglass or steel banding, well known in the art. The wrapping will typically be preprinted with trademarks and logos of the lumber manufacturer's brand. Finally, the ends of the lumber pieces in the strapped, wrapped lumber package 59 are painted with a Class-A fire-protective paint, also containing CFIC liquid material (e.g. 25% by volume Hartindo AF21) to be effective in achieving Class-A fire-protection.

Figure 28A:
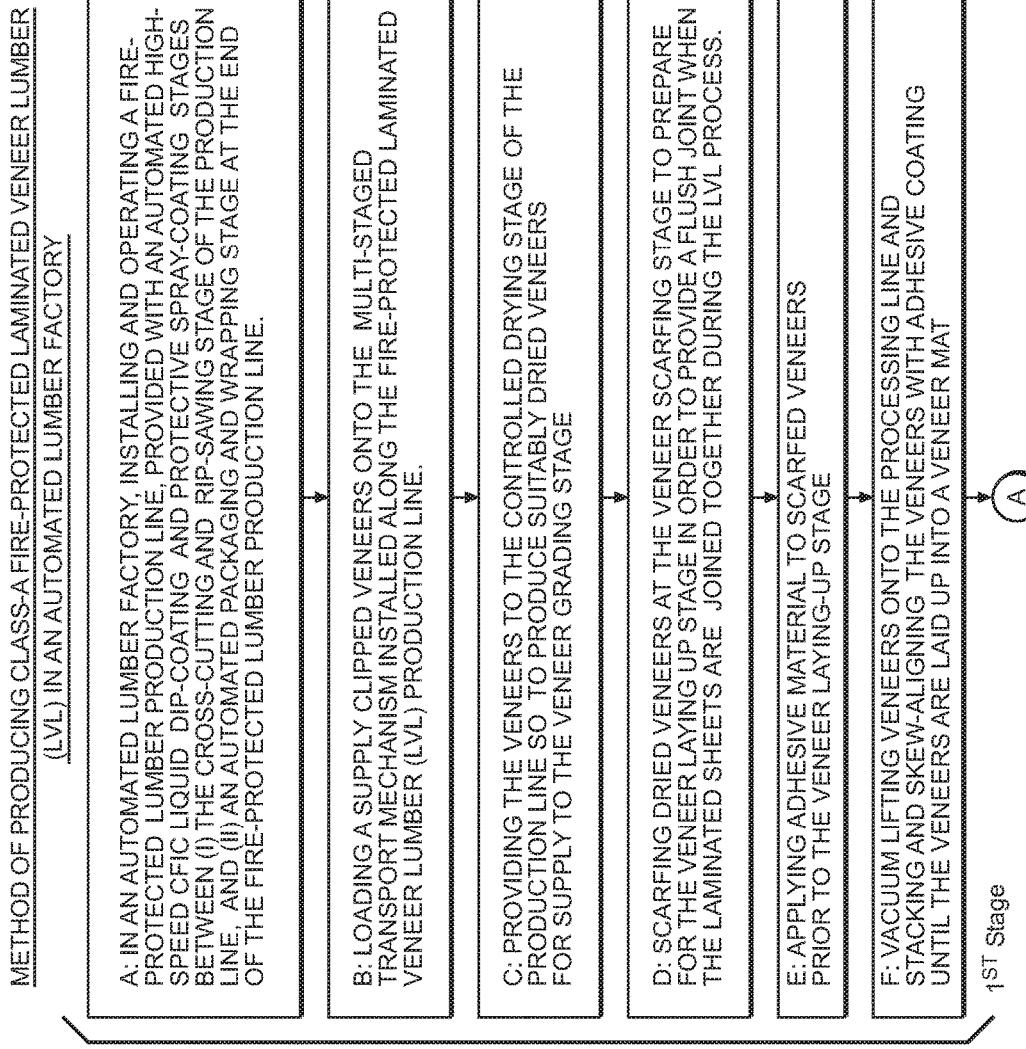
FIGS. 28A, 28B and 28C, taken together, set forth a flow chart describing the high level steps carried out when practicing the method of producing Class-A fire-protected laminated veneer lumber (LVL) along the production line of the automated lumber factory shown in FIGS. 27, 27A and 27B.
Figure 28B:
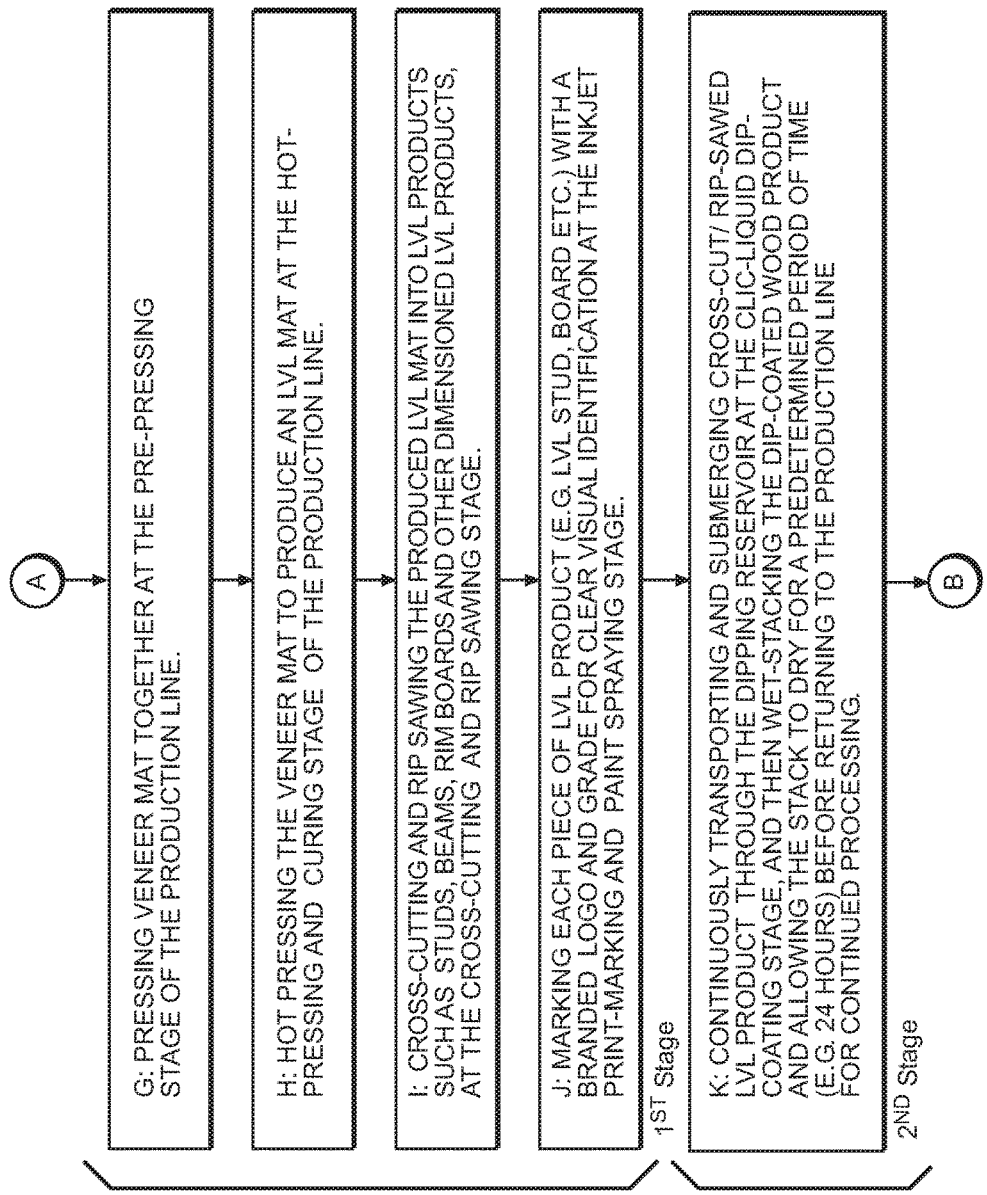

FIGS. 28A and 28B describe the high level steps carried out when practicing the method of producing bundles of Class-A fire-protected laminated veneer lumber (LVL) product for use in fire-protected building construction.

As indicated at Block A in FIG. 28A, a high-speed fire-protected lumber production line is installed and operated in an automated lumber factory 45, provided with an automated high-speed dip-coating stage 54 and spray-coating stage 55 installed between (i) the cross-cutting and rip-sawing stage 53 of the production line, and (ii) an automated stacking, packaging and wrapping stage 57 installed at the end of the production line in the lumber factory 45.

As indicated at Block B in FIG. 28A, a supply clipped veneers 46 is continuously loaded onto the conveyor/transport mechanism 47 installed along the LVL production line.

As indicated at Block C in FIG. 28A, the veneers are continuously provided to the controlled drying stage 47 of the production line so to produce suitably dried veneers for supply to the veneer grading stage 49 and subsequent stages.

As indicated at Block D in FIG. 28A, dried veneers are scarfed at the veneer scarfing stage 49 to prepare for the veneer laying-up stage 51 where the leading and trailing edges of each sheet of veneer are scarfed (i.e. lapped-jointed) in order to provide a flush joint when the veneer sheets are joined together at the laying-up stage of the LVL process.

As indicated at Block E in FIG. 28B, adhesive material is applied by curtain coating at the adhesive application stage 50, to the surfaces of scarfed veneers prior to the veneer laying-up stage.

As indicated at Block F in FIG. 28B, the veneers are vacuum lifted onto the processing line and stacked and skew aligned with adhesive coating until the veneers are laid up, at the veneer laying-up line 51, into a veneer mat of a predetermined number of veneer layers (i.e. ply).

As indicated at Block G in FIG. 28B, the veneer mat is pressed together at the pre-pressing stage 52 of the production line.

As indicated at Block H in FIG. 28B, the veneer mat is hot pressed in a hot-pressing/curing machine to produce an LVL mat at the hot-pressing and curing stage 53 of the production line.

As indicated at Block I in FIG. 28B, the produced LVL mat is cross-cut and rip-sawed into LVL products (such as studs, beams, rim boards and other dimensioned LVL products) 54E at the cross-cutting and rip sawing stage 53.

As indicated at Block J in FIG. 28B, each piece of LVL product (e.g. LVL studs, boards, etc.) 54E is marked with a branded logo and grade for clear visual identification at the inkjet print-marking and paint spraying stage installed after the cross-cutting and rip-sawing stage 53.

As indicated at Block K in FIG. 28B, the cross-cut/rip-sawed LVL product 54E is continuously transported and submerged through the dipping reservoir 54B at the CFIC-liquid dip-coating stage 54 so as to apply CFIC liquid 54H to the surface of the dipped LVL product 54E at a coating coverage density of about 300 square feet per gallon of CFIC liquid 54H (i.e. Hartindo AF21). The dip-coated LVL product 54E is then wet-stacked in an automated manner using auto-stacking machinery, and then set aside and allowed to dry for a predetermined period of time (e.g. 24 hours) before the stack of dip-coated LVL wood is returned to the production line for continued processing. In the illustrative embodiment, Hartindo AAF21 total fire-inhibitor is used as the CFIC liquid solution 54H, for depositing the CFIC surface-coating onto treated LVL products produced on the production line described above. The surfactants contained in the CFIC liquid helps to break the surface tension and allow chemical molecules to impregnate ever so slightly the surface of the treated LVL products, and produce a Class-A fire-protective LVL product 54E.

Figure 28C:
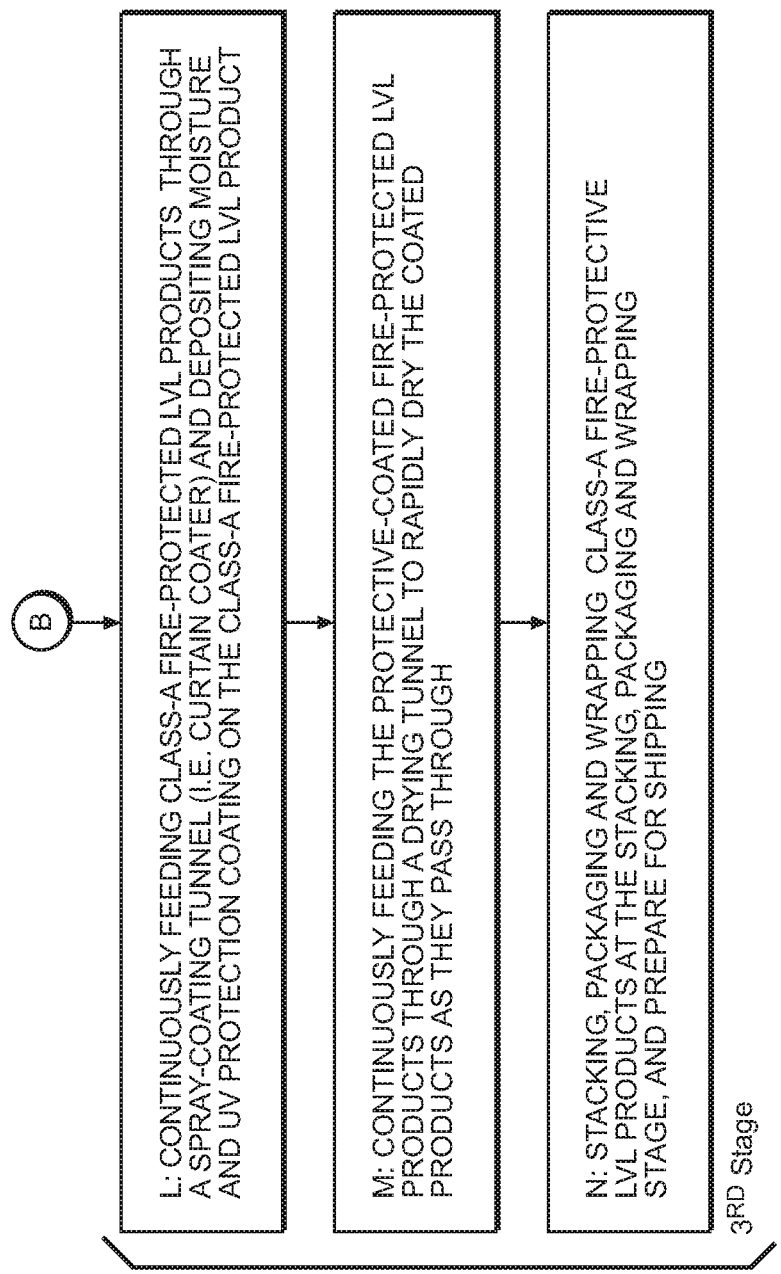

As indicated at Block L in FIG. 28C, the Class-A fire-protective LVL products 54E are continuously feed through the spray tunnel stage 55 for spray coating a moisture/fire/UV-protective liquid coating 55B over the entire surface as each dip-coated Class-A fire-protected LVL product (e.g. stud) 54E is feed through the spray tunnel 55.

As indicated at Block M in FIG. 28C, the Class-A fire-protected LVL product is quick-dried while being passed through the drying tunnel 56 disposed immediately after the curtain-coating tunnel 55. This produces a Class-A fire-protective LVL product with a moisture//fire/UV protective coating as it exits the production line, improving the durability of the Class-A fire-protective LVL product when exposed to outdoor weather conditions during the construction phase.

As indicated at Block N in FIG. 28B, Class-A fire-protective LVL product 59 is automatically stacked, packaged and wrapped at the automated stacking, packaging and wrapping stage 57, with trademarked wrapping, logos and the like.

In the presence of a flame, the chemical molecules in the CFIC-coating on the surface of the Class-A fire-protected LVL lumber 54E interferes with the free radicals (H+, OH–, O–) produced during the combustion phase of a fire, and breaks the fire's free-radical chemical reactions and extinguishes its flame. This is a primary fire suppression mechanism implemented by the CFIC-coatings deposited on wood surfaces in accordance with the principles of invention, disclosed and taught herein.

The table in FIG. 29 illustrates the flame spread and smoke development indices of Class-A fire-protected lumber produced using the method described in FIGS. 28A and 28B. As shown in the table, for Spruce Pine Fire (SPF), the flame spread index was measured to be 15, whereas the smoke development index was measured to be 95, meeting the test criteria for Class-A fire-protection rating. For Douglas Fir, the flame spread index was measured to be 0, whereas smoke development index was measured to be 40, also meeting the test criteria for Class-A fire-protection rating.

Figure 30:
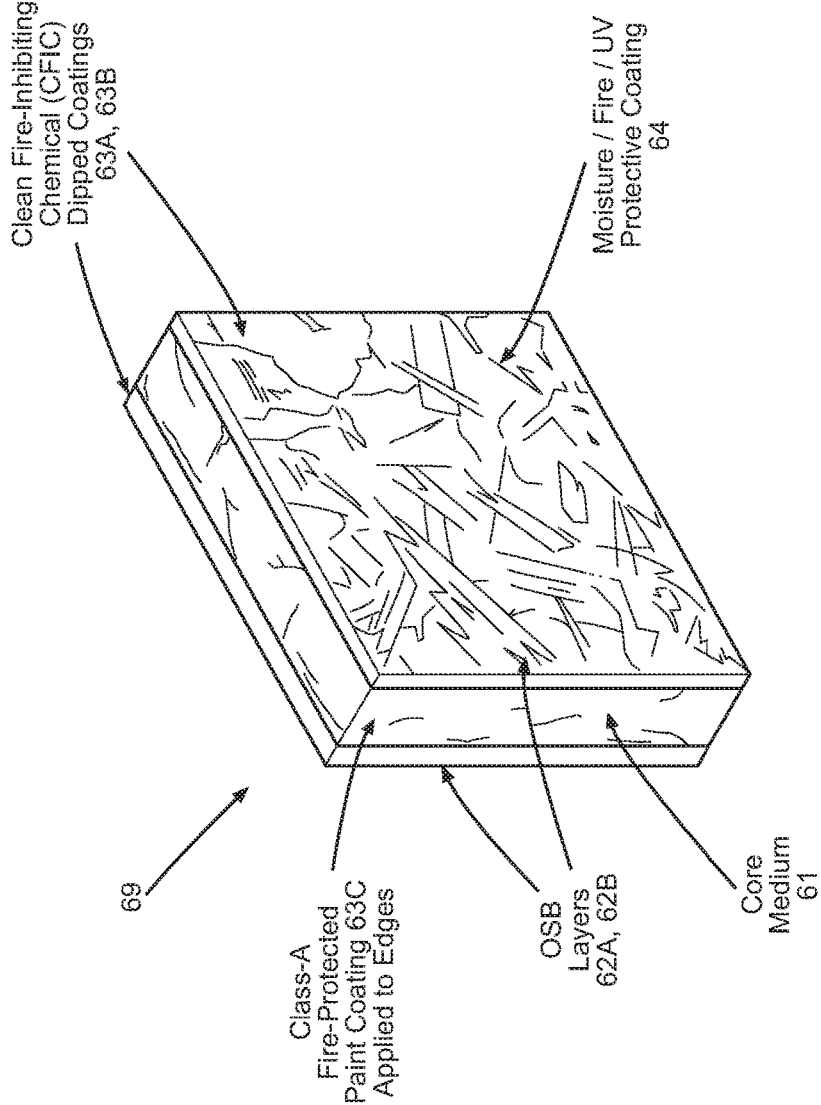
FIG. 30 is a perspective of a cut-away portion of a piece of Class-A fire-protected oriented strand board (OSB) sheathing produced using the method described in FIGS. 32A, 32B and 32C in the automated factory shown in FIG. 33.
Figure 31:
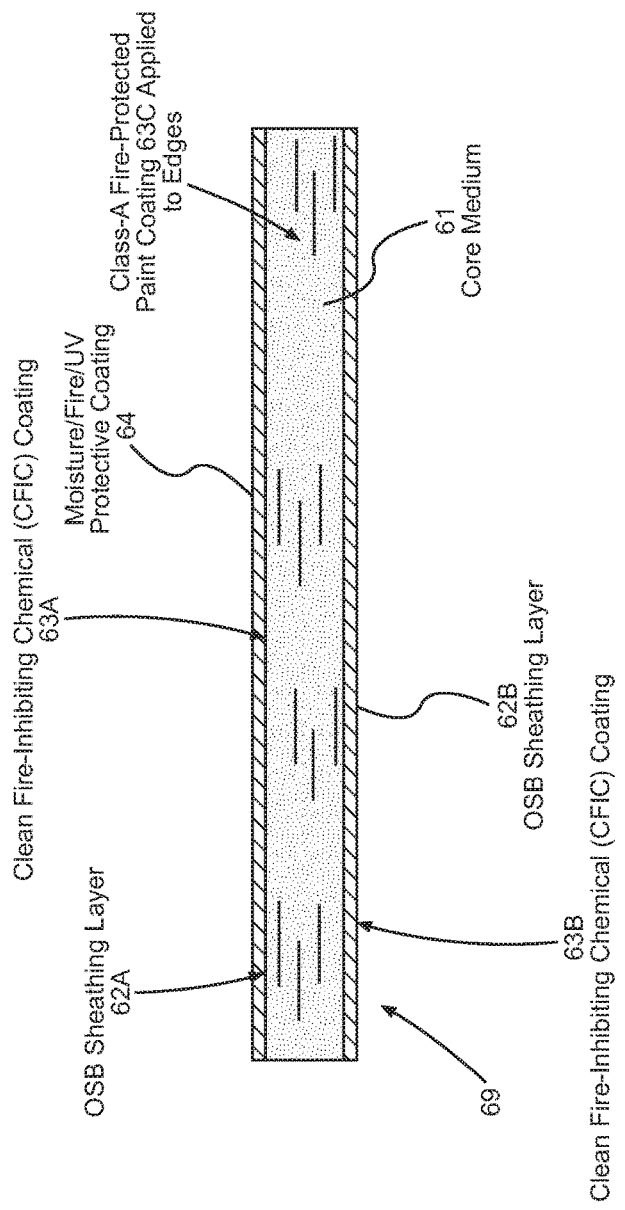
FIG. 31 is a cross-sectional schematic diagram of a section of the Class-A fire-protected OSB sheathing shown in FIG. 30, produced in accordance with the present invention described in FIGS. 32 and 33.

Specification of Method of Producing Clean Fire-Protected Oriented Strand Board (OSB) Sheathing Constructed in Accordance with the Principles of the Present Invention FIGS. 30 and 31 show a piece of Class-A fire-protected oriented strand board (OSB) sheathing 60 constructed in accordance with the principles of the present invention. This Class-A fire-protected OSB sheathing 69 is provided with a moisture, fire and UV protection coating 64 that supports weather during building construction when roof, wall and floor sheeting gets hammered by the natural environment until the building is "dried in." The coating 64 also protects the CFIC (e.g. Hartindo AF21 fire inhibitor) dip-coatings 63A and 63B and paint coating 63C from getting washed out by the weather during the construction phase, as otherwise occurs with most conventional pressure-treated lumber products.

As shown, the Class-A fire-protective OSB sheathing 60 comprises: a core medium layer 61 made of wood pump, binder and/or adhesive materials; OSB sheathing layers 62A and 62B bonded to the core medium layer 61; a clean fire inhibiting chemical (CFIC) coating 63C painted onto the edge surfaces of the core medium layer 61, using a Class-A fire-protective paint containing a CFIC liquid; CFIC coatings 63A and 63B applied to the surface of OSB sheathing layers 62A and 62B respectively, by dipping the OSB sheathing 66 into a CFIC liquid 66H contained in a dipping tank 66B, and allowing shallow surface absorption or impregnation into the OSB sheathing layers 62A and 62B at atmospheric pressure; and a moisture/fire/UV protective coating 64 spray-coated over the CFIC coatings 63A, 63B and 63C applied to protect these underlying CFIC coatings from outdoor weather conditions such as rain, snow and UV radiation from Sunlight.

In the illustrative embodiment, Hartindo AAF21 Total Fire Inhibitor is used as the CFIC liquid 66H to form the CFIC surface coatings 63A, 63B and 63C over the surfaces of the OSB product (e.g. sheet) 66. The clinging agent in the CFIC liquid 66H enables its chemical molecules to cling to the surface of the CFIC-coated OSB product, while its surfactants help to break the surface tension and allow chemical molecules to impregnate ever so slightly the surface of the treated wood. The CFIC paint coating 63A can be formulated by adding Hartindo AF21, 25-30% by volume, to a water-base paint containing liquid polymer binder.

In the illustrative embodiment, the moisture/fire/UV protection liquid 68A comprises a formulation comprising: 75% by volume, DECTAN chemical liquid from Hartindo Chemicatama Industri of Jakarta, Indonesia, a complex vinyl acrylic copolymer and tannic acid; 25% by volume, AF21 anti-fire liquid chemical from Hartindo Chemicatama Industri; and ceramic microsphere dust, 1.0–0.75 [cups/gallon] (e.g. ThermaCels™ insulating ceramic microsphere dust by Hy-Tech Thermal Solutions, LLC, of Melbourne, Fla.).

Figure 33:
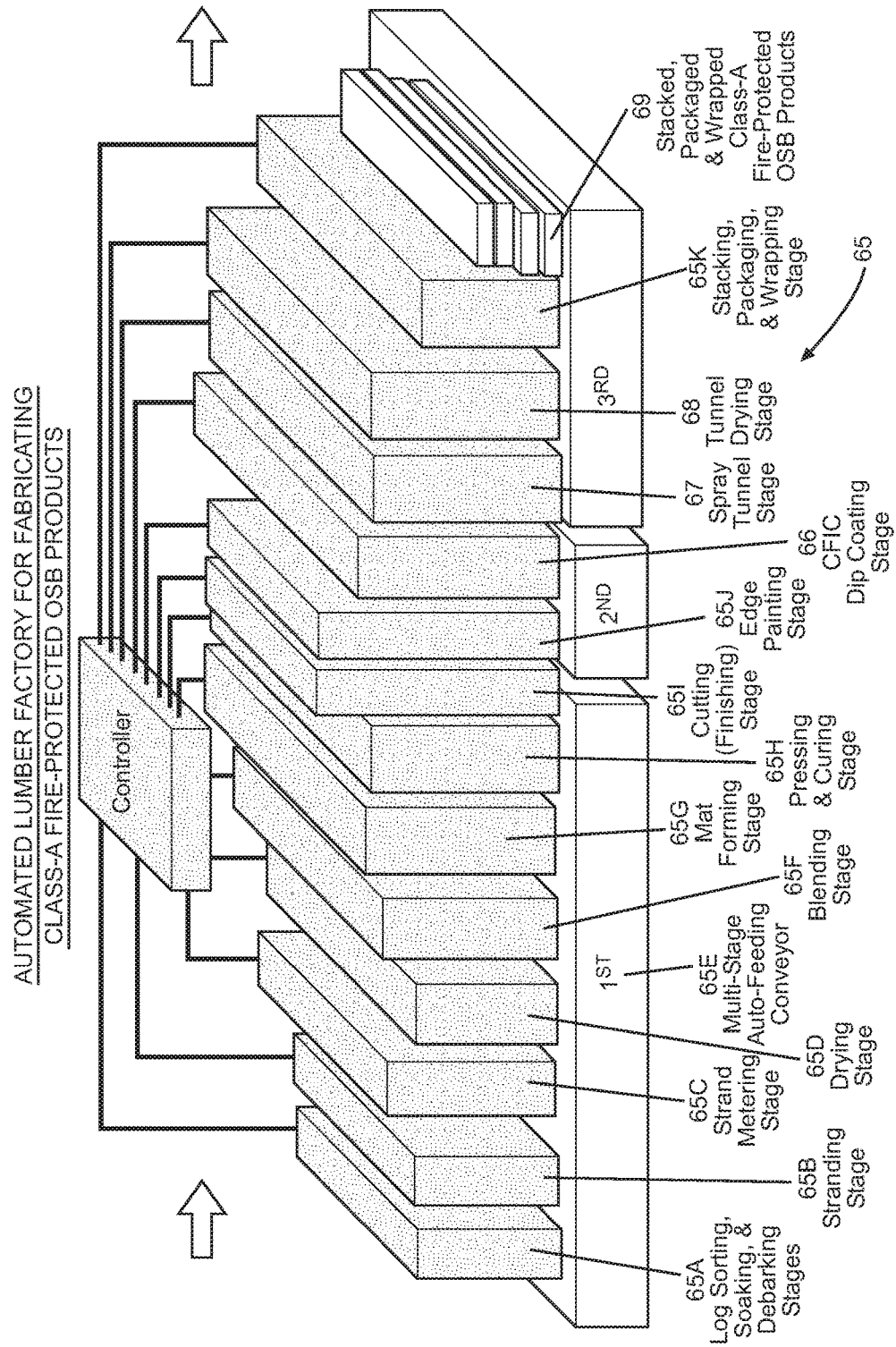
FIG. 33 is a schematic representation of the automated factory configured for producing Class-A fire-protected OSB sheathing in accordance with the principles of the present invention described in FIGS. 32A, 32B and 32C.

FIG. 33 shows an automated factory system 65 for producing Class-A fire-protected laminated OSB products in a high volume manner in accordance with the principles of the present invention. As shown in FIG. 33, the factory 65 comprises a number of automated stages integrated together under automation and control, namely: a conveyor-chain mechanism 65E having numerous primary stages in the illustrative embodiment shown in FIGS. 33, 33A and 33B.

As shown in FIG. 33, the OSB production line comprises an arrangement of stages for high-volume automated production of OSB products. Such systems comprise: presses & curing machines; automation and controllers. Such technologies and machines can be used to implement many of the stages described above in the OSB product production line of the present invention. Suzhou CMT Engineering Company Limited offers complete turnkey OSB production lines.

Figure 33A:
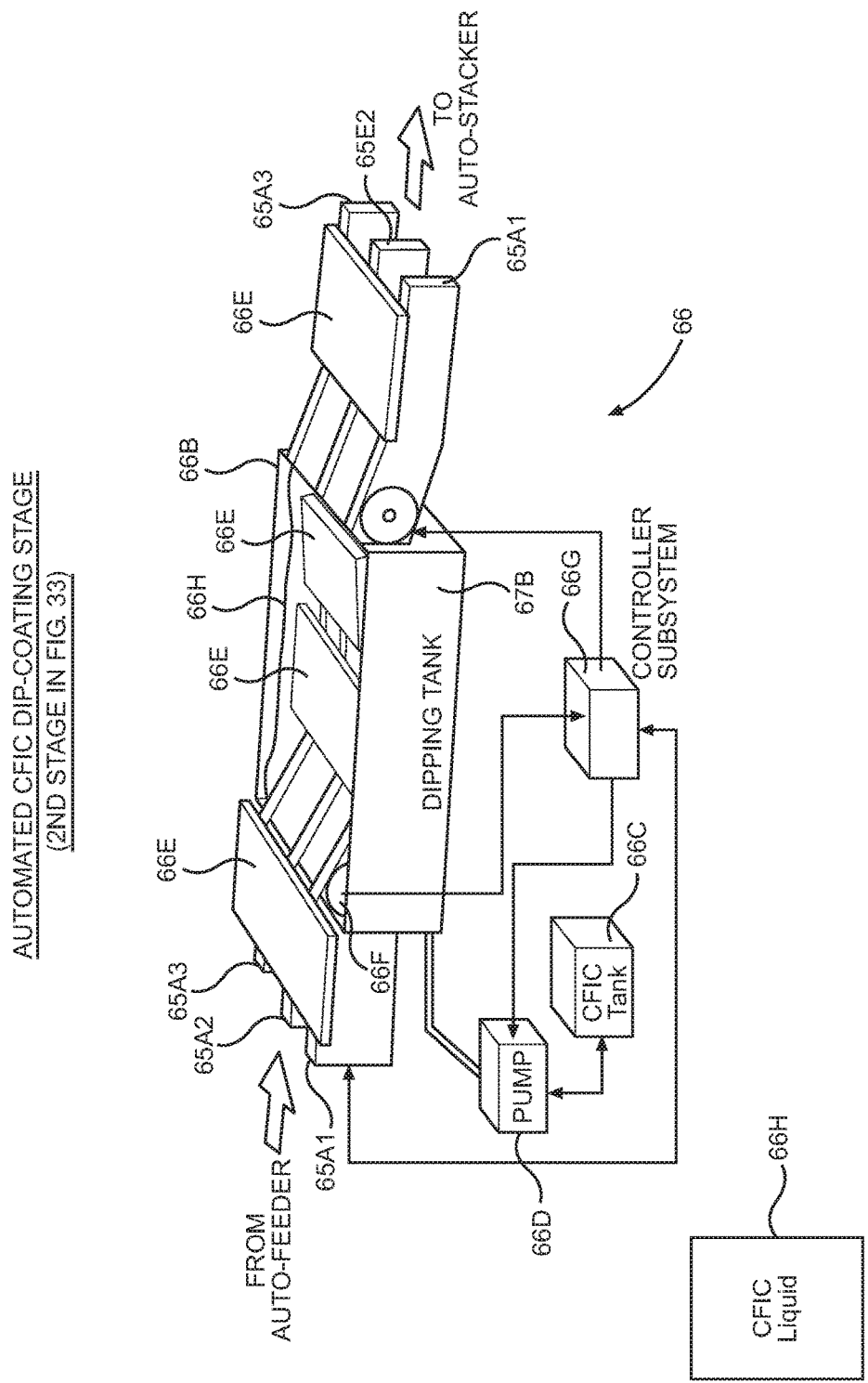
FIG. 33A is a perspective view of the automatic OSB sheathing dip-coating stage deployed along the production line of the automated lumber fabrication factory shown in FIG. 33.

As shown in FIG. 33A, the dip-coating stage 66 comprises a chain-driven conveyor subsystem 65E, supporting several parallel sets of chain-driven transport rails 65E1, 65E2 and 65E3 as shown, extending from the pressing and curing stage 65H towards a dipping tank 54B, and then running inside and along the bottom of the dipping tank 66B, and then running out thereof towards the stacking, packing and wrapping stage 65K, as shown.

In the illustrative embodiment, the dipping tank 66B has a width dimension to accommodate the width of the OSB product 66E being transported on chain-driven conveyor rails 65E1, 65E2 and 65E3 mounted and running outside of and also within the dipping tank 66B, as shown, and allowing sufficient dwell time in the CFIC liquid 66H during the dip-coating process. As shown, the OSB products are supported upon the chain driven rails 65E1, 65E2 and 65E3 while the OSB products 66E are transported through the dipping tank 66B while fully immersed and submerged at least 6 inches deep in CFIC liquid 66H contained in the dipping tank 66B, moving at the linear rate of 300 feet/minute through the dipping tank 66B during the CFIC dip-coating process of the present invention. Electrically-powered driven motors are provided for the purpose of driving the chain-driven conveyors under computer control to transport OSB products 66E from stage to stage along the production line. A level sensor 66F is used for sensing the level of CFIC liquid 66H in the dipping tank at any moment in time during production line operation. A reservoir tank 66C is provided for containing a large volume or supply of CFIC liquid 66H. Also, a computer controller 66G is used for controlling the conveyor subsystem, and an electric pump 66D is provided for pumping CFIC liquid 66H into the dipping tank 66B to maintain a constant supply level during system operation in response to the liquid level measured by the level sensor 66F and controlled by the controller 66G.

The high-speed dip-coating stage 66 may also include additional apparatus including, for example, liquid heaters, circulation pumps and controls for (i) maintaining the temperature of CFIC liquid solution in the dipping tank 66B, and (ii) controlling the circulation of CFIC liquid around submerged OSB product 66E being transported through the dipping tank in a submerged manner during the CFIC dip-coating process. Controlling such dip coating parameters may be used to control the amount and degree of absorption of CFIC liquid within the surface fibers of the OSB product 66E as it is rapidly transported through the dipping tank 66B between the cross-cutting and rip-sawing stage 65I and the lumber packaging and wrapping stage 65K of the production line. Notably, the dip coating process allows for the rapid formation a surface coating, or surface barrier, on the surface of each piece of dipped OSB product, or in the presence of a surfactant added to the CFIC liquid in the dipping tank 66B, shallow impregnation of CFIC liquid 66H to occur into the surface fibers of each OSB sheet 66E near atmospheric pressure (i.e. below 6 inches of liquid CFIC in the dipping tank) during the dip-coated process. It is understood that drip pans may also be provided beyond the dipping tank 66B, installed beneath the chain-driven conveyor subsystem arranged between the dripping tank 66B and the packaging and wrapping stage 65K so as to recover excess CFIC liquid dripping from the dip-coated lumber pieces and returning this recovered CFIC liquid to the dipping tank after appropriate filtering of the CFIC liquid if and as necessary.

Figure 33B:
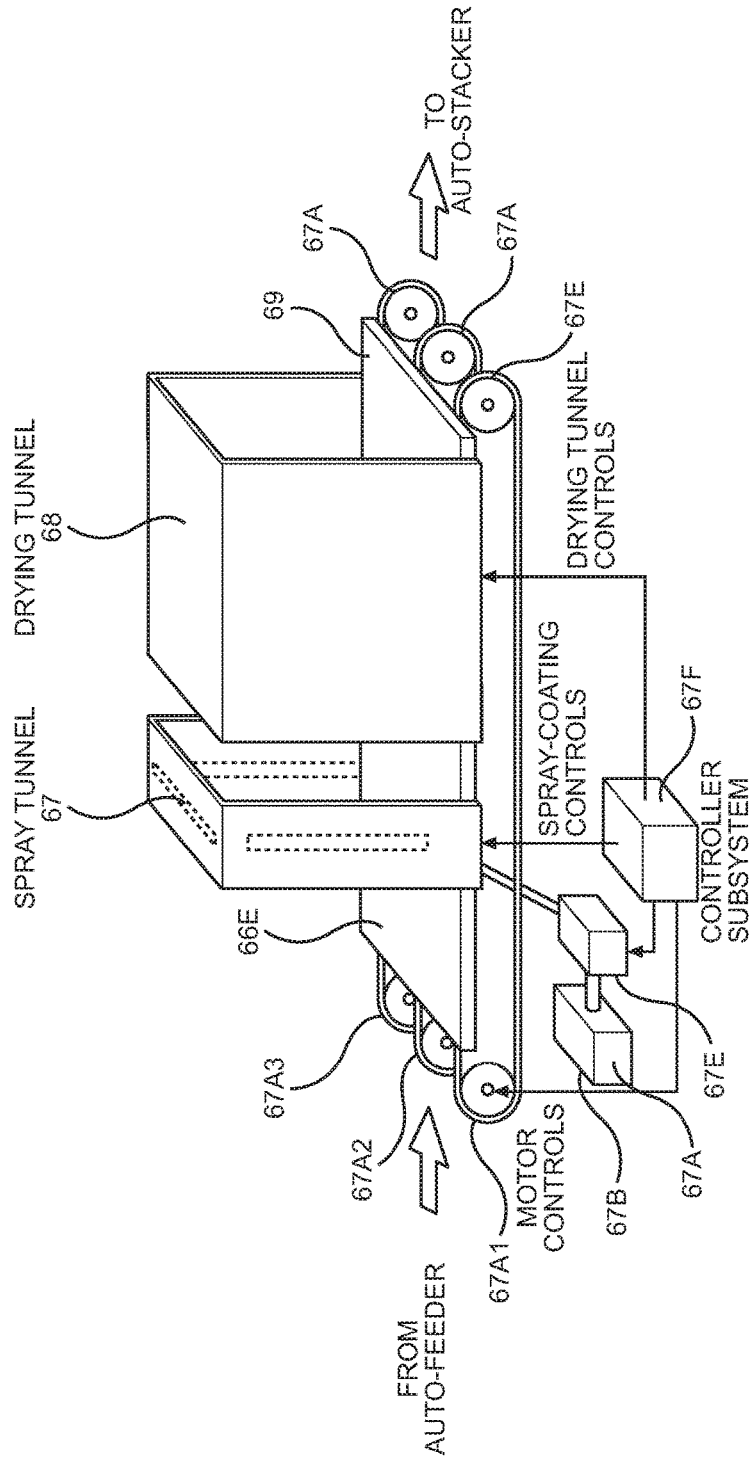
FIG. 33B is a perspective view of the automatic OSB sheathing spray-coating tunnel stage and drying tunnel stage deployed along the production line of the automated lumber fabrication factory shown in FIG. 33.

As shown in FIG. 33B, the moisture, fire and UV protection is provided using the spray tunnel stage 67 deployed immediately after the CFIC-liquid dip-coating stage 66. As shown, the spray tunnel stage 67 comprises: a storage tank 67A for storing a large supply of moisture/fire/UV-protective liquid chemical 67B; a spray tunnel 67C for supporting an array of spray nozzles 67D arranged about the conveyor rails 67A1, 67A2 and 67A3, operably connected to a liquid pump 67E connected to the storage tank 67A under controller 67F, to provide a 360 degrees of spray coverage in the tunnel 67, for spray-coating dip-coated OSB sheets 66E within a controlled plane of moisture/fire/UV-protection liquid 67B sprayed to cover 100% of surfaces of such OSB sheets 66E as they are being transported through the spray tunnel 67 at high-speed; and a drying tunnel stage 56 installed after the spray tunnel stage 67, for quick drying of spray-coated Class-A fire-protected OSB sheet 66E, as they move through the drying tunnel 68 towards the automated stacking, packaging and wrapping stage 65K, under the control of the subsystem controller 58. In the preferred embodiment, the moisture/fire/UV protection liquid 67B sprayed in the spray tunnel 67 is formulated as follows: 25% by volume Hartindo AF21 liquid; 75% by volume Dectan Chemical from Hartindo Chemicatama Industri, or its distributed Newstar Chemicals of Malaysia; and 0.75 [cups/gallon] of Hy-Tech ceramic microsphere dust, as an additive.

As illustrated in FIG. 33, the automated stacking, packaging and wrapping stage 65K includes equipment designed to receive Class-A fire-protected OSB sheets 66E, automatically stacking the fire-protected OSB sheets, packaging and wrapping the sheets with wrapping material (e.g. plastic, TVEK or other wrapping material) that covers the top portion and at least half way down each side of the stacked OSB sheets, and then banding or strapping the wrapped package with fiberglass or steel banding, well known in the art. The wrapping will typically be preprinted with trademarks and logos of the lumber manufacturer's brand. Finally, the ends of the OSB lumber sheets 69 in the strapped, wrapped lumber package 69 are painted with a fire-protective paint also containing CFIC liquid material (e.g. 25% by volume, Hartindo AF21 liquid) to be effective in achieving Class-A fire-protection.

Figure 32A:
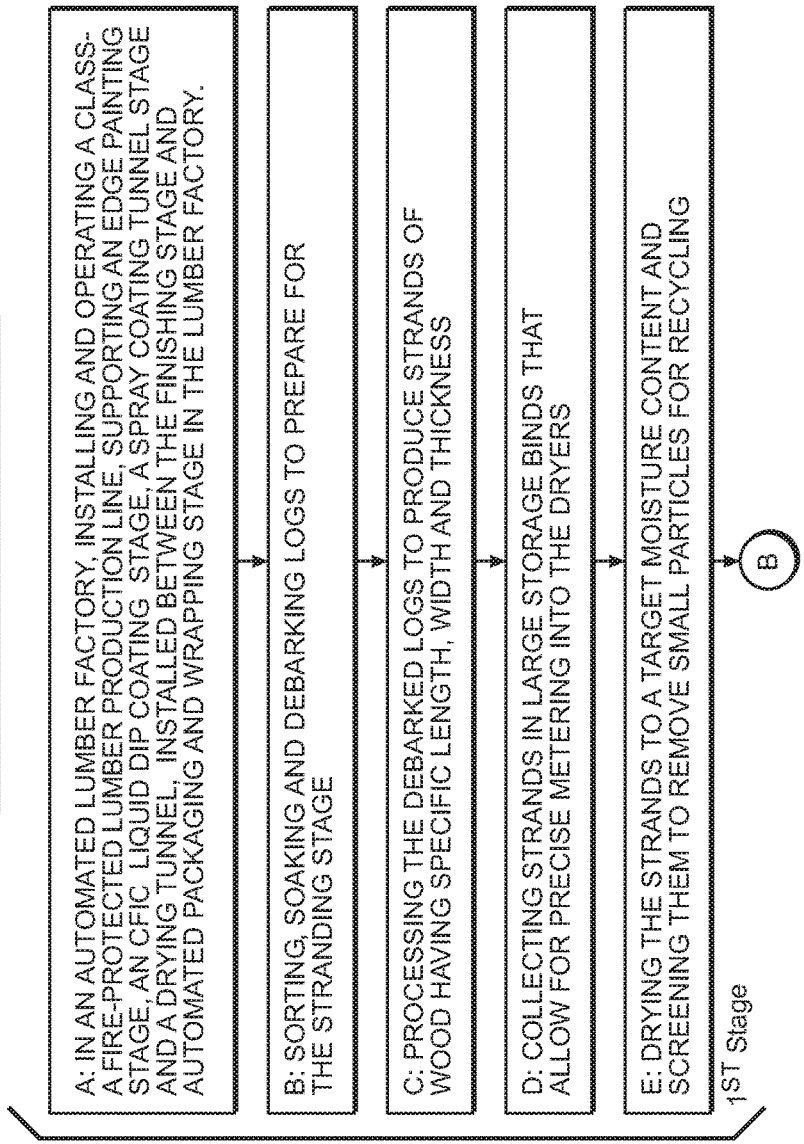
Figure 32B:
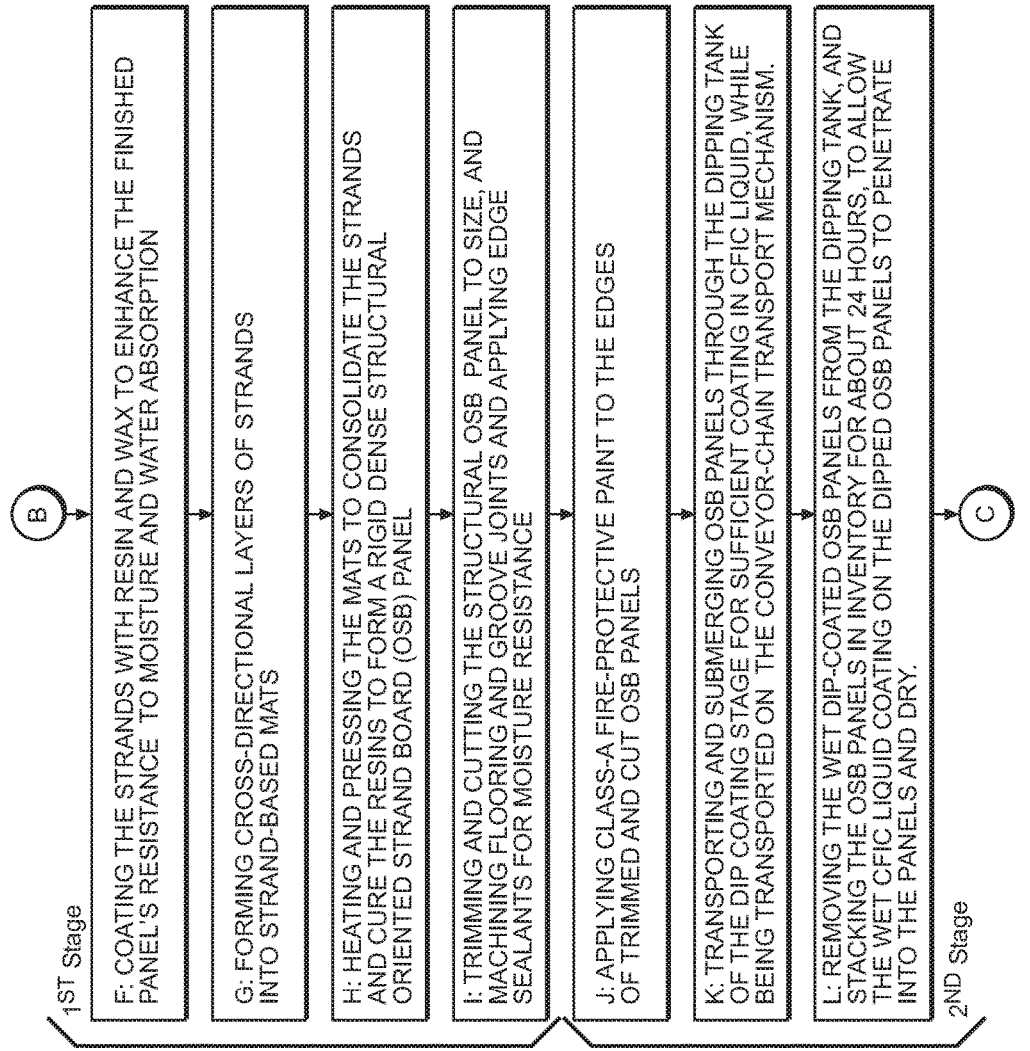

FIGS. 32A, 32B and 32C describe the high-level steps carried out when producing Class-A fire-protected OSB sheathing 69 in the automated factory shown in FIGS. 33, 33A and 33B, in accordance with the method and principles of the present invention.

Provided with this innovative two-coating system of UV/moisture/fire-protection, in the presence of a flame, the chemical molecules in both the moisture/fire/UV-protective coating 64 and CFIC-coatings 63A, 63B capture the free radicals (H+, OH−, O) produced during a fire, and break the fire's chemical reaction and extinguish its flame. This is a primary fire suppression mechanism deployed or rather implemented by the CFIC-coatings deposited on wood surfaces in accordance with the various principles of invention, disclosed and taught herein.

As indicated at Block A in FIG. 32A, in an automated factory configured for automated production of Class-A fire-protected OSB sheeting, an edge painting stage 65J, an CFIC liquid dip coating stage 67, a spray tunnel stage 67, and a drying tunnel stage 68 are installed between the finishing stage 65I and automated packaging and wrapping stage 65K along the lumber production line.

As indicated at Block B in FIG. 32A, logs are sorted, soaked and debarked at stage 65A to prepare for the logs for the stranding stage 65B.

As indicated at Block C in FIG. 32A, the debarked logs are processed at the stranding stage 65B to produce strands of wood having specific length, width and thickness.

As indicated at Block D in FIG. 32A, at the strand metering stage 65C, the strands are collected in large storage binds that allow for precise metering into the dryers.

As indicated at Block E in FIG. 32A, the strands are dried at the drying stage 65D to a target moisture content and screening them to remove small particles for recycling.

As indicated at Block F in FIG. 32B, the strands are coated with resin and wax at the blending 65F to enhance the finished panel's resistance to moisture and water absorption.

As indicated at Block G in FIG. 32B, cross-directional layers of strands are formed into strand-based mats at the mat forming stage 65G.

As indicated at Block H in FIG. 32B, the mats are heated and pressed at the pressing and curing stage 65H to consolidate the strands and cure the resins and form a rigid dense structural oriented strand board (OSB) panel.

As indicated at Block I in FIG. 32B, at the finishing stage 65I, the structural OSB panel is trimmed and cut to size, and groove joints machined and edge sealants applied for moisture resistance.

As indicated at Block J in FIG. 32B, Class-A fire-protective paint (containing CFIC liquid, 25% by volume, Hartindo AF21 liquid) is applied to the edges of the trimmed and cut OSB panels, at the edge painting stage 65J.

As indicated at Block K in FIG. 32B, OSB panels are transported and submerged through the dipping tank 66B of the dip coating stage 66 for sufficient coating in CFIC liquid 66H, while being transported on the conveyor-chain transport mechanism 65E.

As indicated at Block L in FIG. 32B, the wet dip-coated OSB panels are removed from the dipping tank 66B, and wet stacked and set aside for about 24 hours or so, to allow the wet CFIC liquid coating on the dipped OSB panels 66E to penetrate into the panels 69 as the coating dries.

As indicated at Block M in FIG. 32C, a stack of air-dried dip-coated OSB panels 66E is loaded to the auto-feeder of the second stage of the production line, shown in FIG. 33B.

As indicated at Block N in FIG. 32C, the dip-coated OSB panels 66E are spray-coated with a moisture, fire and UV protection coating 64 that supports weather during building construction, to produce Class-A fire-protected OSB panels 69.

As indicated at Block O in FIG. 32C, spray-coated dipped OSB sheets 69 are transported through a drying tunnel at stage 68.

As indicated at Block P in FIG. 32C, dried spray-coated/dipped OSB panels 69 are stacked, packaged and wrapped into a bundle of Class-A fire-protected OSB panels at the stacking, packaging and wrapping stage 65K.

As shown and described above, the lumber factory 65 is configured for producing Class-A fire-protected OSB sheathing 69 fabricated in accordance with the principles of the present invention.

Figure 34:
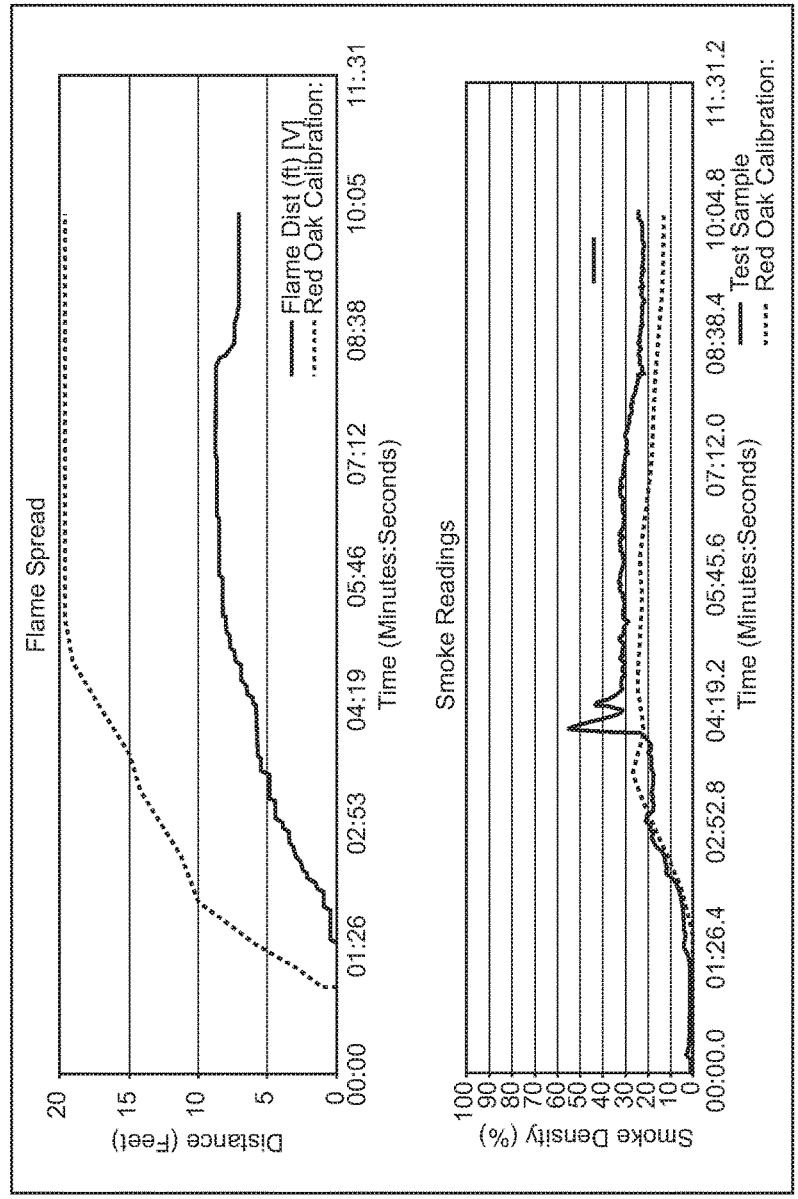
FIG. 34 are flame-spread rate and smoke-development indices associated with the Class-A fire-protected OSB sheathing of the present invention produced using the method of the illustrative embodiment described in FIGS. 32A, 32B and 32C, and tested in accordance with the test standard ASTM E2768-11.
Figure 35:
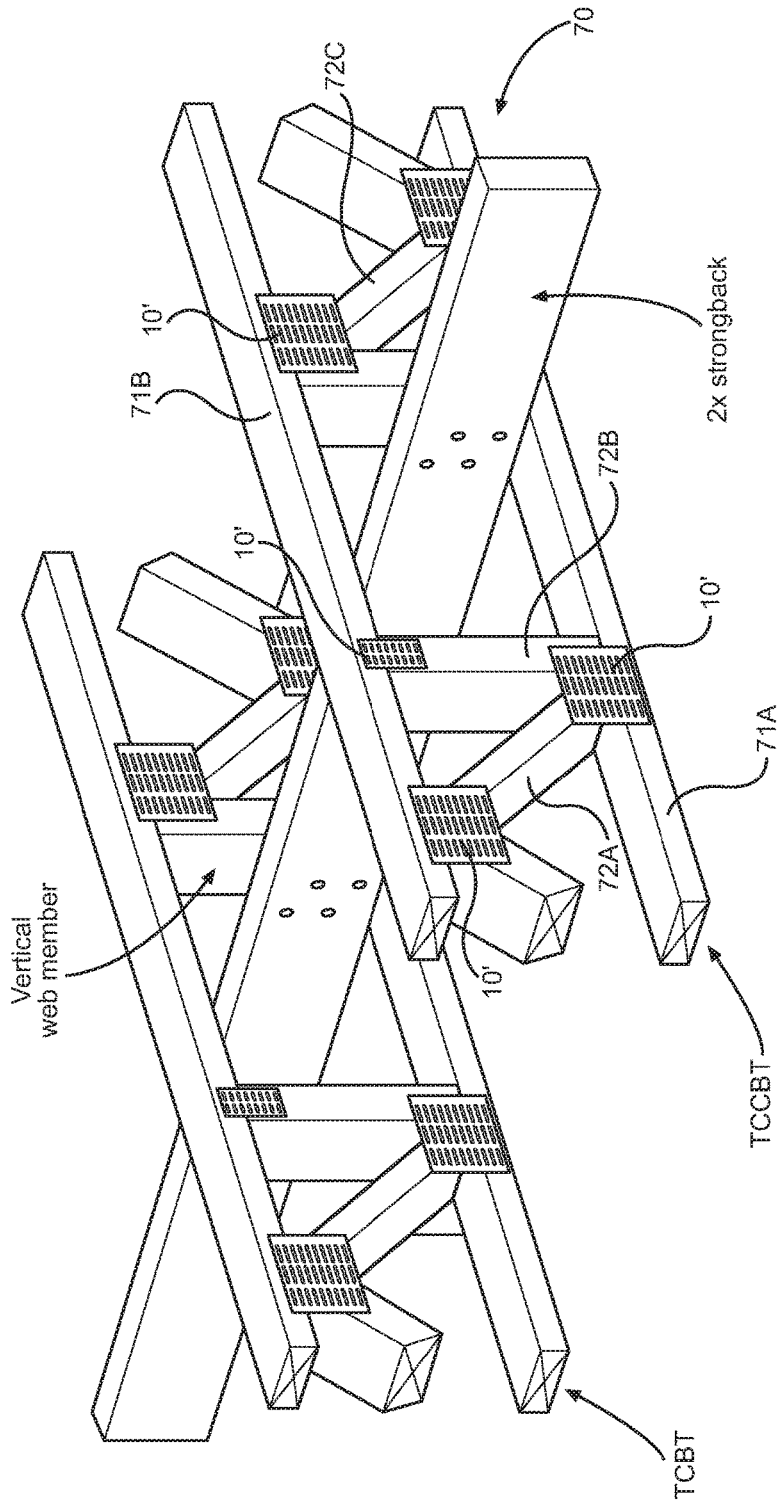
FIG. 35 is a perspective view of a Class-A fire-protected top chord bearing (floor) truss (TCBT) constructed in accordance with the method described in FIG. 36 in the automated factory illustrated in FIG. 37, using Class-A fire-protected lumber sections connected together using heat-resistant coated metal truss connector plates, indicating a 50% reduction in heat transfer during ASTM E119 Testing, which reduces wood charring behind the connector plates and prevented truss failure in the presence of fire.

FIG. 34 shows the flame-spread and smoke-reading (development) characteristics associated with the Class-A fire-protected OSB sheathing 69 shown in FIGS. 30 and 31 and manufactured according to the method of the illustrative embodiment described in FIGS. 32A and 32B, and using the factory production line shown in FIGS. 33, 33A and 33B.
Specification of Method of Making Fire-Protected Top Chord Bearing (Floor) Truss (TCBT) Structure Constructed in Accordance with the Principles of the Present Invention FIG. 35 shows a Class-A fire-protected top chord bearing (floor) truss (TCBT) structure 70 constructed in accordance with the present invention. As will be described in greater detail herein, the method of production involves (i) producing Class-A fire-protected lumber sections, and (ii) producing heat-resistant metal truss connector plates 10' coated with Dectan-chemical (i.e. indicating a 50% reduction in E119 Testing which reduces charring in the wood behind plate), and (iii) using these heat-resistant metal truss connector plates 10' to secure connect together the Class-A fire-protected pieces of lumber to form a Class-A fire-protected floor truss structure 70.

Figure 8A:
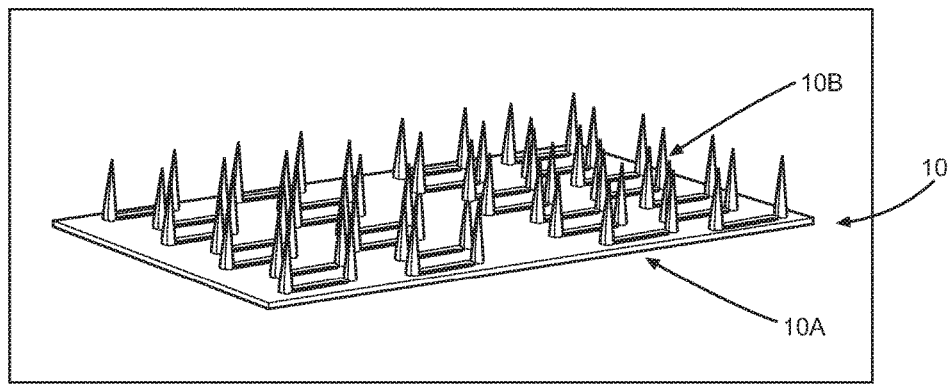
FIG. 8A is perspective top view of conventional metal connector plate, showing its array of nail-spikes orthogonally projecting from its support plate.
Figure 8B:
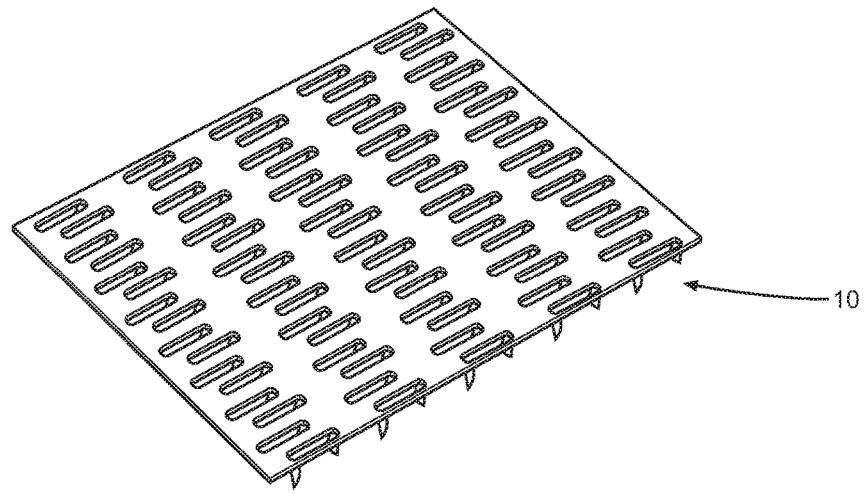
FIG. 8B is perspective bottom view of conventional metal connector plate, showing its array of nail-spikes orthogonally projecting from its support plate.
Figure 9:
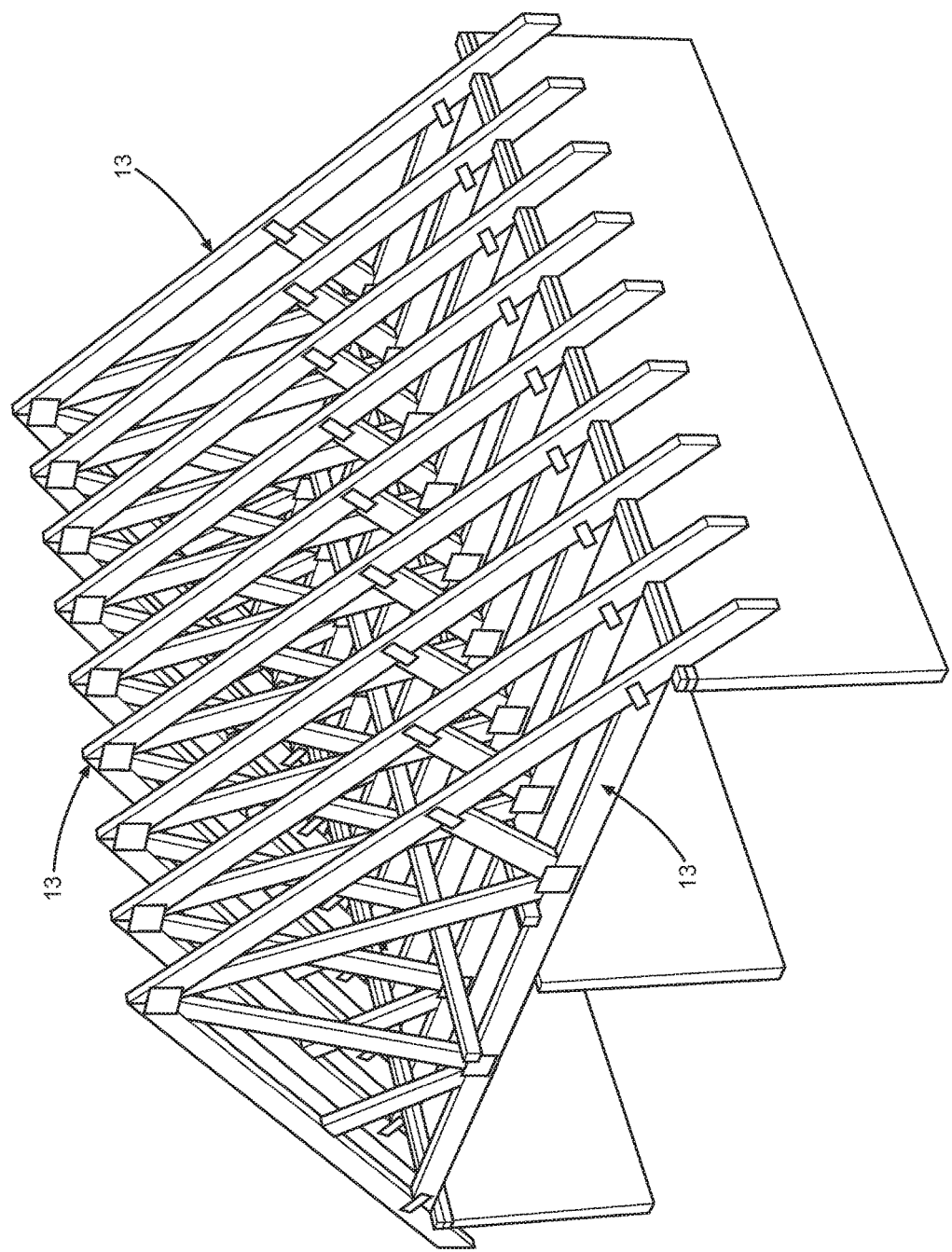
FIG. 9 is a perspective view of a plurality of conventional top chord load-bearing roof trusses, each being constructed from untreated lumber beams connected together using conventional metal truss connector plates, as shown in FIGS. 8A and 8B.
Figure 13:
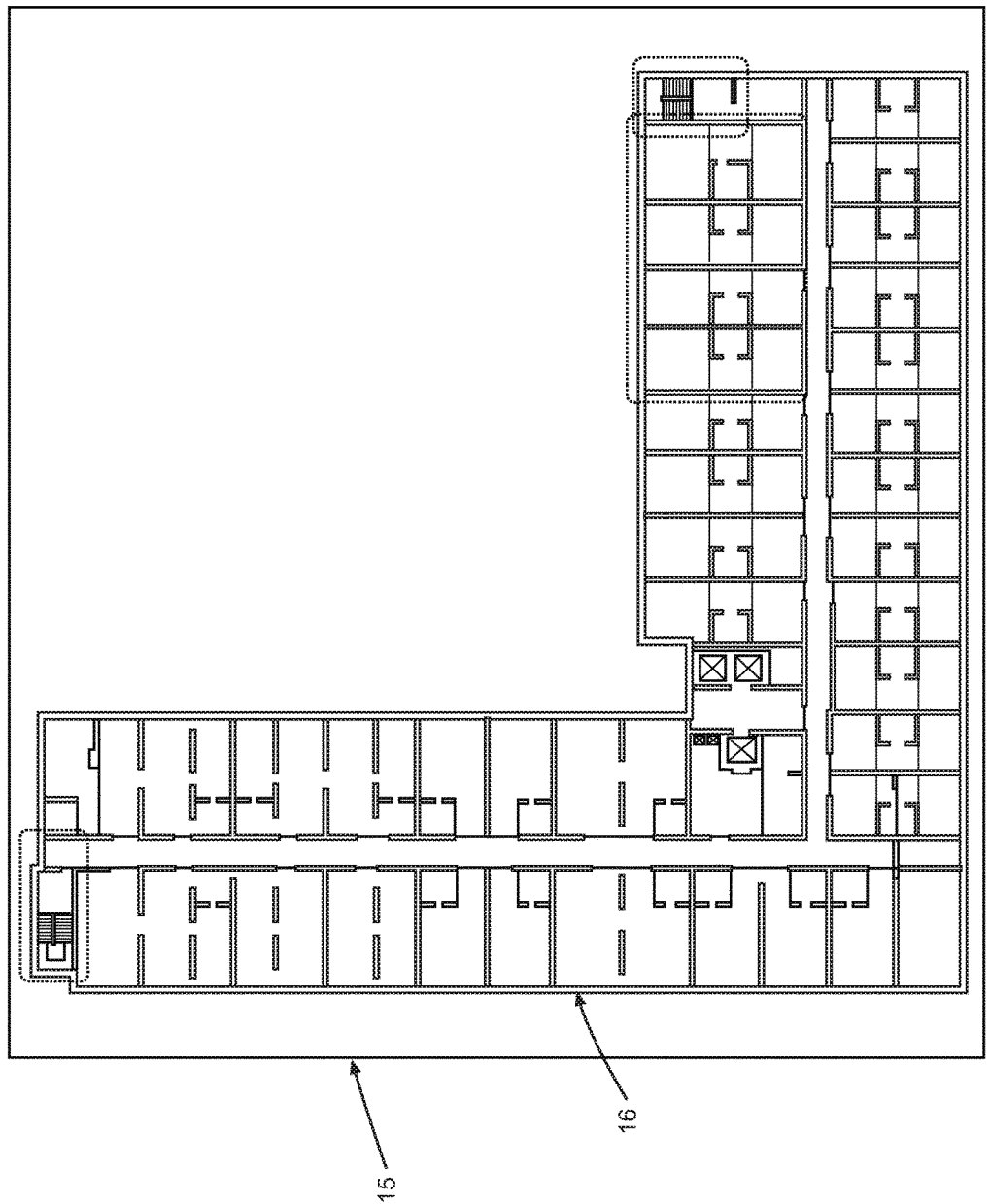
FIG. 13 is a schematic construction diagram for a conventional multi-story wood-framed building under construction, indicating in bold lines, around the perimeter of the building, that fire-treated lumber and sheathing has been specified only for outer wall structures by the building architects, consistent with the wood bearing wall schedule shown in FIG. 12.
Figure 14A:
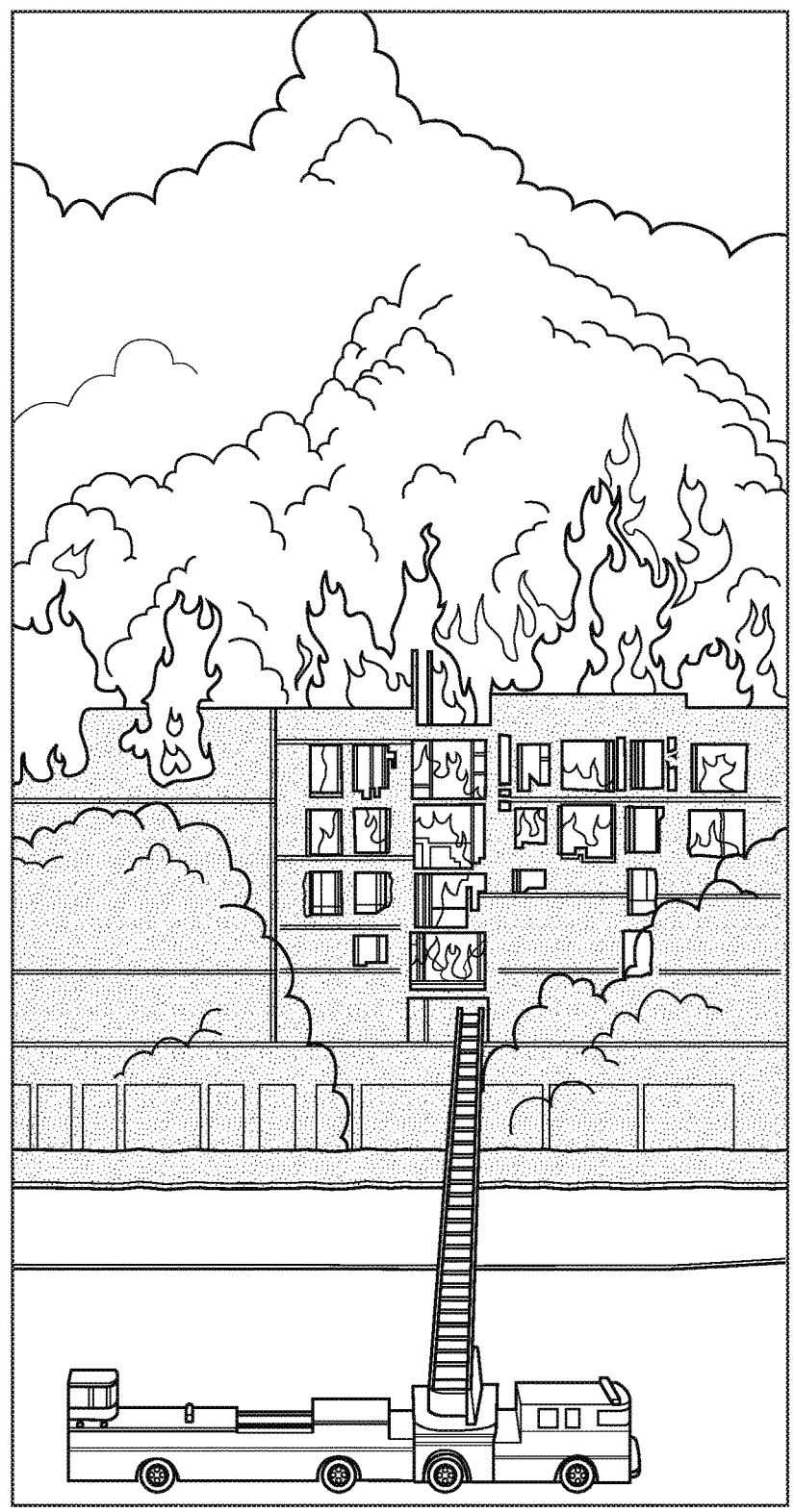
FIG. 14A is a photographic representation showing a conventional multi-story wood-framed building structure ablaze during its construction phase, and ravaged by flames fueled by massive amounts of untreated lumber and OSB sheathing used to construct the same, in accordance with conventional architectural building specifications.
Figure 14B:
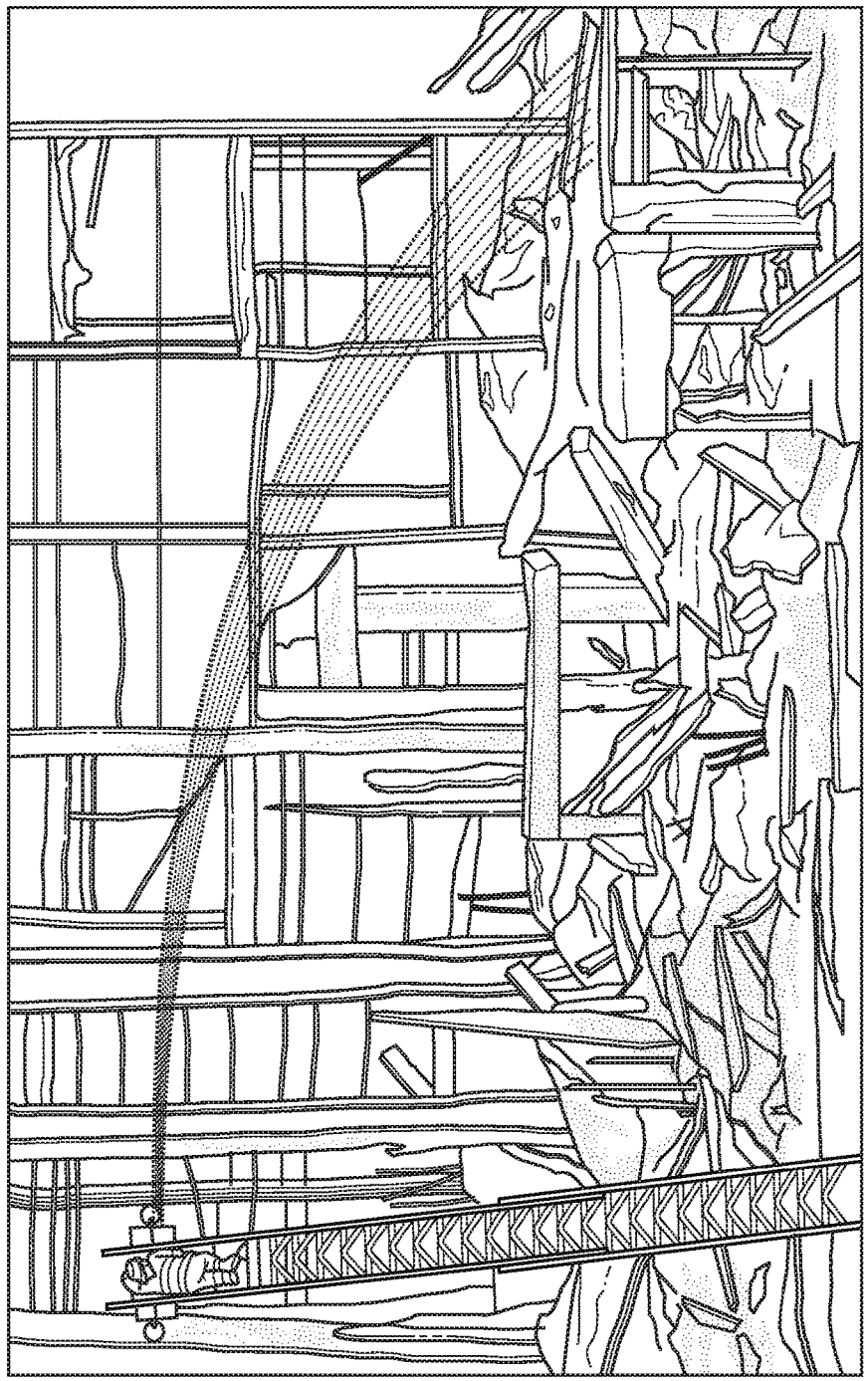
FIG. 14B is a photographic representation showing the conventional multi-story wood-framed building structure of FIG. 14B, completely destroyed by fire during its construction phase, with firemen continuing to apply water to cool down the destroyed site.
Figure 15:
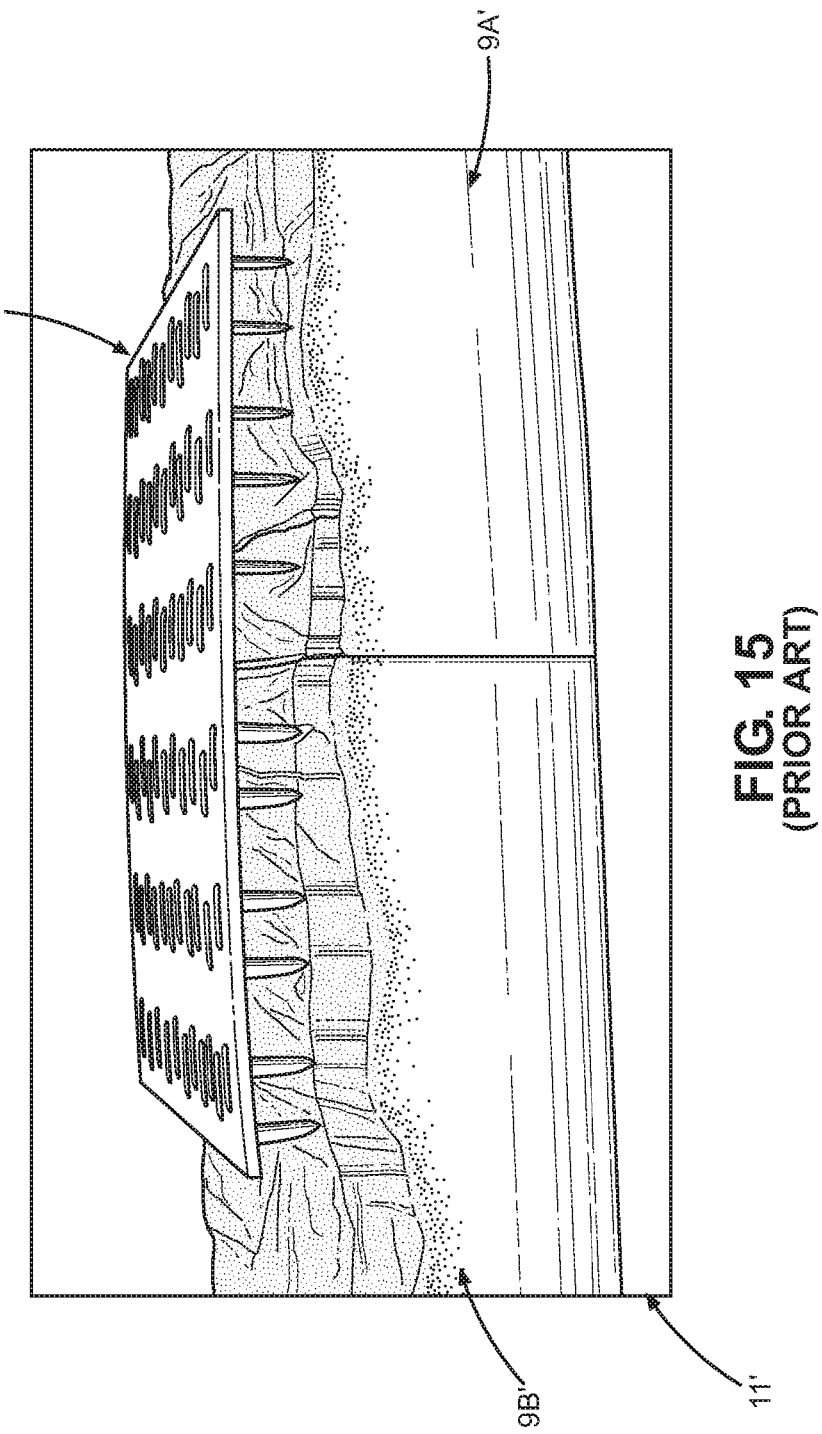
FIG. 15 is a photographic representation of a section of a conventional roof truss and its lumber beams and metal connection plate, both charred and weakened during an interior fire within a conventional multi-story wood-framed building.
Figure 16:
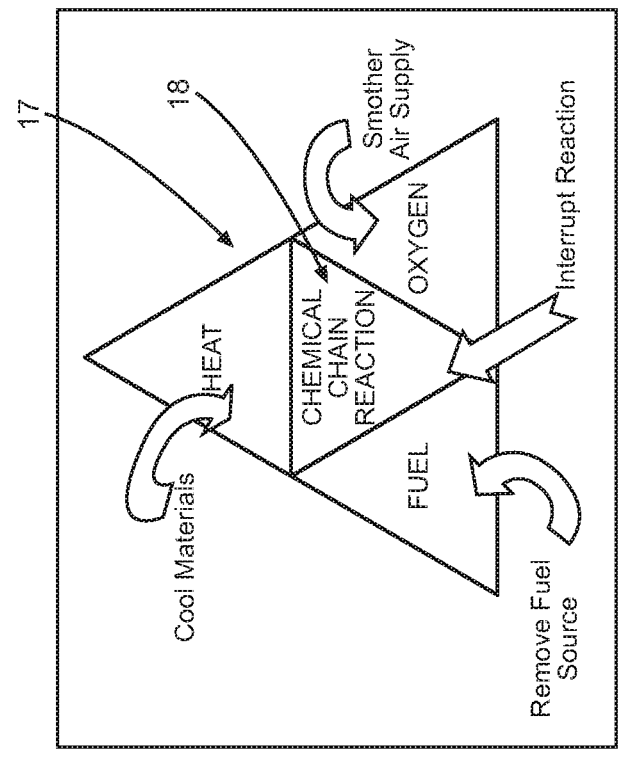
FIG. 16 is a schematic representation of the process of fire showing its four primary components and illustrating various pathways available for suppressing fire within a wood-framed building and protecting the same from total destruction by fire.

The Class-A fire-protected floor truss structure 70 performs better than conventional I-joists, does not require doubling as do conventional I-joists, does not require drilling on site top pass and install plumbing pipes and electrical wiring, as do I-joists, and does not require expensive LVL rim joists, while being easier to install in wood-framed buildings. The fire-protected floor truss structure 70 of the present invention provides an innovative solution to conventional wooden floor trusses using metal nail connector plates to connect together small lumber sections which ignite easily and burn quickly in a building fire. During a building fire, conventional metal nail connector plates 10, shown in FIGS. 8A and 8B, bend in the heat of a fire and release from its lumber section, causing the truss to loose all strength in a fire, as shown in FIG. 15. This places occupants at great risk trying to escape a burning wood-framed building, as well as firemen trying to extinguish a fire in a burning building before the fire reaches its critical stage.

Figure 36:
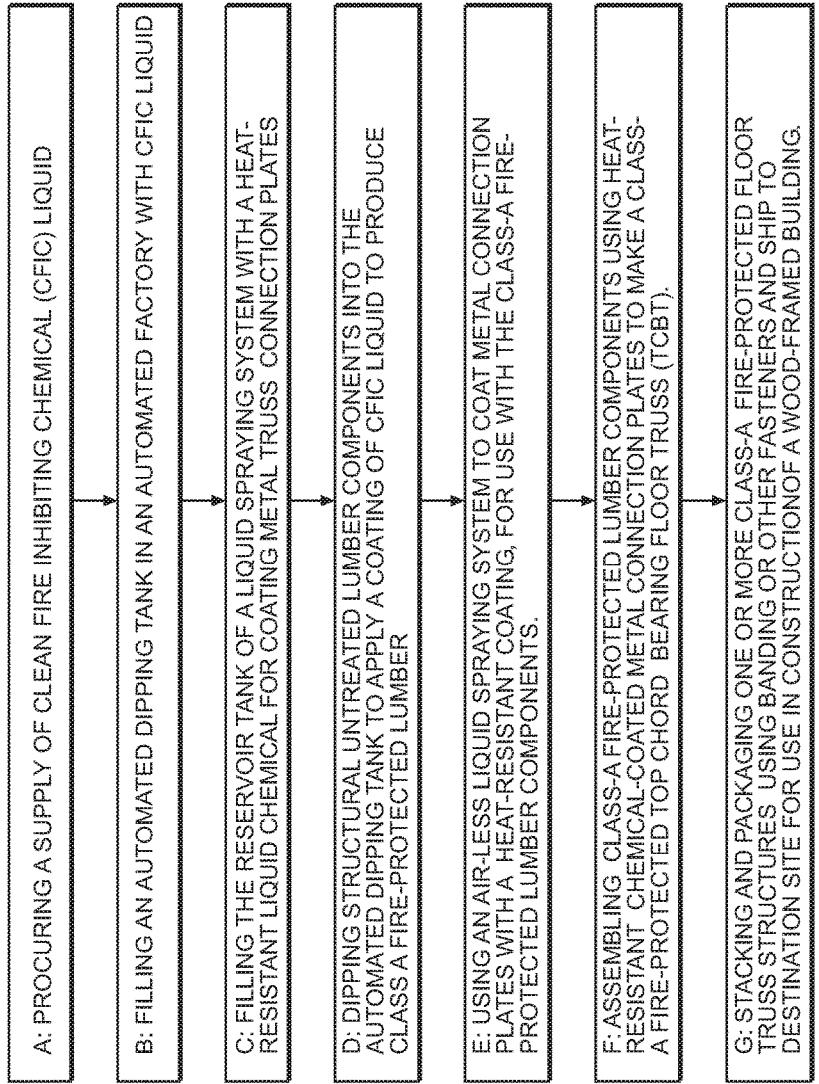
FIG. 36 is a flow chart describing the high level steps carried out when practicing the method of producing Class-A fire-protected top chord bearing floor trusses (TCBT) in accordance with the present invention, comprising the steps of (i) procuring a water-based clean fire inhibiting chemical (CFIC) liquid, (b) filling a dipping tank with the water-based CFPC liquid, (c) filling the reservoir tank of an air-less liquid spraying system with heat-resistant chemical liquid, (e) dipping structural untreated lumber components into the dipping tank to apply a coating of clean fire inhibiting chemical (CFIC) over all its surfaces, and allow to dry to produce Class-A fire-protective lumber, and then use air-less liquid spraying system to coat metal connector plates for use with the fire-treated lumber components, (f) assembling the fire-treated lumber components using heat-resistant coated metal connector plates to make a fire-protected top chord bearing floor truss (TCBT) structure, and (g) stacking and packaging one or more Class-A fire-protected floor truss structures using banding or other fasteners and ship to destination site for use in the construction of a wood-framed building.

FIG. 36 describes practicing the method of producing Class-A fire-protected top chord bearing floor trusses (TCBT) 70 in accordance with the present invention. As shown, the method comprises the steps: (a) procuring clean fire inhibiting chemical (CFIC) liquid 77A (e.g. Hartindo AF21 Total Fire Inhibitor from Newstar Chemicals); (b) filling the dipping tank 77 with water-based CFIC solution 77A; (c) filling the reservoir tank 78 of a liquid spraying system with a heat-resistant chemical liquid 78A for coating metal truss connector plates (e.g. Dectan Chemical from Hartindo Chemicatama Industri, or its distributor Newstar Chemicals of Malaysia); (d) dipping structural untreated lumber components into dipping tank 77 in a high-speed manner so as to apply a coating of clean fire inhibiting chemical (CFIC) 77A over all its surfaces, wet-stacking the treated lumber, and allowing to air-dry to produce Class-A fire-protected lumber sections 71A, 71B, 71C; (e) using an air-less liquid spraying system, or other applicator, to coat metal connector plates 10 with a heat-resistant chemical liquid (i.e. Dectan Chemical from Hartindo Chemicatama Industri) 78A and thereafter drying in air or in drying tunnel, to produce heat-resistant metal connector plates 10' for use in connecting together the Class-A fire-protected lumber components 71A, 71B, 71C; (f) assembling the Class-A fire-protected lumber components 71A, 71B, 71C using heat-resistant metal connector plates 10' spray-coated with Dectan chemical to make a Class-A fire-protected top chord bearing floor truss (TCBT) structure 70; and (g) stacking and packaging one or more Class-A fire-protected floor truss structures 7 using banding, strapping or other fasteners and ship to a destination site for use in constructing wood-framed buildings.

Liquid DecTan chemical is a complex mixture of a vinyl acrylic copolymer and tannic acid. Liquid DecTan chemical from Hartindo Chemicatama Industri has the ability to resist high heat, as it contains Hartindo's AF21 total fire inhibitor, and has proven to be an excellent heat-resistant coating for purposes of the present invention. It can be applied using spray-coating, curtain-coating, and brush-coating methods.

Figure 37:
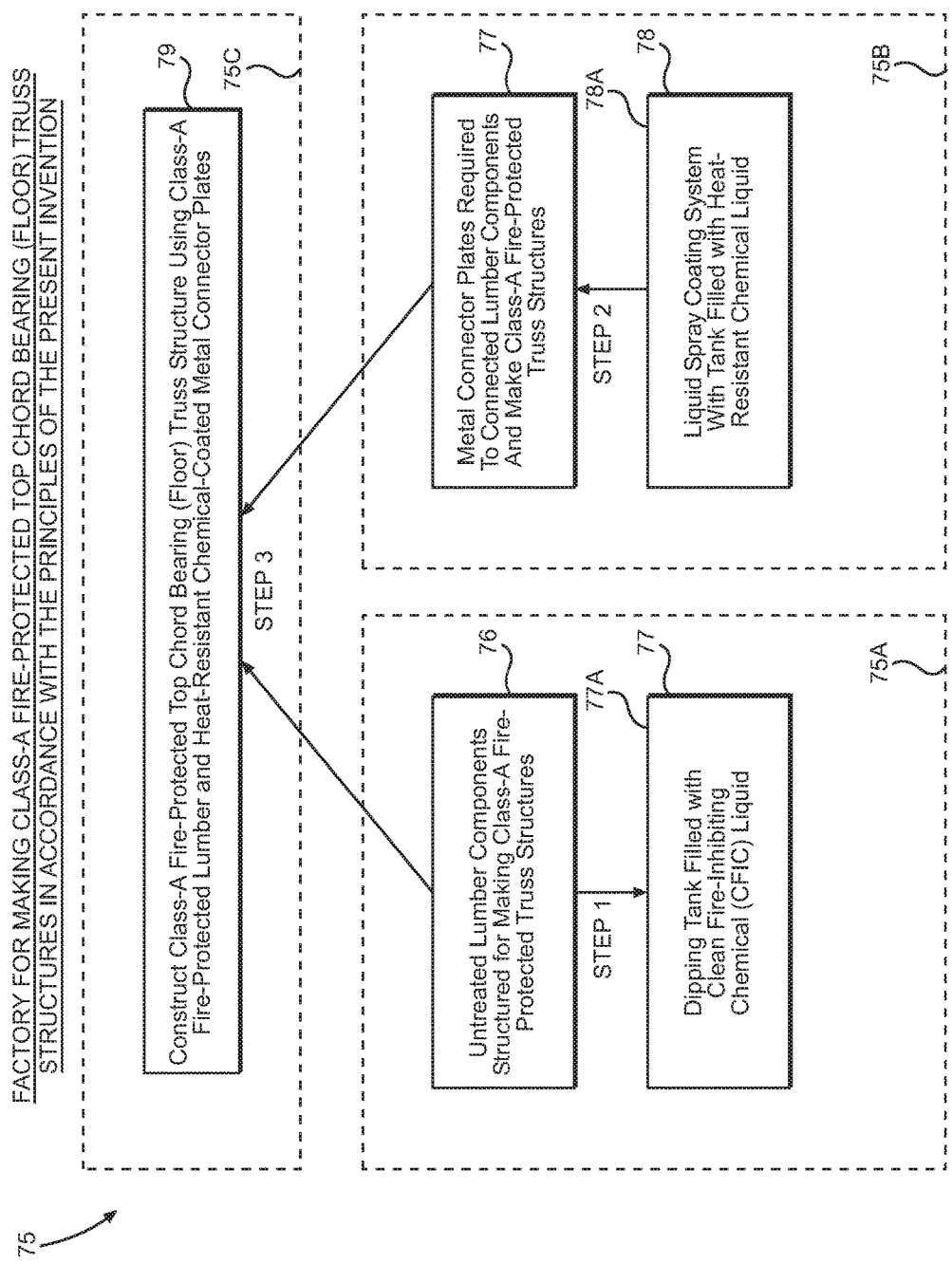
FIG. 37 is a schematic representation of an automated factory for making Class-A fire-protected floor trusses shown in FIG. 36 according to the method described in FIG. 36, wherein the automated factory comprises the components, including (a) a first stage for dipping untreated lumber components in a tank filled with liquid clean fire inhibiting chemicals, (b) a second stage for spraying metal connector plates with a coating of heat-resistant chemical liquid to produce heat-resistant metal connector plates, and (c) third stage for assembling the Class-A fire-treated lumber components with the heat-resistant metal connector plates to form Class-A fire-protected floor trusses.

FIG. 37 depicts a factory 75 for making Class-A fire-protected floor trusses 70 in accordance with the principles of the present invention. As shown, the factory 75 comprises the components, including: (a) a first stage 75A for automated dipping of untreated lumber components in a dipping tank 77 filled with clean fire inhibiting chemical (CFIC) liquid 77A (e.g. Hartindo AF21 Total Fire Inhibitor from Newstar Chemicals of Malaysia) using automated dip-coating technology described hereinabove in FIG. 19A; (b) a second stage 75B for automated spraying metal connector plates 10 with DecTan chemical 78A from Hartindo Chemicatama Industri using automated spray-coating technology described hereinabove in FIG. 27B; and (c) a third stage 75C for automated or semi-automated assembly of the Class-A fire-protected lumber components 71A and 71B with the DecTan-coated heat-resistant metal connector plates 10' using automation and controls, to form Class-A fire-protected floor trusses 70 in a high-speed, high-volume manner.

Figure 38:
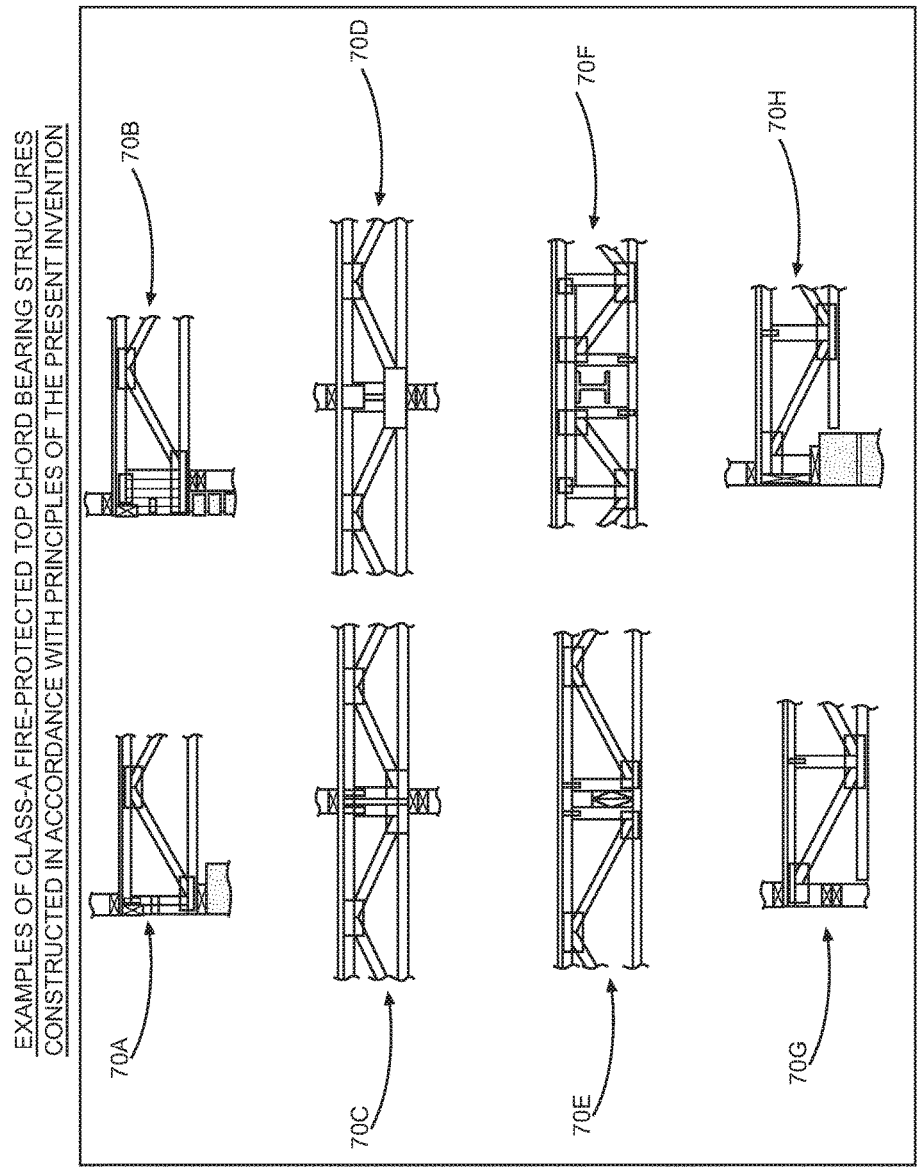
FIG. 38 shows a family of Class-A fire-protected top chord bearing floor structures constructed in accordance with the principles of the present invention, described in FIGS. 36 and 37.

FIG. 38 shows a family of fire-protected top chord bearing floor structures 70A through 70H constructed in accordance with the present invention described above. Such examples include, for example: a bottom chord bearing on exterior frame or masonry wall 70A; a bottom chord bearing on exterior frame wall with masonry fascia wall 70B; an intermediate bearing—simple span trusses 70C; an intermediate bearing—continuous floor truss 70D; a header beam pocket—floor truss supporting header beam 70E; an intermediate bearing—floor truss supported by steel or wooden beam 70F; a top chord bearing on frame wall 70G; and a top chord bearing on masonry wall 70H. Notably, in each of these alternative top chord bearing floor truss designs, heat-resistant metal truss connector plates 10' are used to connect sections of fire-protected CFIC-coated lumber 71 in a secure manner, and enjoy the many benefits that such Class-A fire-protective building assemblies provide over the prior art.

FIG. 39 shows a schematic table illustrating the flame spread and smoke development indices obtained through testing of AAF21-treated Class-A fire-protected floor truss structures 70A through 70H produced using the method of the illustrative embodiment described in FIGS. 35, 36 and 37, and tested in accordance with standards ASTM E84 and UL 723.

Specification of the Method of a Fire-Protected Top Chord Bearing (Roof) Truss Structure of the Present Invention FIG. 40 shows a Class-A fire-protected top chord bearing (roof) truss structure of the present invention 80, formed using clean fire inhibiting chemical (CFIC) coated lumber pieces 81A through 81E connected together using Dectan-coated heat-resistant metal truss connector plates 10'. This novel building construction provides an innovative solution to conventional wooden roof trusses employing conventional metal nail connector plates to connect together untreated lumber sections used to construct the truss structure which are plagued with numerous problems: (i) lumber truss sections easily igniting and quickly burning in a building fire; and (ii) conventional metal nail connector plates bending in the heat of a fire and releasing from its lumber sections, causing the truss structure to loose all strength in a fire. Such problems put occupants at great risk trying to escape a burning building, and also firemen trying to extinguish the fire before the fire reaches its critical stage.

Figure 41:
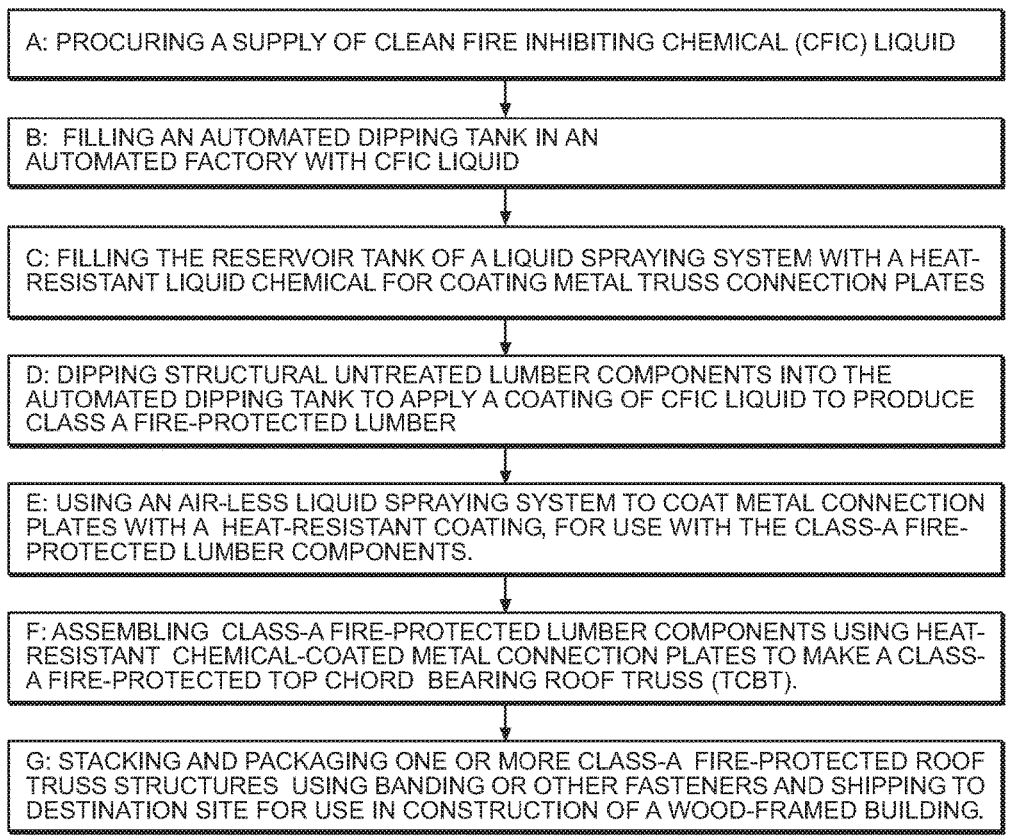
FIG. 41 is a flow chart describing the high level steps carried out when practicing the method of producing Class-A fire-protected top chord bearing roof trusses (TCBT) shown in FIG. 40, comprising the steps of (a) procuring clean fire inhibiting chemical (CFIC) liquid for treating wood pieces, (b) filling water-based CFPC liquid into a dipping tank, (c) filling a reservoir tank of an air-less liquid spraying system with heat-resistant chemical liquid, (d) dipping structural untreated lumber components into the dipping tank to apply a coating of clean fire inhibiting chemicals (CFIC) over all its surfaces, and allow to dry to produce Class-A fire-protected lumber, (e) using the air-less liquid spraying system to coat the metal connector plates with heat-resistant chemical liquid, to produce heat-resistant metal connector plates for use with the Class-A fire-protected lumber components, (f) assembling the fire-treated lumber components using heat-resistant Dectan chemical coated metal connector plates to make a fire-protected top chord bearing roof truss (TCBT) structure, and (g) stacking and packaging one or more Class-A fire-protected roof truss structures using banding or other fasteners and ship to destination site for use in construction wood-framed buildings.

FIG. 41 describes practicing the method of producing Class-A fire-protected top chord bearing roof trusses (TCBT) 80 in accordance with the present invention. As shown, the method comprises the steps: (a) procuring clean fire inhibiting chemical (CFIC) liquid 85A (e.g. Hartindo AF21 Total Fire Inhibitor from Newstar Chemicals); (b) filling the dipping tank 85 with water-based CFIC solution 86A; (c) filling the reservoir tank 86 of a liquid spraying system with a heat-resistant chemical liquid 86A for coating metal truss connector plates (e.g. Dectan Chemical from Hartindo Chemicatama Industri, or its distributor Newstar Chemicals of Malaysia); (d) dipping structural untreated lumber components into dipping tank 85 in a high-speed manner so as to apply a coating of clean fire inhibiting chemical (CFIC) 85A over all its surfaces, wet-stacking the treated lumber, and allowing to air-dry to produce Class-A fire-protected lumber sections 81A, 81B, 81C, 81D, and 81E; (e) using an air-less liquid spraying system, or other applicator, to coat metal connector plates 10 with a heat-resistant chemical liquid (i.e. Dectan Chemical) 8A and thereafter drying in air or in drying tunnel, to produce heat-resistant metal connector plates 10' for use in connecting together the Class-A fire-protected lumber components 81A, 81B, 81C, 81D, and 81E; (f) assembling the Class-A fire-protected lumber components 81A, 81B, 81C, 81D, and 81E using heat-resistant metal connector plates 10' spray-coated with Dectan chemical to make a Class-A fire-protected top chord bearing roof truss (TCBT) structure 80; and (g) stacking and packaging one or more Class-A fire-protected roof truss structures 80 using banding, strapping or other fasteners and ship to a destination site for use in constructing wood-framed buildings.

FIG. 42 depicted a factory 83 for making fire-protected top chord bearing roof trusses 80 in accordance with the principles of the present invention. As shown, the factory 83 comprises the components, including: (a) a first stage 83A for dipping untreated lumber components in a dipping tank 85 filled with clean fire inhibiting chemical (CFIC) liquid 85B (e.g. Hartindo AF21 Total Fire Inhibitor from Newstar Chemicals of Malaysia) using automated dip-coating technology described hereinabove in FIG. 19A; (b) a second stage 83B for automated spraying metal connector plates 10 with Dectan chemical 86A from Hartindo Chemicatama Industri, of Malaysia using automated spray-coating technology described hereinabove in FIG. 27B, to produce heat-resistant metal connector plates 10'; and (c) a third stage 83C for assembling the Class-A fire-protected lumber components 81A through 81E with the heat-resistant Dectan-coated metal connector plates 10' using automation and controls, to form fire-protected top chord bearing roof trusses 80 in a high-speed, high-volume manner.

Figure 43A:
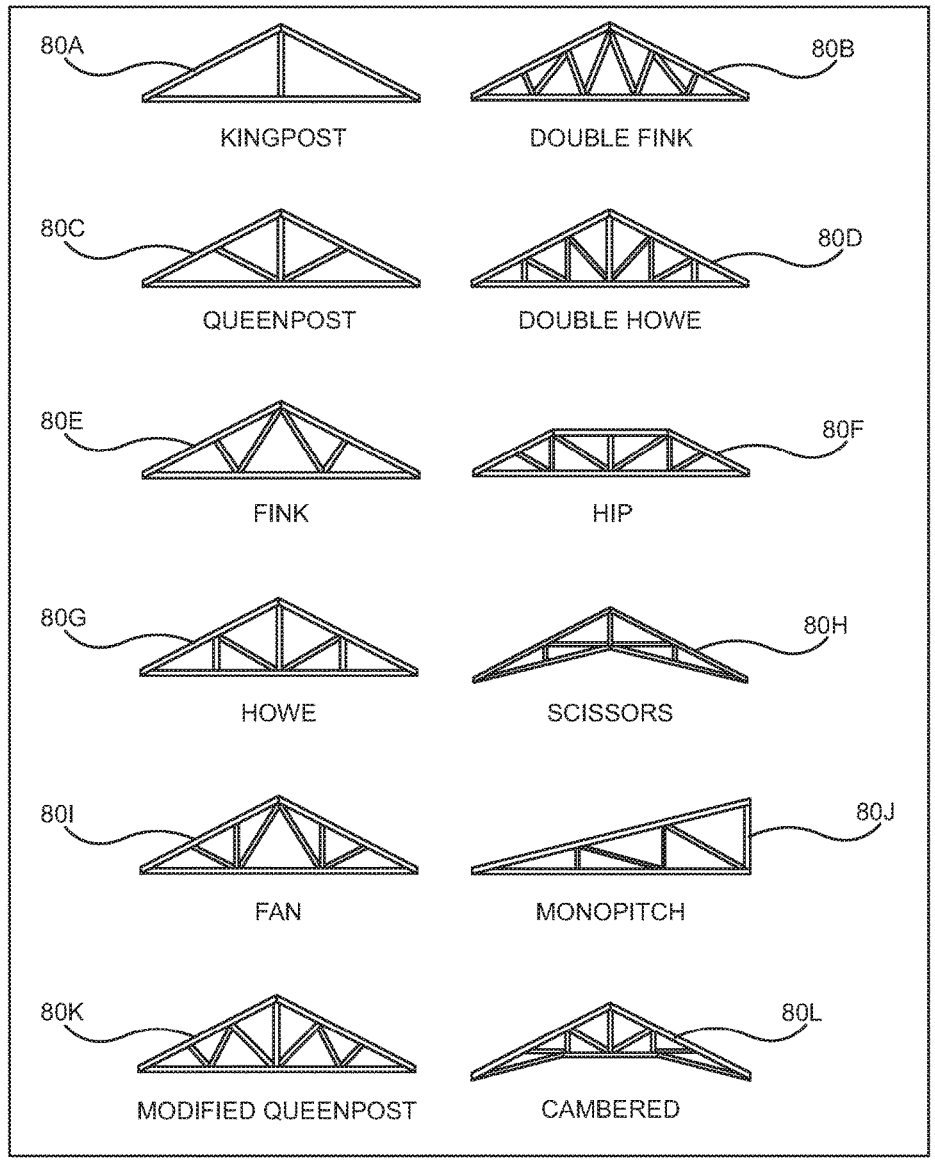
FIGS. 43A and 43B show a family of Class-A fire-protected top chord bearing roof structures constructed in accordance with the present invention, described in FIGS. 40, 41 and 42.
Figure 43B:
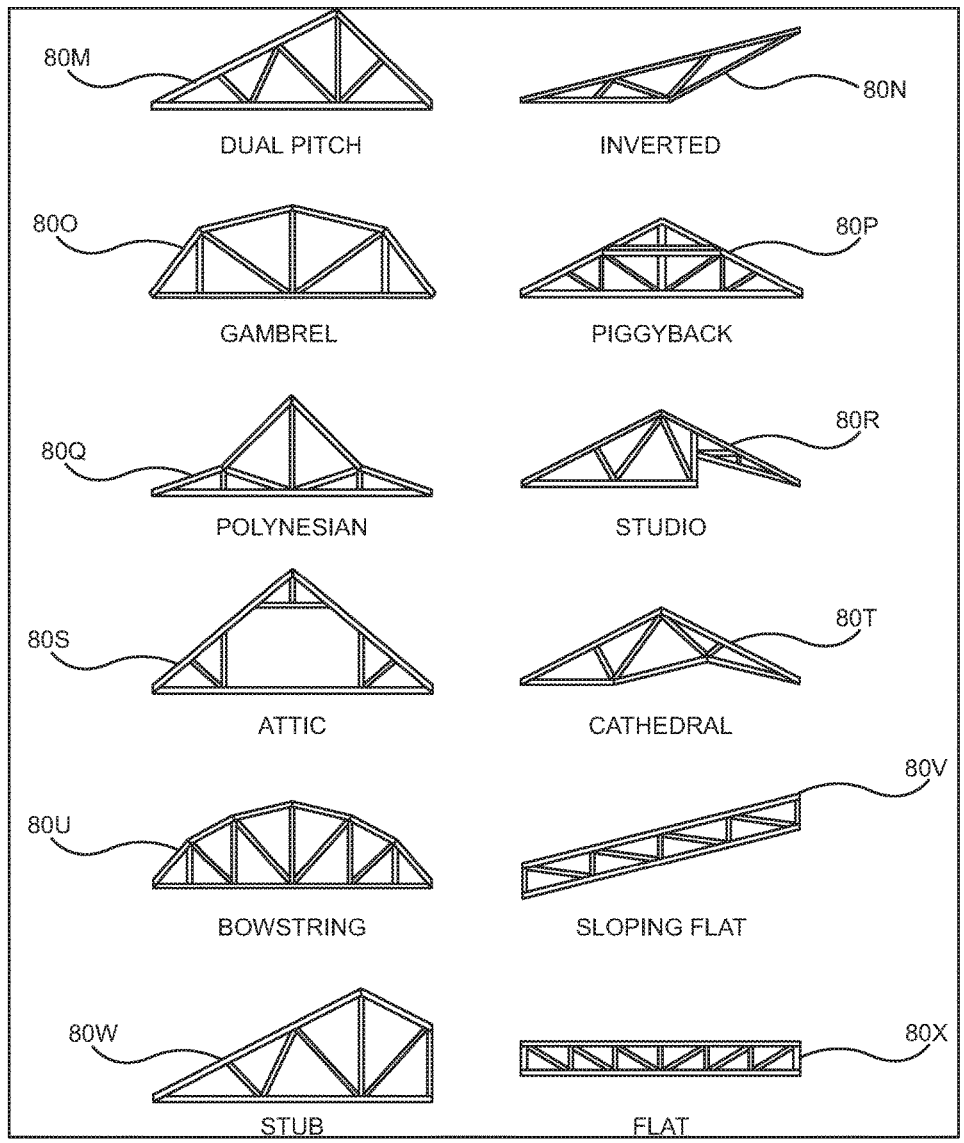

FIGS. 43A and 43B show a family of fire-protected top chord bearing (roof) structures 80 constructed in accordance with the present invention and identified, for example, by roof top truss design names, including: kingpost 80A; double fink 80B; queen post 80C; double Howe 80D; fink 80E; hip 80F; Howe 80G; scissors 80H; fan 80I; monopitch 80J; modified queenpost 80K; cambered 80L; dual pitch 80M; inverted 80N; gambrel 80O; piggyback 80P; polyensian 80Q; studio 80R; attic 80S; cathedral 80T; bowstring 80U; sloping flat 80V; stub 80W; and flat 80X. Notably, in each of these alternative top chord bearing roof truss designs, heat-resistant metal truss connector plates 10' are used to connect together sections of fire-protected CFIC-coated lumber sections in a secure manner, in accordance with the principles of the present invention, and enjoy the many benefits that such improved assembly constructions provide over the prior art.

FIG. 44 shows a schematic table illustrating the flame spread and smoke development indices obtained through testing of AAF21-treated Class-A fire-protected roof truss structure 80A through 80X produced using the method of the illustrative embodiment described in FIGS. 41 and 42, and tested in accordance with standards ASTM E84 and UL 723.

Figure 45:
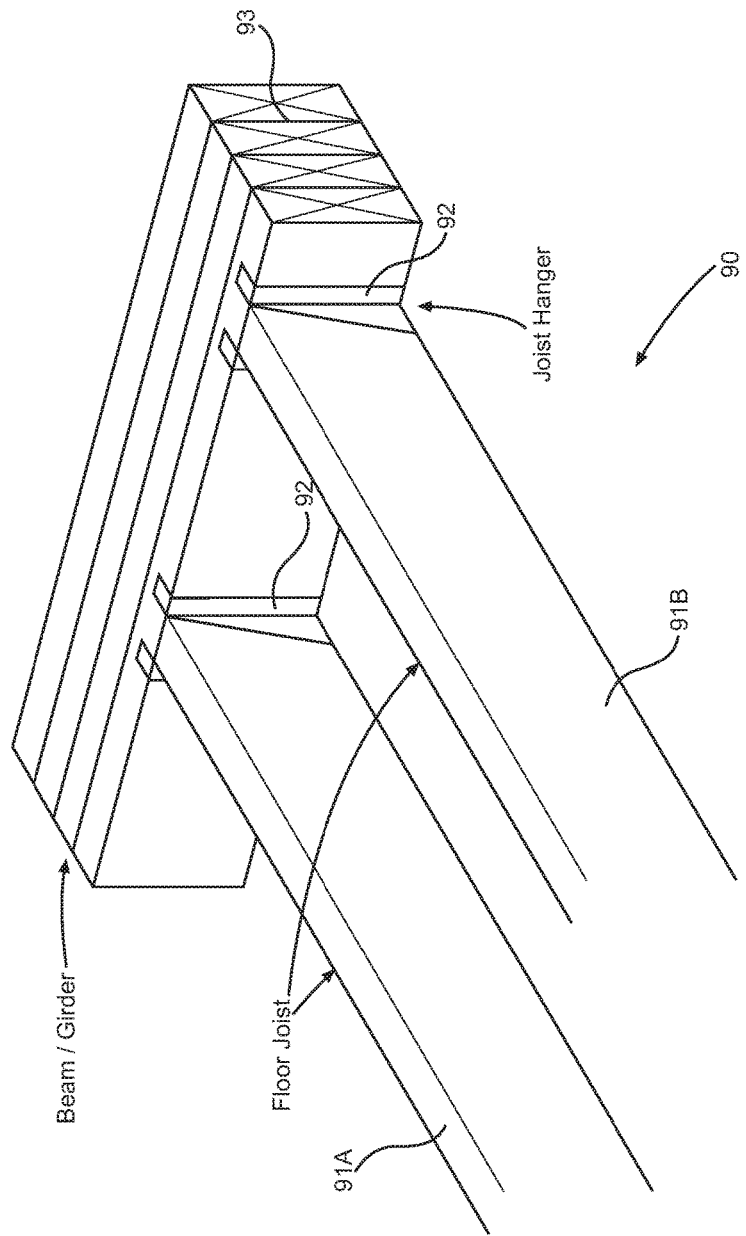
FIG. 45 is a schematic representation of a Class-A fire-protected floor joist structure of the present invention, formed using Class-A fire-protected lumber pieces connected together using heat-resistant metal joist hanger plates, for use in construction a Class-A fire-protected floor joist system enabling the construction of one-hour floor assemblies, using one layer of drywall, in long lengths (e.g. up to 40 feet), for spanning straight floor sections, and as a rim joist as well.

Specification of a Method of Producing a Class-A Fire-Protected Floor Joist Structure of the Principles of the Present Invention FIG. 45 shows a Class-A fire-protected floor joist structure of the present invention 90, formed using clean fire inhibiting chemical (CFIC) coated lumber pieces 91A, 91B, and 93 connected together using heat-resistant Dectan-coated metal joist hanger plates 92, and providing a solution to every firefighter's worse fear (i.e. sudden floor collapses due conventional I-joists and floor trusses which can fail in fire in as little as 6 minutes). The present invention provides a novel solution to this dreaded problem by providing a Class-A fire-protected floor joist system that enables the construction of one-hour floor assemblies using one layer of drywall, available in long lengths (e.g. up to 40 feet), for spanning straight floor sections, and as providing a rim joist as well.

Figure 46:
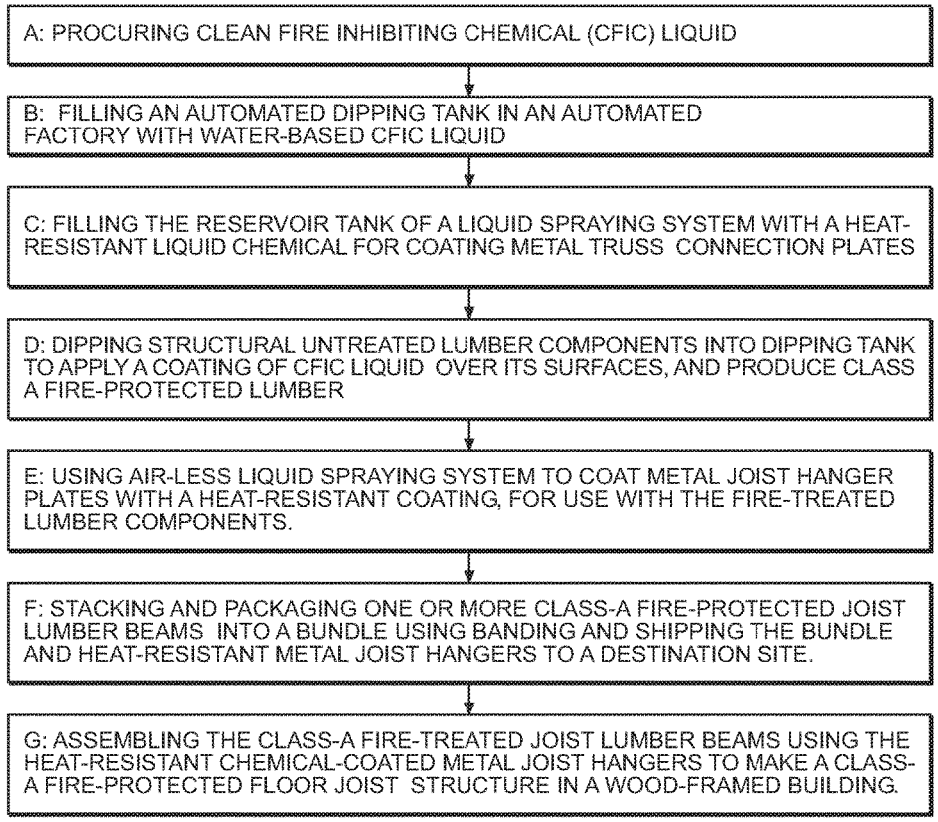
FIG. 46 is a flow chart describing the high level steps carried out when practicing the method of producing Class-A fire-protected joist structure in accordance with the present invention, comprising the steps of (i) procuring clean fire inhibiting chemical (CFIC) liquid for fire-protecting wood and lumber, (b) filling water-based CFPC liquid into a dipping tank, (c) filling the air-less liquid spraying system with heat-resistant chemical liquid, (d) dipping structural untreated lumber components into dipping tank to apply a uniform coating of clean fire inhibiting chemicals (CFIC) over all its surfaces, and allow to dry to produce Class-A fire-protected lumber, (e) using an air-less liquid spraying system to coat metal joist hangers with the heat-resistant chemical liquid, for use with the Class-A fire-protected lumber components, (f) assembling the Class-A fire-protected lumber components using heat-resistant coated metal joist hangers to make a Class-A fire-protected joist structure, and (g) stacking and packaging one or more Class-A fire-protected joist structures using banding or other fasteners and ship the package to destination site for use in construction of a wood-framed building.

FIG. 46 describes the high level steps carried out when practicing the method of producing Class-A fire-protected joist structure 90 in accordance with the present invention. As shown, the method of comprises the steps: (a) procuring clean fire inhibiting chemical (CFIC) liquid 96A (e.g. Hartindo AF21 Total Fire Inhibitor from Newstar Chemicals); (b) filling the dipping tank 96 with water-based CFIC solution 96A; (c) filling the reservoir tank 98 of a liquid spraying system with a heat-resistant chemical liquid 98A (e.g. Dectan Chemical from Hartindo Chemicatama Industri, or its distributor Newstar Chemicals of Malaysia) for coating metal truss connector plates; (d) dipping structural untreated lumber components 91A, 91B, 93 into dipping tank 96 in a high-speed manner so as to apply a coating of clean fire inhibiting chemical (CFIC) 96A over all its surfaces, wet-stacking the treated lumber, and allowing to air-dry to produce Class-A fire-protected lumber sections 91A', 91B', 93'; (e) dipping untreated structural joist lumber beams 91A', 91B', 93' into the dipping tank 96 so as to apply a uniform coating of liquid clean fire inhibiting chemicals (CFIC) 96A over all its surfaces to form a CFIC-coating or membrane all over the lumber surfaces, and allowing the CFIC-coated joist lumber beams to dry to produce Class-A fire-protected lumber sections 91A, 91B, 93; and then using the air-less liquid spraying system to coat metal joist hangers with liquid Dectan chemical 98A in the reservoir tank 98, so as to produce heat-resistant Dectan-chemical coated metal joist hangers 92, for use with the Class-A fire-protected lumber components 91A, 91B and 93; (f) stacking and packaging one or more fire-protected joist lumber beams 91A, 91B, and 93 together into a bundle, using banding or other fasteners, and with the heat-resistant metal joist hangers 92, and shipping the lumber bundle and heat-resistant metal joist hangers to destination site for use in construction wood-framed buildings; and (g) assembling the Class-A fire-protected joist lumber beams 91A, 91B and 93 using the heat-resistant Dectan-chemical coated metal joist hangers 92 to make a Class-A fire-protected joist structure 47 according to the principles of the present invention.

Figure 47:
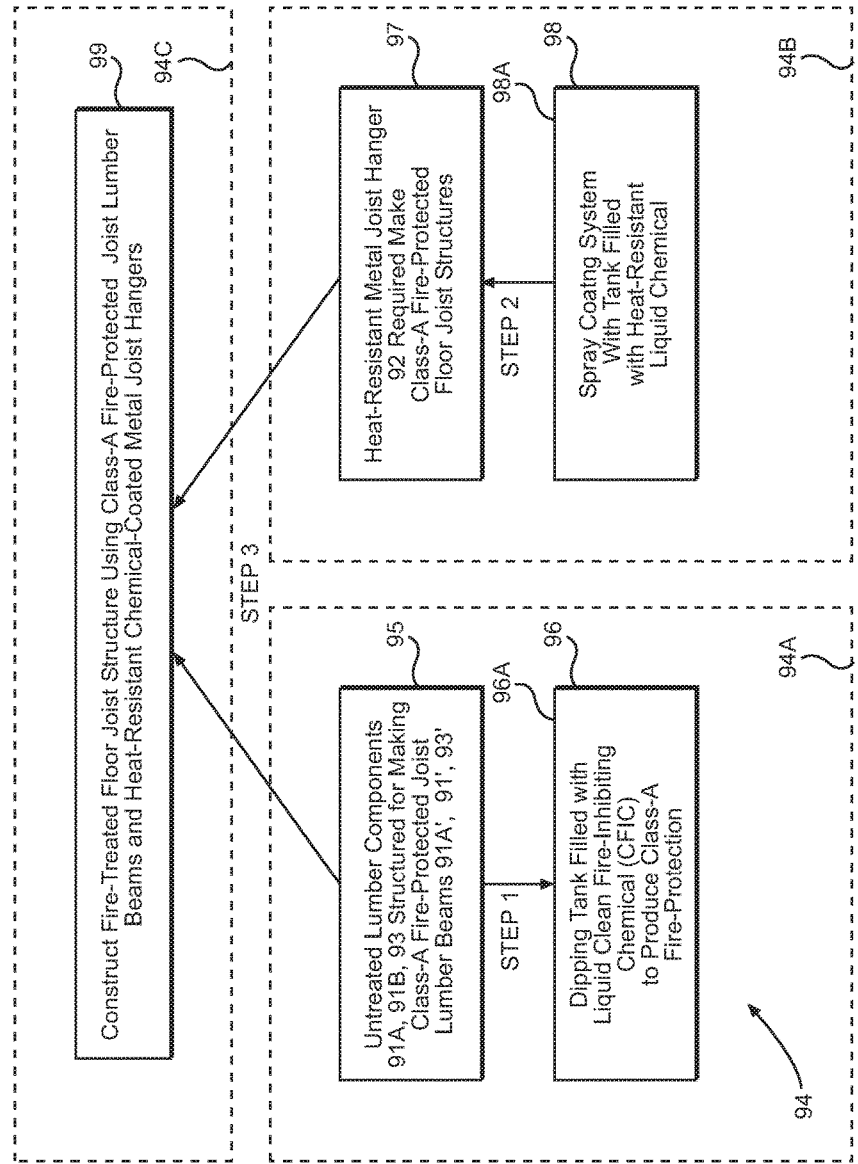
FIG. 47 is a schematic representation of a factory for making Class-A fire-protected joist structures in accordance with the principles of the present invention, comprising the components, including (a) a first stage for dipping untreated lumber components in a tank filled with liquid clean fire inhibiting chemicals (CFIC), (b) a second stage for spraying metal joist hangers with heat-resistant chemical to as to produce heat-resistant metal joist hangers, and (c) a third stage for assembling the Class-A fire-protected lumber components with the heat-resistant metal joist plates to form Class-A fire-protected joist structures.

FIG. 47 depicts a factory 94 for making Class-A fire-protected joist structures 90 in accordance with the principles of the present invention. As shown, the factory 94 comprises the components, including: (a) a first stage 94A for dipping untreated lumber components in a dipping tank 96 filled with liquid clean fire inhibiting chemicals (CFIC) 96A (e.g. Hartindo AF21 Total Fire Inhibitor from Newstar Chemicals) using automated dip-coating technology described hereinabove in FIG. 19A; (b) a second stage 94B for automated spraying metal joist hangers 92 with heat-resistant liquid Dectan chemical 98A from Hartindo Chemicatama Industri using automated spray-coating technology described hereinabove in FIG. 27B to produce heat-resistant Dectan-coated metal hanger joists 92; and (c) a third stage 94C for automated or semi-automated assembly of the Class-A fire-protected lumber components 91A, 91B together using the Dectan-coated metal joist plates 92' using automation and controls, to form Class-A fire-protected joist structures 90 according to the present invention.

FIG. 48 shows a table illustrating the flame spread and smoke development indices obtained through testing of AAF21-treated Class-A fire-protected floor joist structure 90 produced using the method of the illustrative embodiment described in FIGS. 46 and 47, and tested in accordance with standards ASTM E84 and UL 723.

Figure 49:
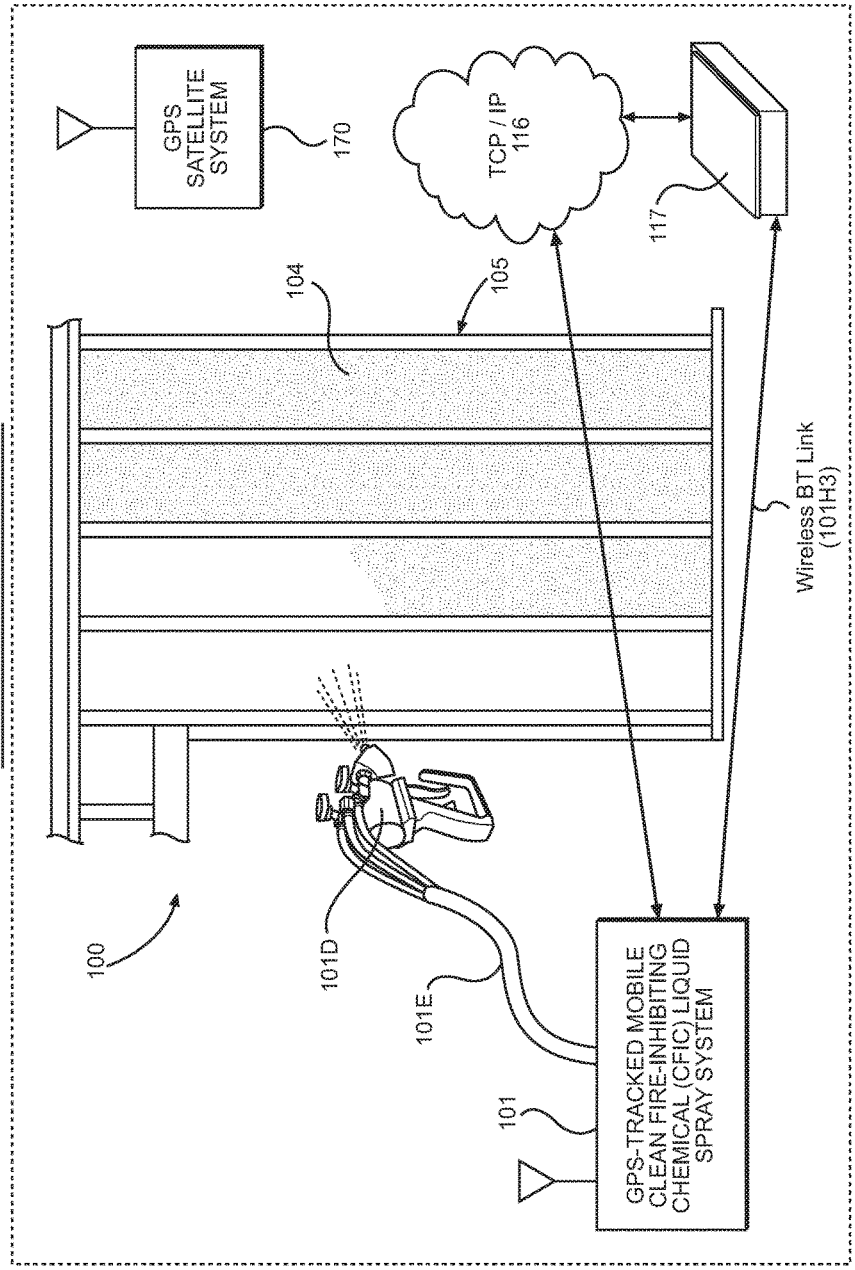
FIG. 49 is a schematic representation illustrating the method of and system for the present invention for on-job-site spray-coating clean fire inhibiting liquid chemical (CFIC) liquid over all exposed interior surfaces of raw as well as fire-treated lumber and sheathing used in a completed section of a wood-framed building during its construction phase, wherein a GPS-tracked mobile clean fire-inhibiting chemical (CFIC) liquid spraying system, and the system network illustrated in FIG. 55, are used to apply and document the spraying of a thin CFIC film or coating over all exposed interior wood surfaces, and thereby provide Class-A fire-protection over all lumber and sheathing used in the wood-framed building construction, along with a complete chain of evidence and documentation to qualify the owner of the Class-A fire-protected wood-framed building for lower causality insurance premiums, and provide local fire departments with valuable building information when fighting fires that may break out in such Class-A fire-protected wood-framed buildings.

Specification of the On-Job-Site Spray-Coating Based Method, System and Network for Class-A Fire-Protection of all Exposed Interior Surfaces of Lumber and Sheathing Used in Wood-Framed Buildings During the Construction Phase FIG. 49 illustrates an on-job-site spray coating of clean fire inhibiting chemical (CFIC) liquid all over the exposed interior surfaces of raw and treated lumber and sheathing used in a completed section of a wood-framed assemblies in a wood-framed building during its construction phase.

Figure 50:
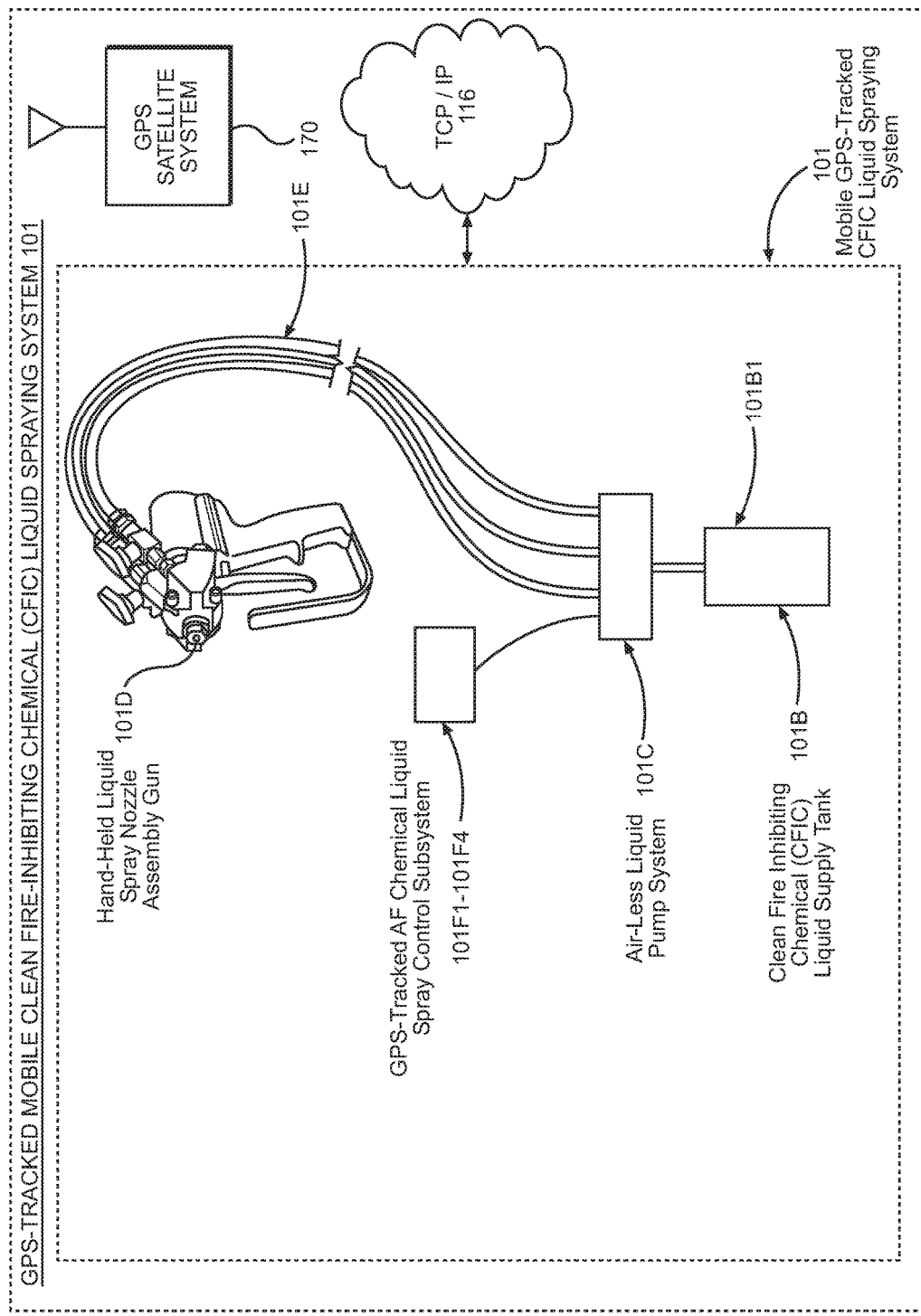
FIG. 50 is a schematic representation showing the primary components of the air-less liquid spraying system for spraying environmentally-clean Class-A fire-protective liquid coatings, comprising (i) an air-less type liquid spray pumping subsystem having a reservoir tank for containing a volume of clean fire inhibiting chemical (CFIC) liquid, (ii) a hand-held liquid spray nozzle gun for holding in the hand of a spray-coating technician, and (iii) a sufficient length of flexible tubing, preferably supported on a carry-reel assembly, if necessary, for carrying the CFIC liquid from the reservoir tank of the liquid spray pumping subsystem, to the hand-held liquid spray gun during spraying operations carried out inside the wood-framed building during the construction phase of the building project.

As shown in FIGS. 49 and 50, the primary components of the mobile GPS-tracked clean fire inhibiting chemical (CFIC) air-less liquid spraying system 100 comprises: (i) an air-less liquid spray pumping subsystem 101 including a reservoir tank 101B for containing a supply of CFIC liquid 101C (i.e. AAF31 from Hartindo Chemicatama Industri), (ii) a hand-held liquid spray nozzle gun 101D for holding in the hand of a spray coating technician, and (iii) a sufficient length of flexible tubing 101E, on a carry-reel assembly, if necessary, for carrying liquid CFIC solution from the reservoir tank 101B of the air-less liquid pumping system 101C to the hand-held liquid spray nozzle gun 101D during spraying operations carried out in the wood-framed building construction.

Figure 50A:
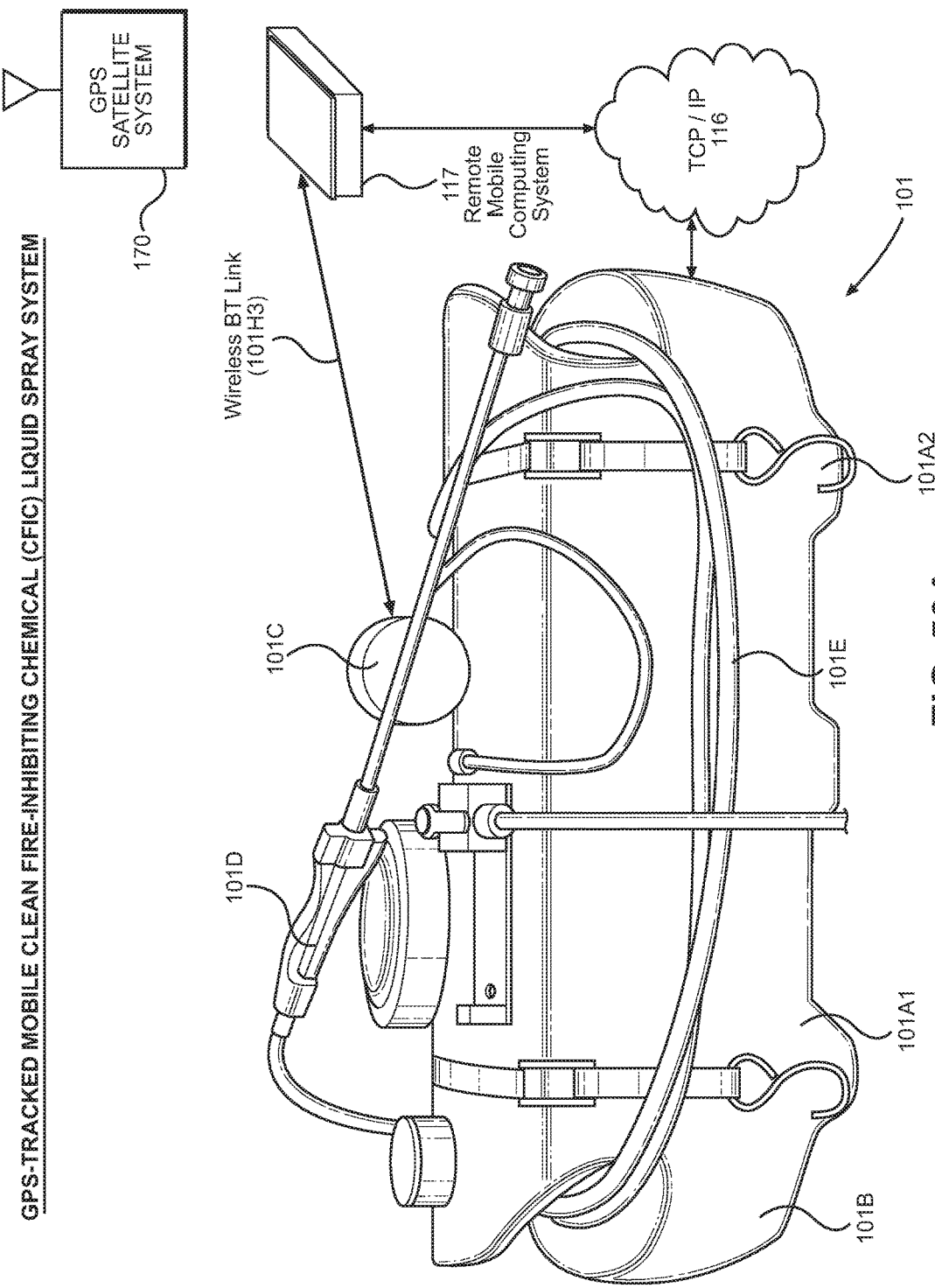
FIG. 50A is a perspective view of a mobile GPS-tracked CFIC liquid spraying system supported on a set of wheels, with integrated supply tank and rechargeable-battery operated electric spray pump, for deployment at private and public properties having building structures, for spraying the same with CFIC liquid in accordance with the principles of the present invention.

Specification of the Mobile GPS-Tracked CFIC Spraying System of the Present Invention FIG. 50A shows a mobile GPS-tracked CFIC liquid spraying system 101 supported on a set of wheels 101A, having an integrated supply tank 101B and rechargeable-battery operated electric spray pump 101C, for deployment at private and public properties having building structures, for spraying the same with environmentally-clean fire inhibiting chemical (CFIC) liquid using a spray nozzle assembly 101D connected to the spray pump 101C by way of a flexible 101E.

Figure 50B:
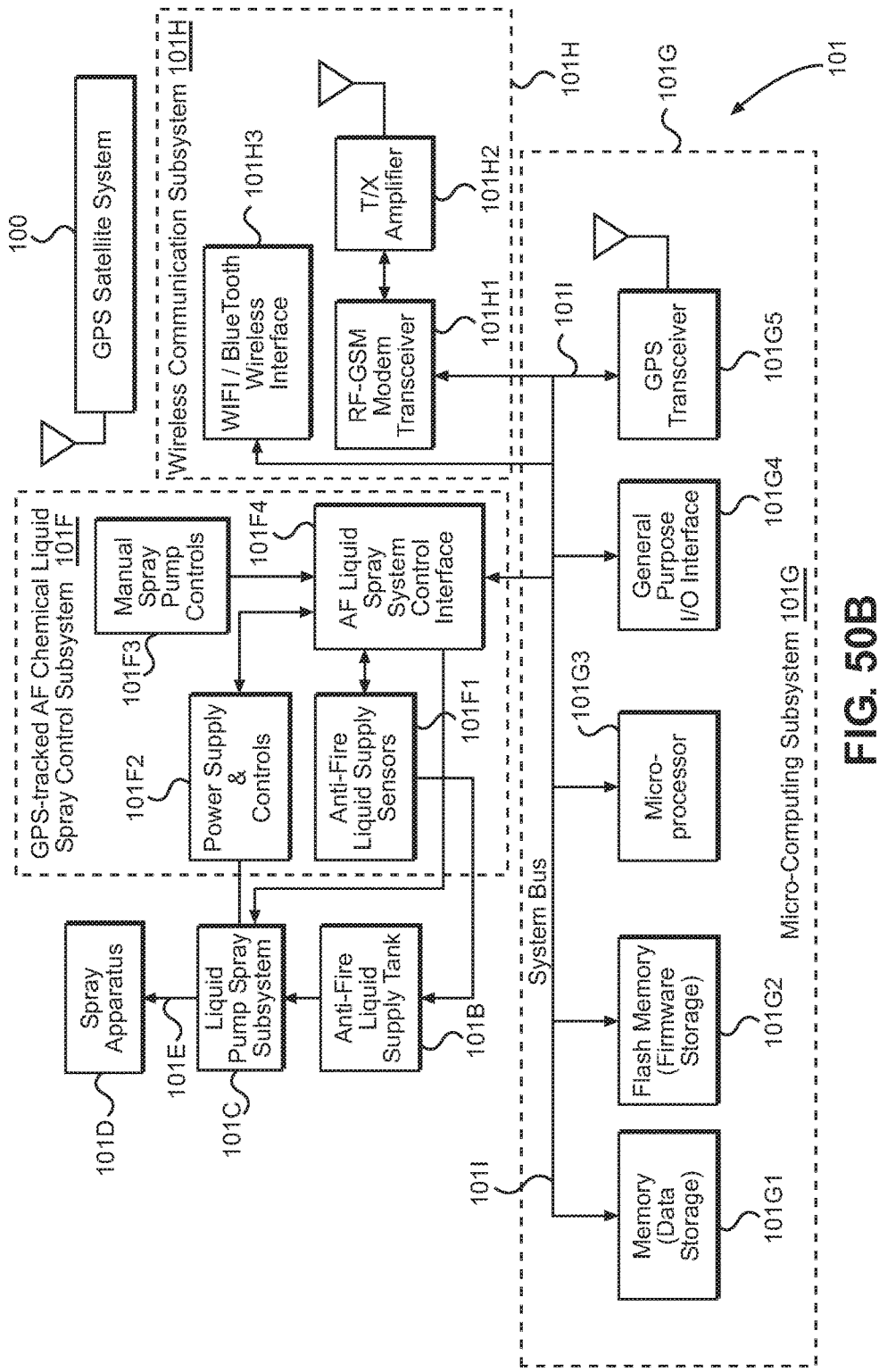
FIG. 50B is a schematic representation of the GPS-tracked mobile CFIC liquid spraying system shown in FIG. 50A, comprising a GPS-tracked and remotely-monitored CFIC liquid spray control subsystem interfaced with a micro-computing platform for monitoring the spraying of CFIC liquid from the system when located at specific GPS-indexed location coordinates, and automatically logging and recording such CFIC liquid spray application oper

FIG. 50B shows the GPS-tracked mobile anti-fire liquid spraying system 101 of FIG. 50A as comprising a number of subcomponents, namely: a GPS-tracked and remotely-monitored AF chemical liquid spray control subsystem 101F; a micro-computing platform or subsystem 101G interfaced with the GPS-tracked and remotely-monitored AF chemical liquid spray control subsystem 101F by way of a system bus 101I; and a wireless communication subsystem 101H interfaced to the micro-computing platform 101G via the system bus 201. As configured, the GPS-tracked mobile CFIC liquid spraying system 2101 enables and supports (i) the remote monitoring of the spraying of CFIC liquid from the system 101 when located at specific GPS-indexed location coordinates, and (ii) the logging of all such GPS-indexed spray application operations, and recording the data transactions thereof within a local database maintained within the micro-computing platform 101G, as well as in the remote network database 9C1 maintained at the data center 110 of the system network 109.

As shown in FIG. 50B, the micro-computing platform 101G comprises: data storage memory 2101G1; flash memory (firmware storage) 2101G2; a programmable microprocessor 2101G3; a general purpose I/O (GPIO) interface 101G4; a GPS transceiver circuit/chip with matched antenna structure 2101G5; and the system bus 1011 which interfaces these components together and provides the necessary addressing, data and control signal pathways supported within the system 101.

As shown in FIG. 50B, the wireless communication subsystem 101H comprises: an RF-GSM modem transceiver 101H1; a T/X amplifier 101H2 interfaced with the RF-GSM modem transceiver 101H1; and a WIFI and Bluetooth wireless interfaces 101H3.

As shown in FIG. 50B, the GPS-tracked and remotely-controllable CFIC liquid spray control subsystem 101F comprises: anti-fire chemical liquid supply sensor(s) 101F1 installed in or on the anti-fire chemical liquid supply tank 101B to produce an electrical signal indicative of the volume or percentage of the CFIC liquid supply tank containing CFIC liquid at any instant in time, and providing such signals to the CFIC liquid spray system control interface 101F4; a power supply and controls 101F2 interfaced with the liquid pump spray subsystem 101C, and also the CFIC liquid spray system control interface 101F4; manually-operated spray pump controls interface 101F3, interfaced with the CFIC liquid spray system control interface 101F4; and the CFIC liquid spray system control interface 101F4 interfaced with the micro-computing subsystem 101G, via the system bus 101I. The flash memory storage 101G2 contains microcode that represents a control program that runs on the microprocessor 101G3 and realizes the various GPS-specified CFIC chemical liquid spray control, monitoring, data logging and management functions supported by the system 101.

In the preferred embodiment, the CFIC liquid is preferably Hartindo AF31 Total Fire Inhibitor, developed by Hartindo Chemicatama Industri of Jakarta, Indonesia, and commercially-available from Newstar Chemicals (M) SDN. BHD of Selangor Darul Ehsan, Malaysia, http://newstarchemicals.com/products.html. When so treated, combustible products will prevent flames from spreading, and confine fire to the ignition source which can be readily extinguished, or go out by itself. In the presence of a flame, the chemical molecules in both dry and wet coatings, formed with Hartindo AF31 liquid, interferes with the free radicals (H+, OH−, O) involved in the free-radical chemical reactions within the combustion phase of a fire, and breaks these free-radical chemical reactions and extinguishes the fire's flames.

In general, any commercially-grade airless liquid spraying system may be used and adapted to construct the GPS-tracked mobile system 101 for spraying Class-A fire-protective liquid coatings on wood-framed building construction sites, and practice the method and system of the present invention, with excellent results. Many different kinds of commercial spray coating systems may be used to practice the present invention, and each may employ an electric motor or air-compressor to drive its liquid pump. For purposes of illustration only, the following commercial spray systems are identified as follows: the Xtreme XL™ Electric Airless Spray System available from Graco, Inc. of Minneapolis, Minn.; and the Binks MX412 Air-Assisted/Compressor-Driven Airless Spray System from Carlisle Fluid Technologies, of Scottsdale, Ariz.

Figure 51A:
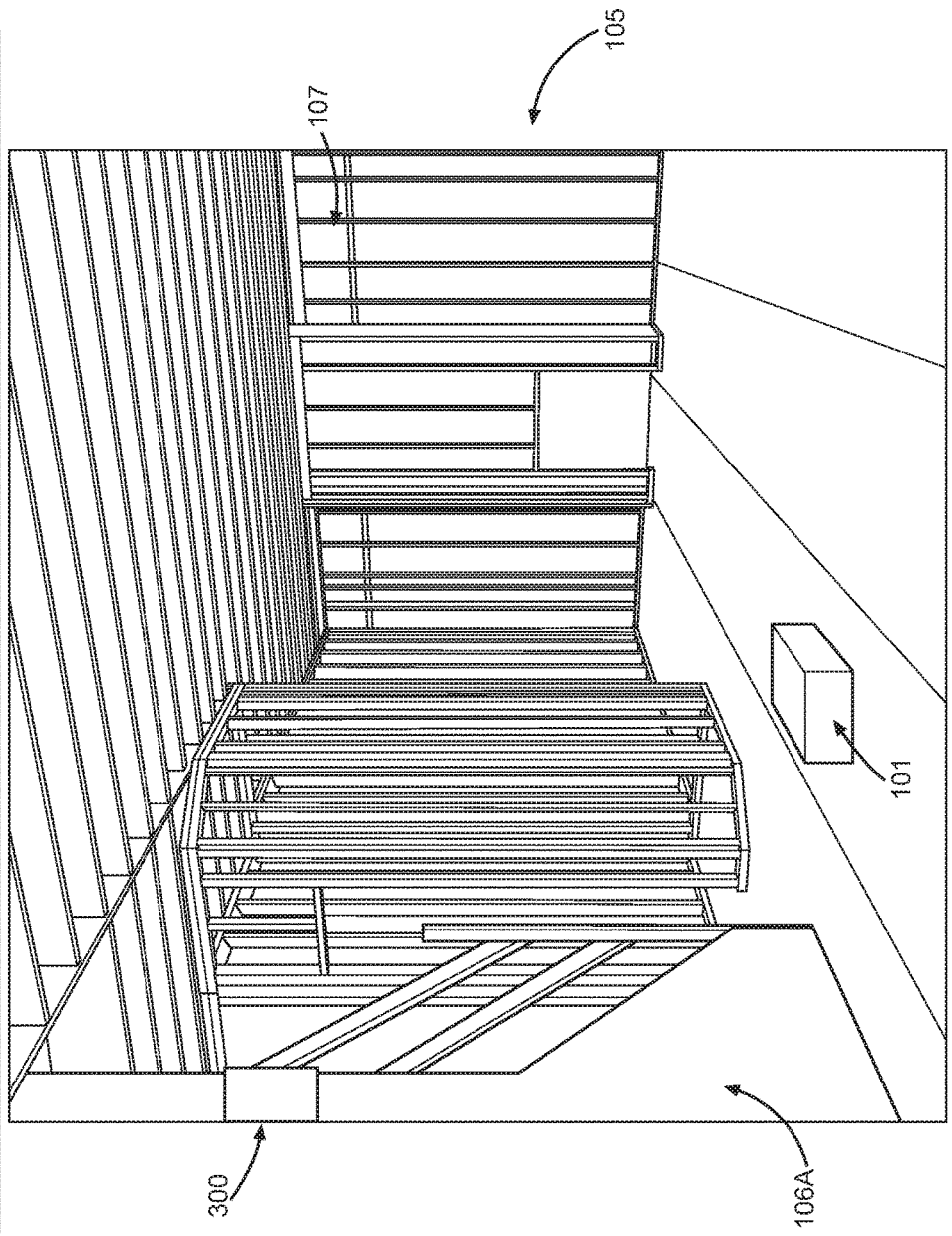
Figure 51B:
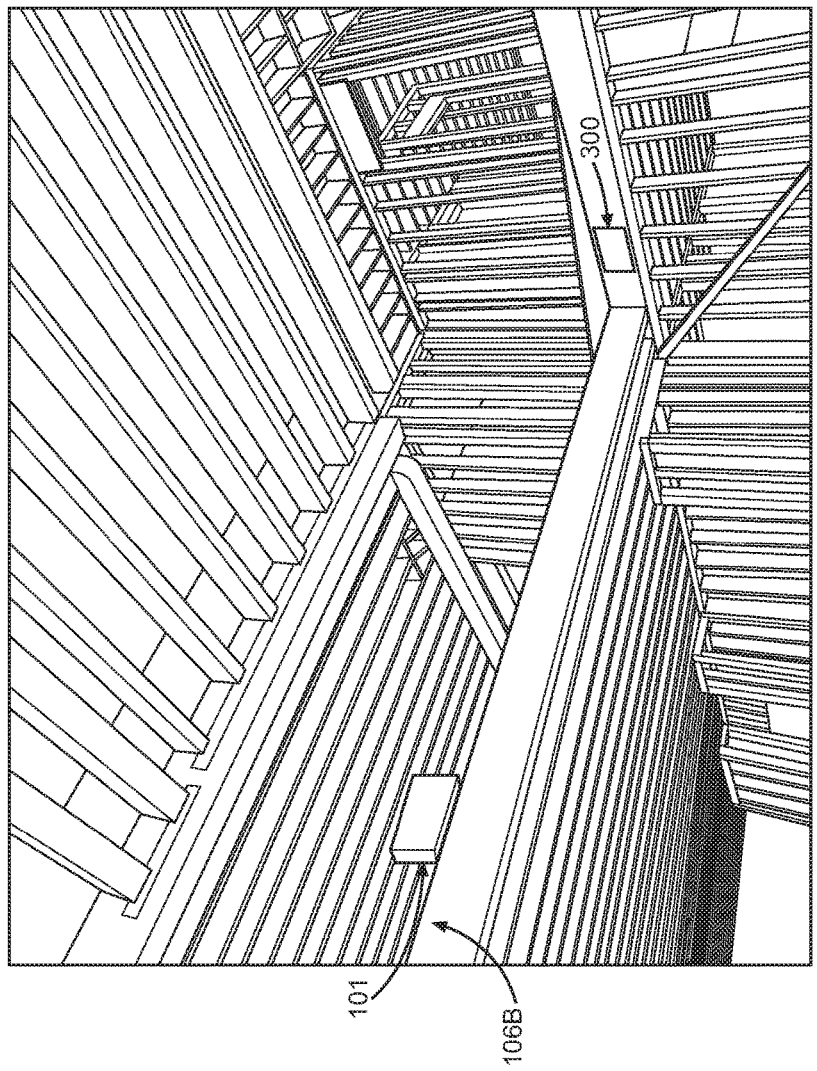

Countless on-site locations will exist having various sizes and configurations requiring the on-job-site spray-based fire-protection method of the present invention. FIG. 51A illustrates a first job-site of multi-apartment wood-framed building under construction prepared and ready for clean fire inhibiting chemical spray coating treatment in accordance with the principles of the present invention. FIG. 51B illustrates a second job-site of multi-apartment wood-framed building under construction prepared and ready for clean fire inhibiting chemical spray coating treatment in accordance with the principles of the present invention.

The on-job-site spray method and system involves spraying a clean fire inhibiting chemical (CFIC) liquid on all new construction lumber and sheathing to prevent fire ignition and flame spread. The method also recommends spraying exterior walls or the exterior face of the roof, wall and floor sheathing with CFIC liquid. The method further recommends that factory-applied fire-protective lumber be used on exterior walls, and fire-protected sheathing be used on the exterior face of the roof, wall and floor sheathing, as it offers extra UV and moisture protection. As disclosed herein, there are many different options available to architects and builders to meet such requirements within the scope and spirit of the present invention disclosed herein.

In the illustrative embodiment, Hartindo AF31 Total Fire Inhibitor (from Hartindo Chemicatama Industri of Jakarta, Indonesia http://hartindo.co.id, or its distributor Newstar Chemicals of Malaysia) is used as the CFIC liquid 101C to spray-deposit the CFIC surface coating onto treated wood/lumber and sheathing products inside the wood-framed building under construction. A liquid dye of a preferred color from Sun Chemical Corporation http://www.sunchemical.com can be added to Hartindo AF31 liquid to help the spray technicians visually track where CFIC liquid has been sprayed on wood surfaces during the method of treatment. The clinging agent in this CFIC liquid formulation (i.e. Hartindo AF31 liquid) enables its chemical molecules to cling to the surface of the CFIC-coated wood so that it is quick to defend and break the combustion phase of fires (i.e. interfere with the free radicals driving combustion) during construction and before drywall and sprinklers can offer any defense against fire. However, a polymer liquid binder, available from many manufacturers (e.g. BASF, Polycarb, Inc.) can be added as additional cling agent to Hartindo AF31 liquid, in a proportion of 1-10% by volume to 99-90% Hartindo AF31 liquid, so as to improve the cling factor of the CFIC liquid when being sprayed in high humidity job-site environments. Alternatively, liquid DecTan Chemical from Hartindo Chemicatama Industri, which contains a mixture of vinyl acrylic copolymer and tannic acid, can be used a cling agent as well when mixed the same proportions, as well as an additional UV and moisture defense on exterior applications. These proportions can be adjusted as required to achieve the cling factor required in any given building environment where the spray coating method of the present invention is being practiced. This way, in the presence of a flame, the chemical molecules in the CFIC-coating on the surface of the fire-protected lumber, interfere with the chemical reactions involving the free radicals (H+, OH−, O−) produced during the combustion phase of a fire, and break the fire's chemical reaction and extinguish its flame. This is a primary fire suppression mechanism deployed or rather implemented by the CFIC-coatings deposited on wood surfaces in accordance with the various principles of invention, disclosed and taught herein.

Figure 52A:
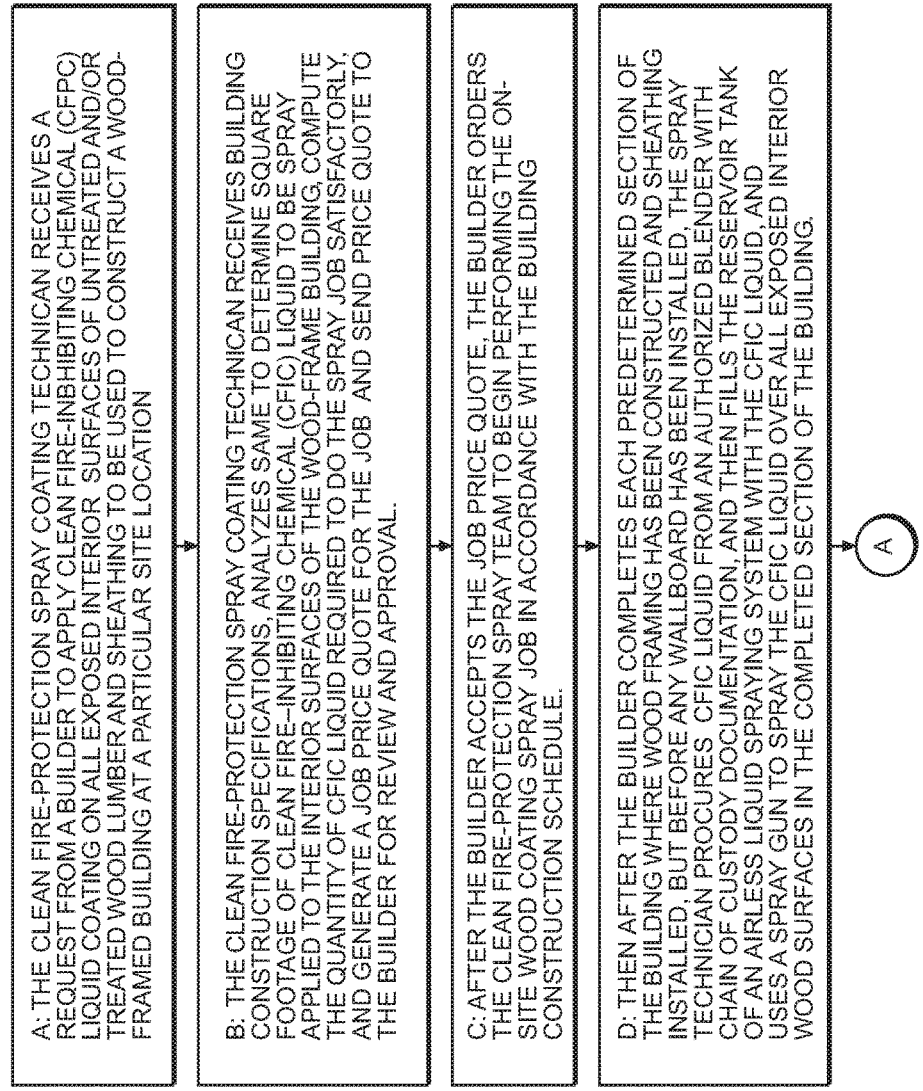
Figure 52B:
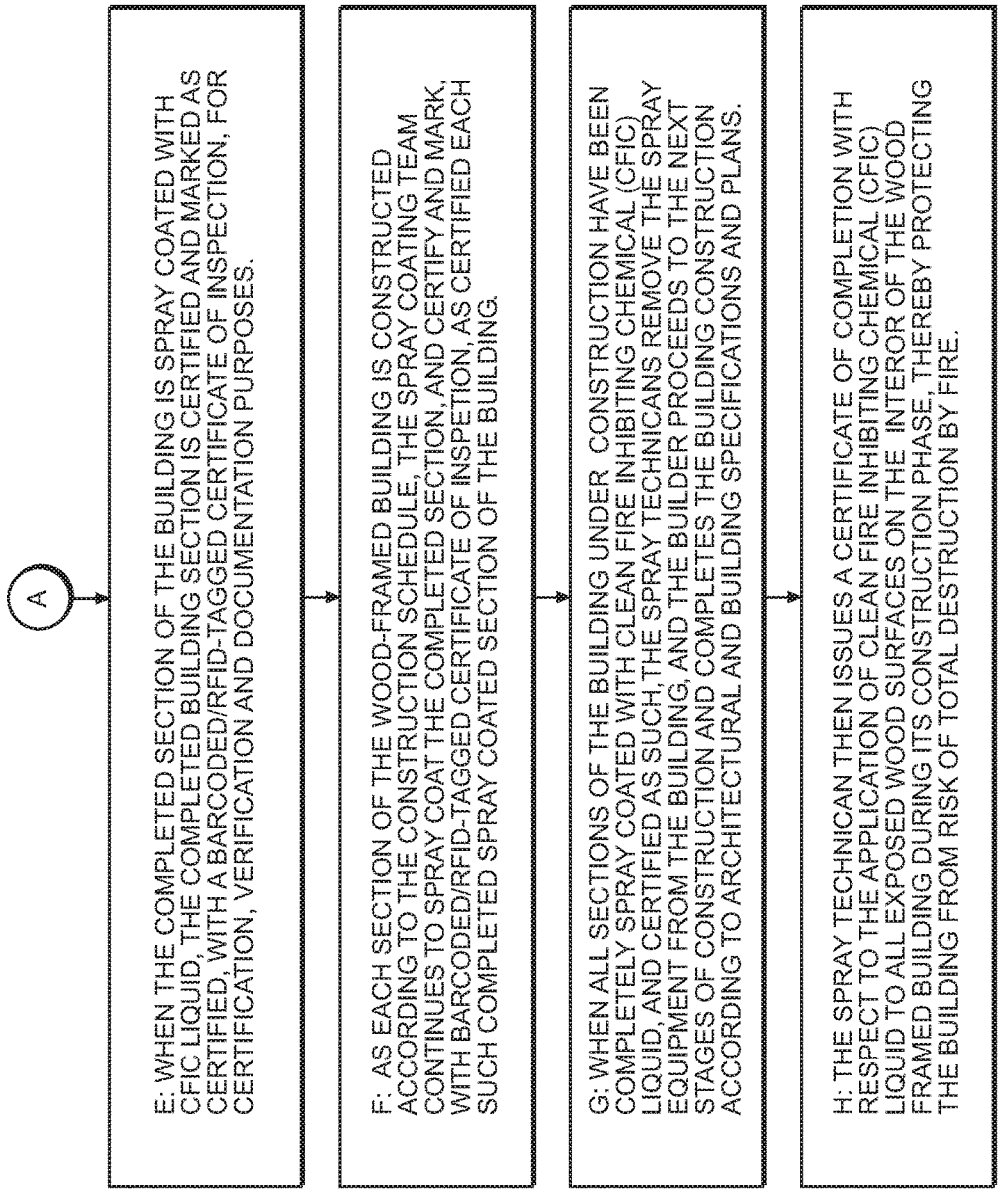

Specification of Method of Producing Multi-Story Wood-Framed Buildings Having Class-A Fire-Protection and Improved Resistance Against Total Fire Destruction FIGS. 52A and 52B, taken together, set forth a high-level for chart describing the steps carried out when practicing the method of producing multi-story wood-framed buildings having improved fire resistance rating and protection against total fire destruction. The method comprises a series of steps described below which effectively results in the coating of substantially all exposed interior wood surfaces of the raw untreated as well as fire-treated lumber and sheathing used during the construction phase of the wood-framed building, to protect and defend its wood, lumber and sheathing from ravage of fire and prevent total destruction by fire. The method recommends use of (i) the fire-protected OSB sheathing shown in FIGS. 30 through 32 and described herein for the exterior face of the roof, wall and floor sheathing, and (ii) the fire-protected lumber products shown in FIGS. 18-21, 22-25, and 26-29, and described herein for interior and exterior wall studs, trusses, sills, and other wood-frame related building structures.

The spray-coating fire-treatment process of the present invention may be carried out as follows. Spray-coating technicians (i) appear on the new construction job-site after each floor (i.e. wood-framed building section) has been constructed with wood framing and sheathing; (ii) spray liquid CFIC solution over substantially all of the exposed interior surfaces of the wood, lumber and sheathing used in the completed wood-framed building section; and then (iii) certify that each such wood-framed building section has been properly spray-coat protected with CFIC liquid chemicals in accordance with the principles of the present invention. Details of this method will be described in greater detail below in a step-by-step manner.

As indicated at Block A in FIG. 52A, the first step of the method involves fire-protection spray-coating technician to receives a request from a builder to spray a clean fire inhibiting chemical (CFIC) liquid coating over substantially all exposed interior surfaces of the untreated and/or treated wood lumber and sheathing used to construct a completed wood-framed section of a building under construction at a particular site location. This order could come in the form of a written work order, and email message, or other form of communication, with appropriate documentation.

As indicated at Block B in FIG. 52A, the second step of the method involves the fire-protection spray-coating technician (i) receiving building construction specifications from the builder, architect and/or building owner, (ii) analyzing same to determine the square footage of clean fire inhibiting chemical (CFIC) liquid coating to be spray applied to the interior surfaces of the wood-frame building, (iii) computing the quantity of clean fire inhibiting chemical material required to do the spray job satisfactorily, and (iv) generating a price quote for the spray job and sending the quote to the builder for review and approval.

As indicated at Block C in FIG. 52A, the third step of the method involves, after the builder accepts the price quote, the builder orders the clean fire-protection spray team to begin performing the on-site wood coating spray job in accordance with the building construction schedule.

As indicated at Block D in FIG. 52A, the fourth step of the method involves, after the builder completes each completed section of wood framing with wood sheathing installed, but before any wallboard has been installed, the spray technician (i) procures a supply of clean fire-protection chemicals (CFIC) liquid solution, (ii) fills the reservoir tank of an airless liquid spraying system with the supply of CFIC liquid, and (iii) then uses a spray gun to spray CFIC liquid in the reservoir tank, over all exposed interior wood surfaces of the completed section of the wood-framed building under construction. FIGS. 49 and 50 show an air-less liquid spraying system 101 for spraying CFIC liquid over all exposed interior surfaces of lumber and wood sheathing used in a completed section of the wood-framed building under construction, so as to form a Class-A fire-protective coating over such treated surfaces.

Figure 53:
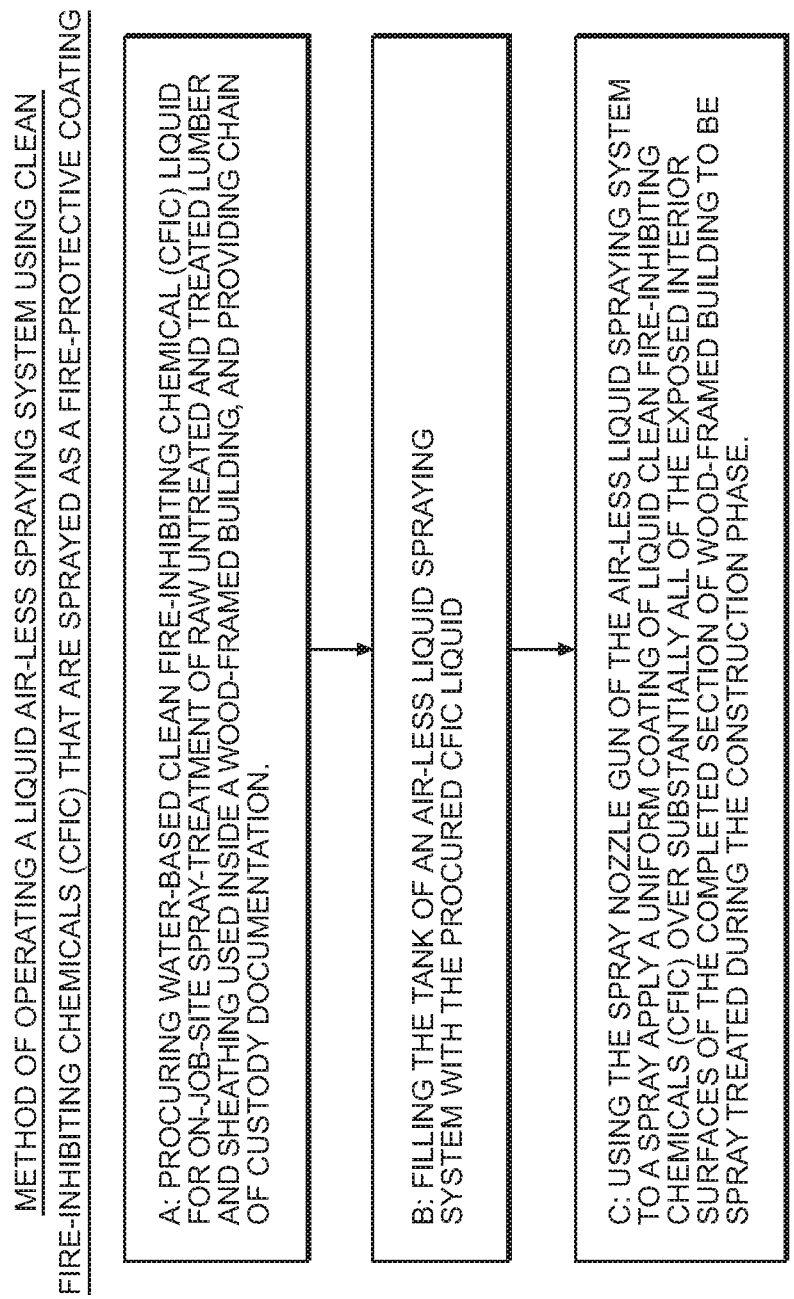

As indicated at Block A in FIG. 53, the first stage of this step involves procuring water-based CFIC liquid for on-job-site spray-treatment of raw untreated and treated lumber and sheathing used inside a wood-framed building. In the preferred embodiment, Hartindo AF31 from Hartindo Chemicatama Industri (and available from its distributor Newstar Chemical of Malaysia) is used as the CFIC liquid employed by the method of the present invention. Hartindo AF31 CFIC is an environmentally-friendly water-based, biodegradable and non-toxic solution that is non-ozone depleting and does not require cleanup procedures after usage. Hartindo AF31 CFIC is also effective for all classes of fires: involving solid, carbonaceous materials; flammable fuels, thinners, etc.; gas, electricity fires, and energy fires; and metal fire and oxidizing fires.

As indicated at Block B in FIG. 53, the second stage of this step involves filling the tank of the air-less liquid spraying system 101 with the procured supply of CFIC liquid.

As indicated at Block C in FIG. 53, the third stage of this step involves using the spray nozzle gun 103 of the air-less liquid spraying system 101 as shown in FIGS. 49 and 50, to a spray apply a uniform coating of liquid clean fire inhibiting chemical (CFIC) liquid over all of the interior surfaces of the completed section of wood-framed building being spray treated during the construction phase of the building, in accordance with the principles of the present invention. In the illustrative embodiment, the liquid CIFC (i.e. Hartindo AF31) is applied at a rate (i.e. coating coverage density) of about 590 square feet per gallon, although it is understood that this rate may vary from illustrative embodiment, to illustrative embodiment.

The CFIC liquid used in the present invention clings to the wood on which it is sprayed, and its molecules combine with the (H+, OH−, O−) free radicals in the presence of fire, during combustion, to eliminate this leg of the fire triangle so that fire cannot exist in the presence of such a CFIC based coating.

FIGS. 51A and 51B shows a few illustrative examples of building construction job site locations where the spray-based fire protective method of the present invention might be practiced with excellent results. It is understood that such examples are merely illustrative, and no way limiting with regard to the present invention.

As indicated at Block E in FIG. 52B, during the fifth step of the method, when the completed section of the building has been spray coated with clean fire inhibiting chemical (CFIC) liquid, the completed building section is certified and marked as certified for visual inspection and insurance documentation purposes. Such marking can involving stamping a CFIC spray-coated sheath, or lumber board, with a seal or certificate using an indelible ink, with date, job ID #, sprayer #, and other information related to specific spray-coat fire-protection job that have been certified as a completed at that wood-framed building section. Preferably, the architectural plans for the building, as well as building schematics used on the job site, will have building section identification numbers or codes, which will be used on the certificate of completion stamped onto the spray-coated fire-protected sheathing and lumber on the job site.

As part of the certification process, an on-job-site spray project information sheet is maintained in an electronic database system, connected to a wireless portable data entry and record maintenance system. The on-job-site spray project information sheet would contain numerous basic information items, including, for example: Date; Customer Name; Weather Description and Temperature; Building Address; Customer Address: Customer Supervisor; Units of Part of the Building Sprayed; Sprayer Used; Spray Technician Supervisor; and Notes. Photographic and video recordings can also be made and stored in a database as part of the certification program, as will be described in greater detail below.

As indicated at Block F in FIG. 52B, during sixth step of the method, as each section of the wood-framed building is constructed according to the construction schedule, the spray coating team continues to spray coat the completed section, and certify and mark as certified each such completed spray coated section of the building under construction.

As indicated at Block G in FIG. 52B, during the seventh step of the method, when all sections of the building under construction have been completely spray coated with clean fire inhibiting chemical (CFIC) materials, suppressing fire ignition and suppression by capturing free radicals (H+, OH−, O−) during the combustion phase, and certified as such, the spray technicians remove the spray equipment from the building, and the builder proceeds to the next stages of construction and completes the building construction according to architectural and building plans and specifications.

As indicated at Block H in FIG. 52B, during the eighth step of the method, the spray technician then issues a certificate of completion with respect to the application of clean fire-protection chemicals to all exposed wood surfaces on the interior of the wood-framed building during its construction phase, thereby protecting the building from risk of total destruction by fire. Preferably, the certificate of completion should bear the seal and signature of a professional engineer (PE) and the building architect who have been overseeing and inspecting the building construction project.

As indicated at Block I in FIG. 52B, during the ninth step of the method, before applying gypsum board and/or other wall board covering over the fire-protected spray-coated wood-framed building section 105, digital photographs and/or videos are captured and collected to visually show certificates of completion stamped or otherwise posted on spray-coated fire-protected sheeting and/or lumber used in the wood framing of each completed building section. Such photographs and videos will provide valuable visual evidence and job-site completion documentation, required or desired by insurance companies and/or government building departments and/or safety agencies.

As indicated at Block J in FIG. 52B, during the tenth step of the method, uploading captured digital photographs and videos collected during Block I, to a centralized web-based information server (111, 113) maintained by the fire-protection spray coating technician company, or its agent, as a valued-added service provided for the benefit of the builder, property owner and insurance companies involved in the building construction project.

As indicated at Block K in FIG. 52B, during the eleventh step of the method, all photographic and video records collected during Block I, and uploaded to the centralized web-based information server (111, 113) at Block J are automatically archived indefinitely for best practice and legal compliance purposes.

Figure 54:
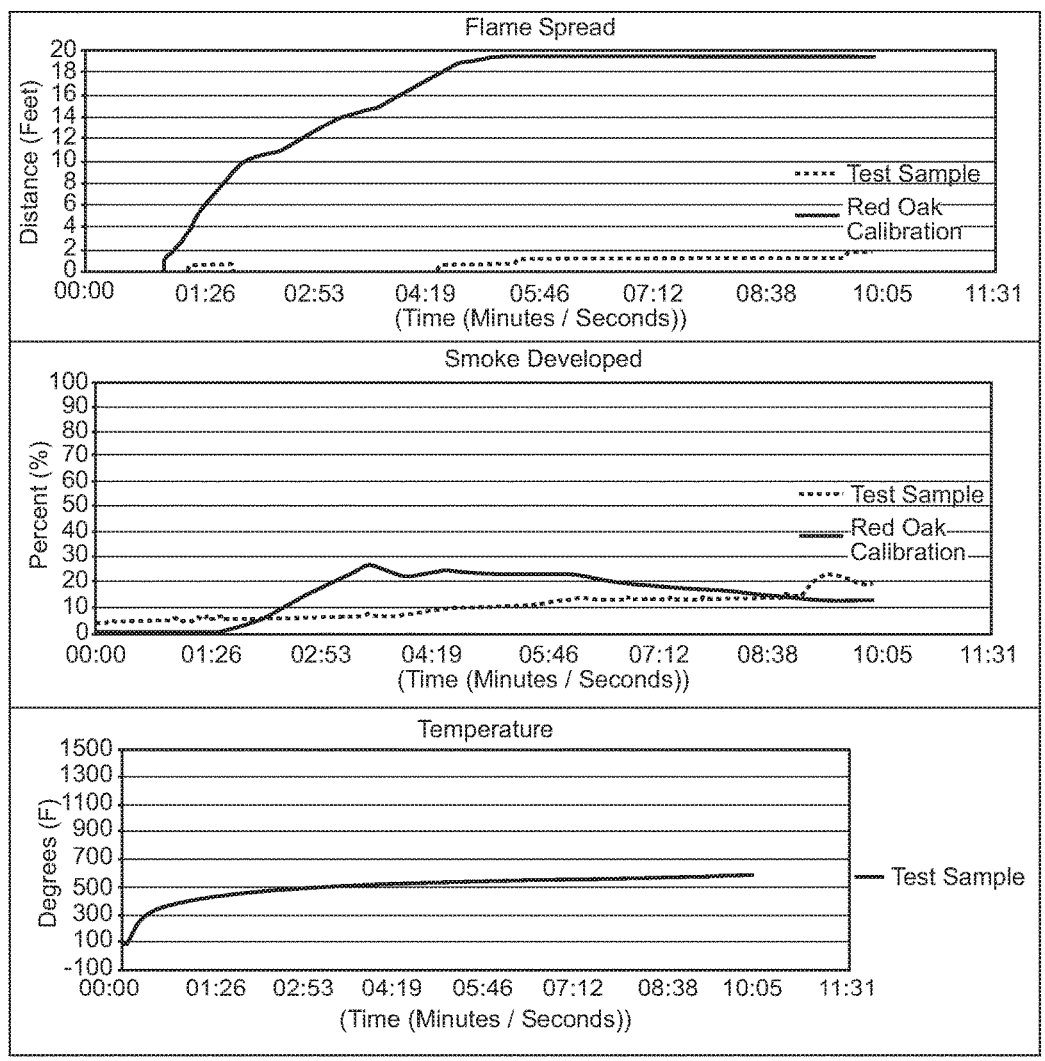

FIG. 54 shows a schematic table representation illustrating the flame spread and smoke development indices obtained through testing of on-job-site Hartindo AF31 spray-treated lumber and sheathing produced using the method of the illustrative embodiment described in FIGS. 49 through 53, in accordance with ASTM E2768-1.

Advantages and Benefits of the On-Job-Site Method of Wood-Treatment and Fire-Protection by Way of Spray Coating of CFIC Liquid Over the Surface of Exposed Interior and Exterior Wood Used in Wood-Framed Buildings The on-site spray coating method of the present invention described above involves the use of CFIC liquid having the property of clinging onto the surface of the wood to which it is applied during on-job-site spray-coating operations, and then inhibiting the ignition of a fire and its progression by interfering with the free-radicals (H+, OH−, O−) involved in the combustion phase of any fire. Hartindo AF31 liquid fire inhibitor meets these design requirements.

In general, CFIC liquids that may be used to practice the on-site fire-protection method of the present invention suppresses fire by breaking free radical (H+, OH−, O−) chemical reactions occurring within the combustion phase of fire, quickly and effectively suppressing fire in a most effective manner, while satisfying strict design requirements during the construction phase of a wood-framed building construction project. At the same time, the spray-based method of wood treatment and fire-protection will not degrade the strength of the wood materials (i.e. Modulus of Elasticity (MOE) and the Modulus of Rupture (MOR)) when treated with the CFIC-based liquid spray chemicals applied during the method of treatment.

The on-site wood lumber/sheathing spraying method of the present invention overcomes the many problems associated with pressure-treated fire retardant treated (FRT) lumber, namely: "acid hydrolysis" also known as "acid catalyzed dehydration" caused by FRT chemicals; significant losses in the Modulus of Elasticity (MOE), the Modulus of Rupture (MOR) and impact resistance of pressure-treated wood.

Internet-Based Cloud-Based System for Verifying and Documenting Class-A Fire-Protection Treatment of a Wood-Framed Building Using On-Site Spraying of a Clean Fire Inhibiting Chemical (CFIC) Liquid FIG. 55 shows Internet-based (i.e. cloud-based) system 100 for verifying and documenting Class-A fire-protection treatment of a wood-framed building using on-site spraying of a clean fire inhibiting chemical (CFIC) liquid, as described in FIGS. 49 through 54, comprising: (i) a data center 110 with web servers 111, application servers 112 and database servers 113, with SMS servers 114 and email message servers 115, each operably connected to the TCP/IP infrastructure 114 of the Internet 116 for supporting a web-based site for hosting images/videos of certificates of completion 119 stamped or printed on spray-treated wood surfaces, at registered inspection checkpoints, often with other certification documents; and (ii) mobile computing systems 117 (117A, 117B, 117C) (e.g. smart-phones such as the Apple iPhone and Samsung Android phone) with either a mobile application 120 installed, and a web-browser application, as discussed further hereinafter.

In the preferred embodiment, each mobile computing system 117 is configured for: (i) capturing digital photographs and video recordings of completed spray-treated wood-framed sections with barcoded/RFID-tagged certificates of inspection 300 posted in buildings under construction 118 (118A, 118B, 118C), as illustrated in FIGS. 51A and 51B, upon completion of the on-site fire-protection spray process at specific building sections; (ii) recording notes and averments by the spray technicians who applied the CFIC liquid spray and supervisors who supervised the same; and (iii) uploading such time-date-stamped digital audio-video (AV) recordings and 121 to the servers 111, 112, 113 in the data center 110, providing documented evidence of barcoded/RFID-tagged certificates of inspection (at inspection checkpoints) 300 stamped/printed or otherwise posted on the surfaces of sprayed wood surfaces, for each fire-protection spray-treatment project, so that insurance companies, builders, and other stakeholders (who are registered users of the system) can access and review such on-site spray completion certifications during and after the construction phase of a wood-framed building, for various purposes.

As shown in FIG. 55, the system network 100 also includes a GPS satellite system 170 for transmitting GPS reference signals transmitted from a constellation of GPS satellites deployed in orbit around the Earth, to GPS transceivers installed aboard each GPS-tracking mobile image capturing and computing system 117, as part of the illustrative embodiments. From the GPS signals it receives, each GPS transceiver is capable of computing in real-time the GPS location of its host system, in terms of longitude and latitude. In the case of the Empire State Building in NYC, N.Y., its GPS location is specified as: N40° 44.9064', W073° 59.0735'; and in number only format, as: 40.748440, −73.984559, with the first number indicating latitude, and the second number representing longitude (the minus sign indicates "west").

Figure 56A:
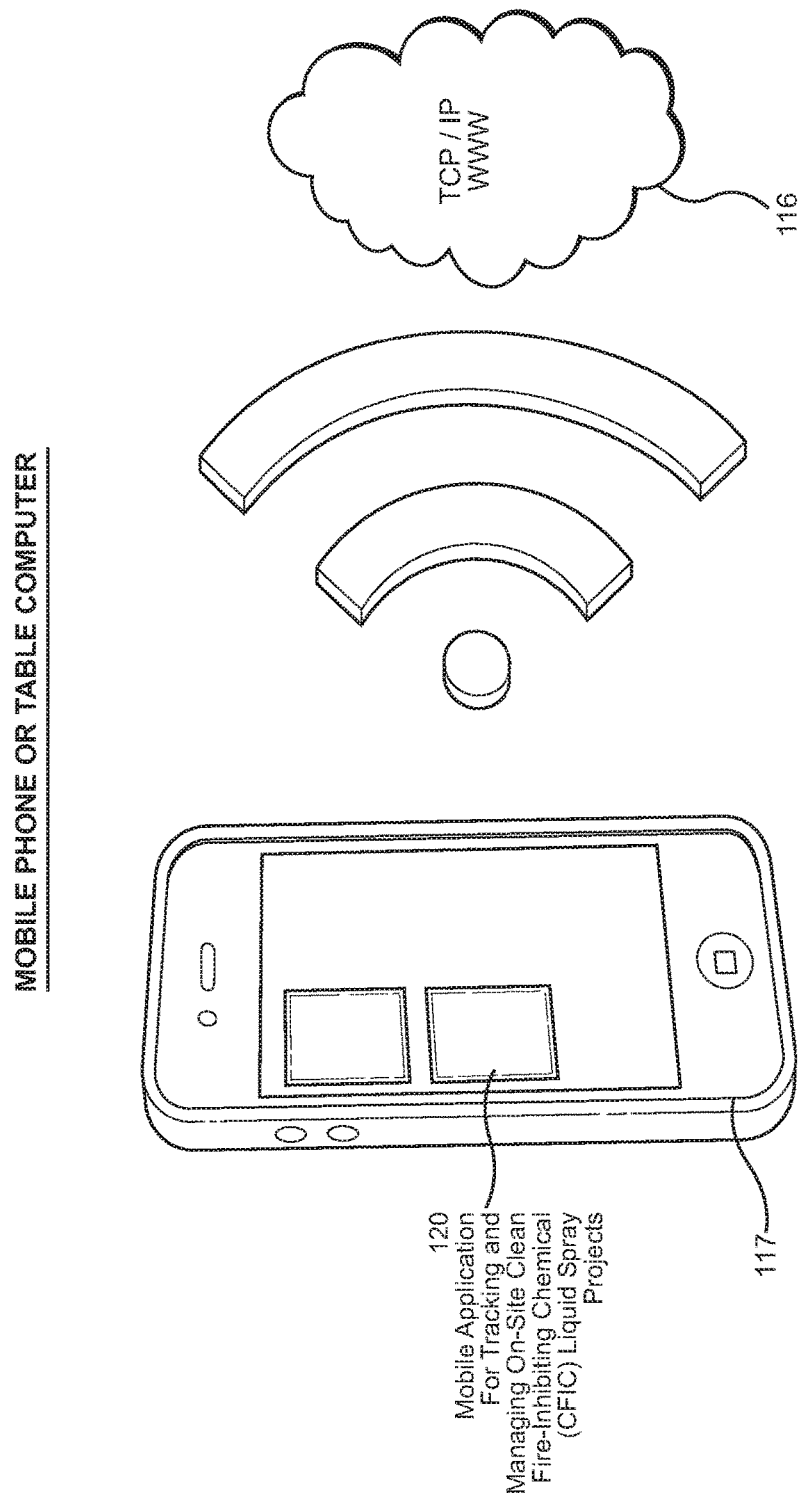

FIG. 56A shows the mobile client computing system 117 (117A, 117B, 117C) deployed on the system network 100 shown in FIG. 55, supporting the mobile application 120 installed on each mobile computing system 117. The purpose of the mobile application 120 is to provide the mobile computing system 117 with a convenient tool for tracking and managing projects involving on-site clean fire inhibiting chemical (CFIC) liquid spray treatment of wood-framed buildings during the construction phase, and the logistics associated therewith, to ensure the provision of Class-A fire-protection of all exposed interior wood surfaces in the wood-framed building. All stakeholders (e.g. building owners, architects, builders, property insurance underwriters, local fire departments and firemen, and others such as project coordinators, spray technicians, site superintendents, site spray managers and others who are involved in the logistics, management and application of CFIC liquid spray onto and over all exposed interior surfaces of the building) will benefit from the system network 100 and its deployed mobile application 120, and the services it supports across the enterprise.

Using the custom-designed mobile application 120, property/building owners, architects, builders, insurance companies and other stakeholders can (i) track the progress being made while a wood-framed building is being spray-treated with CFIC liquid during the construction project schedule, and (ii) review all collected pdf documents, digital images and audio-video recordings collected as visual evidence of "certificates of completion" by trained personnel, at predetermined inspection checkpoints in the wood-framed building, during the course of the construction project.

The purpose of such digital evidence, collected on-site at each inspection checkpoint and remotely stored in the network database 113A, is to verify and document proper application of CFIC liquid spray to each indexed inspection checkpoint designated at the commencement of the Project, and located throughout the interior of the wood-framed building to ensure that 100% of all exposed interior surfaces within the wood-framed building have been provided with Class-A fire-protection.

Preferably, each inspection checkpoint will be identified by Project ID # with a unique coding to identify the Building #, Floor #, Section #, and optionally Panel # at which the inspection checkpoint is located, and where certificates of completion (for the specified section) will be stamped, signed and AV-recorded, and actual wood samples sprayed with CFIC liquid at the time of the certified spray application are AV-recorded and collected and archived for verification and documentation purposes. The AV-recording of certifications made at each registered inspection checkpoint in the wood-framed building should help to ensure that Class-A fire-protected wood-samples will be available in the future in the event there might be a need to investigate the Class-A fire-protection spray treatment process.

Specification of the Network Architecture of the System Network of the Present Invention FIG. 55 illustrates the network architecture of the system network of the present invention 135 for the case where the system of the present invention is implemented as a stand-alone platform deployed on the Internet.

As shown in FIG. 55, the Internet-based system network comprises: cellular phone and SMS messaging systems 122A; email servers 122B; a network of mobile computing systems 117 (117A, 117B) running enterprise-level mobile application software; and one or more industrial-strength data center(s) 110, preferably mirrored with each other and running Border Gateway Protocol (BGP) between its router gateways.

As shown in FIG. 55, each data center 110 comprises: a cluster of communication servers 111 for supporting http and other TCP/IP based communication protocols on the Internet (and hosting Web sites); a cluster of application servers 112; a cluster of RDBMS servers 113 configured within a distributed file storage and retrieval ecosystem/system, and interfaced around the TCP/IP infrastructure of the Internet well known in the art; an SMS gateway server 114 supporting integrated email and SMS messaging, handling and processing services that enable flexible messaging across the system network, supporting push notifications; and a cluster of email processing servers 115.

Referring to FIG. 55, the cluster of communication servers 111 is accessed by web-enabled clients (e.g. smart phones, wireless tablet computers, desktop computers, computer workstations, etc) 117 (117A, 117B) used by stakeholders accessing services supported by the system network. The cluster of application servers 112 implement many core and compositional object-oriented software modules supporting the system network 100. The cluster of RDBMS servers 113 use SQL to query and manage datasets residing in its distributed data storage environment.

Figure 58:
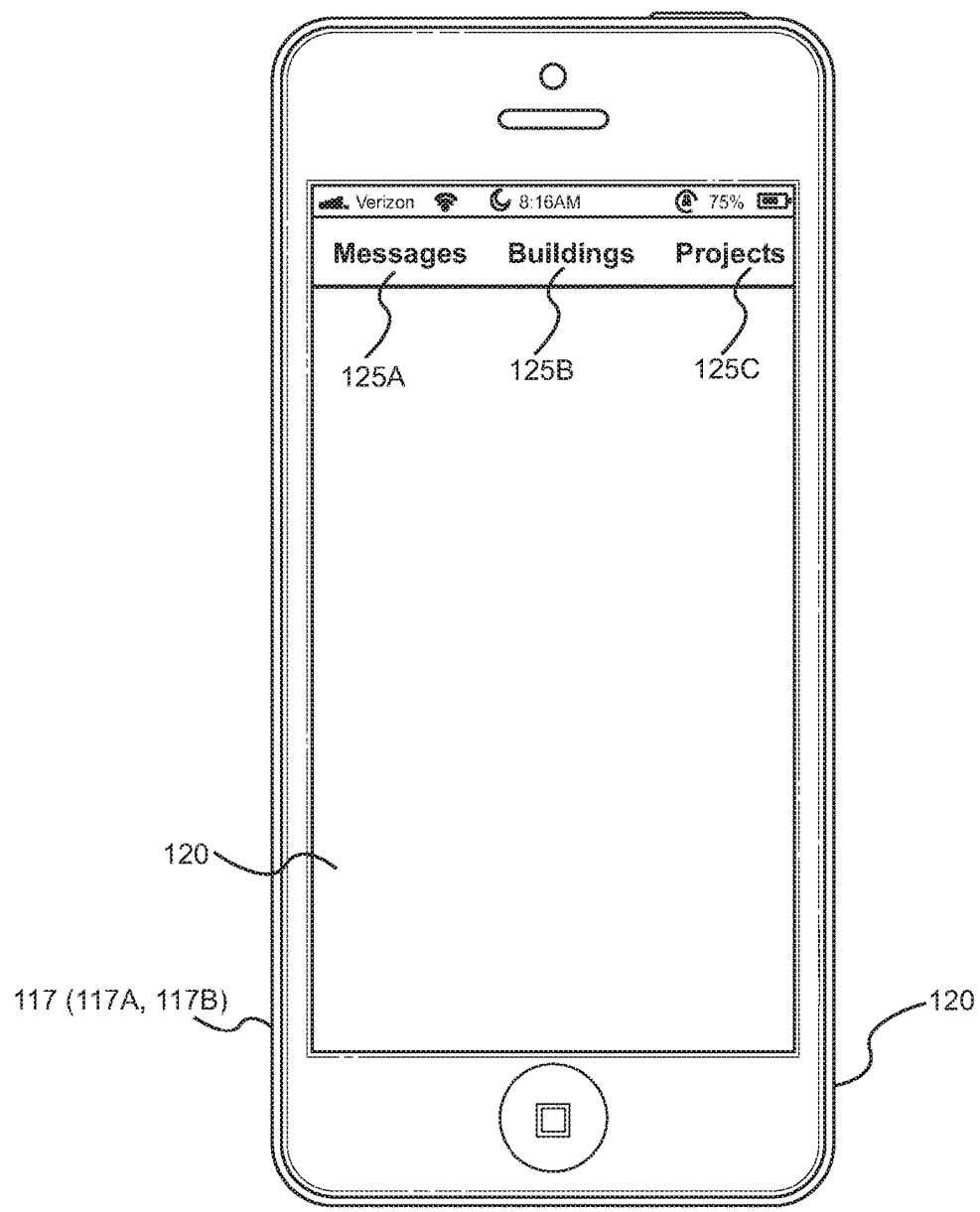
FIG. 58 is an exemplary wire frame model of a graphical user interface of a mobile application configured for use by building/property owners, insurance companies, and other stakeholders, showing a menu of high-level services supported by the system network of the present invention.
Figure 59:
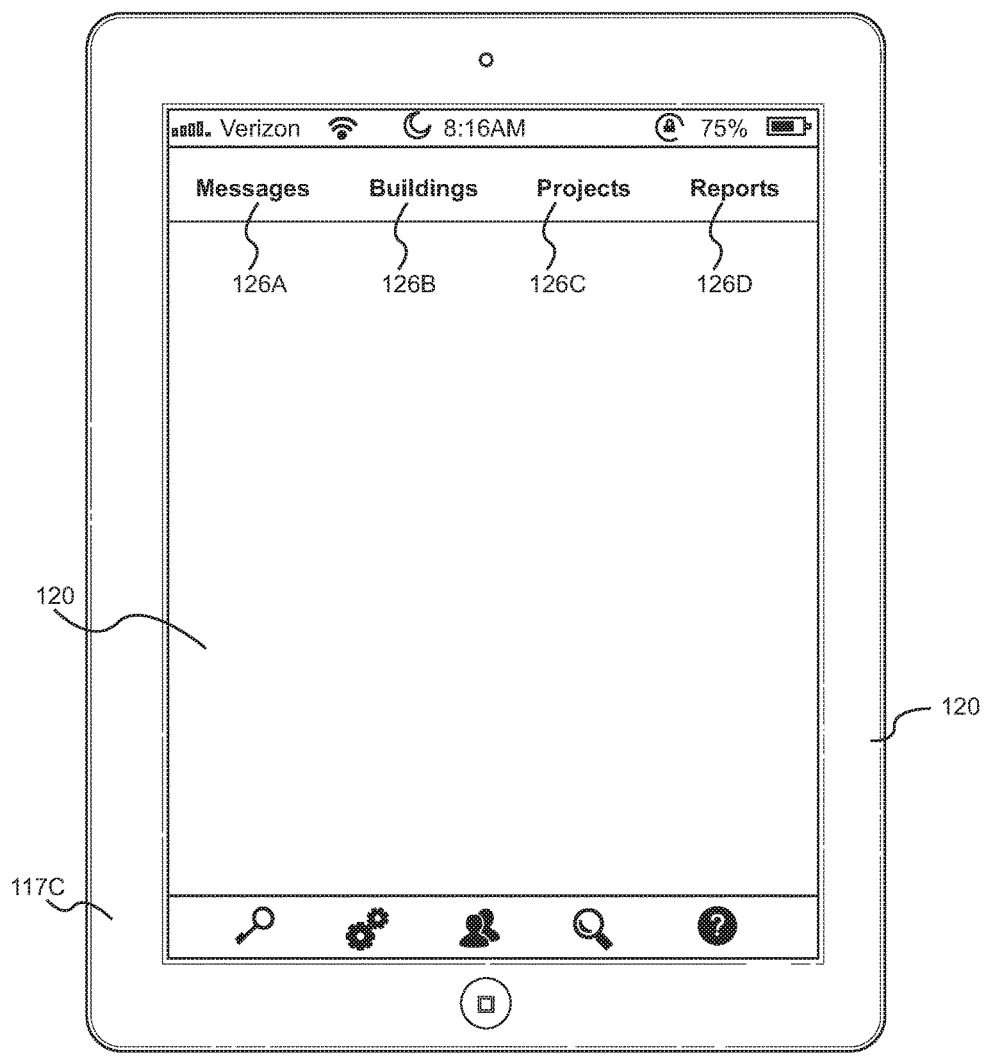
FIG. 59 is an exemplary wire frame model of a graphical user interface of the mobile application showing a high-level menu of services configured for use by on-site fire-protection spray administrators and technicians supported by the system network of the present invention.
Figure 59A:
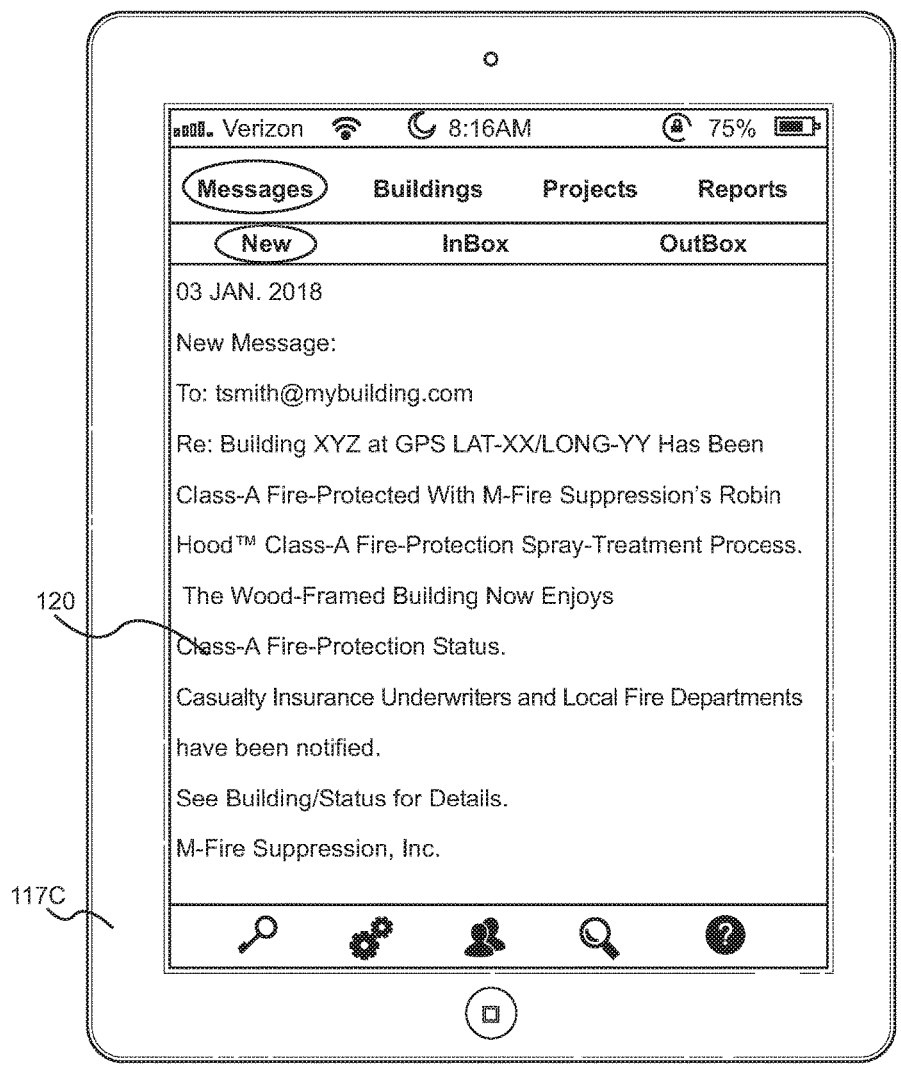
FIG. 59A is an exemplary wire frame model of a graphical user interface of the mobile application configured for use by on-site fire-protection spray administrators and technicians to send and receive messages (via email, SMS messaging and/or push-notifications) with registered users, using messaging services supported by the system network of the present invention.
Figure 59B:
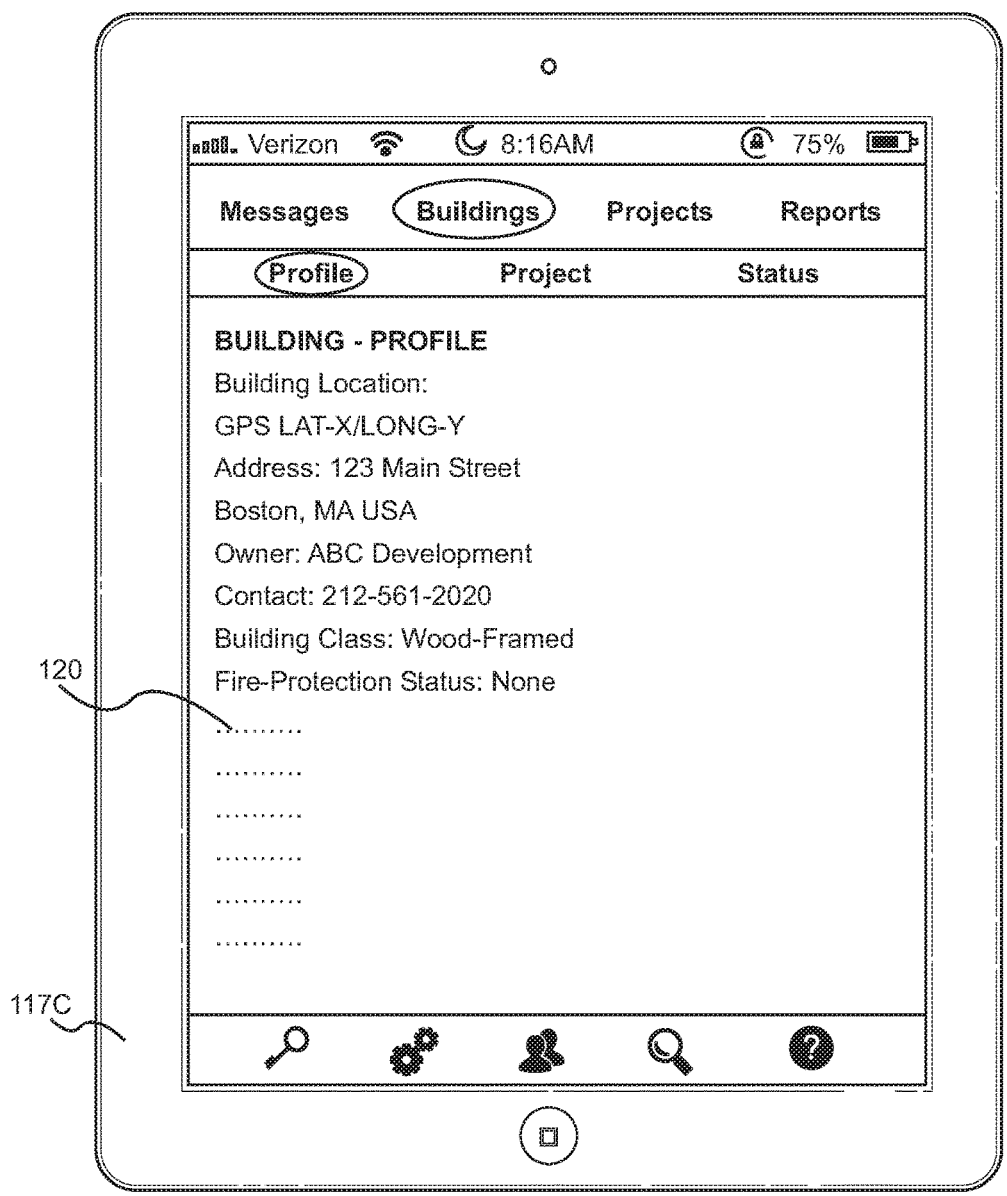
FIG. 59B is an exemplary wire frame model of a graphical user interface of the mobile application configured for use by on-site fire-protection spray administrators and technicians to update a building information profile using the building profile services supported by the system network of the present invention.
Figure 59C:
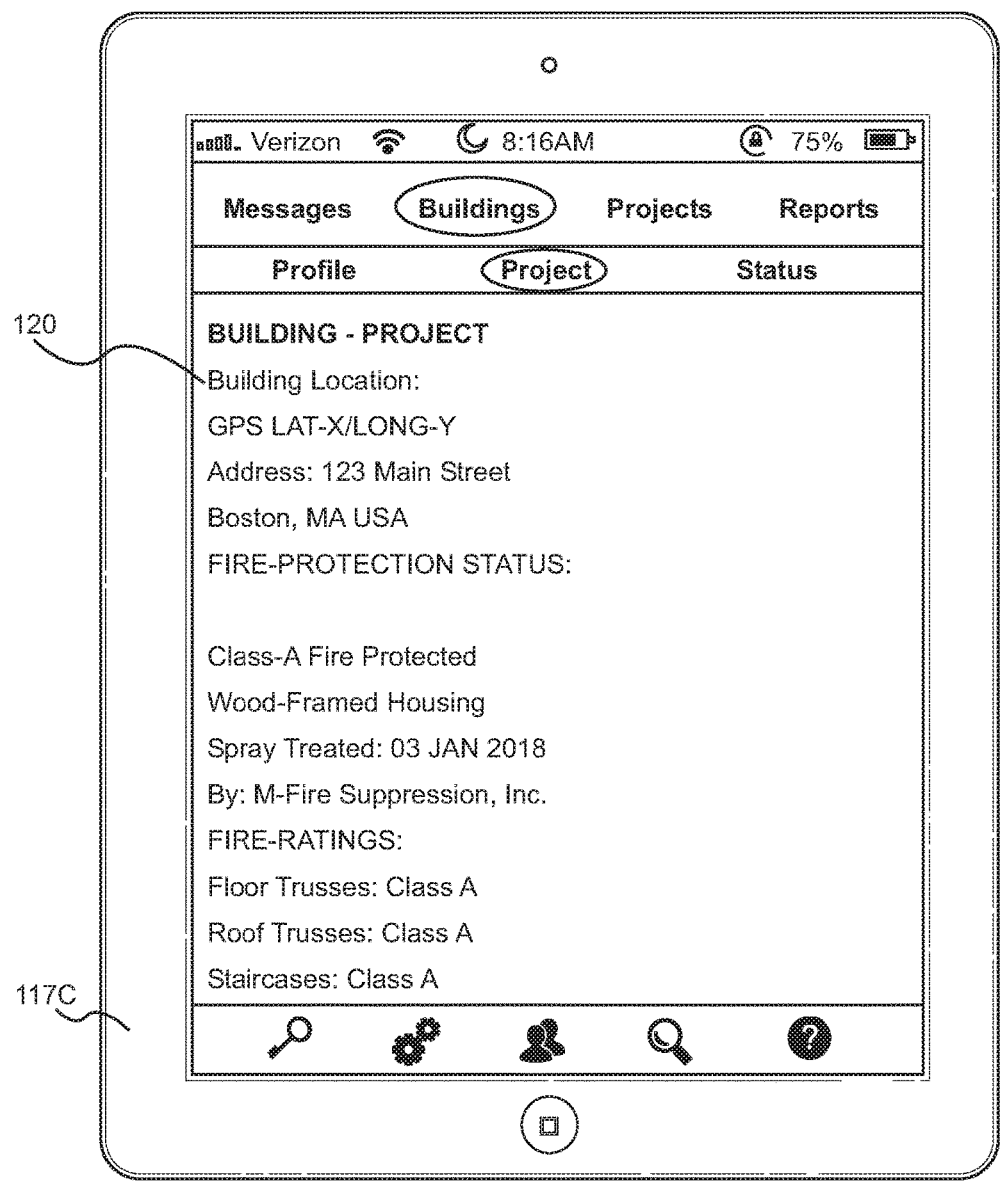
FIG. 59C is an exemplary wire frame model of a graphical user interface of the mobile application configured for use by on-site fire-protection spray administrators and technicians to review a building spray-based fire-protection project using services supported by the system network of the present invention.
Figure 59D:
FIG. 59D is an exemplary wire frame model of a graphical user interface of the mobile application configured for use by on-site fire-protection spray administrators and technicians to review the status of any building registered with the system network using services supported by the system network of the present invention.
Figure 59E:
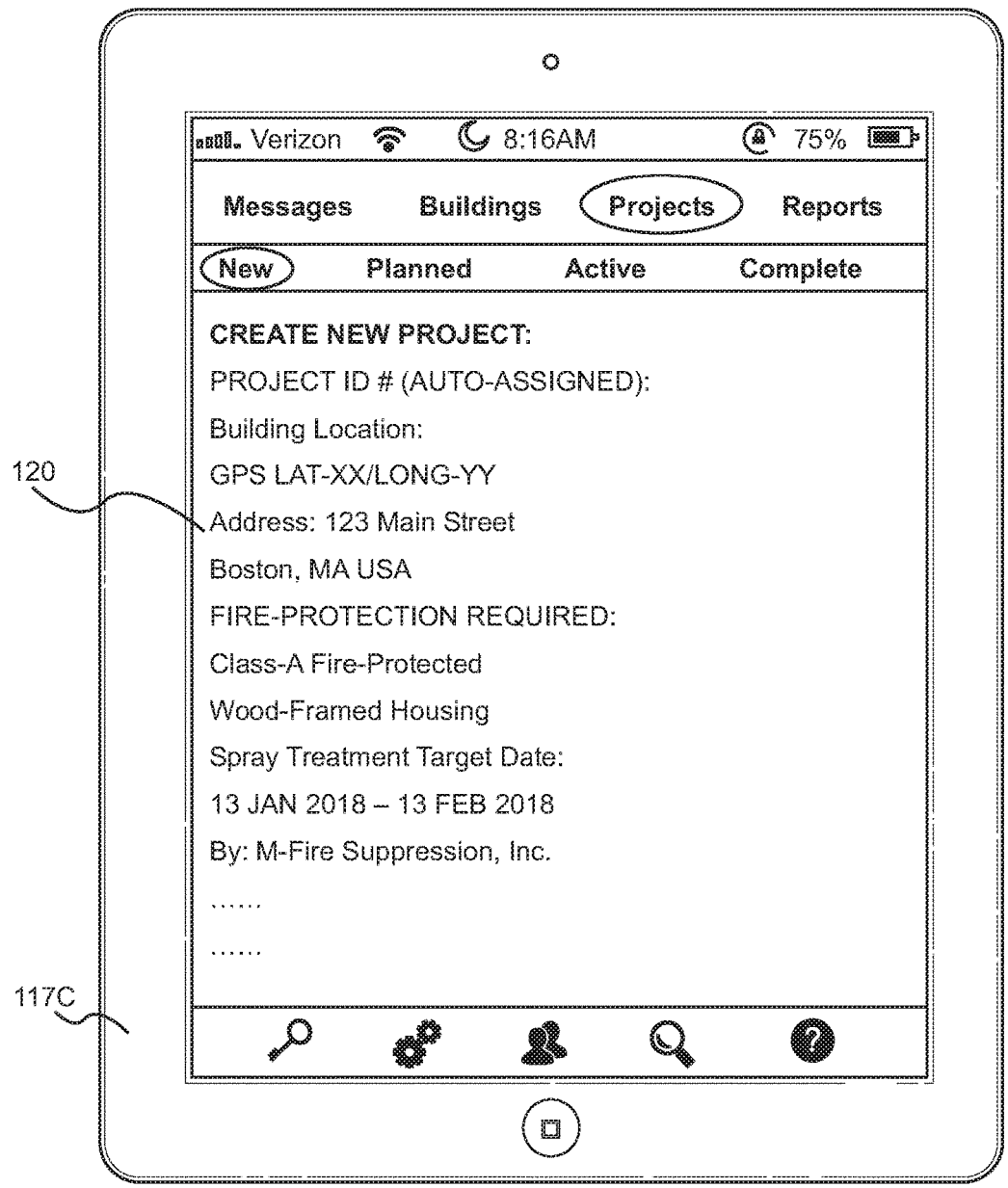
FIG. 59E is an exemplary wire frame model of a graphical user interface of the mobile application configured for use by on-site fire-protection spray administrators and technicians to create a new project for spray-based class-A fire-protection treatment of a wood-framed building, using services supported by the system network of the present invention.
Figure 59F:
FIG. 59F is an exemplary wire frame model of a graphical user interface of the mobile application configured for use by on-site fire-protection spray administrators and technicians to review the status of a planned building fire-protection spray project, using services supported by the system network of the present invention.
Figure 59G:
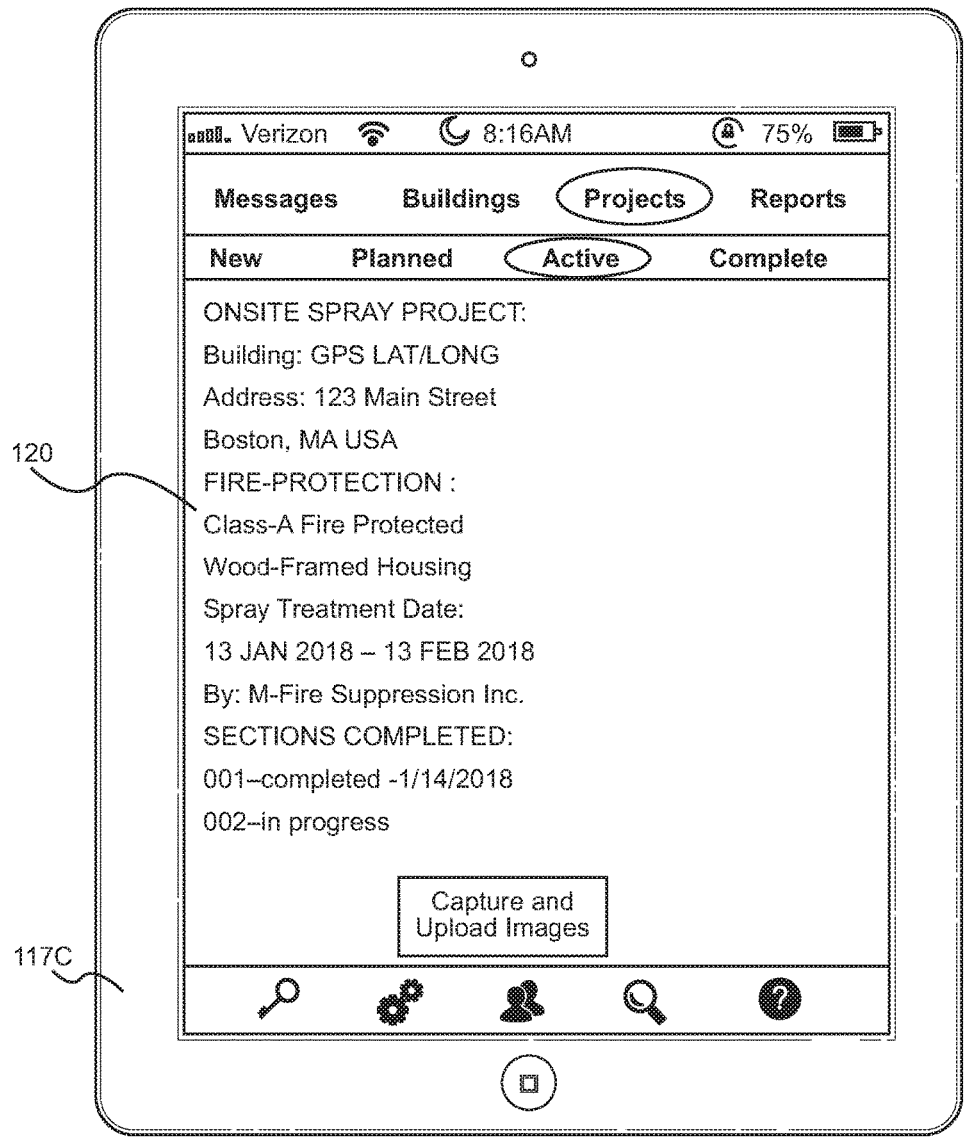
FIG. 59G is an exemplary wire frame model of a graphical user interface of the mobile application configured for use by on-site fire-protection spray administrators and technicians to review the status of an active in-progress building fire-protection spray project, using services supported by the system network of the present invention.
Figure 59H:
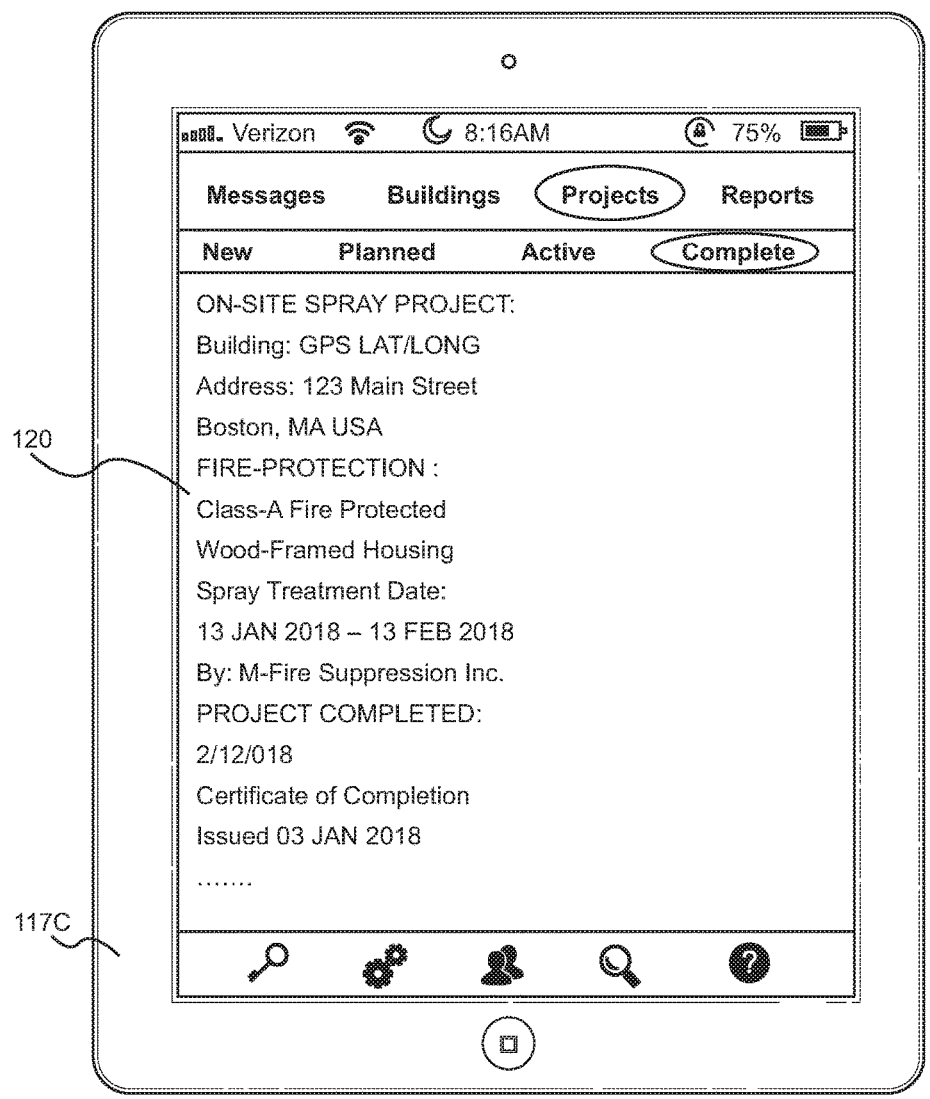
FIG. 59H is an exemplary wire frame model of a graphical user interface of the mobile application configured for use by on-site fire-protection spray administrators and technicians to review a completed building fire-protection spray project, and all documents collected therewhile, using services supported by the system network of the present invention.
Figure 59I:
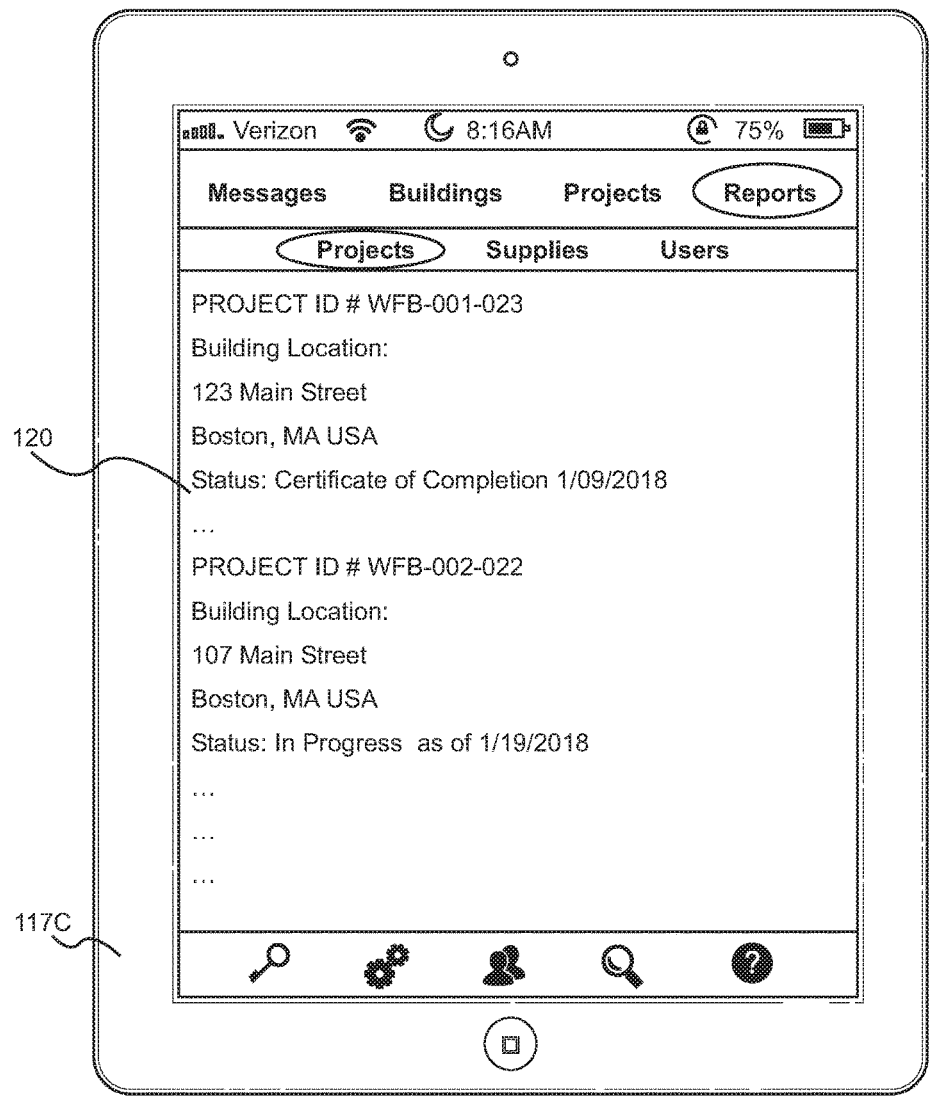
FIG. 59I is an exemplary wire frame model of a graphical user interface of the mobile application configured for use by on-site fire-protection spray administrators and technicians to generate and review reports on projects which have been scheduled for execution during a particular time frame, which have been already completed, or which are currently in progress, using the services of the system network of the present invention.
Figure 59J:
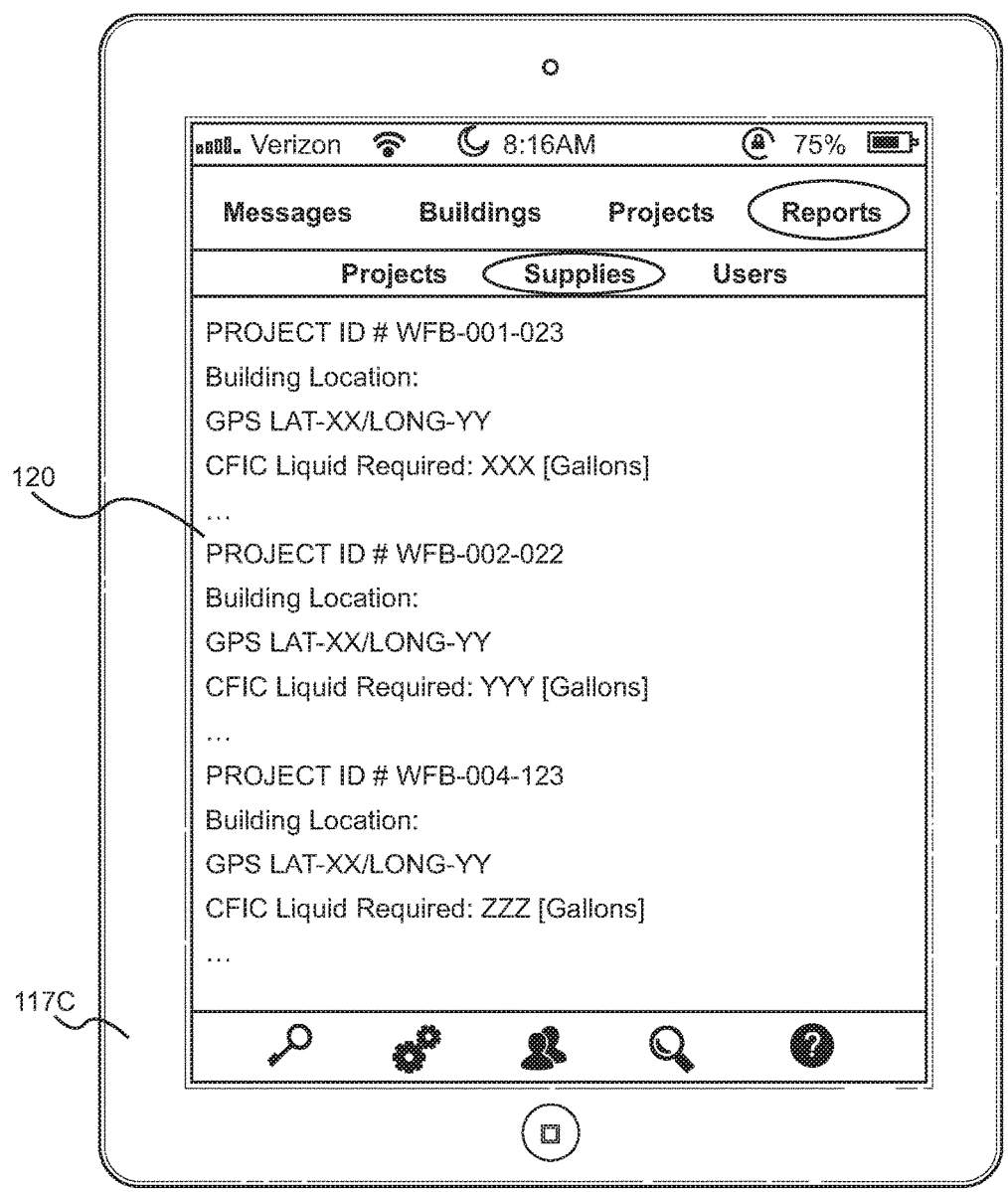
FIG. 59J is an exemplary wire frame model of a graphical user interface of the mobile application configured for use by on-site fire-protection spray administrators and technicians to generate and review reports on supplies used in fulfilling on-site class-A fire-protection building spray projects managed using the services of the system network of the present invention.
Figure 59K:
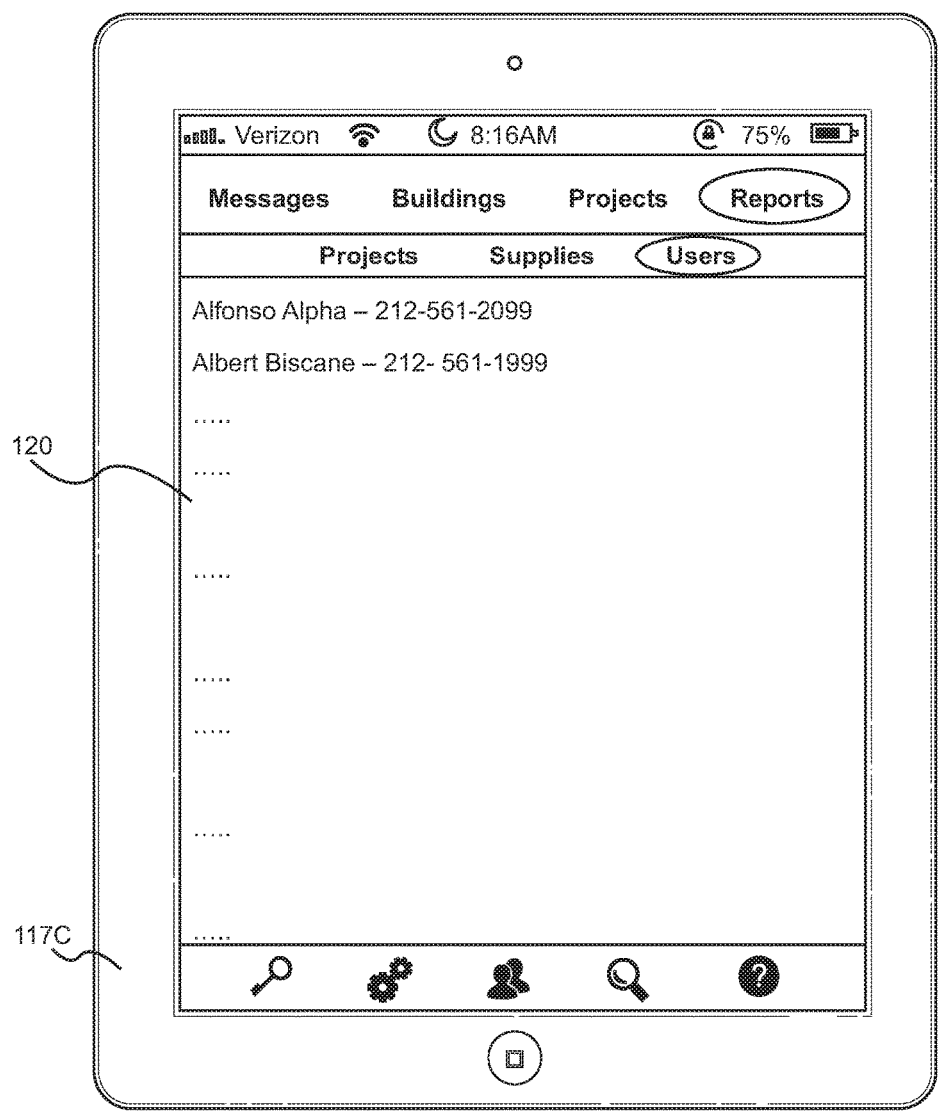
FIG. 59K is an exemplary wire frame model of a graphical user interface of the mobile application configured for use by on-site fire-protection spray administrators and technicians to generate and review reports on registered users associated with particular on-site class-A fire-protection building spray projects managed using the services of the system network of the present invention.

As shown in FIG. 55, the system network architecture further comprises many different kinds of users supported by mobile computing devices 117 running the mobile application 120 of the present invention, namely: a plurality of mobile computing devices 137 running the mobile application 120, and used by fire departments to access services supported by the system network 100; a plurality of mobile computing systems 117 running mobile application 1'20 and used by insurance underwriters to access services on the system network 145; a plurality of mobile computing systems 137 running mobile application 120 and used by architects and their firms to access the services supported by the system network 100 of the present invention; a plurality of mobile client machines 117 (e.g. mobile computers such as iPad, and other Internet-enabled computing devices with graphics display capabilities, etc) for use by spray-project technicians and administrators, and running a native mobile application 117 supported by server-side modules, and the various illustrative GUIs shown in FIGS. 58 through 59K, supporting client-side and server-side processes on the system network of the present invention; and a plurality of mobile GPS-tracked/GSM-linked CFIC Liquid Spraying Systems 101 deployed in one or more wood-framed buildings which are being Class-A fire-protected using the CFIC liquid spray treatment method of the present invention described in FIGS. 52A through 53.

In general, the system network 100 will be realized as an industrial-strength, carrier-class Internet-based network of object-oriented system design, deployed over a global data packet-switched communication network comprising numerous computing systems and networking components, as shown. As such, the information network of the present invention is often referred to herein as the "system" or "system network". The Internet-based system network 100 can be implemented using any object-oriented integrated development environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably configured development and deployment environment well known in the art. Preferably, although not necessary, the entire system of the present invention would be designed according to object-oriented systems engineering (DOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. Preferably, the system network 100 is deployed as a three-tier server architecture with a double-firewall, and appropriate network switching and routing technologies well known in the art. In some deployments, private/public/hybrid cloud service providers, such Amazon Web Services (AWS), may be used to deploy Kubernetes, an open-source software container/cluster management/orchestration system, for automating deployment, scaling, and management of containerized software applications, such as the mobile enterprise-level application 120, described above.

Specification of System Architecture of an Exemplary Mobile Smartphone System Deployed on the System Network of the Present Invention FIG. 56A shows the mobile computing system 117 (117A, 117B, 117C) used in the system network 100 shown in FIG. 55, supporting the mobile application 120 installed on each registered mobile computing system 117. The purpose of the mobile application 120 is to provide a convenient tool for tracking and managing projects involving on-site clean fire inhibiting chemical (CFIC) liquid spray treatment of wood-framed buildings during the construction phase, to ensure Class-A fire-protection of the interior exposed wood surfaces of the building. Using the custom-designed mobile application 120, property/building owners, builders, architects, insurance companies, and financial institutions can (i) track the progress being made while a wood-framed building is being spray-treated with CFIC liquid during the construction project schedule, so that the spray-treatment process ensures that Class-A fire-protection is provided to all (100%) exposed interior surfaces within the wood-framed building, and (ii) review all collected digital audio and visual evidence of certificates of completion signed by trained personnel during the course of the construction and fire-protection treatment project.

Figure 56B:
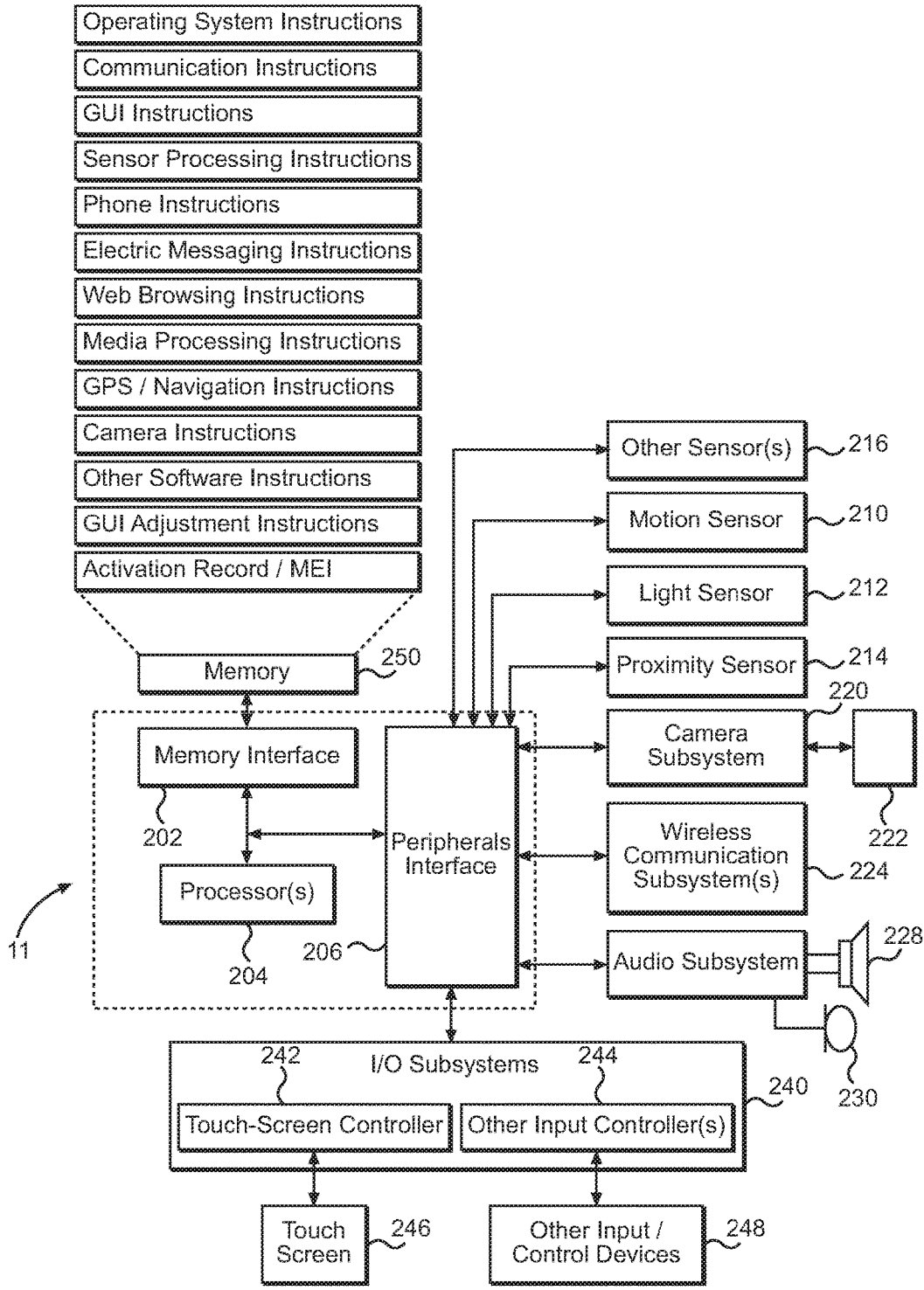

FIG. 56B shows the system architecture of an exemplary mobile computing system 117 that is deployed on the system network 100 and supporting the many services offered by system network servers 112. As shown, the mobile smartphone device 117 (117A, 117B, 117C) can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g. GPS receiver), a temperature sensor, a biometric sensor, a gyroscope, or other sensing device, to facilitate related functionalities. A camera subsystem 220 and an optical sensor 222, e.g. a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g. infrared) receivers and transmitters. The specific design and implementation of the communication subsystem 224 can depend on the communication network(s) over which the mobile device is intended to operate. For example, the mobile device 117 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 117 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile smartphone device 117 can be found in U.S. Pat. No. 8,631,358 incorporated herein by reference in its entirety.

Figure 57A:
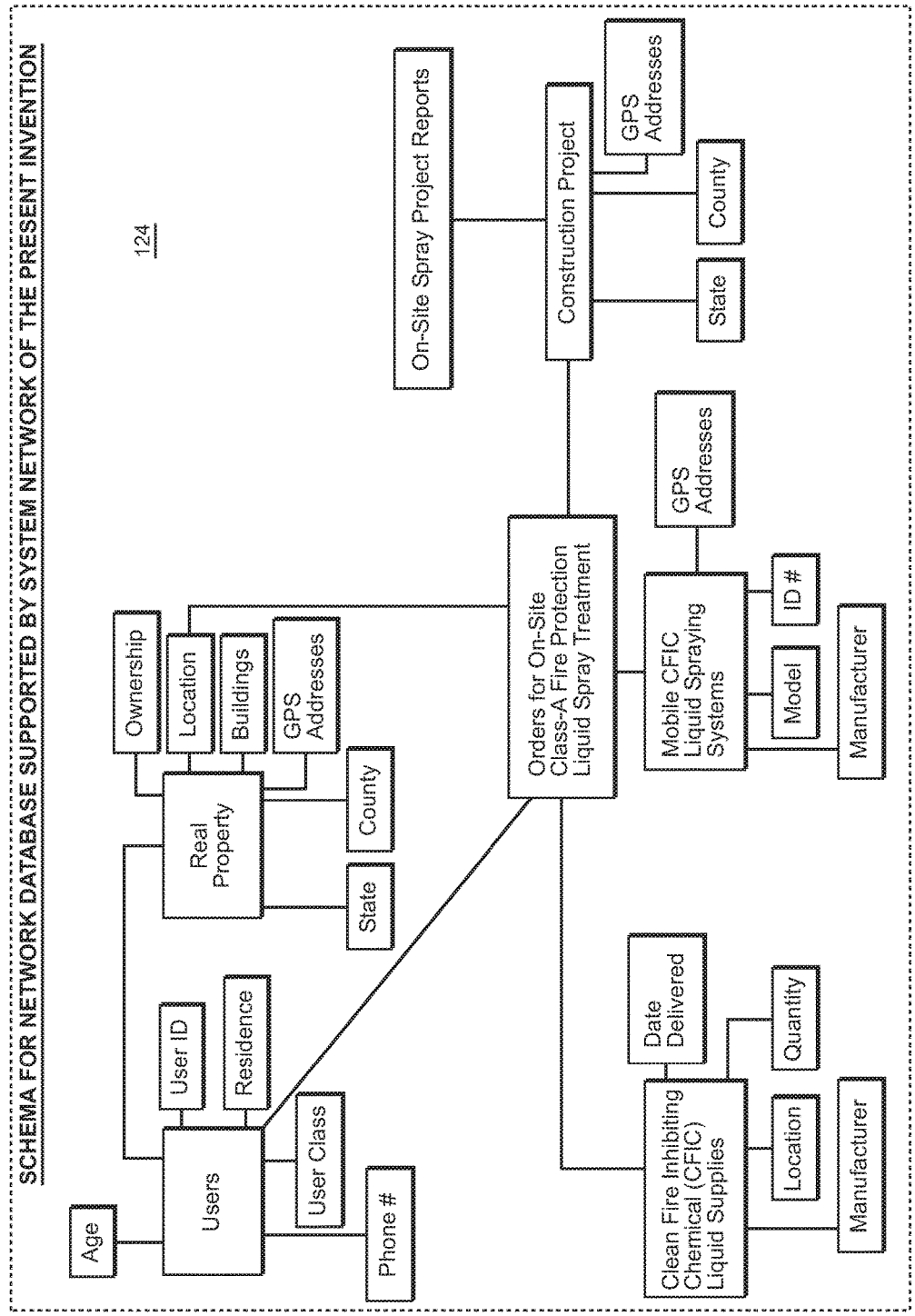

Specification of Network Database Supported on the System Network of the Present Invention FIG. 57A shows an exemplary schema 124 for the network database 113A supported by the system network 109 shown in FIG. 55. Each primary enterprise object is schematically represented as an object in the schema and represented in the data records created and maintained in the network database. As shown, the schema 124 includes objects such as, for example: Users of the system (e.g. property owners, builders, spray technicians, insurance companies, etc); Real Property; Orders For On-Site Class-A Fire-Protection Liquid Spray Treatment; Clean Fire Inhibiting Chemical (CFIC) Liquid Supplies; Construction Project; and Mobile CFIC Liquid Spraying Systems. Each of these objects have further attributes specified by other sub-objects indicated in FIG. 57

Figure 57B:
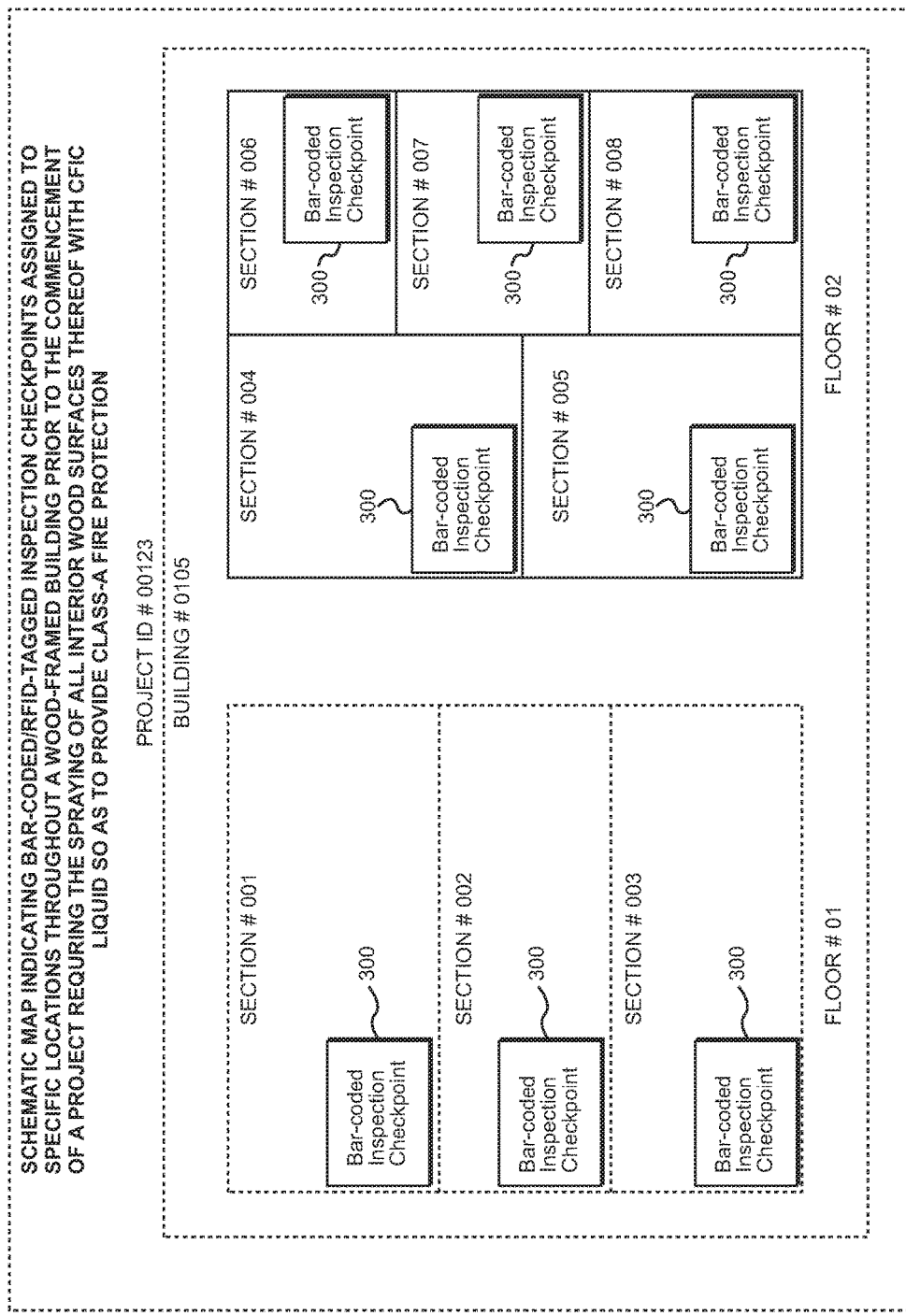

Using Mobile Computing Devices Deployed on the System Network to Verify and Document CFIC Liquid Spray Certifications Made at Each Barcoded/RFID-Tagged Inspection Checkpoint Specified Throughout the Wood-Framed Building being Spray-Treated to Provide Class-A Fire Protection FIG. 57B shows a schematic map indicating the barcoded/RFID-tagged inspection checkpoints assigned to specific locations throughout a wood-framed building, by a spray project administrator, prior to the commencement of a project requiring the spraying of all interior wood surfaces thereof with CFIC liquid so as to provide Class-A fire-protection thereto. In this example, the building has two floors, and each floor has several sections requiring spray-treatment with CFIC liquid, to provide Class-A fire-protection, in accordance with the principles of the present invention.

In general, this map will be created at the commencement of each project for a specified wood-framed building under construction, and its data structure will be stored in the network database 113A for the created project, to enable the organized capture of barcoded/RFID-tagged certifications, verifications and related documentation after spraying each completed wood-framed section.

Each section of the wood-framed building will be provided with at least one GPS-specified barcoded/RFID-tagged inspection checkpoint (e.g. bearing certificates of spraying and inspection by spray technicians and site supervisors printed on a thin flexible plastic sheet, on which a barcode symbol/RFID-tag are mounted) indicated at 300 on the map. The map of FIG. 57B should clearly show the building/floor/section-specific locations of the barcoded/RFID-tagged inspection checkpoints 300, shown in FIGS. 63 and 64, on the floor plan of the wood-framed building, where the bar-coded/RFID-tagged inspection checkpoints 3000 will be mounted on spray-treated wood surfaces, at the completion of spray-treating each section of the wood-framed building, and subsequently signed by the spray technician and spray supervisor, and possibly the building site superintendent, and thereafter digitally photographed and video-recorded with the individuals involved in each such event being verified and documented using the system network of the present invention 100 and its deployed mobile applications 120.

At each barcoded/RFID-tagged inspection checkpoint 300, the spray technician and/or site supervisor uses his mobile computing device 117 to read the bar code symbol and/or RFID tag at the inspection checkpoint, to automatically (or semi-automatically) open the project storage location on the network database 113A, and then capture and record digital images and AV-recordings of signed spray certifications and verifications by the spray technicians and/or site supervisor, and upload them to the network database 113A using the mobile computing device 117 and mobile application 120, in the case where native mobile applications have been deployed. The mobile application 120 will also capture the GPS coordinates of the mobile computing device 117, and enter these coordinates into the project file/folder in the network database 113A, for verification purposes. The mobile application 120 can also capture the IP address of the user's mobile computing device (e.g. Apple iPhone) and record such address information as well. Preferably, at each barcoded inspection checkpoint 300, a set of four bar-coded Class-A fire-protect test boards 301, and a pair of bar-coded UV-protected storage sleeve 302A and 302B, each adapted to store two test boards 301 after CFIC liquid has been spray thereupon to impart Class-A fire protection. One set of sprayed test sample boards will be provided to the building owner, or its professional engineer, to be held in custody for evidentiary purposes. The other set will go to spray contracting firm, typically its laboratory, for post-spray testing purposes, and also to hold for custodial reasons. Digital images of these spray-treated test boards 301 should also be captured and uploaded to the network database 113A in the project folder under the specific inspection checkpoint at which the sprayed test samples where made, at a specific time and date, and GPS-location. Thereafter, these sprayed test boards 301 can be stored in their respective bar-coded storage sleeves 302A, 302B and provided to their respective parties. After such sprayed test samples have been made, and documented, it may desired for the spray contracting firm to send its sprayed test boards 301 to a scientific and engineering laboratory and conduct some tests to ensure that the highest possible scientific and engineering standards have been attained during the on-site spray treatment process, associated with each and every on-site wood-framed building fire-protection spray process. Laboratory technicians may also use the mobile application 120 and system network 100 to add any information they might have regarding the their testing of sprayed test boards 301 produced at each barcoded inspection checkpoint in the project.

Once all certifications and verifications have been made by the spray technician and his site supervisor, and digital photographic and AV-recording documentation (i.e. evidence) has been captured and uploaded to the network database 113A under the building-specific project, at a GPS-specified/barcoded inspection checkpoint 300, the spray technician will resume spraying other sections of the wood-framed building requiring spray treatment with CFIC liquid.

When using the system network of the present invention 100, each certification and verification made by the spray technician and site supervisor at the barcoded inspection checkpoint, and captured and recorded in the network database 113A using the user's mobile computing device 117 (e.g. Apple iPad), should include a legal declaration that a specific CFIC liquid formulation (e.g. Hartindo AF31 anti-fire liquid) has been applied to the sprayed wood surfaces of the completed section of this specific wood-framed building at a particular time and date, and in an active concentration sprayed onto the wood surfaces so as to provide the sprayed wood surfaces with Class-A fire-protected characteristics, as independently tested by a particular licensed engineering testing organization, which should be identified and incorporated therein by reference.

Specification of Services Supported by the Graphical User Interfaces Supported on System Network of the Present Invention for Use by Property/Building Owners, Architects, Builders, Insurance Companies and Other Stakeholders Supported by the System Network FIG. 58 illustrates an exemplary graphical user interface (GUI) 125 of the mobile application 120 used by property/building owners, architects, insurance companies, builders, and other stakeholders supported by the system network 100. As shown in this exemplary GUI screen 125, supports a number of pull-down menus under the titles: Messages 125A, where the user can view messages sent via messaging services supported by the application; Buildings 125B, where projects have been scheduled, have been completed, or are in progress; and Projects 125C, which have been have been scheduled, have been completed, or are in progress, and where uploaded authenticated certifications of completion can be reviewed, downloaded and forwarded as needed by authorized stakeholders.

Figure 58A:
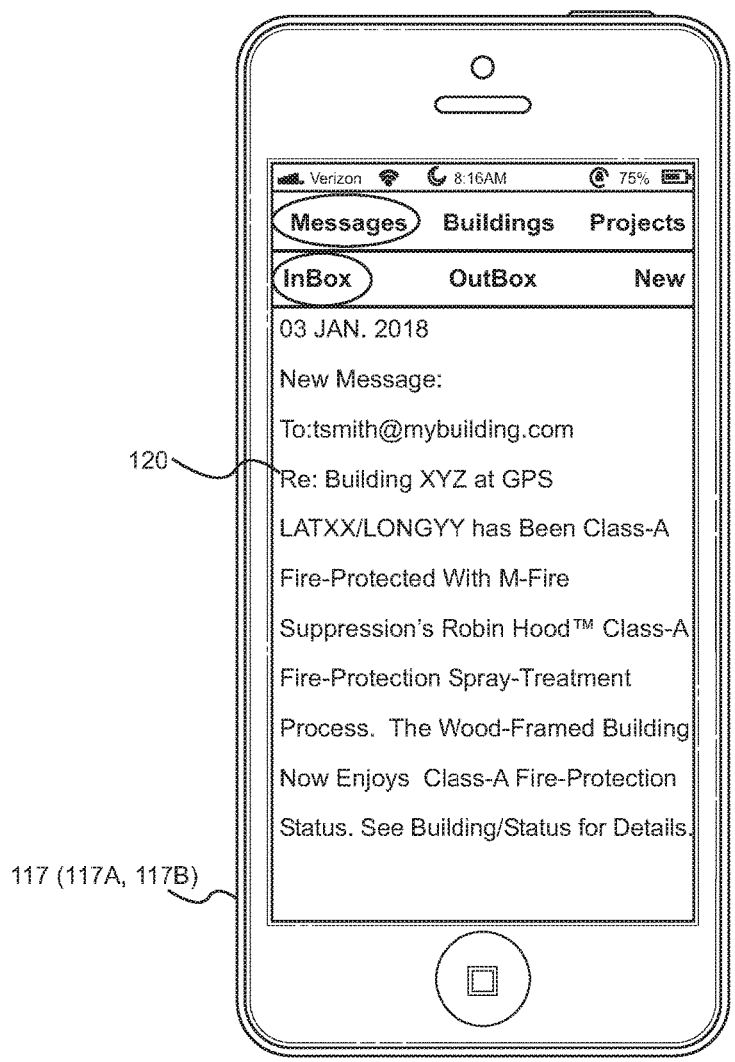
FIG. 58A is an exemplary wire frame model of a graphical user interface of the mobile application configured for use by building/property owners, insurance companies, and other stakeholders showing receipt of new message (via email, SMS messaging and/or push-notifications) relating to building status from messaging services supported by the system network of the present invention.

FIG. 58A shows a graphical user interface of the mobile application 120 configured for use by building/property owners, builders, architects, insurance companies, and other stakeholders showing receipt of new message (via email, SMS messaging and/or push-notifications) on building status from messaging services supported by the system network 100.

Figure 58B:
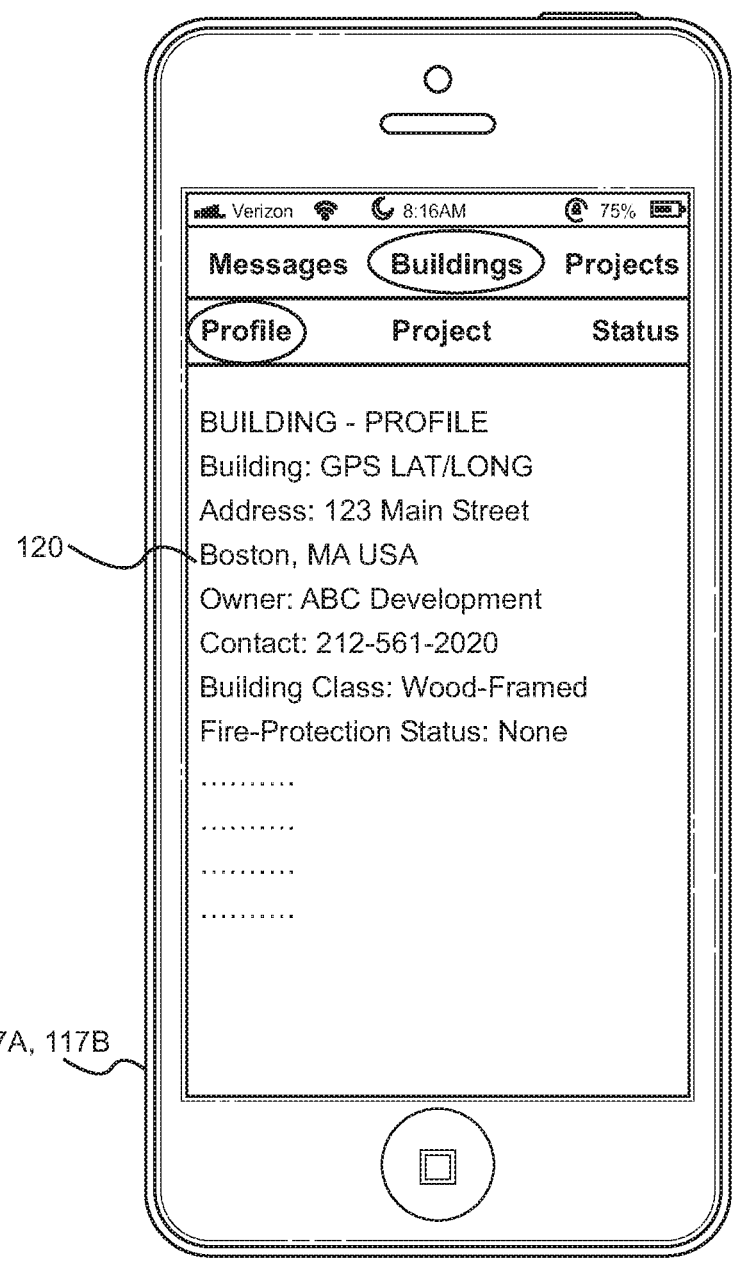
FIG. 58B is an exemplary wire frame model of a graphical user interface of the mobile application configured for use by building/property owners, insurance companies, and other stakeholders to update building profile using profile services supported by the system network of the present invention.

FIG. 58B shows a graphical user interface of the mobile application 120 configured for use by building/property owners, insurance companies, and other stakeholders to update building profile using profile services supported by the system network 100.

Figure 58C:
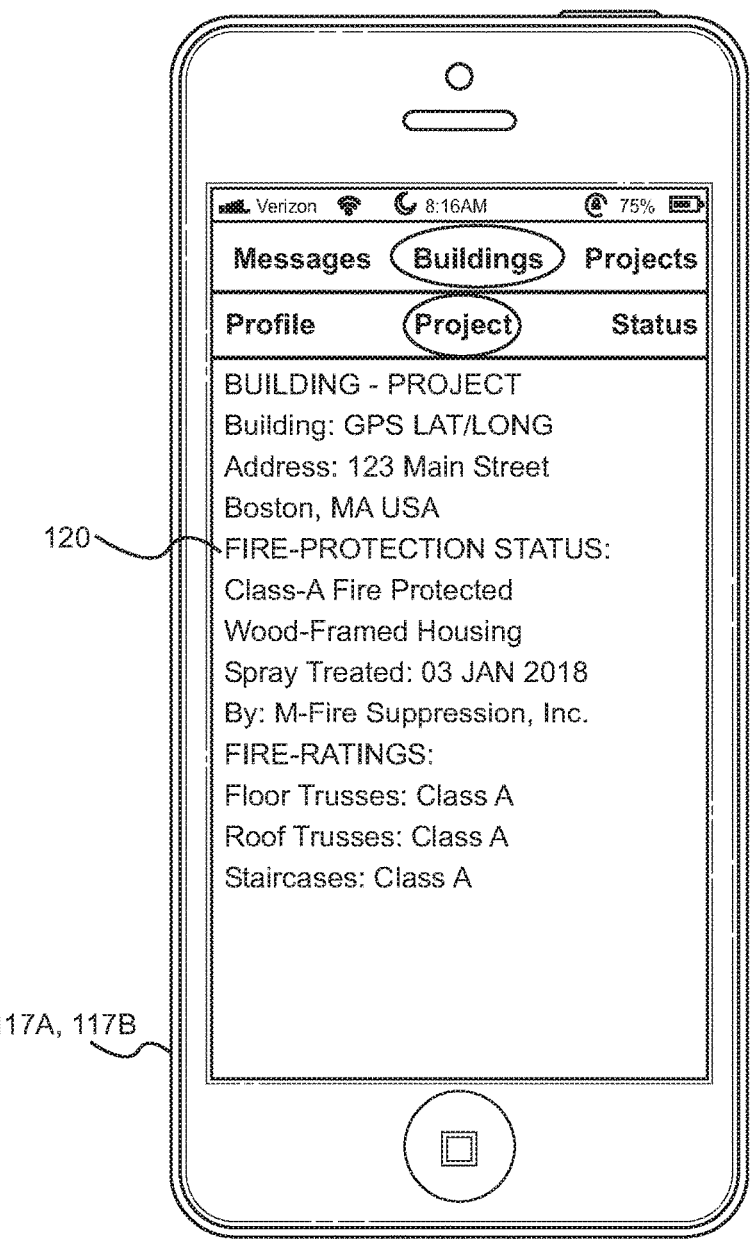
FIG. 58C is an exemplary wire frame model of a graphical user interface of the mobile application configured for use by building/property owners, insurance companies, and other stakeholders to review and monitor the Class-A fire-protection spray treatment project at a particular wood-framed building supported by the system network of the present invention.

FIG. 58C shows a graphical user interface of the mobile application 120 configured for use by building/property owners, builders, architects, insurance companies, and other stakeholders to review and monitor the Class-A fire-protection spray treatment project at a particular wood-framed building supported by the system network 100.

Figure 58D:
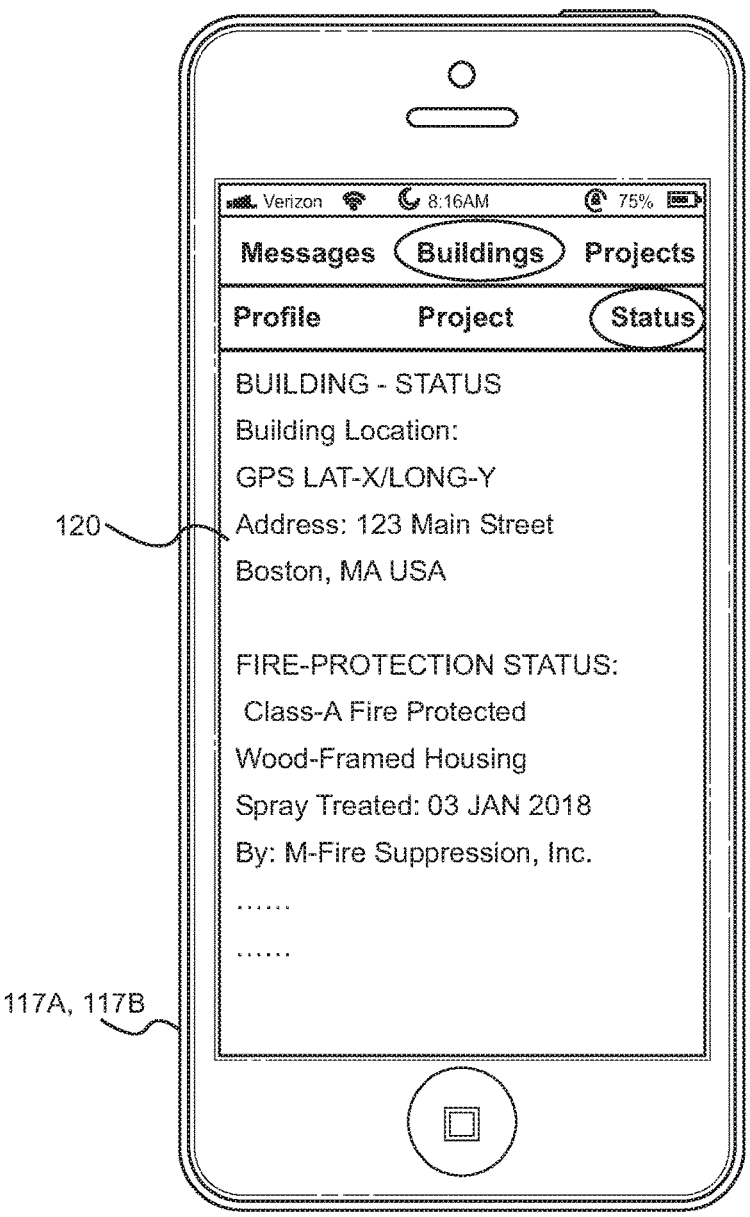
FIG. 58D is an exemplary wire frame model of a graphical user interface of the mobile application configured for use by building/property owners, insurance companies, and other stakeholders to review the fire-protection status of a wood-framed building registered on the system network of the present invention.

FIG. 58D shows a graphical user interface of the mobile application 120 configured for use by building/property owners, insurance companies, and other stakeholders to review the fire-protection status of a wood-framed building registered on the system network 100.

Figure 58E:
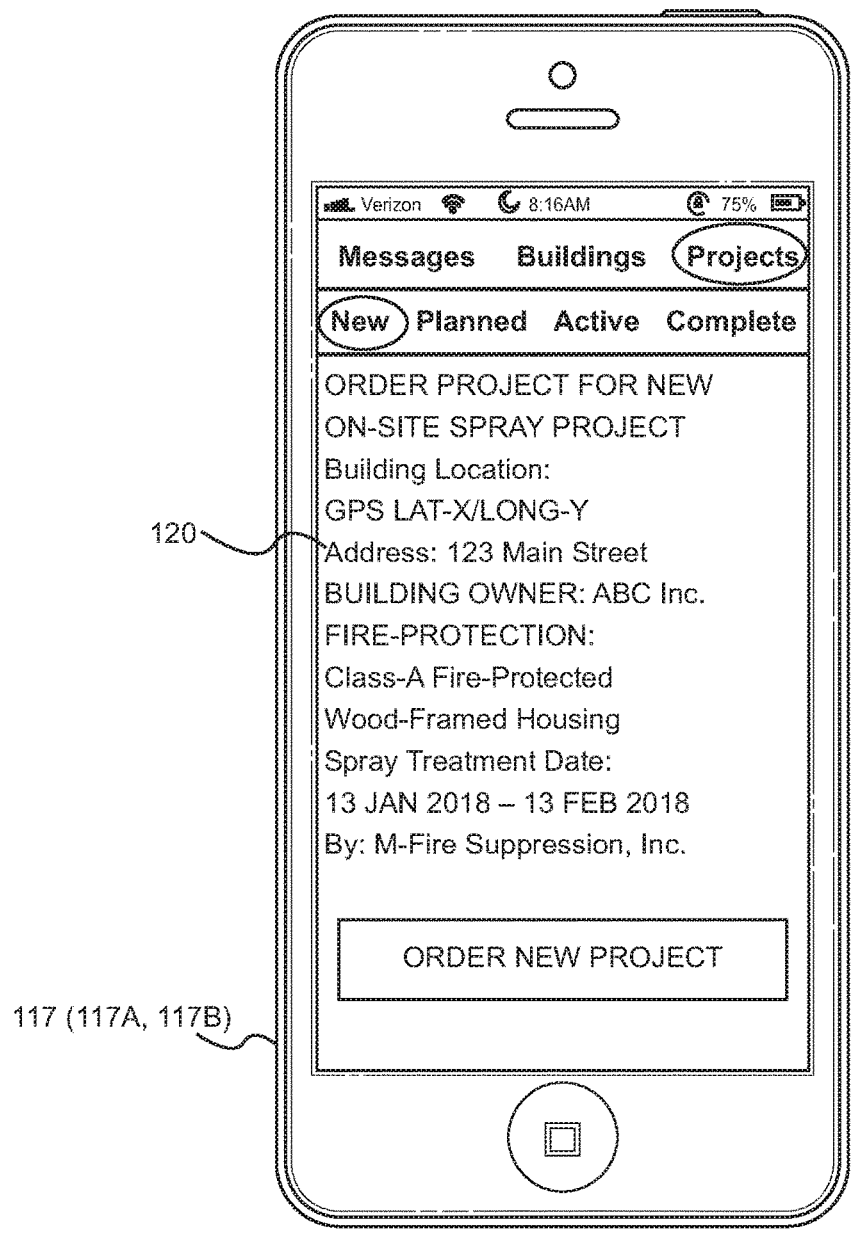
FIG. 58E is an exemplary wire frame model of a graphical user interface of a mobile application configured for use by building/property owners, insurance companies, and other stakeholders to place an order for a new on-site wood-building Class-A fire-protection spray treatment project, using the various services supported by the system network of the present invention.

FIG. 58E shows a graphical user interface of the mobile application 120 configured for use by building/property owners, builders, architects, insurance companies, and other stakeholders to place an order for a new on-site wood-building Class-A fire-protection spray treatment project, using the various services supported by the system network 100. Once the order is received by the system, the system automatically generates a new project in the system network database 113A for the on-site fire-protection spray treatment of the specified wood-framed building. Also, the system automatically assigns a project manager the project. Thereafter, the project and workflow commences under the management of the system using the deployed mobile application 120 running on mobile computing systems 117 (e.g. Apple iPhones) and tablet computers (e.g. Apple iPads), for use by (i) building/property owners, builders, architects, insurance companies/agents as shown in FIGS. 58 through 58H, and also (ii) fire-protection building spray technicians and administrators as shown in FIGS. 59 through 59K.

Figure 58F:
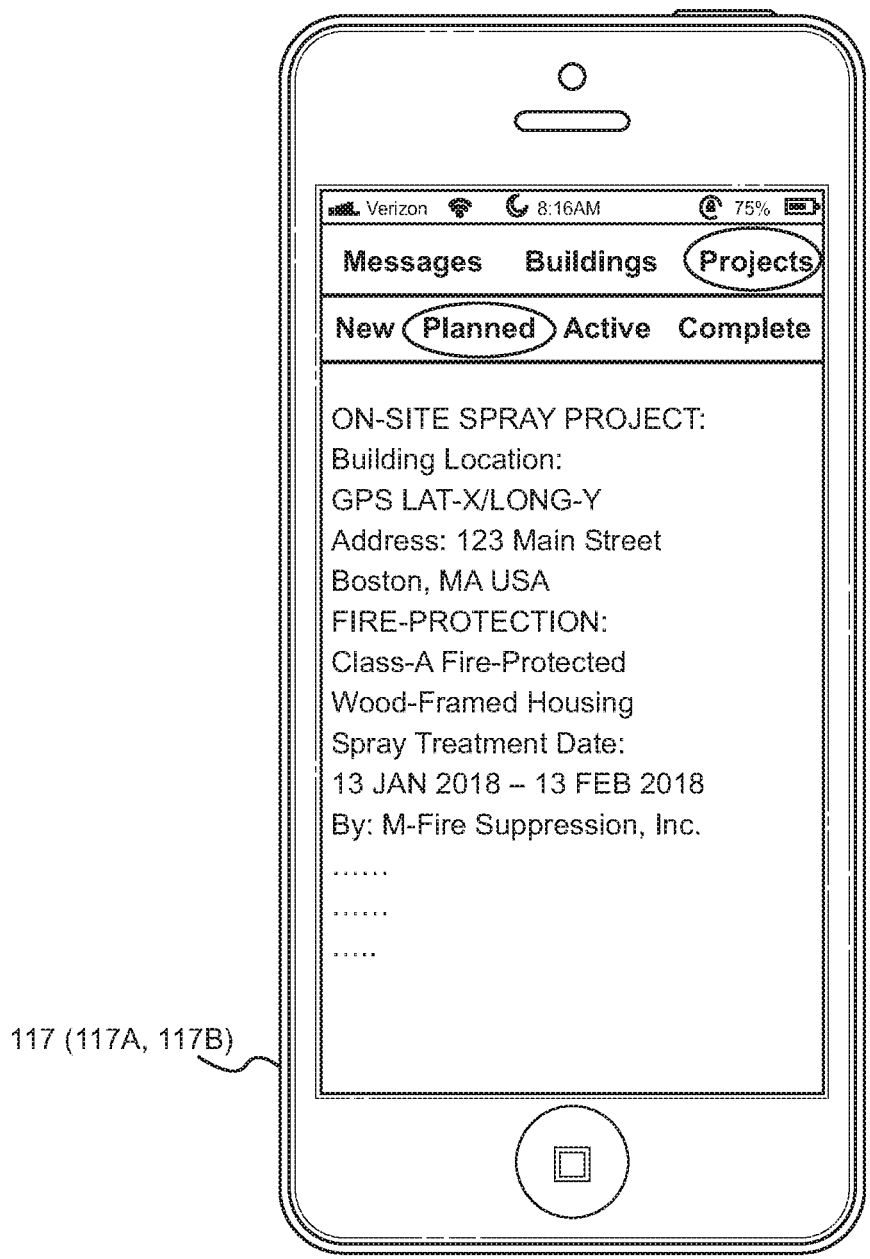
FIG. 58F is an exemplary wire frame model of a graphical user interface of the mobile application configured for use by building/property owners, insurance companies, and other stakeholders to review when a planned on-site wood-building Class-A fire-protection spray treatment project is planned, using the monitoring services supported by the system network of the present invention.

FIG. 58F shows a graphical user interface of the mobile application 120 configured for use by building/property owners, insurance companies, and other stakeholders to review when a planned on-site wood-building Class-A fire-protection spray treatment project associated with the user is planned, using the monitoring services supported by the system network 100.

Figure 58G:
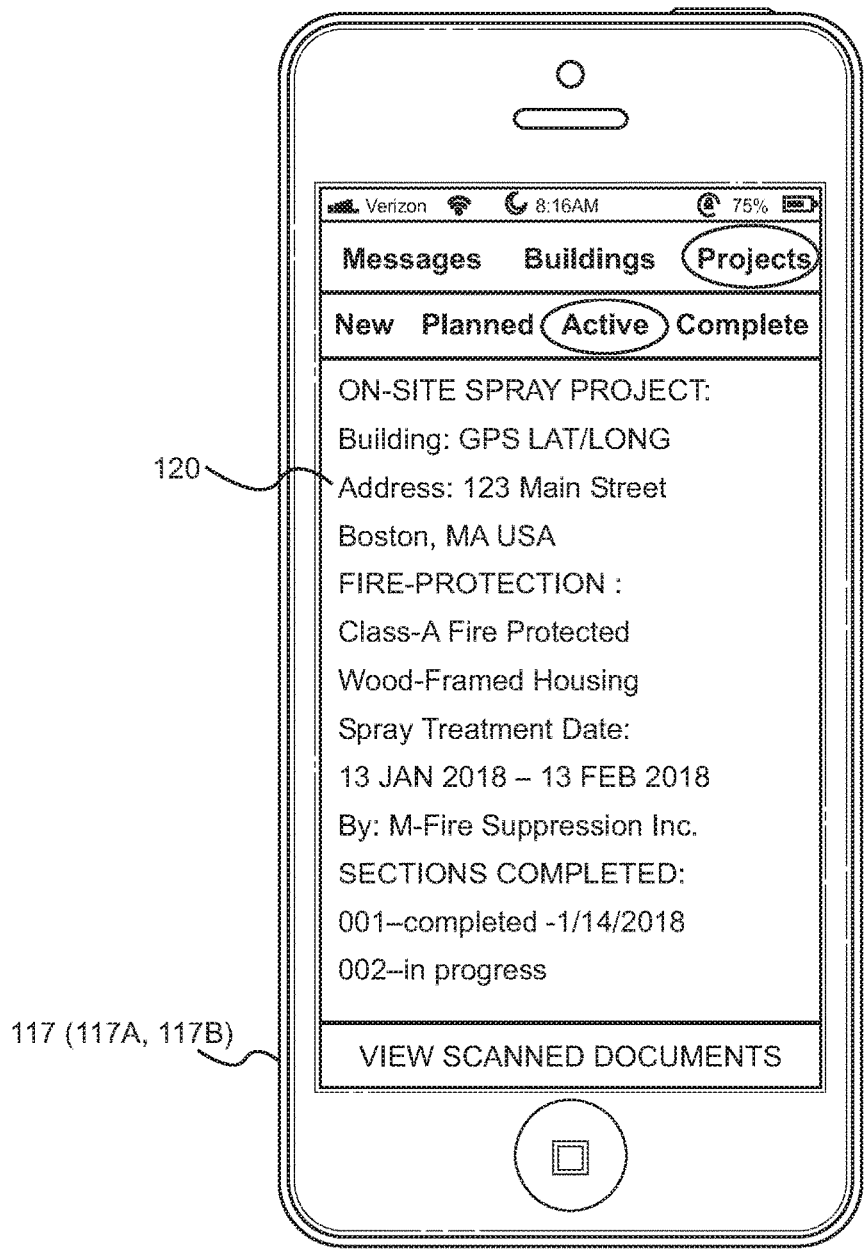
FIG. 58G is an exemplary wire frame model of a graphical user interface of the mobile application configured for use by building/property owners, insurance companies, and other stakeholders to review an active on-site wood-building Class-A fire-protection spray treatment project, using the monitoring services supported by the system network of the present invention.

FIG. 58G shows a graphical user interface of the mobile application 120 configured for use by building/property owners, insurance companies, and other stakeholders to review any active on-site wood-building Class-A fire-protection spray treatment project associated with the user, using the monitoring services supported by the system network 100.

Figure 58H:
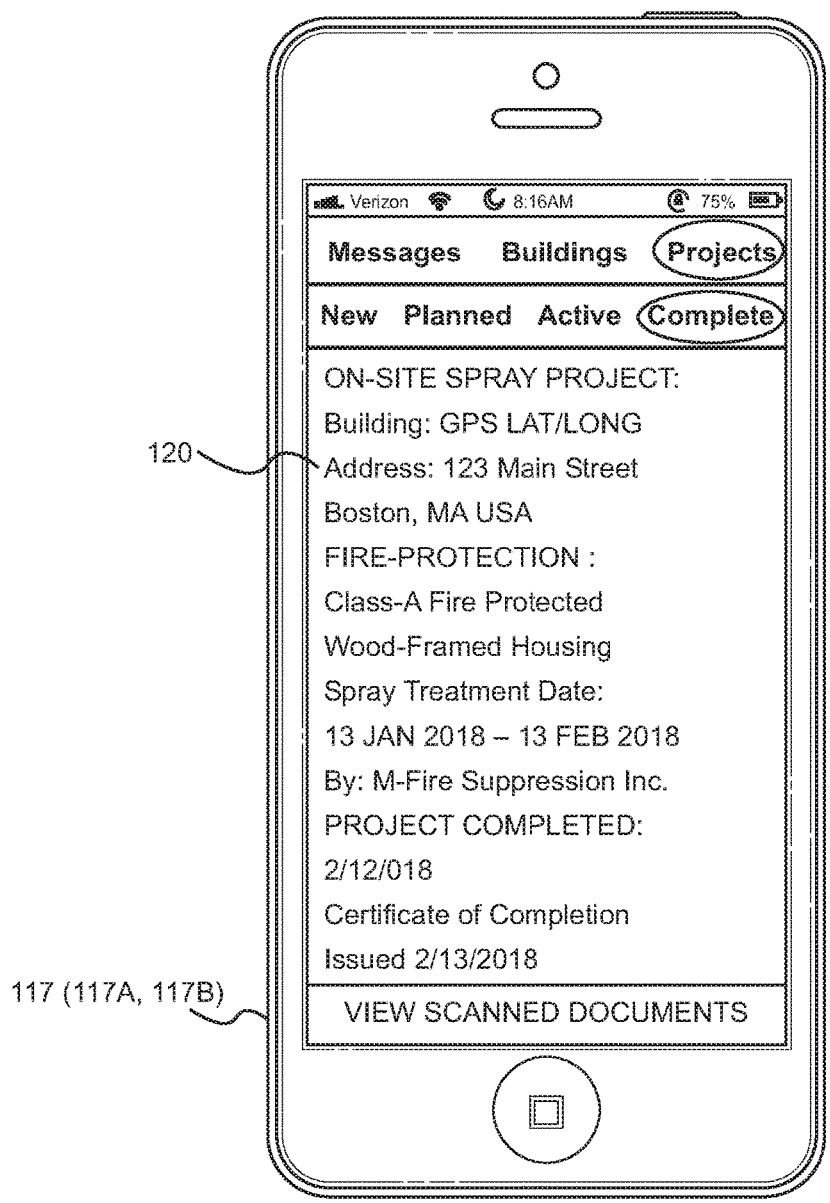
FIG. 58H is an exemplary wire frame model of a graphical user interface of the mobile application configured for use by building/property owners, insurance companies, and other stakeholders to review an completed on-site wood-building Class-A fire-protection spray treatment project, using the monitoring services supported by the system network of the present invention.

FIG. 58H shows a graphical user interface of the mobile application configured for use by building/property owners, insurance companies, and other stakeholders to review any completed on-site wood-building Class-A fire-protection spray treatment project associated with the user, using the monitoring services supported by the system network 100.

Specification of Services Supported by the Graphical User Interfaces Supported on System Network of the Present Invention for Use by On-Site Fire-Protection Spray Administrators and Technicians Supported by the System Network FIG. 59 shows an exemplary graphical user interface (GUI) 126 configured for the mobile application 120 used by on-site fire-protection spray administrators and technicians supported by the system network 100.

As shown in FIG. 59, this exemplary GUI screen 126 supports a number of pull-down menus under the titles: Messages 126A, where project administrator and spray technicians can view messages sent via messaging services supported by the mobile application 120; Buildings 126B, where projects have been scheduled, have been completed, or are in progress, with status notes, terms, conditions and other considerations made of record; Projects 126C, which have been have been scheduled, have been completed, or are in progress, and where uploaded authenticated certification of completions can be reviewed, downloaded and forwarded as needed; and Reports 126D, on on-site spray-applied fire-protection projects and buildings being managed by the mobile application 120 running on client computing systems 117 in operable communication with the web, application and database servers 111, 112 and 113 at the data center 110 shown in FIG. 55.

FIG. 59A shows a graphical user interface of the mobile application 120 configured for use by on-site fire-protection spray administrators and technicians to send and receive (via email, SMS messaging and/or push-notifications) with registered users, using messaging services supported by the system network 100.

FIG. 59B shows a graphical user interface of the mobile application 120 configured for use by on-site fire-protection spray administrators and technicians to update a building information profile associated with the user, using the building profile services supported by the system network 100.

FIG. 59C shows a graphical user interface of the mobile application 120 configured for use by on-site fire-protection spray administrators and technicians to review a building spray-based fire-protection project associated with the user, using services supported by the system network 100.

FIG. 59D shows a graphical user interface of the mobile application 120 configured for use by on-site fire-protection spray administrators and technicians to review the status of any building registered with the system network and associated with the user, using services supported by the system network 100.

FIG. 59E shows a graphical user interface of the mobile application 120 configured for use by on-site fire-protection spray administrators and technicians to create a new project for spray-based Class-A fire-protection treatment of a wood-framed building, using services supported by the system network 100.

FIG. 59F shows a graphical user interface of the mobile application 120 configured for use by on-site fire-protection spray administrators and technicians to review the status of any planned building fire-protection spray project associated with the user, using services supported by the system network 100.

FIG. 59G shows a graphical user interface of the mobile application 120 configured for use by on-site fire-protection spray administrators and technicians to review the status of an active in progress building fire-protection spray project associated with the user, using services supported by the system network 100.

FIG. 59H shows a graphical user interface of the mobile application 120 configured for use by on-site fire-protection spray administrators and technicians to review any completed building fire-protection spray project associated with the user, and all documents collected therewhile, using services supported by the system network 100.

FIG. 59I shows a graphical user interface of the mobile application 120 configured for use by on-site fire-protection spray administrators and technicians to generate and review reports on projects which have been scheduled for execution during a particular time frame, which have been already completed, or which are currently in progress, using the services of the system network 100.

FIG. 59J shows a graphical user interface of the mobile application 120 configured for use by on-site fire-protection spray administrators and technicians to generate and review reports on supplies used in fulfilling on-site class-A fire-protection building spray projects managed using the services of the system network 100.

FIG. 59K shows a graphical user interface of the mobile application 120 configured for use by on-site fire-protection spray administrators and technicians to generate and review reports on registered users associated with particular on-site class-A fire-protection building spray projects managed using the services of the system network 100.

Figure 60B:
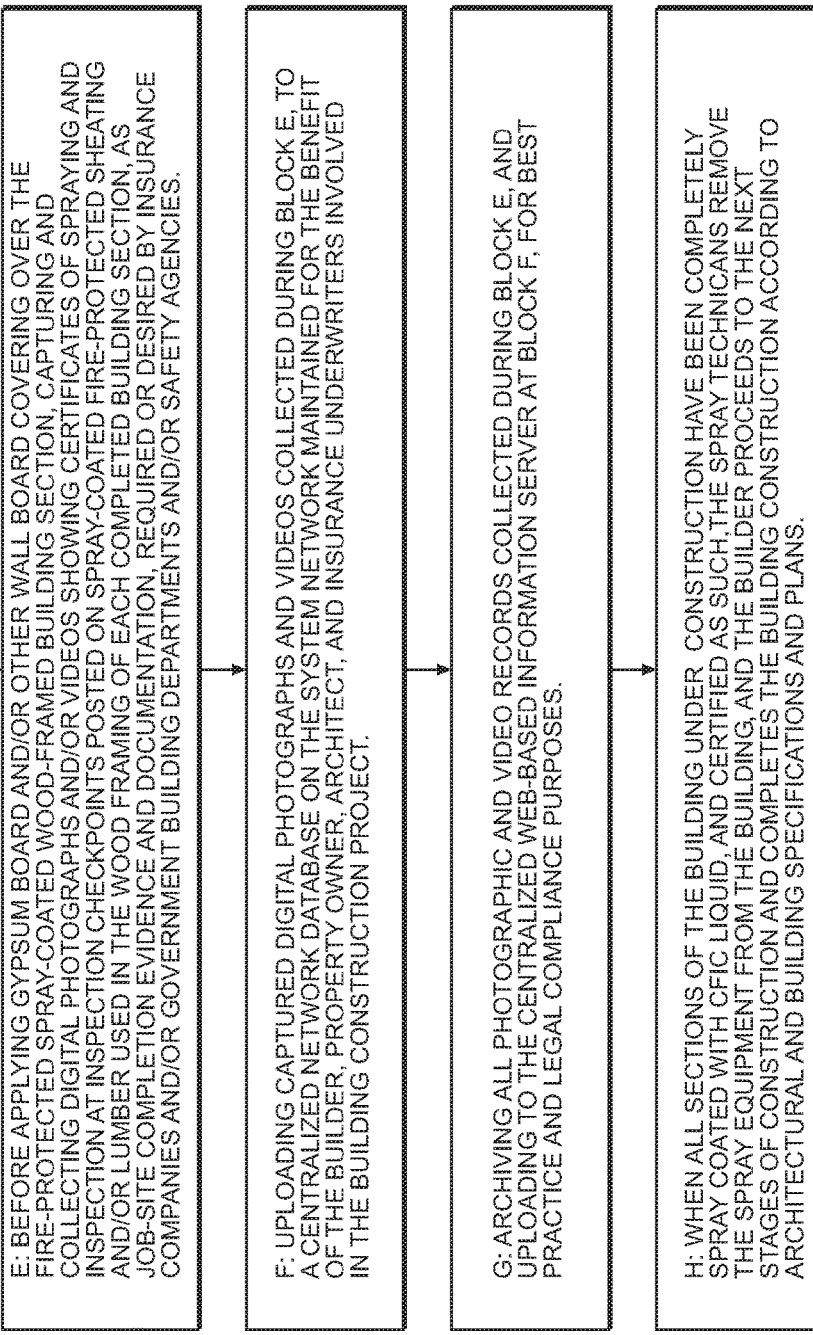

Specification of Method of Verifying and Documenting On-Site Spray-Applied Class-A Fire-Protection Over Wood-Framed Buildings During Construction Using the On-Site Wood-Frame CFIC Liquid Spraying System FIGS. 60A and 60B describe a method of verifying and documenting on-site spray-applied Class-A fire-protection over wood-framed buildings during construction using the on-site wood-frame CFIC liquid spraying system 100 shown in FIGS. 49 through 53. A description of this method is appropriate at this juncture.

As indicated at Block A in FIG. 60A, after a builder completes each predetermined section of a wood-framed building where wood-framing has been constructed and (plywood or OSB) sheathing installed, but before any wallboard has been installed, the spray technician uses an airless liquid spraying system 101 filled with clean fire inhibiting chemical (CFIC) liquid to spray the CFIC liquid over all exposed interior wood surfaces in the completed section of the wood-framed building.

As indicated at Block B in FIG. 60A, when the completed section of the wood-framed building is spray coated with CFIC liquid, the completed wood-framed building section is certified and marked as certified, with a barcoded/RFID-tagged inspection checkpoint 300 (with certificates of spraying and inspection) mounted at checkpoint locations in the completed section of the building, then certified and verified with signatures by the spray applicator and on-site spray supervisor manager (and optionally building site superintendent), and digitally documented by scanning and data capturing photos and/or audio-video recordings of the signed inspection checkpoint event, as shown in FIGS. 51A and 51B and FIGS. 63 and 64, and using the mobile application 120 for uploading the captured documents to the barcoded-project folder in the network database 113A on the system network 100, for subsequent visual inspection and insurance documentation purposes, as shown FIG. 61.

As indicated at Block C in FIG. 60A, as each section of the wood-framed building is constructed according to the construction schedule, the spray coating team continues to spray coat the completed section with CFIC liquid (e.g. Hartindo AF31), and certify and mark, using barcoded/RFID-tagged certificates of inspection (at inspection checkpoints) 300, each such completed spray coated section 118 (118A, 118B, 118C) of the building under construction.

As indicated at Block D in FIG. 60B, when the spray project is completed, the spray technician and supervisor then issue a time/date stamped "certificate of completion" certifying that clean fire inhibiting chemical (CFIC) liquid spray has been applied to all exposed interior wood surfaces on the interior of the wood-framed building during its construction phase, thereby providing the sprayed wood-framed building with Class-A fire-protection and defense against risk of total destruction by fire.

As indicated at Block E in FIG. 60B, before applying gypsum board and/or other wall board covering over the fire-protected spray-coated wood-framed building section 118, the mobile application 120 on mobile computing device 117 is used to capture and collect digital photographs and/or videos showing certificates of inspection at inspection checkpoints 300 posted on spray-coated fire-protected sheathing and/or lumber used in the wood framing of each completed building section, as visual evidence and job-site completion documentation, required or desired by insurance companies and/or government building departments and/or safety agencies. Preferably, each completed section of the wood-framed building should be assigned a section number by the builder, and if not by the builder, then by the spray application administrator, so that each certificate of completion, stamped on the wood surface of each section of the wood-framed building, and signed and dated by the on-site CFIC liquid spray applicator and on-site manager, will be digitally captured as images and/or AV recordings, and then uploaded to the system network database under the project ID number for project verification and documentation purposes.

As indicated at Block F in FIG. 60B, uploading captured digital photographs and videos collected during Block E to the centralized network database 113A on the system network 100, maintained by the fire-protection spray coating technician company, or its agent, as a valued-added service provided for the benefit of the property/building owner, builder, architect, home-owner and/or insurance companies involved in the building construction project.

As indicated at Block G in FIG. 60B, archiving all photographic and video records collected during Block E and uploading to the centralized web-based information server 111 at Block F for best practice and legal compliance purposes.

As indicated at Block H in FIG. 60A, when all sections of the building under construction have been completely spray coated with CFIC liquid, and certified as such, the spray technicians remove the spray equipment from the building, and the builder proceeds to the next stages of construction and completes the building construction according to architectural and building specifications and plans.

By virtue of the Web-based system network 100 described above, it is now possible for professional fire-protection specialists to (i) visually document the spraying of CFIC liquid over all exposed interior wood-surfaces of a wood-framed building under construction so as to achieve Class-A fire-protection, and (ii) after certifying with signatures, the proper on-site spray application of CFIC liquid, and Class-A fire-protection treatment of the wood-framed building, to capture and upload digital photographs and AV-recordings of certificates and related stamps, markings and signatures to a centralized website (e.g. system network database 113A), at which such uploaded and archived digital documents can be reviewed and downloaded when needed by architects, insurance companies, their inspectors, building owners, governmental officials, fire marshals and others who have a stake or interest in the matter of building fire-protection compliance and authentication. This remotely accessible facility, supported by the system network 100 of the present invention, provides a valuable and useful service to property/building owners, insurance underwriters, financial institutions (e.g. banks), and others who have great stakes in ensuring that particular wood-framed buildings have been properly Class-A fire-protected using the spray-treatment methods of the present invention described in great detail hereinabove.

Specification of an Exemplary Embodiment of the System Network of the Present Invention Used During the Management of the Logistical Operations and Certifications Made and Documented During Class-A Fire-Protection Spray Treatment of Wood-Framed Buildings During the Construction Phase The system network 100 of the present invention has been described in great detail above in connection with ways in which to verify and document the CFIC liquid spray treatment of wood-framed buildings on job sites during the construction phase, so that the various stakeholders will have remote access to a secure database 113A containing photographic and audio-visual recording documentation, relating to certifications, verifications and documentation of each CFIC liquid spray project managed using the system network 100 of the present invention. However, when practicing the present invention, it is understood there will be many different ways to implement the useful concepts embraced by such inventions, when deploying and using a system network 100 to manage such operations across any enterprise of local, national or global scope. To help teach those with ordinary skill in the art to practice the present invention, an illustrative embodiment will be described at this juncture with reference to FIGS. 61A through 64.

Figure 61A:
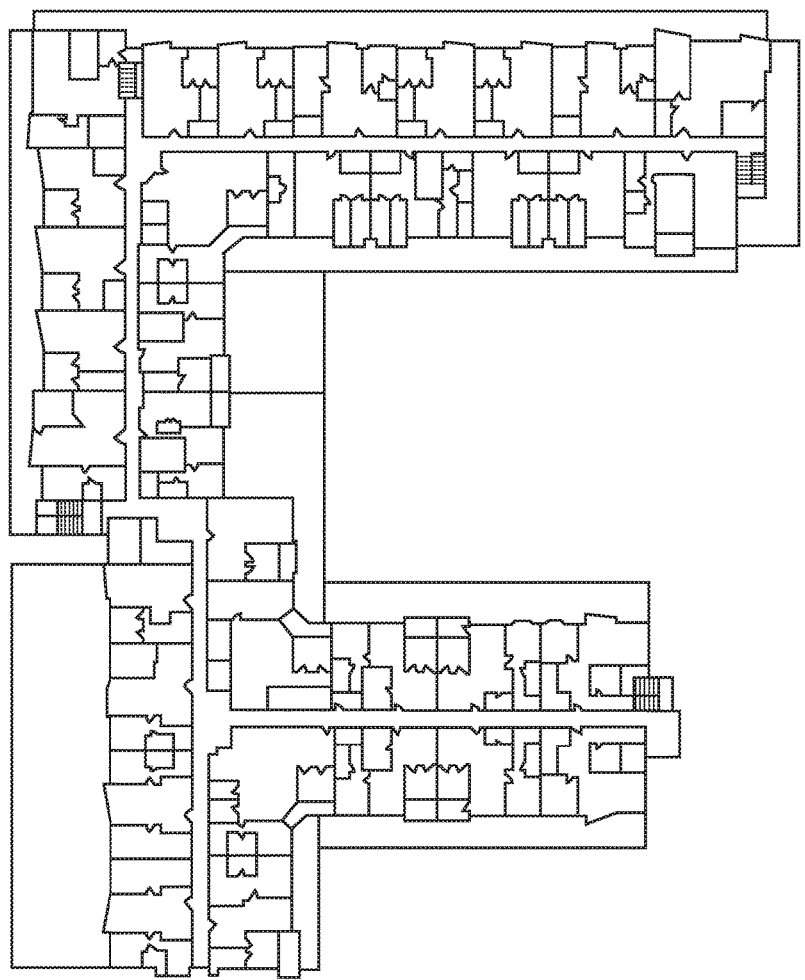
FIG. 61A is a schematic representation of architectural floor plans for a wood-framed building scheduled to be sprayed with CFIC liquid to provide exposed interior surfaces with Class-A fire-protection.
Figure 61B:
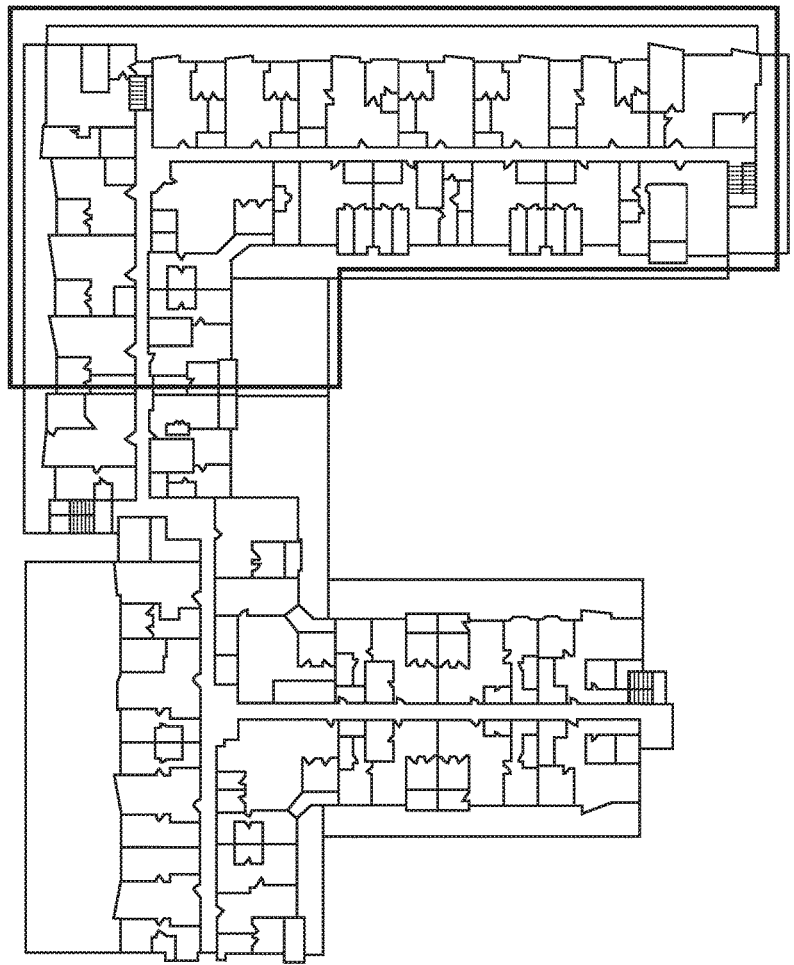
FIG. 61B is a schematic representation of architectural floor plans for a wood-framed building, with a section marked up by the builder, and scheduled to be sprayed with CFIC liquid to provide Class-A fire-protection.
Figure 61C:
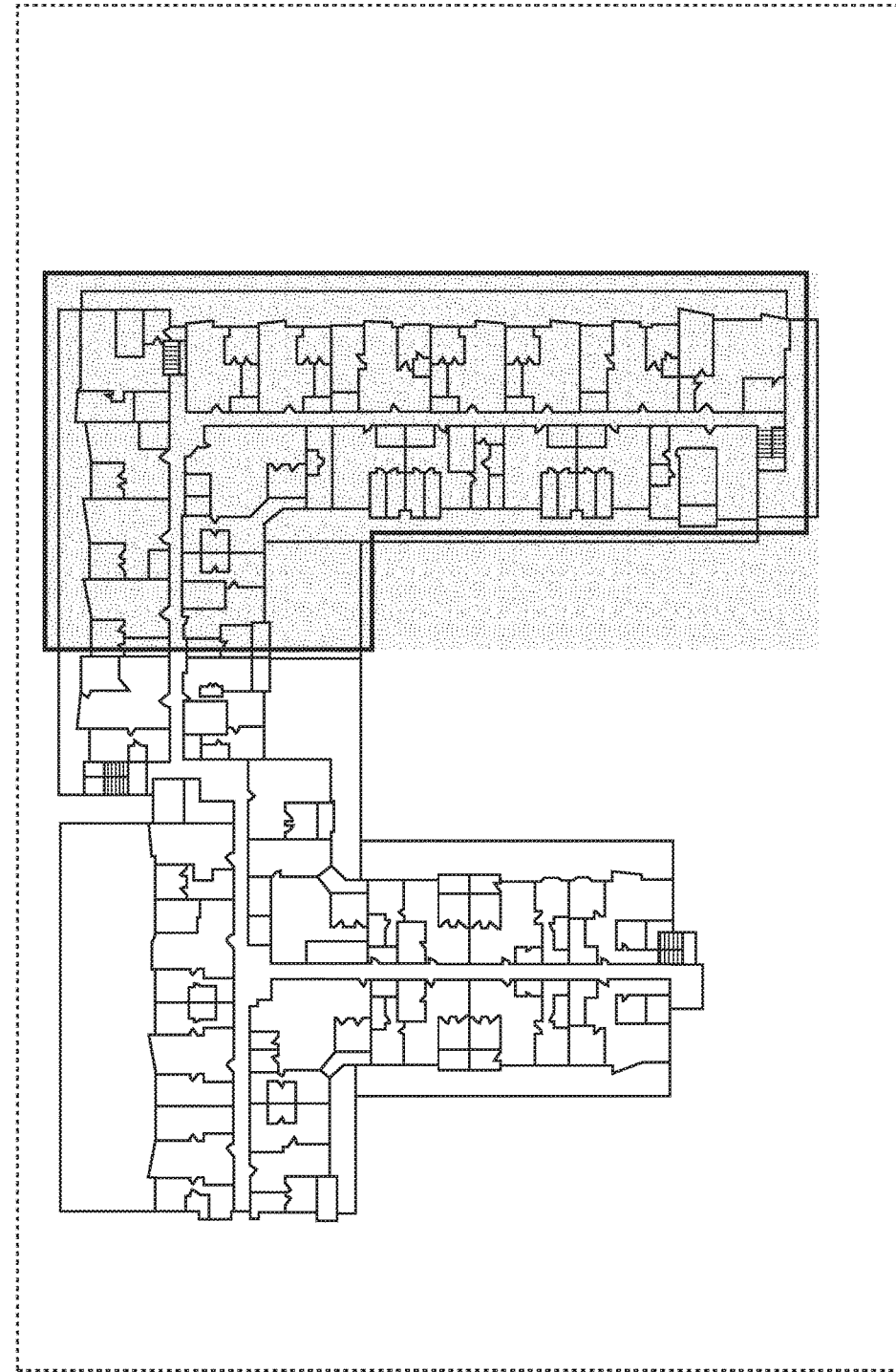
FIG. 61C is a schematic representation of marked-up architectural floor plans indicating a completed section that has been sprayed with CFIC liquid to provide exposed interior surfaces with Class-A fire-protection.

FIG. 61A shows architectural floor plans for a wood-framed building scheduled to be sprayed with CFIC liquid to provide exposed interior surfaces with Class-A fire-protection. These floor plans will be uploaded and stored in the network database 113A in the document folder/directory of the project. FIG. 61B shows architectural floor plans for an exemplary wood-framed building, with a section marked up by the builder (indicated in dark thick lines), and scheduled to be sprayed with CFIC liquid to provide Class-A fire-protection. FIG. 61C shows marked-up architectural floor plans indicating a completed section that has been sprayed with CFIC liquid to provide exposed interior surfaces with Class-A fire-protection. All such marked-up floor plans will also be stored in the network database 113A as part of the project's document package, as will be explained in greater detail herein below.

On the exemplary system network 100, the following stakeholders will be supported and use the mobile application 120 (or web-browser equivalent) during a spray project on a building construction site for the following purposes:

Project Coordinator—To initiate the project and track progress of the projects

CFIC Supply Chain Manager—To start the chain of custody for the supply of CFIC materials in shipping CFIC totes (i.e. CFIC liquid concentrate in totes for diluting with water at job sites, or CFIC dry power in totes for mixing with water at job sites)

Site Spray Manager—To continue the chain of custody and electronically notify the site spray technician where they need to spray and then review to see if it has been sprayed Site Spray Technicians—To continue the chain of custody and indicate sprayed areas Spray Administrator Management—To review progress of the projects Building Owners (i.e. Customers or site superintendent)—To continue the chain of custody and to order the spray contractor to spray parts or sections of their buildings Insurance companies—To review real time progress on when their insured buildings are protected.

Fire fighters—To check if a building fire, to which they are responding, has been defended from fire using CFIC liquid spray treatment disclosed and taught herein.

The system network 100 and its distribution of mobile computing devices (running mobile application 120 or web-browser equivalents) will have the capability to list all spray projects linked to the user, wherein each project contains numerous project details and information of different relevance to different stakeholders. In the illustrative embodiment, all projects will be searchable by customer name then project name. The building owners (often referred to as the "customer" with respect to the spray contractor) will only be able to access their projects, not the projects of others which will be maintained confidential on the system network 100. The mobile application 120 will be able to send push-notifications where required, and users will choose what notifications they want to receive. For example, the customer's insurance company will have the option to only be notified when a portion of the building has been sprayed, or when only an entire floor has been sprayed.

Upon creating a new project on the system network 100, the spray project coordinator will use the mobile application 120 to add various information items regarding the project, in the network database 113A, including, for example: Customer Name (e.g. Building Owner Name); Project Name; Site Address; Superintendent's name and title, mobile number, email address; number of buildings associated with the project.

The mobile application 120 will then start with building 1 or building A, and prompt the user for the following information: Identify Building Type—by choosing a type from a drop down menu (i.e. apartment, townhouse, house, etc). If the Building Type is an apartment, then the user will be asked to describe the building (i.e. 3, 4 or 5 stories, square footage, total number of suites).

Figure 62:
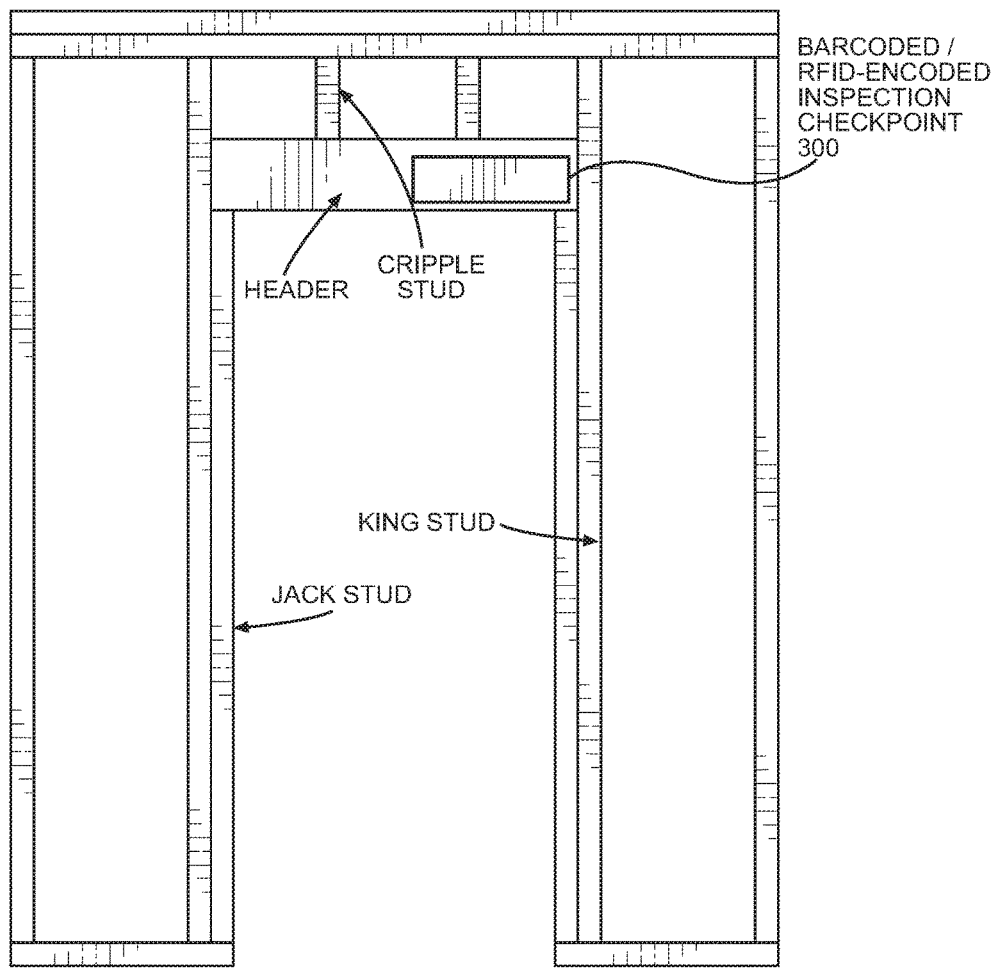
FIG. 62 is a schematic representation of a wood-framed door panel showing the studs and header above a doorway, on which the barcoded/RFID-tag encoded inspection checkpoint, realized on a piece of flexible plastic material and supporting a barcode symbol and RFID tag, and certification by a spray technician and spray supervisor, showing greater detail in FIG. 63.

Mobile application 120 has the capability to import one or more pdf documents of each floor plan of the building into the project folder on the network database 113A, as shown in FIG. 62A. At this stage, the mobile application 120 will ask the user to import one or more pdf document(s) of the floor plan of each floor in the building, and will ask to identify the building, floor, and provide other information for subsequent use and marking. In particular, the application servers 112 will support advanced pdf document processing software enabling the users to index imported building floor plans to indicate the precise location where barcoded/RFID-tagged inspection checkpoints 300 (with integrated certificates of spraying, certificates of inspection) shown be posted during the project, as shown in FIGS. 62 and 63, for purposes of illustration.

The mobile application 120 will also request from the spray project coordinator, a Project Start Date when spray technicians should be begin spraying, in coordination with the construction schedule. Once the project has been created, the mobile application 120 will automatically send a push notification to: CFIC supply manager; building site coordinator; and spray administrators. Each user will be invited to project, with certain rights and privileges as determined and set by the spray project administrator (i.e. fire-protection provider administrator).

When the CFIC totes are ready to be filled or shipped, the mobile application 120 will prompt the CFIC Supply Manager user for various items of information relating to CFIC material required on certain building sites, in connection with specific projects. The user will navigate to the project on the mobile application 120, and will store the CFIC tote information that multiple CFIC totes are required per project. For purposes of the present invention, the term "tote" shall mean any device fashioned to contain and hold a predetermined quantity of CFIC material, whether in dry power form, or concentrated liquid form, and may include bags, containers, bottles, or any other type of vessel capable of perform functions of containment and carrying. Estimates of CFIC material, based on the size of the building spray job, can be calculated using tables and other knowledge possessed by the CFIC supply chain manager, and may be automated using AI-based processes. In an illustrative embodiment, the user will select one of the following buttons; Add a CFIC Tote; Ship A CFIC Tote. If the user selects "add a CFIC tote" then they will be prompted for the following; the date (chosen from a calendar), the CFIC tote number, the size of the CFIC tote, dye (yes or no) mold protection (yes or no). If the user wants to "ship a CFIC tote", then the user navigates to the project and selects the "ship a CFIC tote" button and chooses the CFIC tote the user wants to ship from a drop-down menu. The user will then pick a date from a calendar. The user will have to enter the ship date and the arrival date and name of the shipping carrier.

Once the CFIC Tote arrives at building job-site, the building site supervisor will log into the system network via the mobile application 120, and perform the following system network operations. The building site supervisor (i.e. customer) will navigate to the project on the mobile application 120, and sign off that the CFIC tote has arrived at the job site, with its locks intact and that CFIC tote has not been tampered. The site supervisor will use his/her finger to sign this confirmation in the mobile application 120.

When the building owner (i.e. customer) wants to request a completed portion or section of a wood-framed building to be sprayed-treated with CFIC liquid, the Building site supervisor will perform the following system network operations. The building site supervisor use the mobile application 120 to navigate to their project and enter the portion of their building they want sprayed with CFIC liquid. The building site supervisor will indicate the date the request was made, building number, the floor and the suites they want sprayed and date they want it sprayed. The mobile application 120 will send a notification via the mobile application 120 to the project coordinator, to let them know the request has been made. The spray project coordinator will use the mobile application 120 to either accept the requested spray date, or propose a new spray date to the building site supervisor. If the spray project coordinator (i.e. fire protection provider) accepts the proposed spray date, then a confirmation will be sent to the building site superintendent via the system network using the mobile application 120.

Once the spray contractors (i.e. fire protection providers) arrive on-site of the building and are ready to spray CFIC liquid as requested, the site spray technician will perform the following operations in the system network 100 using the mobile application 120. The site spray technician will mix a CFIC tote (e.g. by adding water to a tote contain CFIC liquid concentrate, or by adding water to the tote containing AAF31 powder and dye, if the project requires dye). If the project requires mold protection, then that will be added at the time the CFIC tote is mixed on site), and the spray technicians will sign in to the mobile application 120, navigate to the project page, and click on "on-site CFIC tote preparation". The spray technicians will choose the CFIC tote number from the drop-down list (previously created by the CFIC supply manager) and then enter the date, by clicking on a calendar date. The spray technicians will indicate if they have added dye, and or mold protection to the CFIC material.

When the spray date arrives, the building site superintendent will do a walk through of the intended spray area (i.e. floor plan) and inspect to make sure the area is ready to spray all exposed interior wood surfaces with CFIC liquid. The building site superintendent will attach an RFID tag and/or bar code symbol at each inspection checkpoint 300 marked on the floor plans of the wood-framed building to be spray-treated with CFIC liquid spray, indicated in FIG. 61B. Each RFID tag and/or bar code symbol will be encoded with a unique code identifier that is marked on the floor plan, and uniquely associated with the project, and added to the network database 113A on the system network.

Preferably, the spray site superintendent will mount a barcoded/RFID-encoded inspection checkpoint 300 (bearing a certificate of spraying by the spray technician and a certificate of inspection by the spray supervisor and optionally the building site supervisor, printed on a thin flexible plastic sheet, on which a barcode symbol/RFID-tag are mounted) to (i) the entry door header of each room in each unit including the entrance to the unit, as illustrated in FIG. 62, and also (ii) a stud located at every 10' on one side of the hallway. Expectedly, the location of each barcoded/RFID-tagged inspection checkpoint 300 in any given project will vary. However, placement of such inspection checkpoints 300 should be selected to ensure that inspection is sufficient granular in resolution to not overlook significant areas of a sprayed wood-framed building section under inspection.

Each barcoded/RFID-tagged inspection checkpoint will include a bar code symbol and RFID tag that has a unique project/inspection-checkpoint identifier (e.g. an alphanumeric character string) encoded into the symbology used in the barcode symbol and RFID tag identifier, and this project/inspection-checkpoint identifier will be used to identify subfolders or subdirectories where collection data, information and documents are stored in the project folder on the network database 113A, maintained on the system network 100. The project/inspection-checkpoint identifier will be read during each scan/read of the barcoded/RFID-tag inspection checkpoint 300, and used by the mobile application to access the appropriate inspection checkpoint folder in the project folder where all such certifications of spraying, inspection and oversight, and photos, and videos are stored and archived for posterity.

At the beginning of each spray session, the spray technician will log into the system network 100 using the mobile application 120, then navigate to the project page, select his name from a drop down or scrolling list, and indicate when he started spraying by clicking on a date and hour, minutes, seconds. The spray technician may also need to scan his barcoded ID card using the mobile application 120 for proper authentication and/or authorization purposes. He may also choose to record the presence of other members of his spray crew using the mobile application and their barcoded user ID cards and network ID numbers. The spray technician will then proceed to spray each assigned section of the building, and after spraying each wood-framed building section, the spray technician will approach the barcoded/RFID-tagged inspection checkpoint 300 in the spray area, and read, sign and date the certification of spraying on the checkpoint substrate, mounted on the header surface illustrated in FIGS. 62 and 63. The spray technician should diligently read, sign and date each and every certificate of spraying at the inspection checkpoint 300, and treated as a condition of professionalism, duty, and employment, given the responsibility being entrusted to the individual with such operations.

At the end of the day, the spray technician will log into the system network 100, if already logged out, using the mobile application 120, and indicate the time when he finished spraying and indicate which suites on the floor plan pdf were sprayed with CFIC liquid. This will be done by drawing on his mobile computing device 117 (e.g. Apple iPad or Apple iPhone), by shading the PDF of the floor plan, over the appropriate suites and hallways, as shown in FIG. 61C, which were in fact sprayed with CFIC liquid during his work session that date. This is the same floor plan that was previously loaded on the mobile application 120 by the customer/building owner, as shown in FIG. 61A, but with the spray technicians markings added to the floor plan to indicate sections which have been spray treated with CFIC liquid.

At the end of each day or during the course of the day, the spray site superintendent will review the CFIC liquid spraying work performed on the job site that date, to ensure that the spray work has been completed properly.

The spray supervisor will visit each checkpoint 300, and read, sign and date the certificate of inspection at the inspection checkpoint 300 after performing a diligent inspection at and around the checkpoint where spraying occurred earlier that day. At each barcoded/RFID-tagged inspection checkpoint 300 on the plan, the spray site supervisor will also scan each and every barcoded/RFID-tag inspection checkpoint 300, and confirm with the system network 100 that the spray work at each inspection checkpoint has been completed properly. This process will involve displaying GUI screens on the mobile application 120 and checking off all suites/units and hallways have been completed and sprayed with CFIC liquid, and uploading such information to the project folder on the network database 113A on the system network 100. The process can also include capturing digital photos and AV-recordings of the site in the vicinity of each barcoded/RFID-tagged inspection checkpoint, verifying and documenting the certifications at each inspection checkpoint signed by the spray-technician after CFIC liquid spraying, and then uploading these captured digital photos and AV recordings to the project under the inspection checkpoint ID, within the network database 113A maintained by the system network 100.

Also, it is desired that the building site superintendent visit each checkpoint and read, sign and date the certificate of inspection/oversight by the building superintendent on the job site on that date. The building site superintendent should also use the mobile application 120 to capture digital images and videos of this certificate and competed inspection checkpoint, and surrounding areas treated with CFIC liquid by the spray technician. Images and video recordings of the spray technician and supervisor can be included at each and every barcoded/RFID-tagged inspection checkpoint 300 and uploaded to the project folder, under the barcoded/RFID-tagged inspect checkpoints 300 assigned to the project.

The above steps above will be repeated every time the spray crew arrives at the building site until the project is complete.

Each time a CFIC tote is mixed at the job site by the spray technician, he/she will spray six 1-foot long 2×4's test boards (301A, 301B) covering all sides (e.g. 3 sprayed test boards for spray administrator and 3 sprayed test boards for the customer). The sample test boards 301 will be marked with the tote number. Alternatively, CFIC liquid sprayed test boards 301 can be made at or near barcode/RFID-tagged inspection checkpoints 300 in the building, and marked with the barcode/RFID ID number, and date they were sprayed. The fact that these sample test boards 301 were created will be recorded using the mobile application 120 in either the CFIC tote supply record section of each project, or under a barcode symbol/RFID-tag ID section of the project. Digital images and videos of these sprayed test boards 301 can be captured and uploaded to project folder in the network database 113A maintained on the system network 100.

At the completion of the project, the spray site superintendent will check the box that the project is complete. The spray site superintendent will request the building project superintendent to sign that the project has been completed, and such documentation will be made part of the project files stored in the network database 113A on the system network 100. A physical certificate of completion document can be signed and dated and scanned into pdf format and stored in the project file in the network database 113A, using the mobile application 120 deployed on the system network 100. Once the project has been completed, the system network 100 will send a notification to the local fire department, the insurance underwriting company, the building owner (i.e. customer), and the spray project coordinator. The system network will automatically organize all documents, data and information collected during the course of the project, and compile for presentation to various parties including the building owner, and property insurance underwriters.

The site spray technician will then collect all the sprayed samples 301A, 301B stored in barcoded storage sleeves 302A, 302B and deliver the first set of test samples 301A to the building site superintendent or the building's architect, while providing the second set of the sprayed test samples 301B to the spray supervisor to transport and archive in storage, as part of the fire protection provider's legal and business records. The spray technician will certify that he has provided the first set of sprayed test samples in storage sleeves to the building site superintendent, and the second set of sprayed test samples to the spray site superintendent. The building site superintendent will sign that he has received the sprayed test samples in their barcoded storage sleeves. The second set of sprayed test samples can be shipped to the fire protection provider's warehouse for archival purposes.

Figure 64:
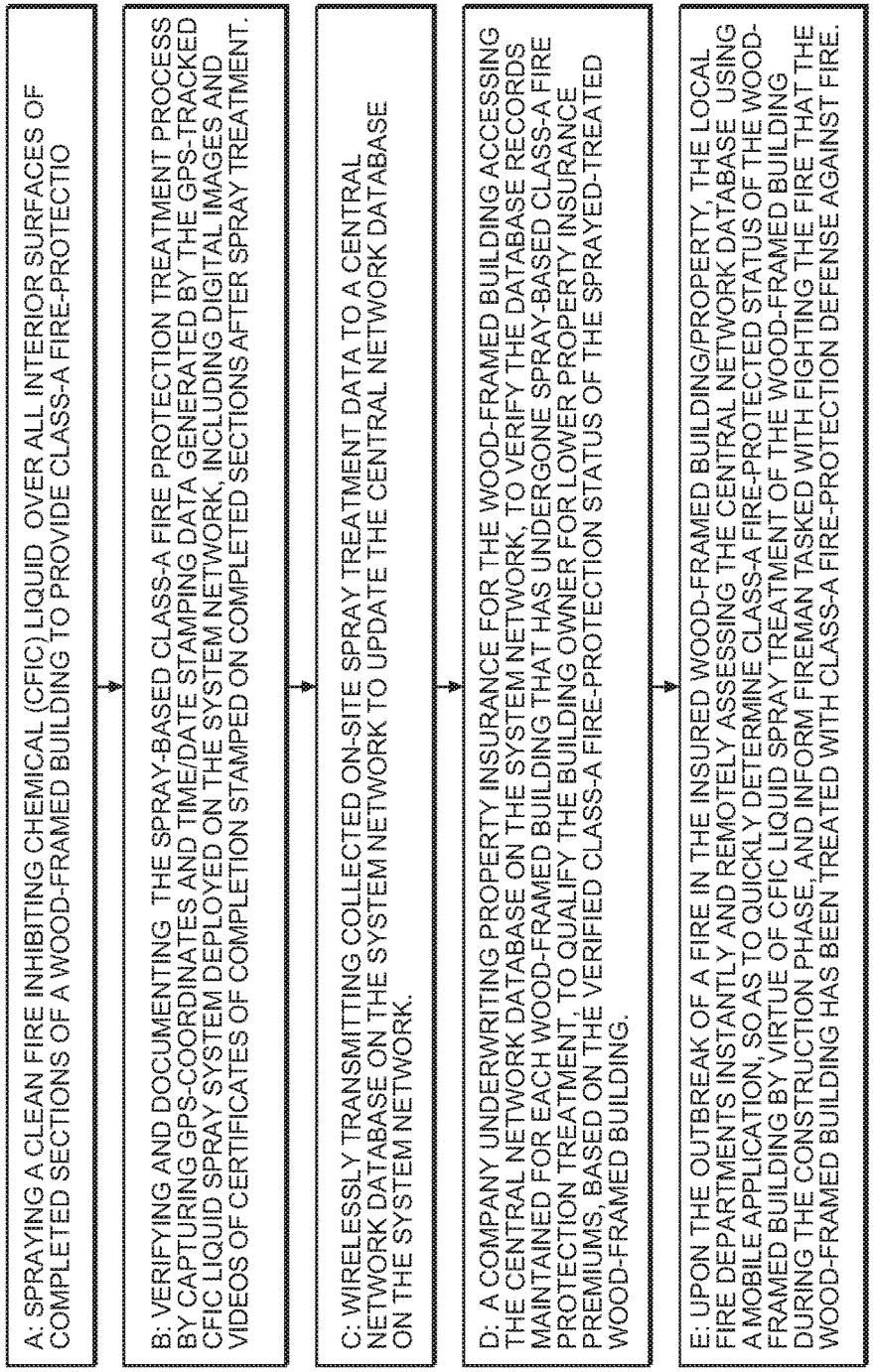
FIG. 64 is a flow chart describing the primary steps of the method of qualifying real property for reduced property insurance, based on verified on-site spraying of the exposed interior surfaces of wood-frame buildings with clean fire inhibiting chemical (CFIC) liquid during the construction stage of the building, using the system network of the present invention.

Method of Qualifying a Wood-Framed Building for Reduced Property Insurance Based on Verified and Documented Spray-Based Clean Fire Inhibiting Chemical (CFIC) Liquid Treatment of all Exposed Interior Wood Surfaces of the Wood-Framed Building During the Construction Phase Thereof FIG. 64 shows the high-level steps required to practice the method of qualifying a wood-framed building for reduced property insurance based on verified and documented spray-based clean fire inhibiting chemical (CFIC) liquid treatment of all of the exposed interior surfaces of the wood-framed building, after each completed section.

As indicated at Block A in FIG. 64, a clean fire inhibiting chemical (CFIC) liquid is sprayed all over all interior surfaces of each completed sections of a wood-framed building to provide Class-A fire-protection, as described above in FIGS. 60A and 60B, using the GPS-tracked/GSM-linked mobile clean fire-inhibiting chemical (CFIC) liquid spraying system 101, as shown in FIGS. 49, 50, 50 and 50B.

As indicated at Block B in FIG. 64, the spray-based class-A fire protection treatment process is verified and documented by capturing (i) GPS-coordinates and time/date stamping data generated by the GPS-tracked CFIC liquid spray system 101 deployed on the system network, and (ii) digital images, and audio-video (AV) recordings of certificates of completion 181 stamped on completed sections after spray treatment, as illustrated in FIGS. 51A and 51B, using the mobile application 120 on mobile computing device 117.

As indicated at Block C in FIG. 64, the collected on-site spray treatment verification data is wirelessly transmitted to a central network database 113A on the system network to update the central network database on the system network 109.

As indicated at Block E in FIG. 64, a company underwriting property insurance for the wood-framed building accesses the central network database 113A on the system network 100, to verify the database records maintained for each wood-framed building that has undergone spray-based Class-A fire protection treatment, to qualify the building owner for lower property insurance premiums, based on the verified Class-A fire-protection status of the sprayed-treated wood-framed building.

As indicated at Block E in FIG. 64, upon the outbreak of a fire in the insured wood-framed building/property, the local fire departments instantly and remotely assess the central network database 113A using a mobile application 120, so as to quickly determine Class-A fire-protected status of the wood-framed building by virtue of CFIC liquid spray treatment of the wood-framed building during the construction phase, and inform fireman tasked with fighting the fire that the wood-framed building has been treated with Class-A fire-protection defense against fire.

Figure 65A:
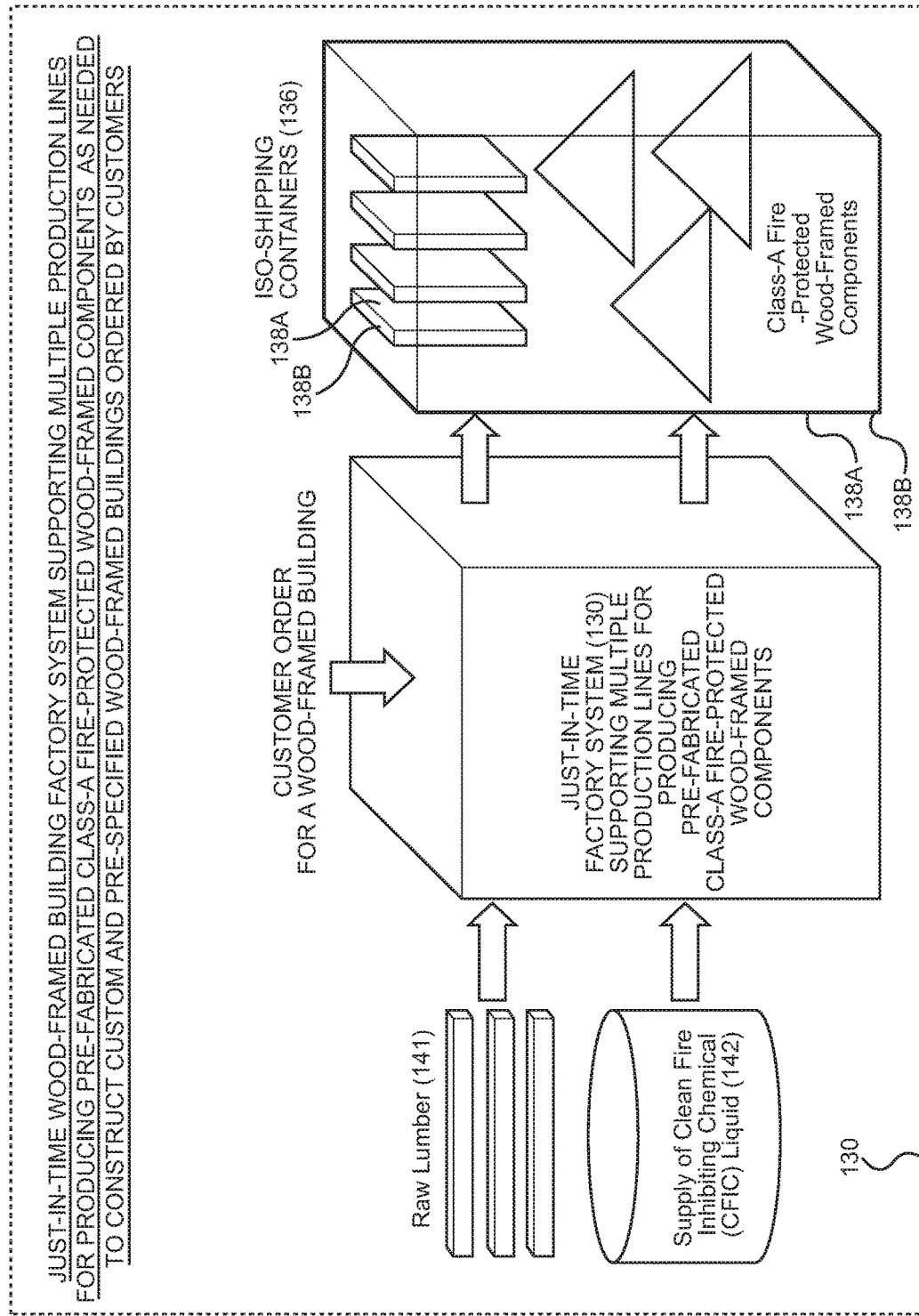
FIG. 65A is a schematic representation of a just-in-time wood-framed building factory system supporting multiple production lines for producing pre-fabricated Class-A fire-protected wood-framed components as needed to construct custom and pre-specified wood-framed buildings ordered by customers.

Just-in-Time Wood-Framed Building Factory Method, System and Network Supporting Multiple Production Lines for Producing Pre-Fabricated Class-A Fire-Protected Wood-Framed Components as Needed to Construct Custom and Pre-Specified Wood-Framed Buildings Ordered by Customers FIG. 65A shows a just-in-time wood-framed building factory system 130 supporting multiple production lines 131A, 131B, 131C, etc. for producing pre-fabricated Class-A fire-protected wood-framed components as needed to construct custom and pre-specified wood-framed buildings ordered by customers, as the case may be, from anywhere around the globe. In accordance with the principles of the present invention, each production line includes a conveyor for conveying wood components (e.g. raw lumber, finger-jointed lumber, CLT components and/or LVL components) along at least a portion of the production line and through, into and out of a dipping tank, as described herein, filled with clean fire inhibiting chemical (CFIC) liquid (e.g. Hartindo AF21 Anti-Fire Chemical Liquid), and allowed to dry and attain Class-A fire-protection properties during the wood-framed component fabrication process.

Figure 65B:
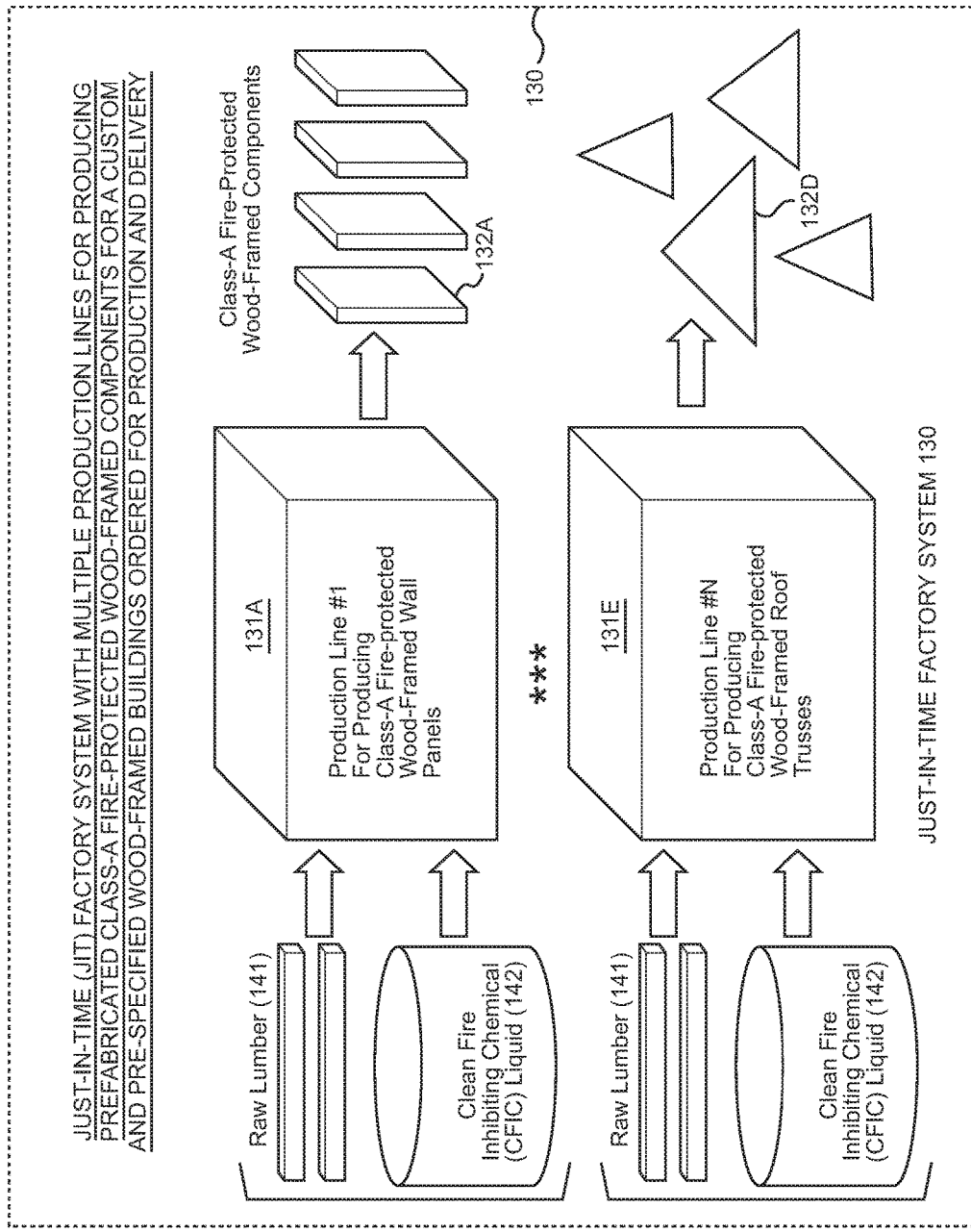
FIG. 65B is a schematic representation of a just-in-time (JIT) factory system with multiple production lines for producing prefabricated Class-A fire-protected wood-framed components (e.g. wood-framed walls, staircases, roof trusses, floor trusses, etc.) for use in constructing custom and pre-specified wood-framed buildings ordered by customers for production and delivery.

FIG. 65B shows the just-in-time (JIT) factory system 130 of FIG. 61 in greater detail, with production lines shown for producing various kinds of prefabricated Class-A fire-protected wood-framed components (e.g. wood-framed walls, staircases, roof trusses, floor trusses, etc.) 132A, 132B, and 132C which are used in constructing custom and pre-specified wood-framed buildings ordered by customers for production and delivery. As shown, each production line 131 requires inputs such as (i) an order for a customer or pre-specified wood-framed building; (ii) raw lumber 141 of a certain type and in a certain quantity to build the ordered custom or prespecified wood-framed building; as well as (iii) CFIC liquid 142 in sufficient supply to render the raw lumber Class-A fire-protected in accordance with the principles of the present invention disclosed herein. As shown in FIG. 62, the outputs from the factory system 130 are Class-A fire-protected wood-framed building components such as (i) wall panels 132A, (ii) floor panels 132B, (iii) floor trusses 132C, (iv) roof trusses 132D, and (v) stair panels 132E, manufactured using the dip-coating methods disclosed herein, for use in constructing custom and specified wood-framed buildings.

Figure 66:
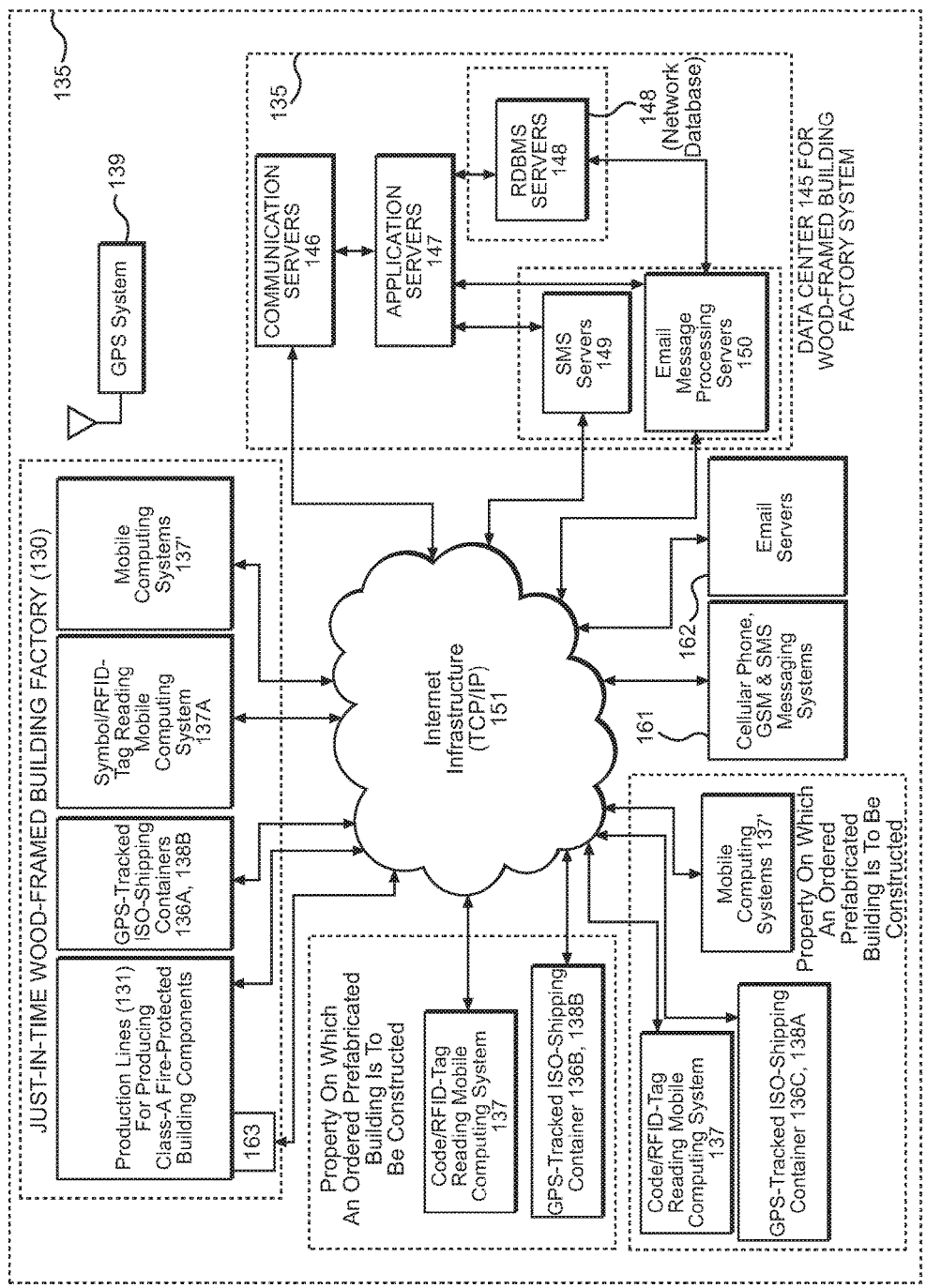
FIG. 66 is a schematic system network representation of the just-in-time factory system shown in FIGS. 65A and 65B, shown comprising (i) a just-in-time wood-framed building factory with multiple production lines for producing Class-A fire-protected building components, (ii) GPS-tracked ISO-shipping containers and code symbol/RFID tag reading mobile computing system, and (iii) a data center for factory system and supporting a network of mobile computing devices running a mobile application adapted to help track and manage orders, projects and supplies for prefabricating Class-A fire-protected wood-framed buildings, and Class-A fire-protected wood-framed building components for use in constructing the same.

FIG. 66 shows the just-in-time factory system network 135 shown in FIGS. 65A and 65B, shown comprising: (i) the just-in-time wood-framed building factory 130, shown in FIGS. 65A and 65B and described above, with multiple production lines 131A through 131D for producing Class-A fire-protected building components as illustrated in FIG. 65B; (ii) RFID-tagged/coded ISO-shipping containers 136 shown in FIG. 65A, and mobile code symbol/RFID tag reading mobile computing systems 137 for reading optical code symbols (e.g. PDF 417, etc) 138A and RFID tags 138B well known in the shipment tracking art; a (iii) a data center 145, operably connected to the TCP/IP internet infrastructure 151 for supporting enterprise resource planning (ERP) related operations within the wood-framed building factory system 130 shown in FIGS. 65A and 65B, and supporting a network of mobile computing devices 137 shown in FIG. 64, each running a mobile application 153 adapted to help track and manage (i) orders placed by customers for prefabricated Class-A fire-protected wood-framed buildings, and (ii) projects within the factory system involving the placed customer orders. As shown, the data center 145 comprises: web (http and ftp) communication servers 146; application servers 147; database servers (RDBMS) 148; SMS servers 149; and email message servers 150, well known in the art.

As shown in FIG. 66, the system also includes a GPS system 139 for transmitting GPS reference signals transmitted from a constellation of GPS satellites deployed in orbit around the Earth, to GPS transceivers installed aboard each GPS-tracking ISO-shipping containers 136A, 136B, as part of the illustrative embodiments. From the GPS signals it receives, each GPS transceiver is capable of computing in real-time the GPS location of its host system, in terms of longitude and latitude. In the case of the Empire State Building in NYC, N.Y., its GPS location is specified as: N40° 44.9064', W073° 59.0735'; and in number only format, as: 40.748440, −73.984559, with the first number indicating latitude, and the second number representing longitude (the minus sign indicates "west").

FIG. 67 shows the mobile client computing system(s) 137, 137' used in the system network 135 shown in FIG. 63, supporting mobile application 153 installed on each registered mobile computing system 137, 137'. The purpose of the mobile application 153 is to provide a convenient tool for tracking and managing projects involving factory-applied clean fire inhibiting chemical (CFIC) liquid dip-coating treatment of wood pieces during the prefabrication of Class-A fire-protected wood-framed buildings. In the event that CFIC liquid solution is mixed on site by adding water to preblended dry powder chemicals at a toll blender, the mobile application can be used to track chain of custody from our toll blender to the factory site where the toted power mixture is added to water to produce an aqueous-based CFIC liquid solution, for high-speed dip-coating 100% of all wood/lumber used to fabricate Class-A fire-protected wood-framed building components along production lines inside the factory 130 shown in FIGS. 65A, 65B and 66.

Using the custom-designed mobile application 153 of the present invention, prefabricated building purchasers, builders and architects alike can track the progress being made while an order for a prefabricated Class-A fire-protected wood-framed building is being executed as a prefabricated wood-framed building project. During the process, all wood pieces used to fabricate each wood-framed building component is automatically dip-coated in a tank of CFIC liquid, as shown in FIGS. 19A, 23A, 27A, and 33A, in a just-in-time manner, during the building fabrication schedule, so as to provide 100% Class-A fire-protected wood-framed building components. These components can then be used in constructing Class-A fire-protected prefabricated wood-framed buildings. The mobile application 153 can be used to review all collected digital images, and audio and visual evidence of certificates, stamps, signatures and verifications during the course of the just-in-time prefabrication building project.

Specification of the Network Architecture of the System Network of the Present Invention FIG. 66 illustrates the network architecture of the system network of the present invention 135 for the case where the system of the present invention is implemented as a stand-alone platform deployed on the Internet.

As shown in FIG. 66, the Internet-based system network comprises: cellular phone and SMS messaging systems 161; email servers 1162; a network of mobile computing systems 136 (136A, 136B) running enterprise-level mobile application software; and one or more industrial-strength data center(s) 145, preferably mirrored with each other and running Border Gateway Protocol (BGP) between its router gateways.

As shown in FIG. 66, each data center 145 comprises: a cluster of communication servers 146 for supporting http and other TCP/IP based communication protocols on the Internet (and hosting Web sites); a cluster of application servers 147; a cluster of RDBMS servers 148 configured within a distributed file storage and retrieval ecosystem/system, and interfaced around the TCP/IP infrastructure of the Internet well known in the art; an SMS gateway server 149 supporting integrated email and SMS messaging, handling and processing services that enable flexible messaging across the system network, supporting push notifications; and a cluster of email processing servers 150.

Referring to FIG. 66, the cluster of communication servers 146 is accessed by web-enabled clients (e.g. smart phones, wireless tablet computers, desktop computers, computer workstations, etc) 137 (137A, 137B) used by stakeholders accessing services supported by the system network. The cluster of application servers 147 implement many core and compositional object-oriented software modules supporting the system network 145. The cluster of RDBMS servers 148 use SQL to query and manage datasets residing in its distributed data storage environment.

Figure 69:
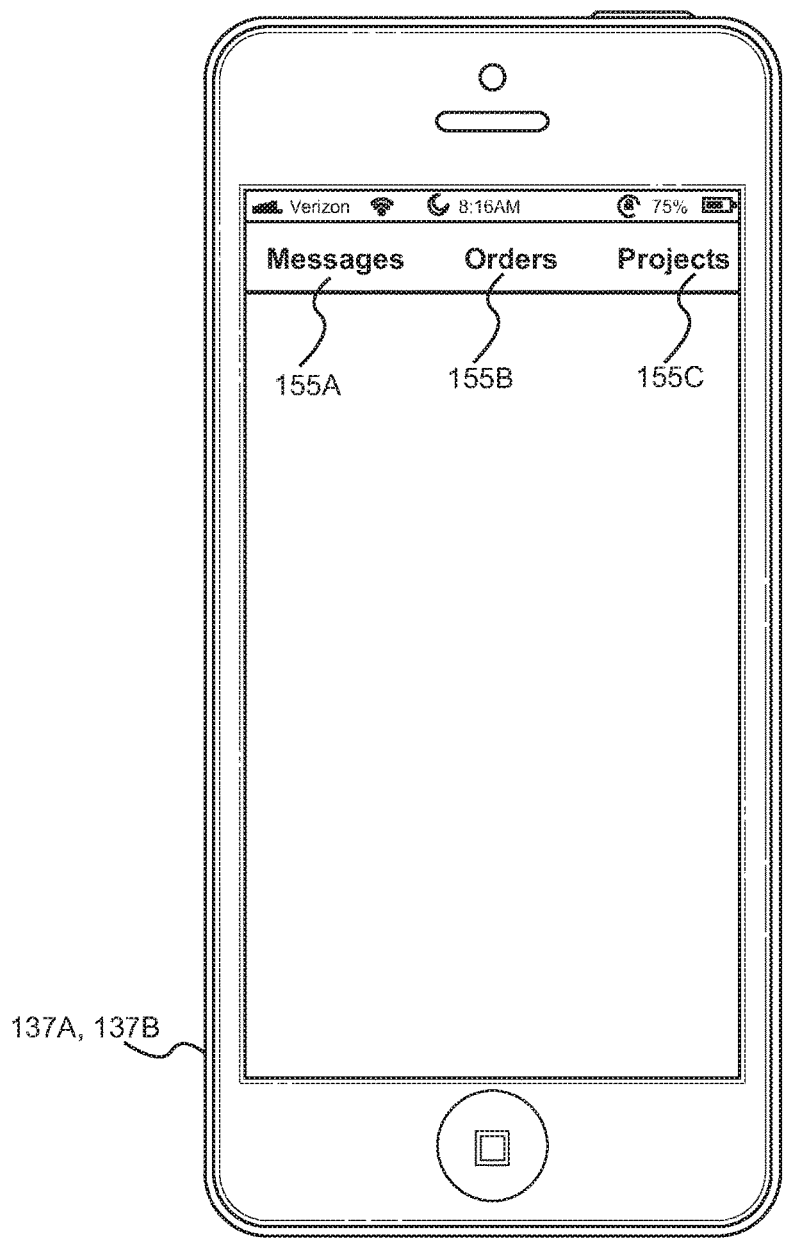
FIG. 69 is an exemplary wire frame model of a graphical user interface of a mobile application of the present invention configured used by customers who place orders for prefabricated Class-A fire-protected wood-framed buildings, supported by the system of the present invention.
Figure 70:
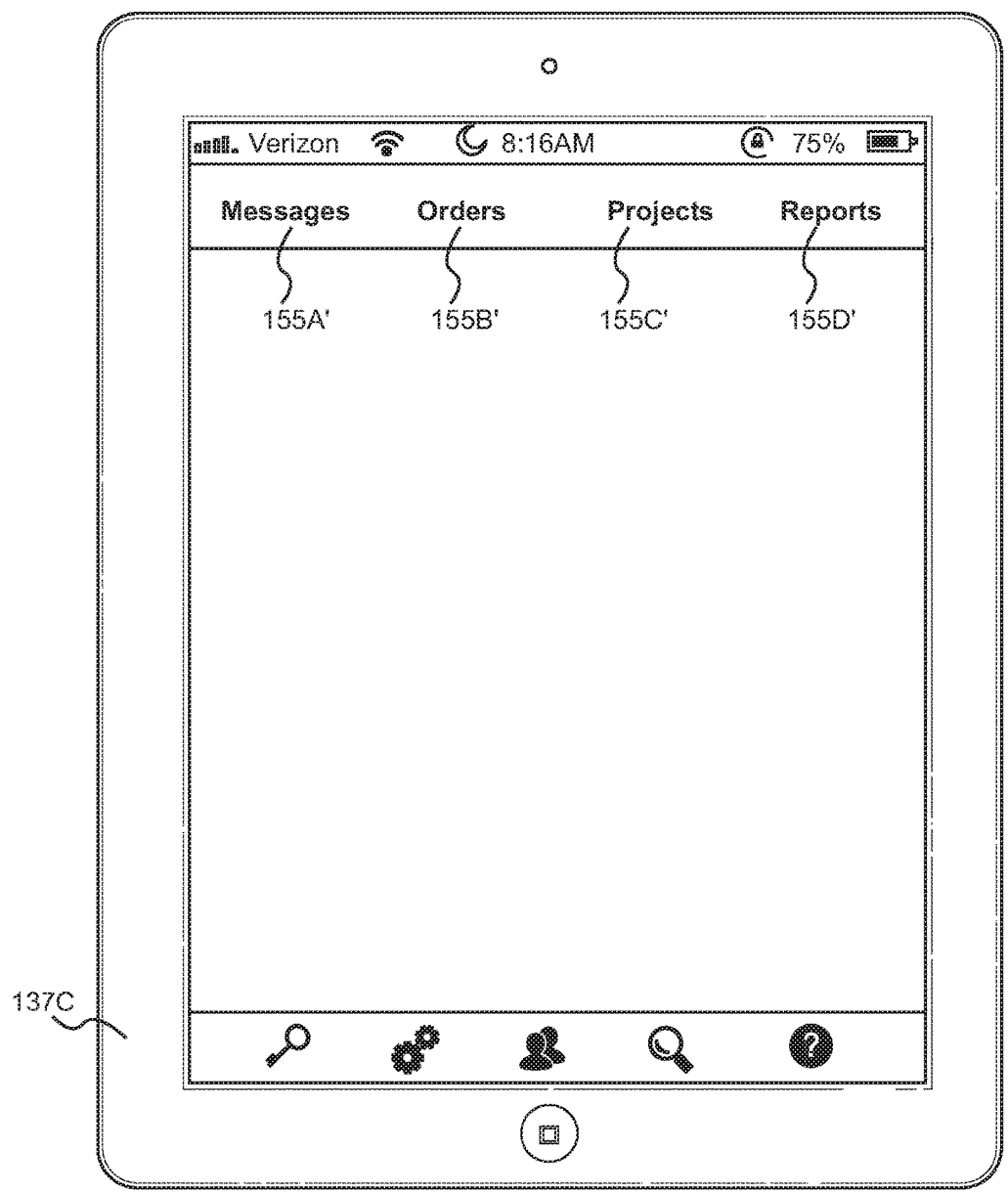
FIG. 70 is an exemplary wire frame model for a graphical user interface of a mobile application configured for use by project administrators, managers, fabricators and technicians showing a high-level menu of services supported by the system network of the present invention.
Figure 70A:
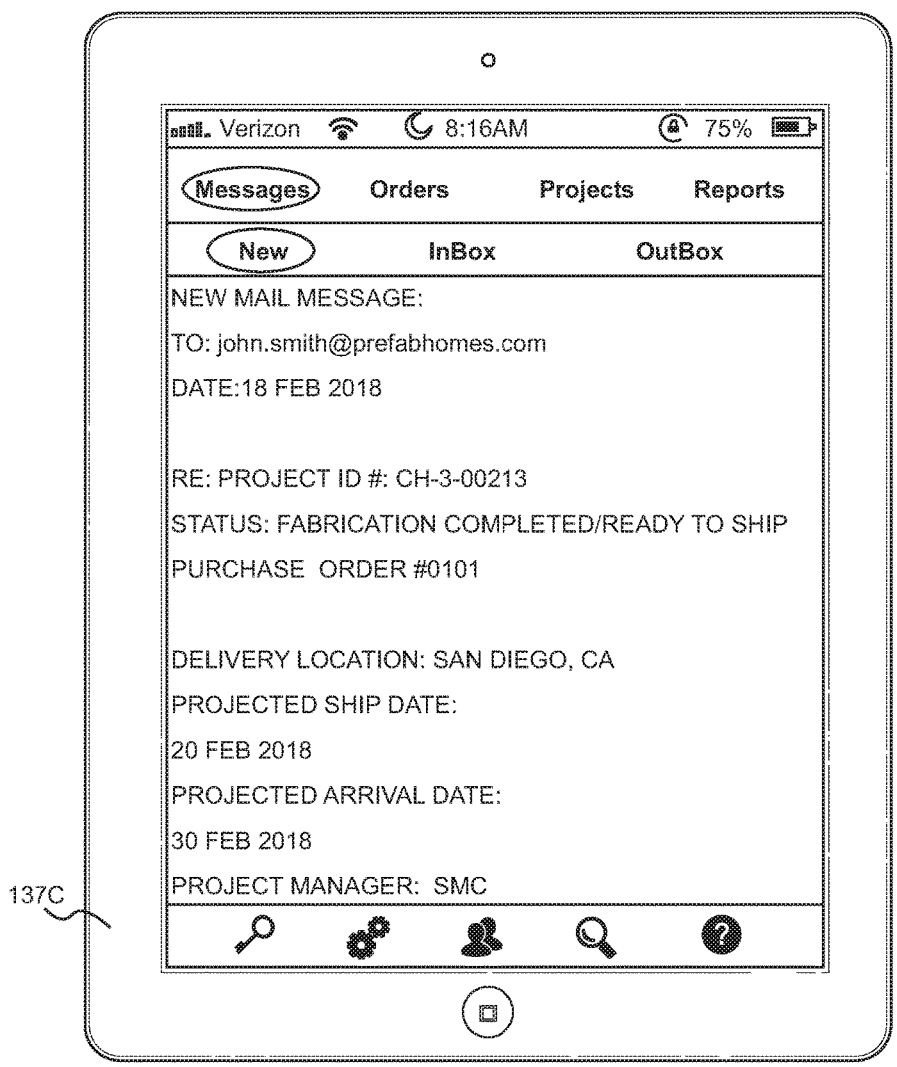
FIG. 70A is an exemplary wire frame model for a graphical user interface of the mobile application configured for use by project administrators and managers showing the creation of a new message about a specific project, using message services supported on the system network of the present invention.
Figure 70B:
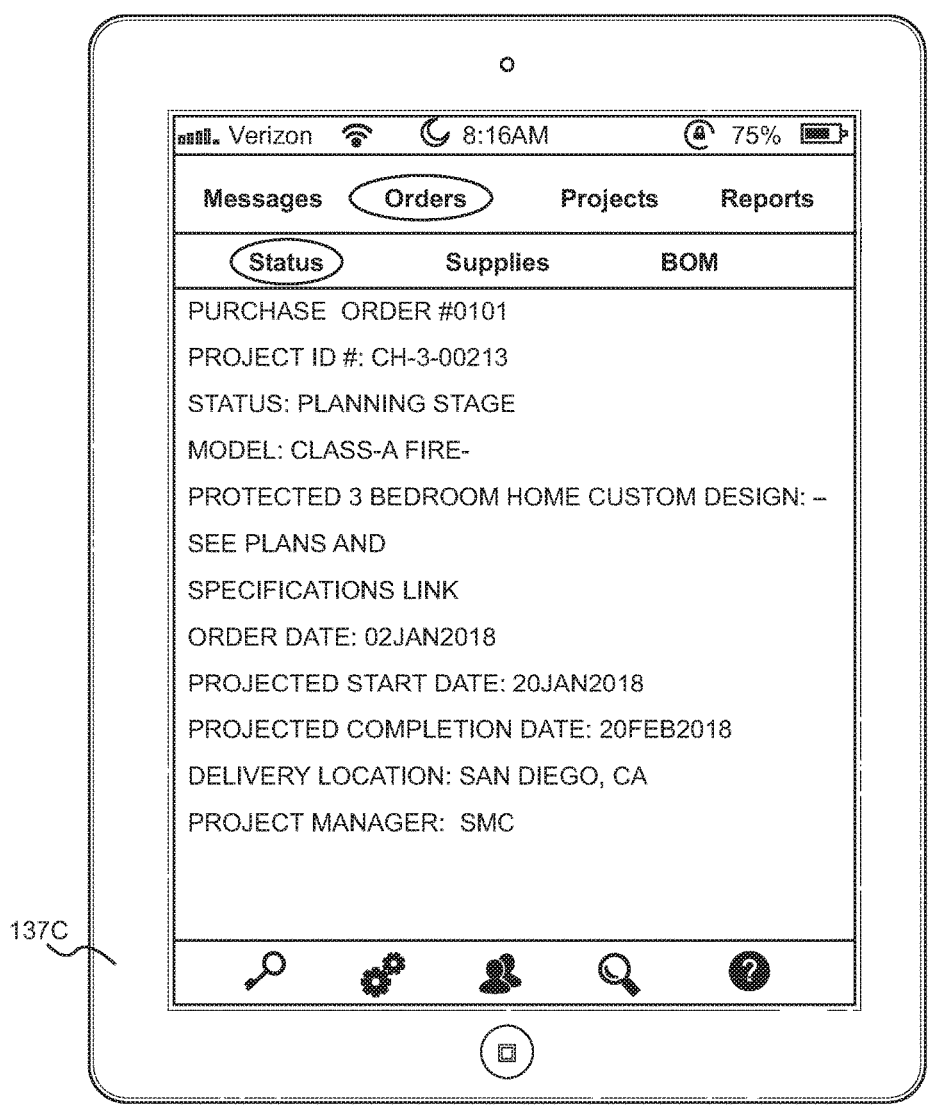
FIG. 70B is an exemplary wire frame model for a graphical user interface of the mobile application configured for use by project administrator showing the status of a purchase order for a prefabricated wood-framed building, or wood-framed building component, using services supported by the system network of the present invention.
Figure 70C:
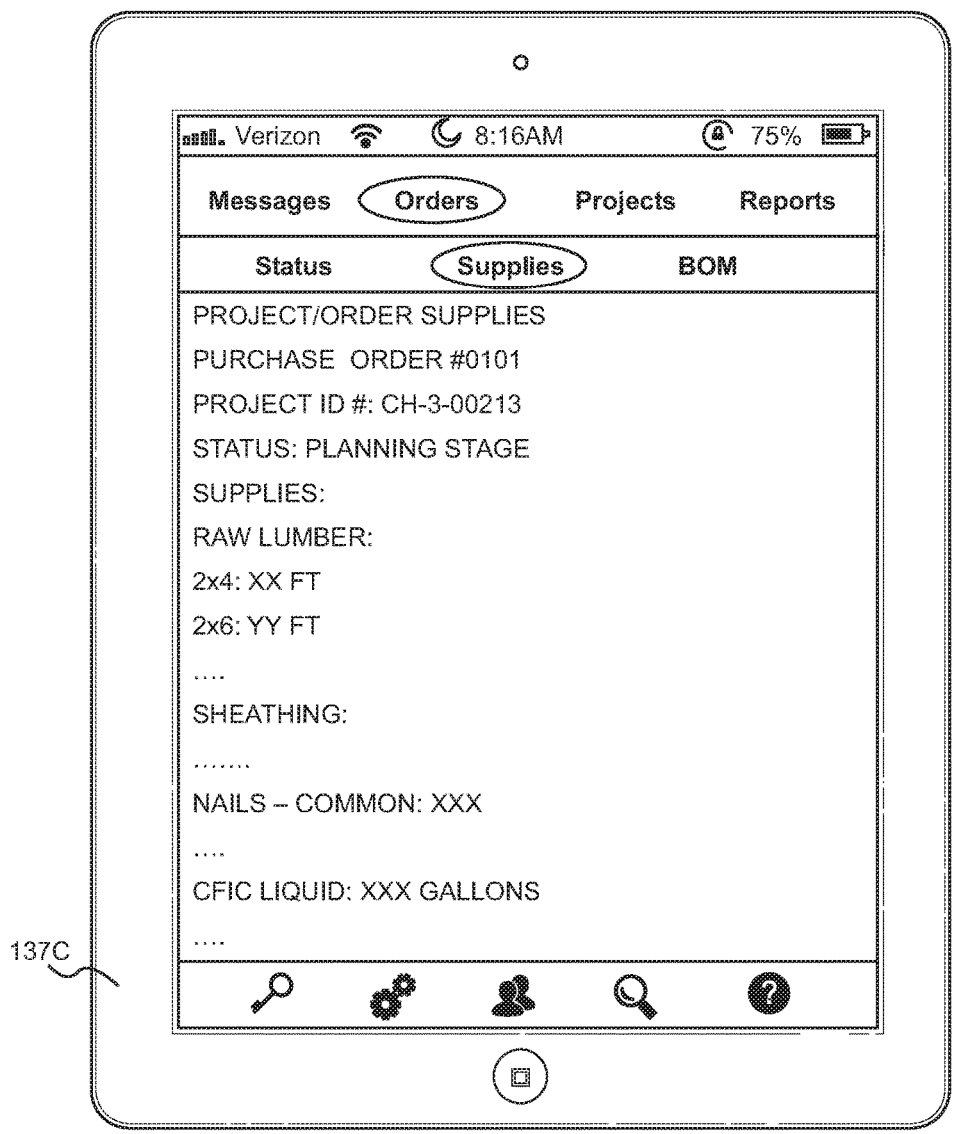
FIG. 70C is an exemplary wire frame model for a graphical user interface of the mobile application configured for use by project administrator showing the supplies required to fulfill a purchase order for a Class-A fire-protected prefabricated wood-framed building, or Class-A fire-protected prefabricated wood-framed building component, using services supported by the system network of the present invention.
Figure 70D:
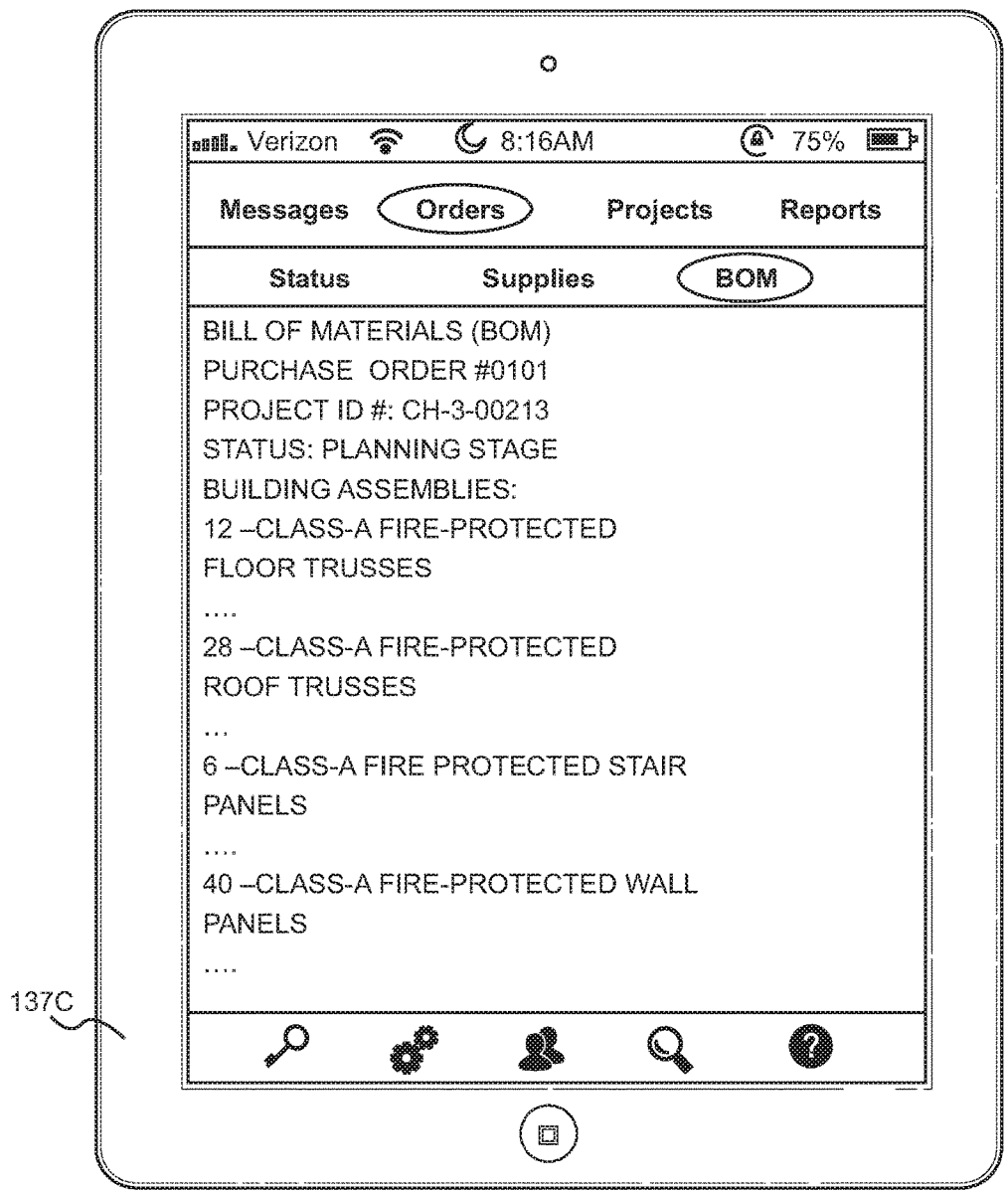
FIG. 70D is an exemplary wire frame model for a graphical user interface of the mobile application for use by project administrator showing the bill of materials (BOM) required to fulfill a purchase order for a prefabricated Class-A fire-protected wood-framed building, or Class-A fire-protected wood-framed building component, using services supported by the system network of the present invention.
Figure 70E:
FIG. 70E is an exemplary wire frame model for a graphical user interface of the mobile application configured for use by project administrator showing the status of a factory project involving the prefabrication of a Class-A fire-protected wood-framed building, or Class-A fire-protected wood-framed building component, using services supported by the system network of the present invention.
Figure 70F:
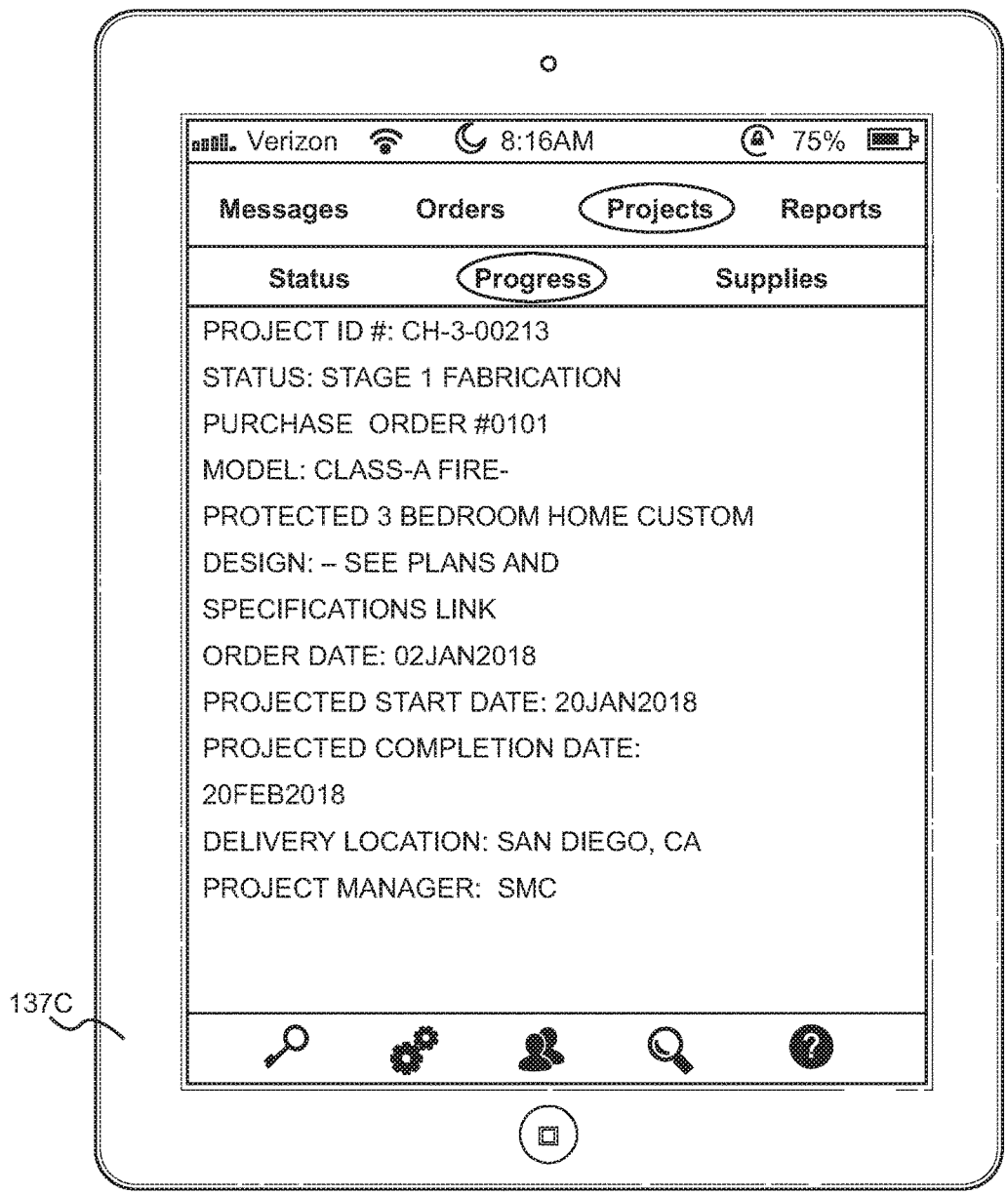
FIG. 70F is an exemplary wire frame model for a graphical user interface of the mobile application configured for use by project administrator showing the progress of a factory project involving the prefabrication of a Class-A fire-protected wood-framed building, or Class-A fire-protected wood-framed building component, using services supported by the system network of the present invention.
Figure 70G:
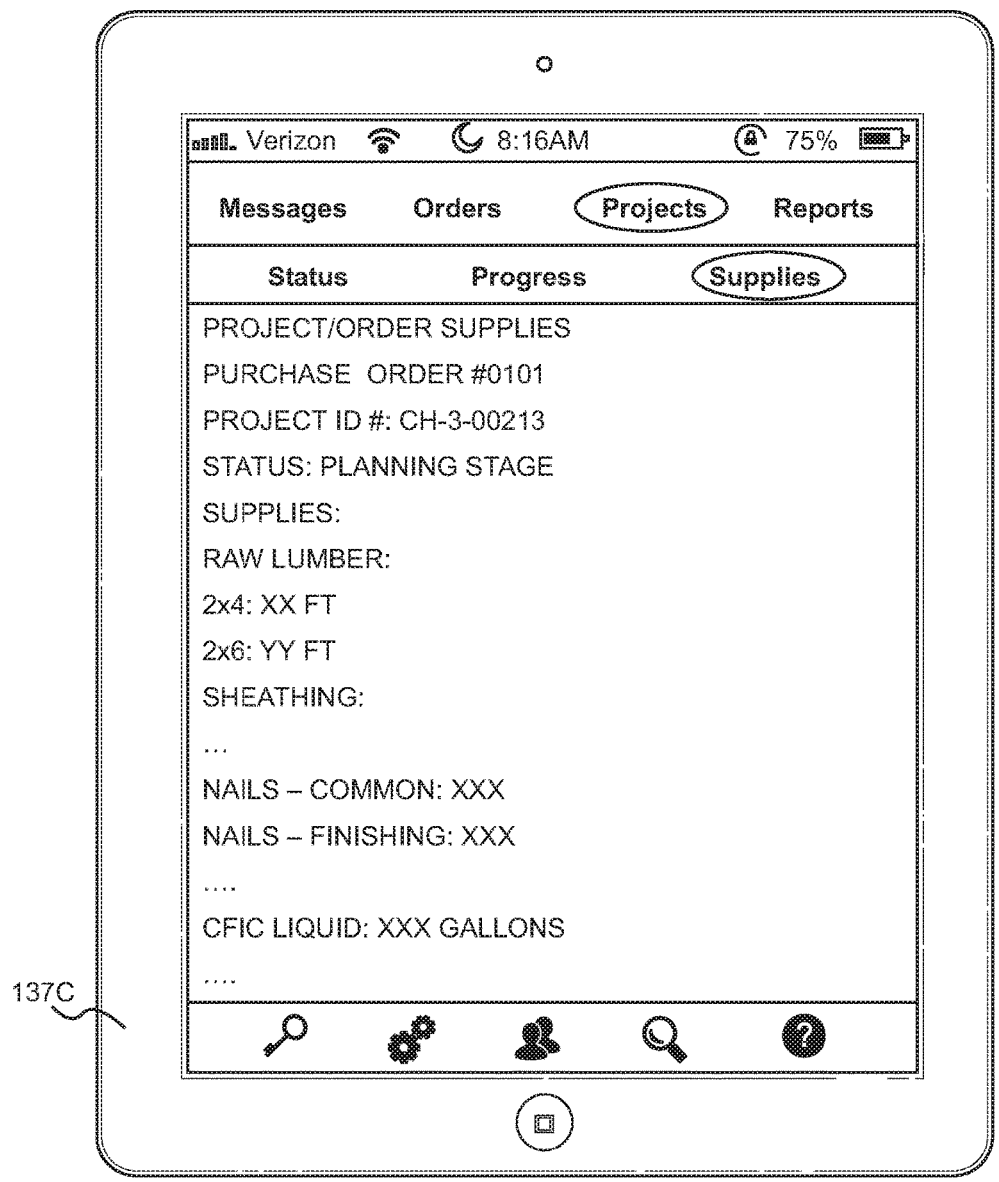
FIG. 70G is an exemplary wire frame model for a graphical user interface of the mobile application configured for use by project administrator showing the supplies required by a factory project involving the prefabrication of a Class-A fire-protected wood-framed building, or Class-A fire-protected wood-framed building component, using services supported by the system network of the present invention.
Figure 70H:
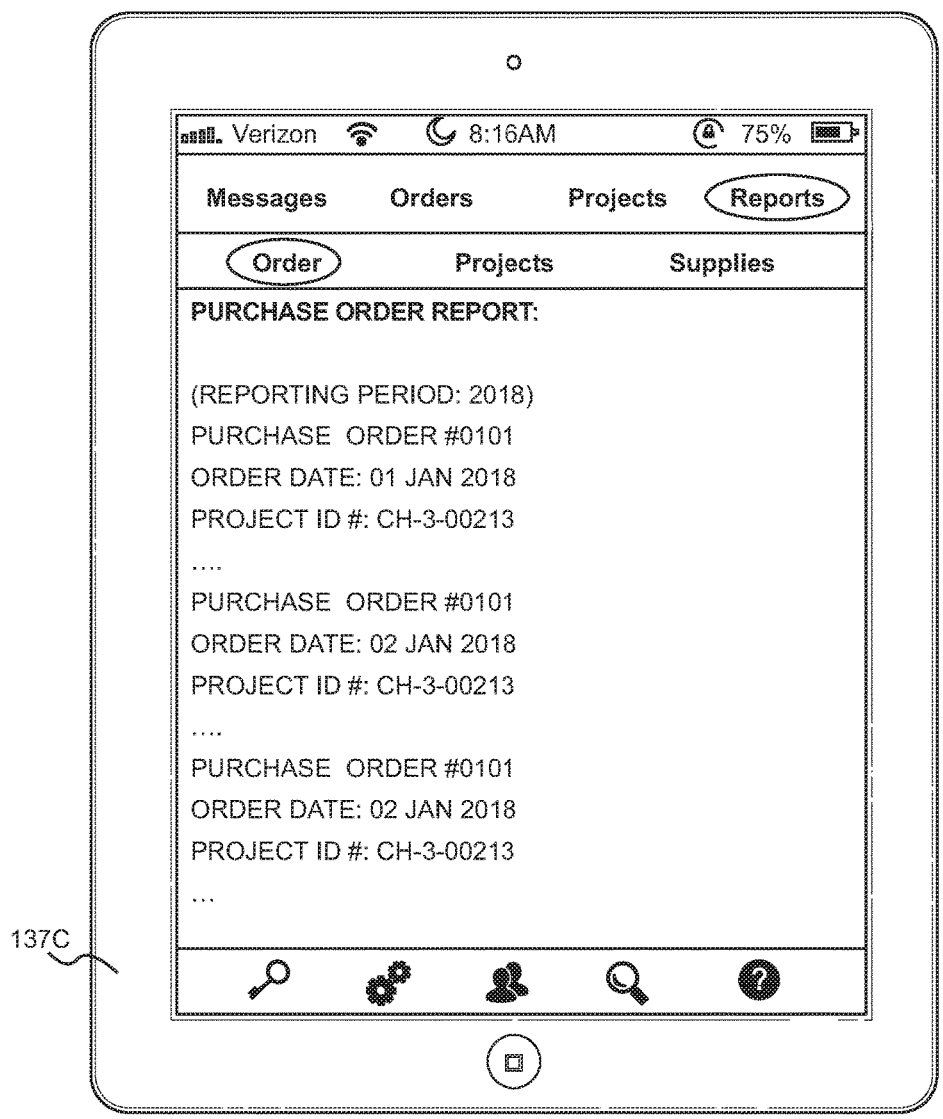
FIG. 70H is an exemplary wire frame model for a graphical user interface of the mobile application configured for use by project administrator showing a report on purchase orders placed for the prefabrication of a Class-A fire-protected wood-framed building, or Class-A fire-protected wood-framed building component, using services supported by the system network of the present invention.
Figure 70I:
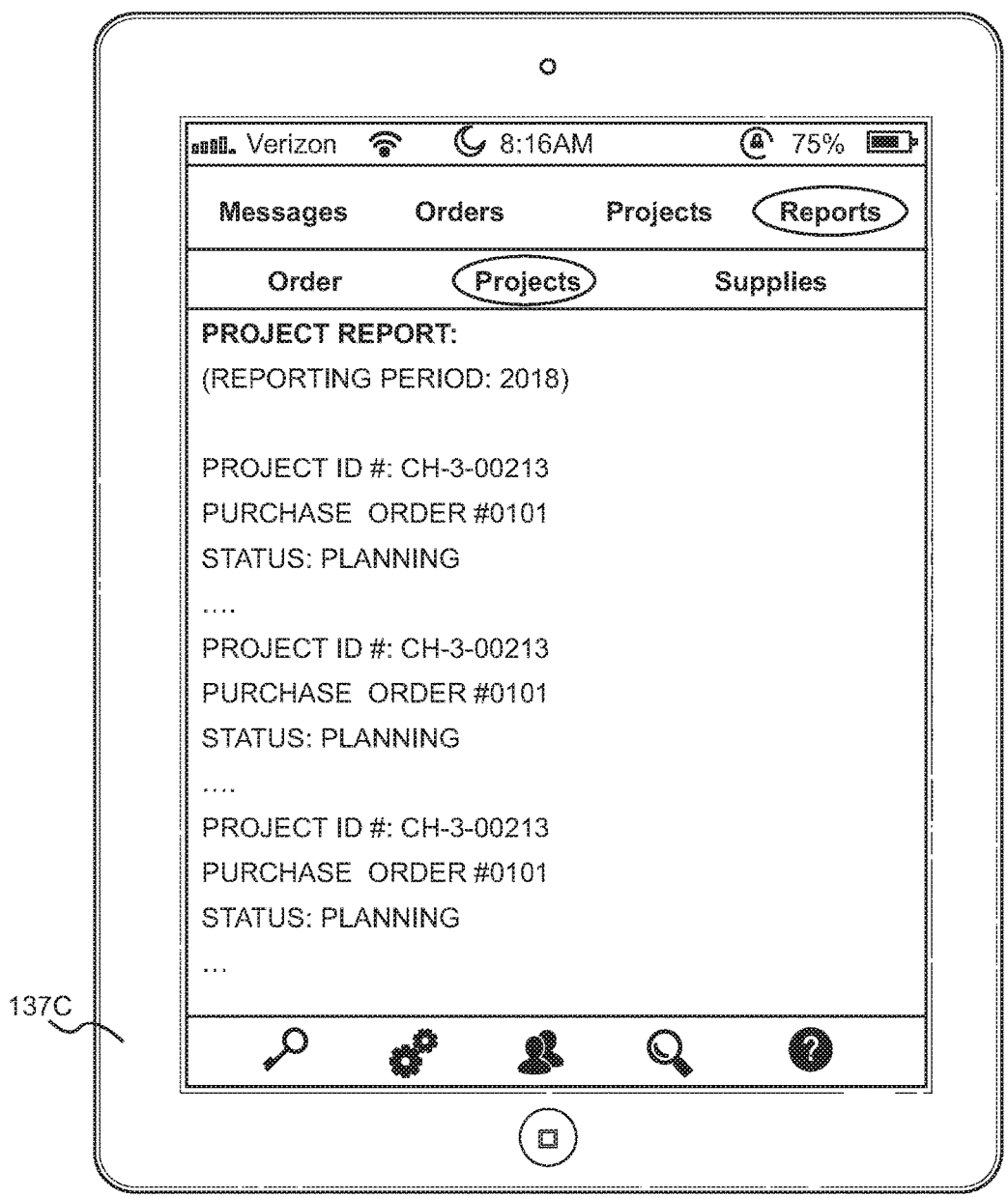
FIG. 70I is an exemplary wire frame model for a graphical user interface of the mobile application configured for use by project administrator showing a report on projects involving the prefabrication of a Class-A fire-protected wood-framed building, or Class-A fire-protected wood-framed building component, using services supported by the system network of the present invention.
Figure 70J:
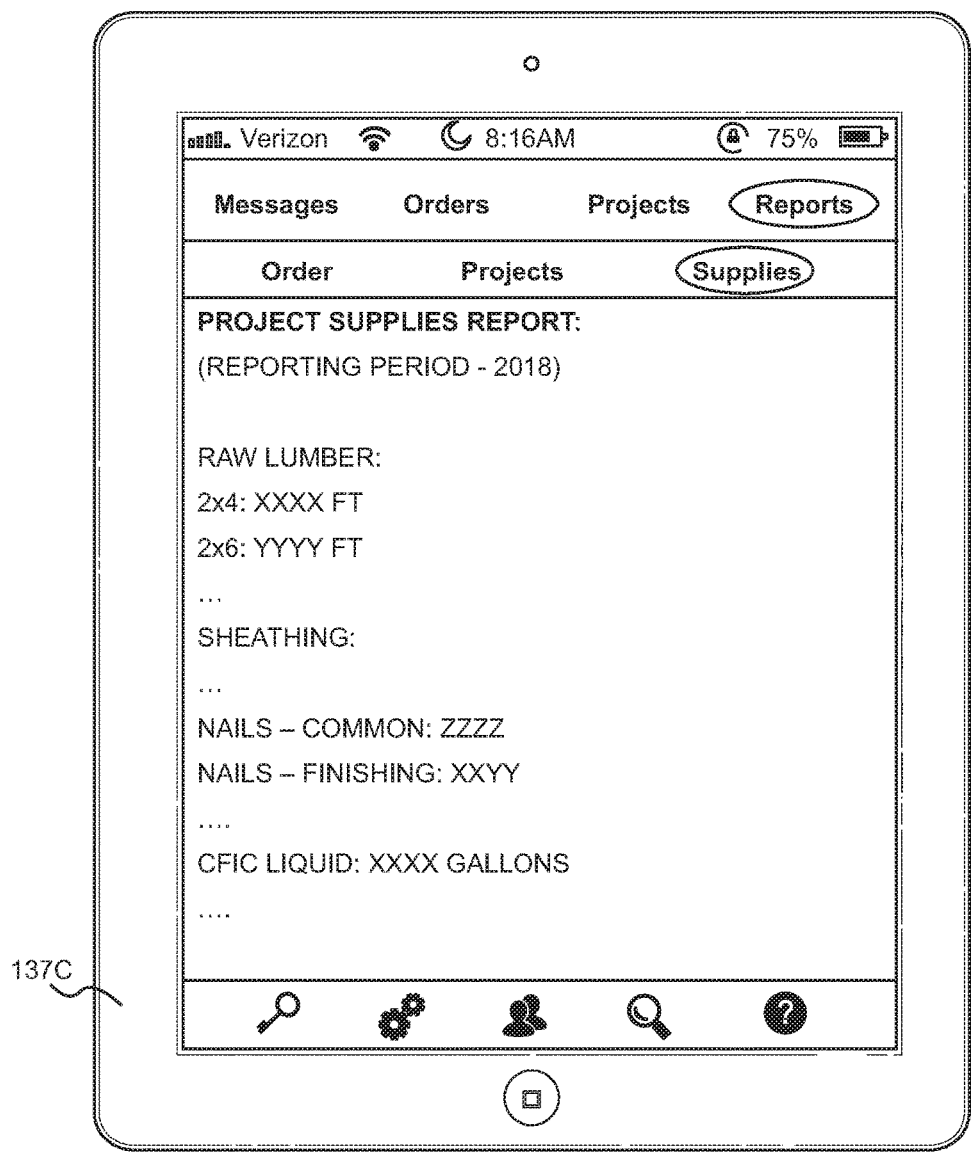
FIG. 70J is an exemplary wire frame model for a graphical user interface of the mobile application configured for use by project administrator showing a report on supplies required for the prefabrication of a Class-A fire-protected wood-framed building, or Class-A fire-protected wood-framed building component, using services supported by the system network of the present invention.

As shown in FIG. 66, the system network architecture further comprises many different kinds of users supported by mobile computing devices 137 running the mobile application 153 of the present invention, namely: a plurality of mobile computing devices 137 running the mobile application 153, and used by fire departments to access services supported by the system network 145; a plurality of mobile computing systems 137 running mobile application 153 and used by insurance underwriters to access services on the system network 145; a plurality of mobile computing systems 137 running mobile application 153 and used by architects and their firms to access the services supported by the system network 145 of the present invention; a plurality of mobile client machines 137 (e.g. mobile computers such as iPad, and other Internet-enabled computing devices with graphics display capabilities, etc) for use by spray-project technicians and administrators, and running a native mobile application 137 supported by server-side modules, and the various illustrative GUIs shown in FIGS. 69 through 70J, supporting client-side and server-side processes on the system network of the present invention; and a GPS-tracked GSM-linked digital camera 163 installed over each CFIC liquid dip-coating tank, installed along a production line 131, for capturing digital images and video recordings of the CFIC liquid dip-coating process, along the production line, where wood pieces are dip-coated and Class-A fire-protected prior art to use in fabricating Class-A fire-protected wood-framed building components.

In general, the system network 135 will be realized as an industrial-strength, carrier-class Internet-based network of object-oriented system design, deployed over a global data packet-switched communication network comprising numerous computing systems and networking components, as shown. As such, the information network of the present invention is often referred to herein as the "system" or "system network". The Internet-based system network can be implemented using any object-oriented integrated development environment (IDE) such as for example: the Java Platform, Enterprise Edition, or Java EE (formerly J2EE); Websphere IDE by IBM; Weblogic IDE by BEA; a non-Java IDE such as Microsoft's .NET IDE; or other suitably configured development and deployment environment well known in the art. Preferably, although not necessary, the entire system of the present invention would be designed according to object-oriented systems engineering (DOSE) methods using UML-based modeling tools such as ROSE by Rational Software, Inc. using an industry-standard Rational Unified Process (RUP) or Enterprise Unified Process (EUP), both well known in the art. Implementation programming languages can include C, Objective C, C, Java, PHP, Python, Google's GO, and other computer programming languages known in the art. Preferably, the system network is deployed as a three-tier server architecture with a double-firewall, and appropriate network switching and routing technologies well known in the art. In some deployments, private/public/hybrid cloud service providers, such Amazon Web Services (AWS), may be used to deploy Kubernetes, an open-source software container/cluster management/orchestration system, for automating deployment, scaling, and management of containerized software applications, such as the mobile enterprise-level application 153 of the present invention, described above.

Figure 67A:
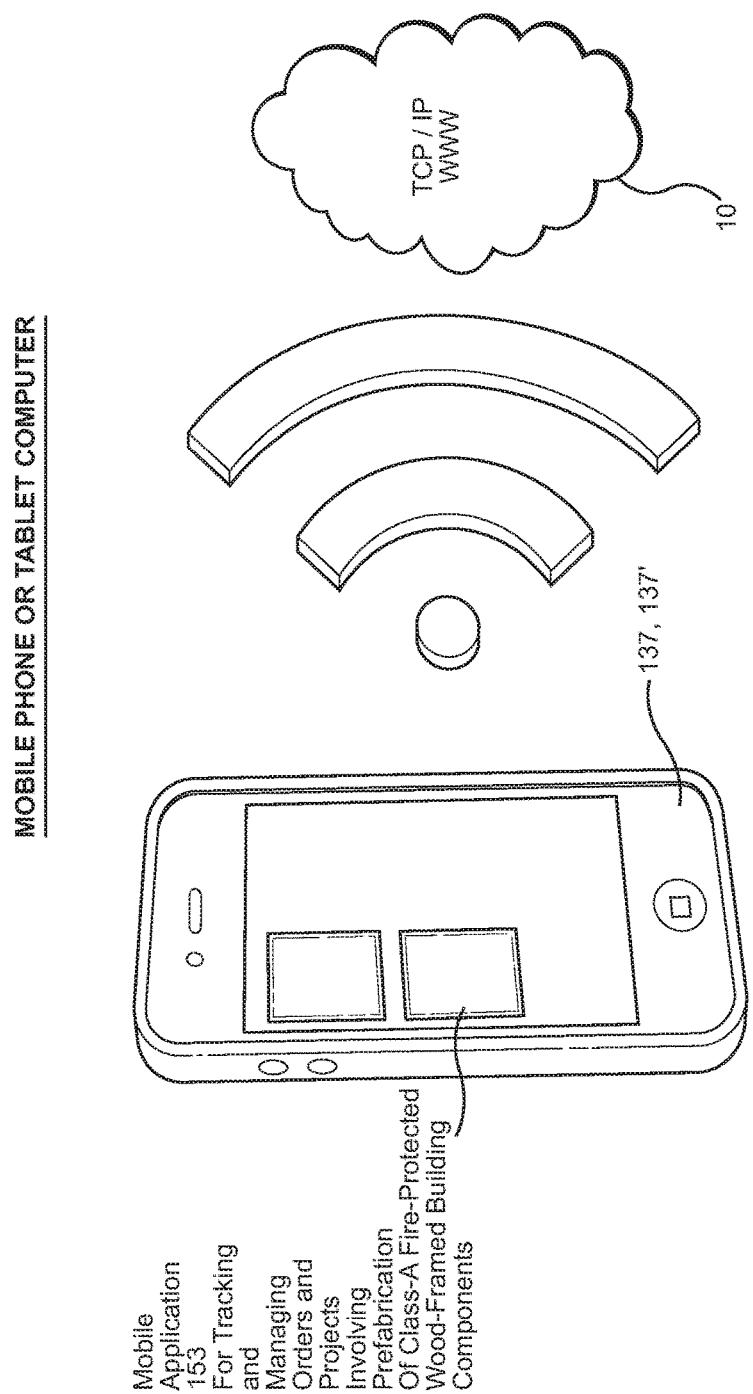
FIG. 67A is a perspective view of a mobile computing system used in the system shown in FIG. 66, supporting a mobile application installed on the mobile computing system for the purpose of tracking and managing projects involving just-in-time fabrication of Class-A fire-protected wood-framed building components for ordered prefabricated wood-framed buildings in accordance with the principles of the present invention.
Figure 67B:
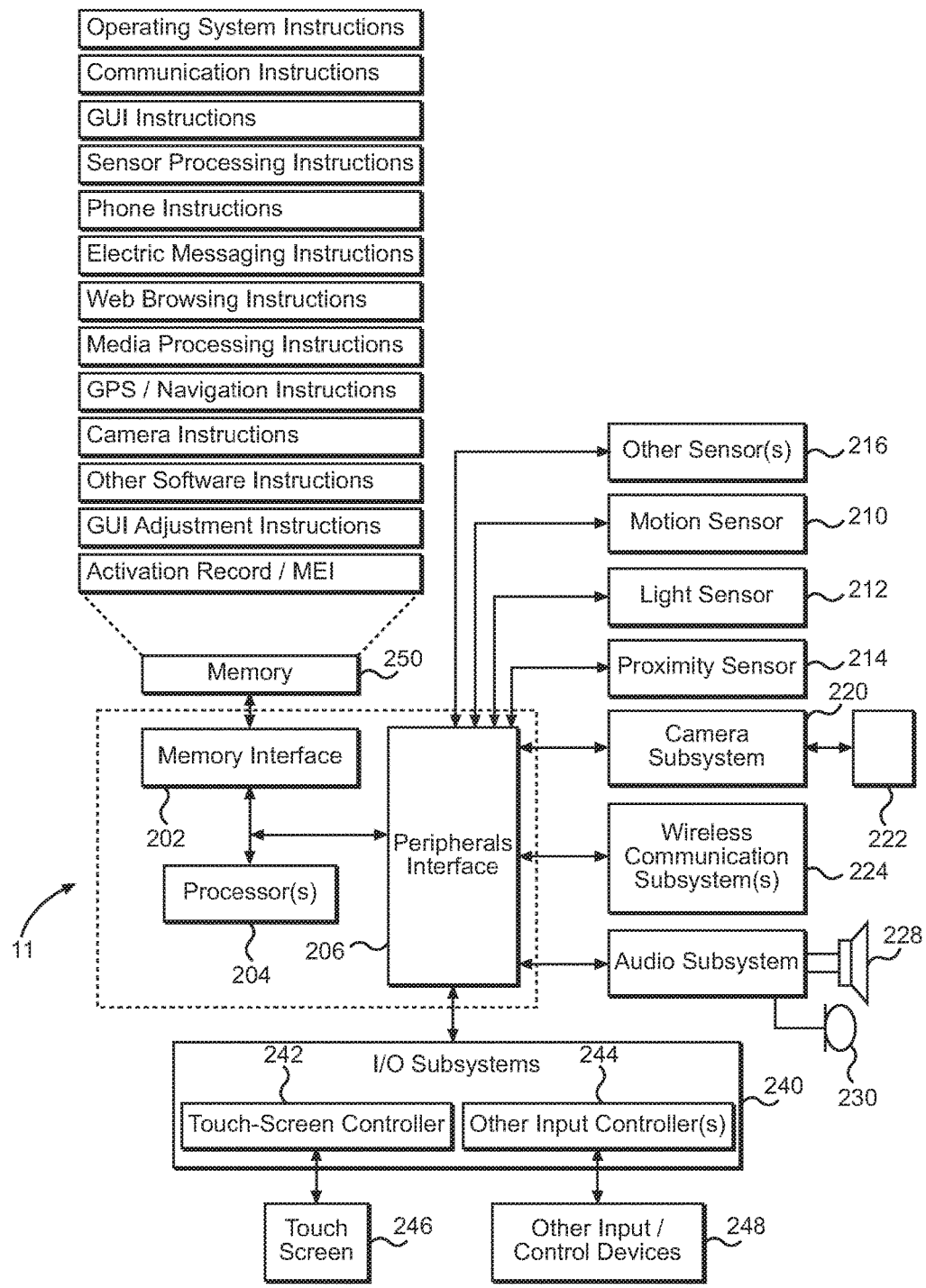
FIG. 67B is a system diagram for the exemplary mobile computing system showing the various subcomponents and subsystems used to construct the mobile computing system.

Specification of System Architecture of an Exemplary Mobile Smartphone System Deployed on the System Network of the Present Invention FIG. 67A shows an exemplary mobile the mobile client computing system (e.g. client device) 137 that is deployed on the system network 135 and supporting the many services offered by system network servers of the present invention. As shown in FIG. 67B, the mobile computing device 137 (137') can include a memory interface 202, one or more data processors, image processors and/or central processing units 204, and a peripherals interface 206. The memory interface 202, the one or more processors 204 and/or the peripherals interface 206 can be separate components or can be integrated in one or more integrated circuits. The various components in the mobile device can be coupled by one or more communication buses or signal lines. Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate the orientation, lighting, and proximity functions. Other sensors 216 can also be connected to the peripherals interface 206, such as a positioning system (e.g. GPS receiver), a temperature sensor, a biometric sensor, a gyroscope, or other sensing device, to facilitate related functionalities. A camera subsystem 220 and an optical sensor 222, e.g. a charged coupled device (CCD) or a complementary metal-oxide semiconductor (CMOS) optical sensor, can be utilized to facilitate camera functions, such as recording photographs and video clips. Communication functions can be facilitated through one or more wireless communication subsystems 224, which can include radio frequency receivers and transmitters and/or optical (e.g. infrared) receivers and transmitters. The specific design and implementation of the communication subsystem 224 can depend on the communication network(s) over which the mobile device is intended to operate. For example, the mobile device 137 may include communication subsystems 224 designed to operate over a GSM network, a GPRS network, an EDGE network, a Wi-Fi or WiMax network, and a Bluetooth™ network. In particular, the wireless communication subsystems 224 may include hosting protocols such that the device 137 may be configured as a base station for other wireless devices. An audio subsystem 226 can be coupled to a speaker 228 and a microphone 230 to facilitate voice-enabled functions, such as voice recognition, voice replication, digital recording, and telephony functions. The I/O subsystem 240 can include a touch screen controller 242 and/or other input controller(s) 244. The touch-screen controller 242 can be coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. The other input controller(s) 244 can be coupled to other input/control devices 248, such as one or more buttons, rocker switches, thumb-wheel, infrared port, USB port, and/or a pointer device such as a stylus. The one or more buttons (not shown) can include an up/down button for volume control of the speaker 228 and/or the microphone 230. Such buttons and controls can be implemented as a hardware objects, or touch-screen graphical interface objects, touched and controlled by the system user. Additional features of mobile smartphone device 137 can be found in U.S. Pat. No. 8,631,358 incorporated herein by reference in its entirety.

Different Ways of Implementing the Mobile Client Machines and Devices on the System Network of the Present Invention In one illustrative embodiment, the enterprise-level system network 135 is realized as a robust suite of hosted services delivered to Web-based client subsystems 137 using an application service provider (ASP) model. In this embodiment, the Web-enabled mobile application 153 can be realized using a web-browser application running on the operating system (OS) (e.g. Linux, Application IOS, etc) of a mobile computing device 137 to support online modes of system operation, only. However, it is understood that some or all of the services provided by the system network 135 can be accessed using Java clients, or a native client application, running on the operating system of a client computing device, to support both online and limited off-line modes of system operation. In such embodiments, the native mobile application 153 would have access to local memory (e.g. a local RDBMS) on the client device 137, accessible during off-line modes of operation to enable consumers to use certain or many of the system functions supported by the system network during off-line/off-network modes of operation. It is also possible to store in the local RDBMS of the mobile computing device 137 most if not all relevant data collected by the mobile application for any particular fire-protection spray project, and to automatically synchronize the dataset for user's projects against the master datasets maintained in the system network database 148A, within the data center 145 shown in FIG. 66. This way, when using an native application, during off-line modes of operation, the user will be able to access and review relevant information regarding any building spray project, and make necessary decisions, even while off-line (i.e. not having access to the system network).

As shown and described herein, the system network 135 of the present invention has been designed for several different kinds of user roles including, for example, but not limited to: (i) building purchasers, builders, and architects who might or will have the authority to place or make purchase orders online to commence a Class-A fire-protected wood-framed building project; and (ii) prefabrication building project administrators and technicians registered on the system network. Depending on which role, for which the user requests registration, the system network will request different sets of registration information, including name of user, address, contact information, information about wood-framed buildings, builders, architects, etc. In the case of a web-based responsive application on the mobile computing device 137, once a user has successfully registered with the system network, the system network will automatically serve a native client GUI, or an HTML5 GUI, adapted for the registered user. Thereafter, when the user logs into the system network, using his/her account name and password, the system network will automatically generate and serve GUI screens described below for the role that the user has been registered with the system network.

In the illustrative embodiment, the client-side of the system network 135 can be realized as mobile web-browser application, or as a native application, each having a "responsive-design" and adapted to run on any client computing device (e.g. iPhone, iPad, Android or other Web-enabled computing device) 137 and designed for use by anyone interested in managing, overseeing and/or monitoring on-site CFIC liquid spray projects involving owners of specific wood-framed buildings seeking Class-A fire-protection.

Figure 68:
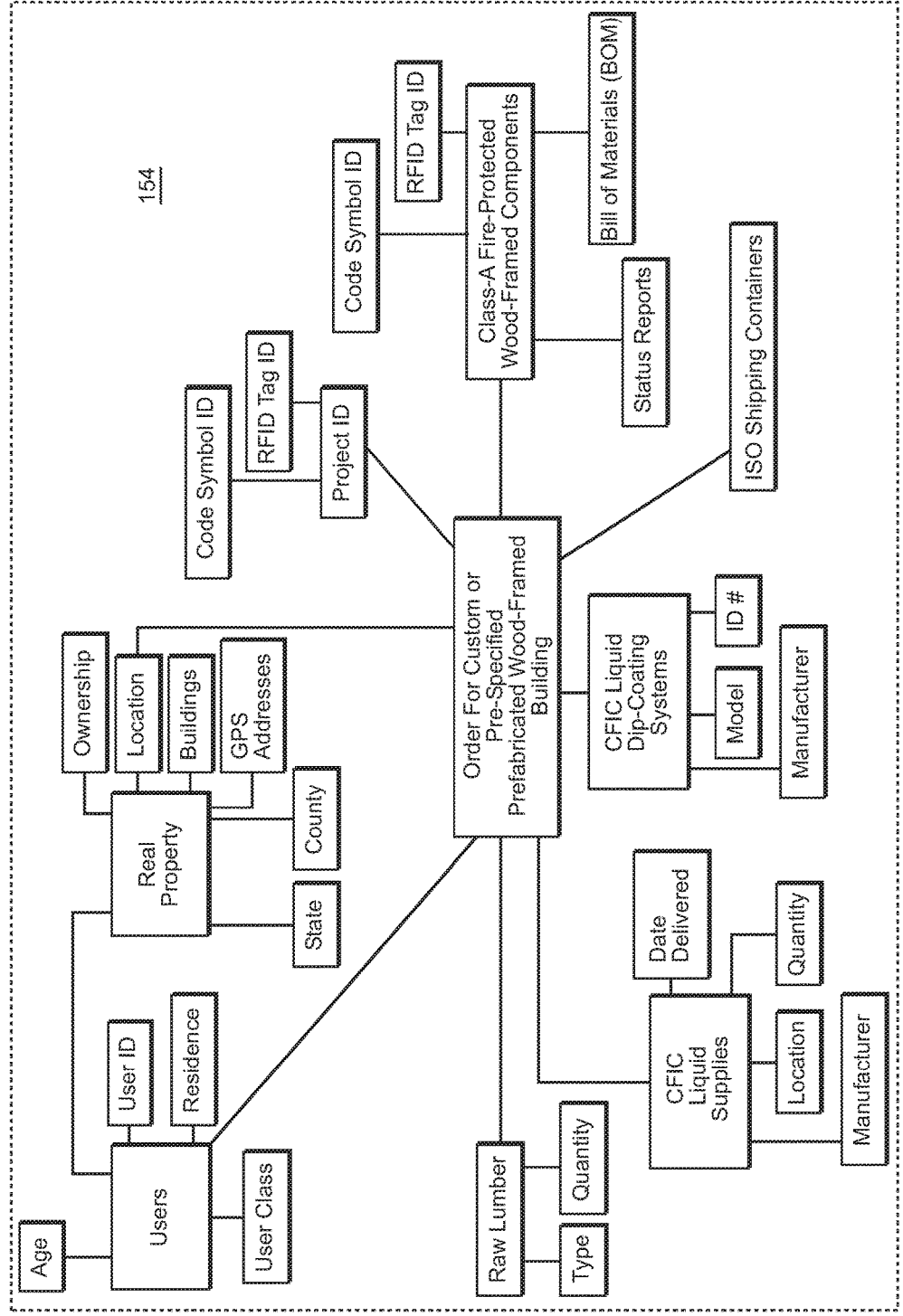
FIG. 68 is a schematic representation of an exemplary schema for the network database supported by the system the present invention shown in FIG. 61, wherein each primary enterprise object is schematically represented as an object in the schema and represented in the data records created and maintained in the network database.

Specification of Database Schema for System Network Database Supported on the System Network of the Present Invention As shown in FIG. 68, the schema 154 includes objects such as, for example: users of the system (e.g. property owners, builders, insurance companies, etc); real property on which the building will be constructed (if known at the time of ordering); orders for custom or pre-specified prefabricated wood-framed building; and construction project. Each of these objects have further attributes specified by other sub-objects indicated in FIG. 68, including, for example: project ID; raw lumber; CFIC liquid; CFIC liquid dip coating systems; Class-A fire-protected wood-framed components; and ISO-shipping containers.

Specifications of Services Supported by the Graphical User Interfaces Supported on System Network of the Present Invention for Building Purchasers, Builders, Architects, Property Insurers and Other Stakeholders FIG. 69 illustrates an exemplary graphical user interface (GUI) 155 of the mobile application 153 used by customers who place orders for prefabricated Class-A fire-protected wood-framed buildings, supported by the system of the present invention. As shown in this exemplary GUI screen, a number of pull-down menus are supported under the titles: Messages 155A, where the user can view messages sent via messaging services supported by the application; Orders 155B, where orders for prefabricated buildings have been placed and scheduled, have been completed, or are in progress; and Projects 155C, which have been have been scheduled, have been completed, or are in progress, and where uploaded authenticated certifications can be reviewed, downloaded and forwarded as needed by authorized stakeholders, to the appropriate parties and authorities.

Notably, the GUIs shown in FIGS. 70 through 70J have been designed and configured for use by the prefabricated building administrators and technicians who will be responsible for (i) taking orders for prefabricated Class-A fire-protected wood buildings, and (ii) managing each prefabricated fire-protected building project, from start to finish, so that building owners, builders, architects, property insurance agents and financial institutions (e.g. banks) may rely on the prefabrication company managing each and every step of each project using the system network 135.

Figure 69A:
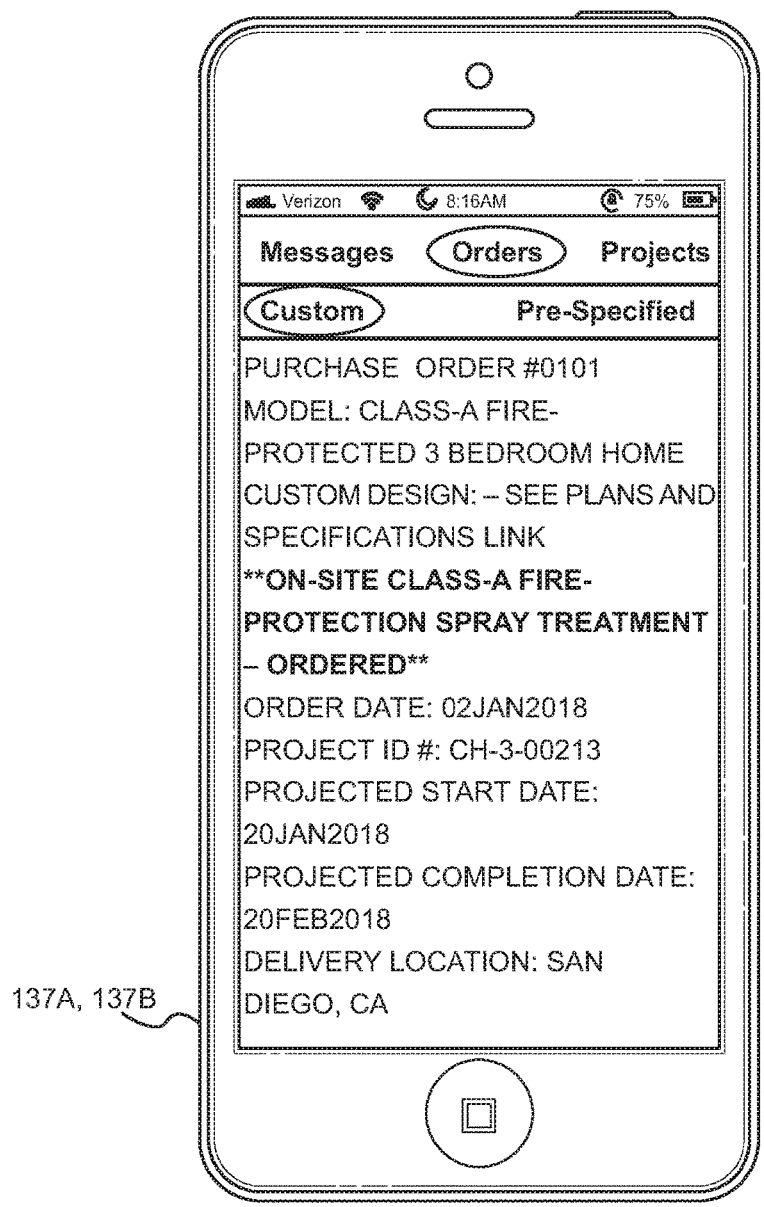
FIG. 69A is an exemplary wire frame model for a graphical user interface of the mobile application configured for use by customers showing details for an order for a custom prefabricated wood-framed building, or wood-framed building component using services supported by the system network of the present invention.

FIG. 69A shows a graphical user interface of mobile application configured for use by customers showing details for an order for a custom prefabricated wood-framed building, or wood-framed building component using services supported by the system network 135.

Figure 69B:
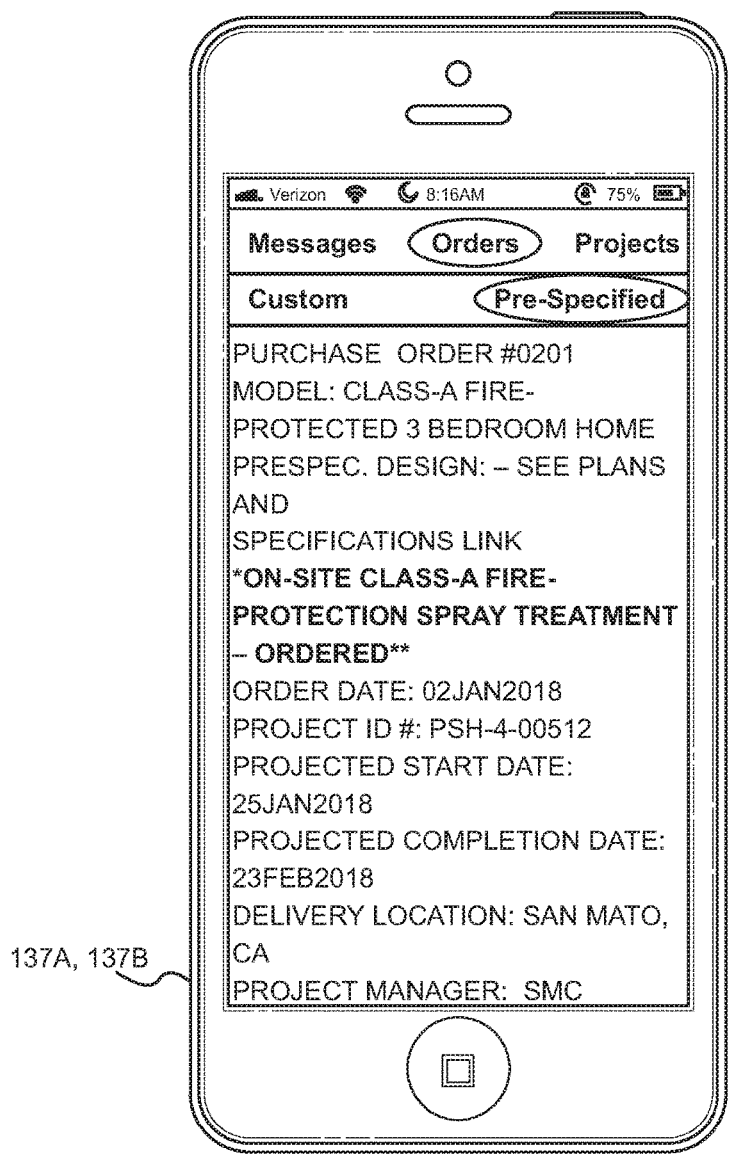
FIG. 69B is an exemplary wire frame model for a graphical user interface of the mobile application configured for use by project administrator showing details for an order for a pre-specified prefabricated wood-framed building, or wood-framed building component, using services supported by the system network of the present invention.

FIG. 69B shows a graphical user interface of mobile application configured for use by project administrator showing details for an order for a pre-specified prefabricated wood-framed building, or wood-framed building component, using services supported by the system network 135.

Figure 69C:
FIG. 69C is an exemplary wire frame model for a graphical user interface of the mobile application configured for use by project administrator showing status details for a project for a custom prefabricated wood-framed building, or wood-framed building component, using services supported by the system network of the present invention.

FIG. 69C shows a graphical user interface of mobile application configured for use by project administrator showing status details for a project for a custom prefabricated wood-framed building, or wood-framed building component, using services supported by the system network 135.

Figure 69D:
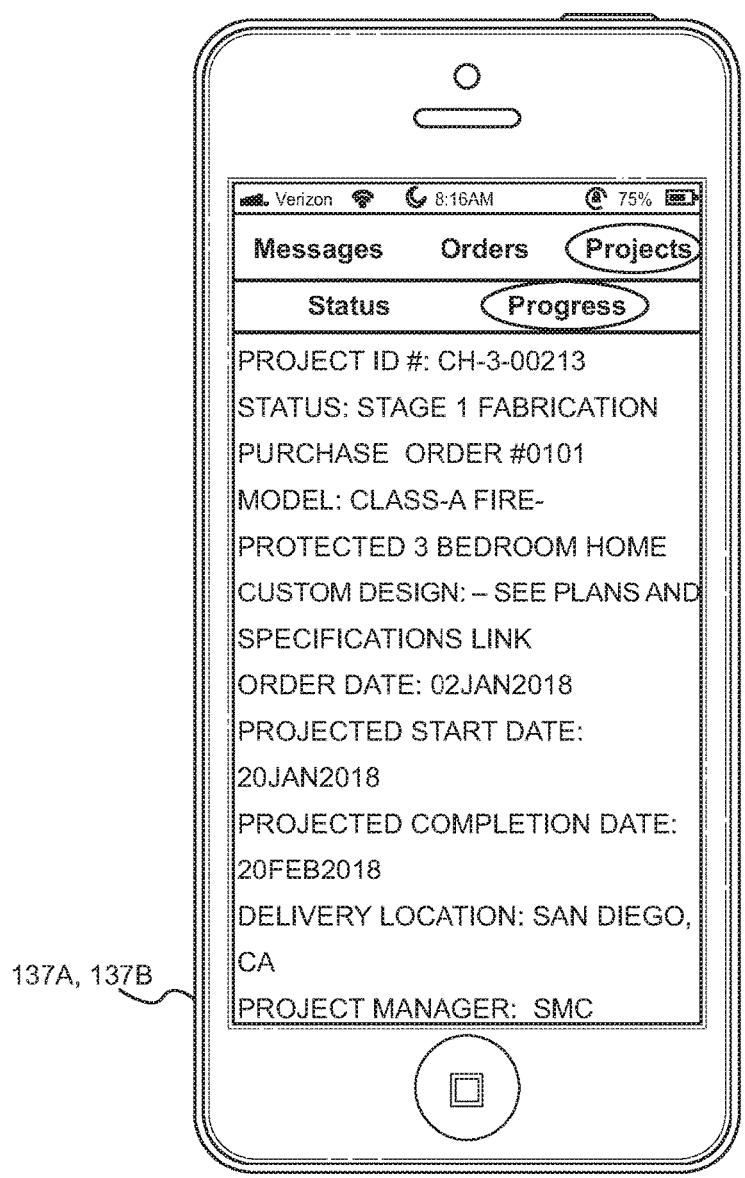
FIG. 69D is an exemplary wire frame model for a graphical user interface of the mobile application configured for use by project administrator showing progress details for a project relating to the factory-fabrication of a prefabricated wood-framed building, or prefabricated wood-framed building component, using services supported by the system network of the present invention.

FIG. 69D shows a graphical user interface of mobile application configured for use by project administrator showing progress details for a project relating to the factory-fabrication of a prefabricated wood-framed building, or prefabricated wood-framed building component, using services supported by the system network 135.

Figure 69E:
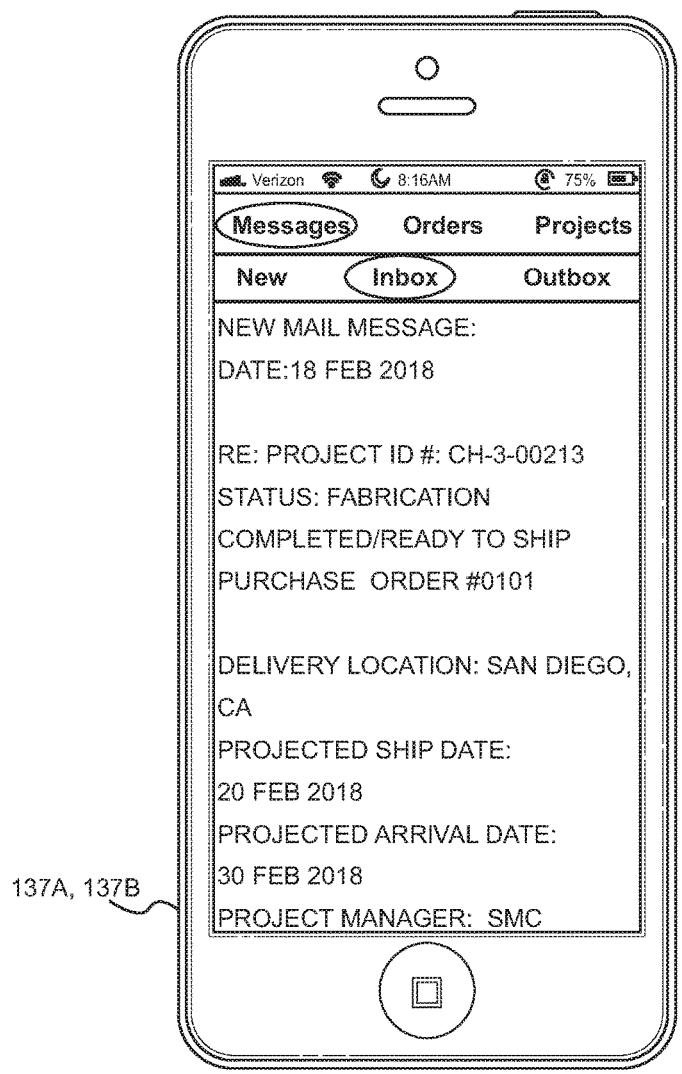
FIG. 69E is an exemplary wire frame model for a graphical user interface of the mobile application configured for use by project administrator showing a message (via email, SMS messaging and/or push-notifications) received indicating that the project relating to a prefabricated wood-framed building is completed and ready for shipment to destination shipping location, using services supported by the system network of the present invention.

FIG. 69E shows a graphical user interface of mobile application configured for use by project administrator showing a message (via email, SMS messaging and/or push-notifications) received indicating that the project relating to a prefabricated wood-framed building is completed and ready for shipment to destination shipping location, using services supported by the system network 135.

Specification of Services Supported by the Graphical User Interfaces Supported on System Network of the Present Invention for Use by Fabricators, Administrators and Technicians Involved in the Production of Prefabricated Class-A Fire-Protected Wood-Framed Buildings and Components FIG. 70 shows an exemplary graphical user interface 156 for the mobile application 153 configured for use by JIT wood-framed building administrators and supervisors supported by the system network 135. As shown in this exemplary GUI screen 156, supports a number of pull-down menus under the titles: Messages 156A, where project administrators and supervisors can view messages sent via messaging services supported by the application; Orders 156B, where orders for prefabricated wood-framed buildings have been placed and/or scheduled, have been completed, or are in progress, with status notes, terms, conditions and other considerations made of record; Projects 156C, which have been have been scheduled, have been completed, or are in progress; and Reports 156D, which are generated for Orders, Projects and Supplies, on prefabricated wood-framed building projects are managed by the mobile application 153 running on the mobile client system 137C in operable communication with web, application and database servers 146, 147, 148 at the JIT factory data center 145.

Notably, the GUIs shown in FIGS. 70 through 70J have been designed and configured for use by the prefabricated building administrators and technicians who will be responsible for (i) taking orders for a prefabricated Class-A fire-protected wood-framed building, (ii) managing the entire prefabricated fire-protected building project, from start to finish, so that building owners, builders, architects, property insurance agents and financial institutions (e.g. banks), as well as local, state and federal authorities, may rely on their services and work product of the prefabrication company managing each and every step of project using the system network 135.

FIG. 70A shows a graphical user interface of the mobile application 153 configured for use by project administrators and managers showing the creation of a new message about a specific project, using message services supported on the system network 135.

FIG. 70B shows a graphical user interface of the mobile application 153 configured for use by project administrators showing the status of a purchase order (PO) for a prefabricated Class-A fire-protected wood-framed building, or Class-A fire-protected wood-framed building component(s), using services supported by the system network 135.

FIG. 70C shows a graphical user interface of the mobile application 153 configured for use by project administrators showing the supplies required to fulfill a purchase order for a Class-A fire-protected prefabricated wood-framed building, or Class-A fire-protected prefabricated wood-framed building component(s), using services supported by the system network 135.

FIG. 70D shows a graphical user interface of the mobile application 153 configured for use by project administrators showing the bill of materials (BOM) required to fulfill a purchase order for a prefabricated Class-A fire-protected wood-framed building, or Class-A fire-protected wood-framed building component, using services supported by the system network 135.

FIG. 70E shows for a graphical user interface of the mobile application 153 configured for use by project administrators showing the status of a factory project involving the prefabrication of a Class-A fire-protected wood-framed building, or Class-A fire-protected wood-framed building component(s), using services supported by the system network 135.

In one illustrative embodiment, the mobile application 153 and/or digital camera systems can be used to review digital images and audio-video (AV) recordings taken of CFIC liquid dipped-coated wood pieces along the production line, relating to prefabricated wood-framed building components being fabricated, and uploaded to the system network database 148A under the project ID # of the prefabricated building project. All captured documents and evidence of CFIC liquid dip-coated wood can be uploaded, logged and time/date-stamped and stored into the project-specific document folder maintained on the system network database 148A of the system network 135 using document capture, time/date-stamping and cataloguing capabilities.

Alternatively, Class-A fire-protected lumber, and/or engineered wood products (EWPs), that are dip-coated in CFIC liquid, will be used to construct prefabricated Class-A fire-protected wood-framed building components (e.g. wall panels, roof trusses, floor trusses, roofing systems, flooring systems, and stair assemblies). Once constructed in the factory on the production line, a barcoded/RFID-tagged inspection label 400 is applied to each and every prefabricated Class-A fire-protected wood-framed building component produced on the production line 131. Each barcoded/RFID-tagged inspection label 400 will include a bar code symbol and RFID tag that has a unique building-component identifier (e.g. an alphanumeric character string) encoded into the symbology used in the barcode symbol and RFID tag identifier, and this building-component identifier will be used to identify subfolders or subdirectories where collection data, information and documents are stored in a building-component subfolder (indexed with the building-component identifier), in the building-project folder on the network database 113A, maintained on the system network 100. The building-component identifier will be read during each scan/read of the barcoded/RFID-tag label 400, and used by the mobile application 153 to access the appropriate building-component subfolder in the building project folder where all such certifications of dip-coating, inspection and oversight, and photos, and videos are stored and archived for posterity.

The mobile application 153 has access to all services supported in the mobile computing device 137 (e.g. Apple iPhone or iPad) as the case may be, for verifying and documenting the CFIC liquid spray treatment of each and every completed Class-A fire-protected wood-framed building fabricated in the factory. Such documentation should include capturing and uploading digital images and AV-recordings of certificates of CFIC liquid dip-coating stamped and verified along the production line involved the fabrication process.

FIG. 70F shows a graphical user interface of the mobile application 153 configured for use by project administrator showing the progress of a factory project involving the prefabrication of a Class-A fire-protected wood-framed building, or Class-A fire-protected wood-framed building component, using services supported by the system network 135.

FIG. 70G shows for a graphical user interface of the mobile application 153 configured for use by project administrator showing the supplies required by a factory project involving the prefabrication of a Class-A fire-protected wood-framed building, or Class-A fire-protected wood-framed building component, using services supported by the system network 135.

FIG. 70H shows for a graphical user interface of mobile application configured for use by project administrator showing a report on purchase orders placed for the prefabrication of a Class-A fire-protected wood-framed building, or Class-A fire-protected wood-framed building component, using services supported by the system network 135.

FIG. 70I shows for a graphical user interface of the mobile application 153 configured for use by project administrator showing a report on projects involving the prefabrication of a Class-A fire-protected wood-framed building, or Class-A fire-protected wood-framed building component, using services supported by the system network 135.

FIG. 70J shows for a graphical user interface of the mobile application 153 configured for use by project administrator showing a report on supplies required for the prefabrication of a Class-A fire-protected wood-framed building, or Class-A fire-protected wood-framed building component, using services supported by the system network 135.

Figure 71:
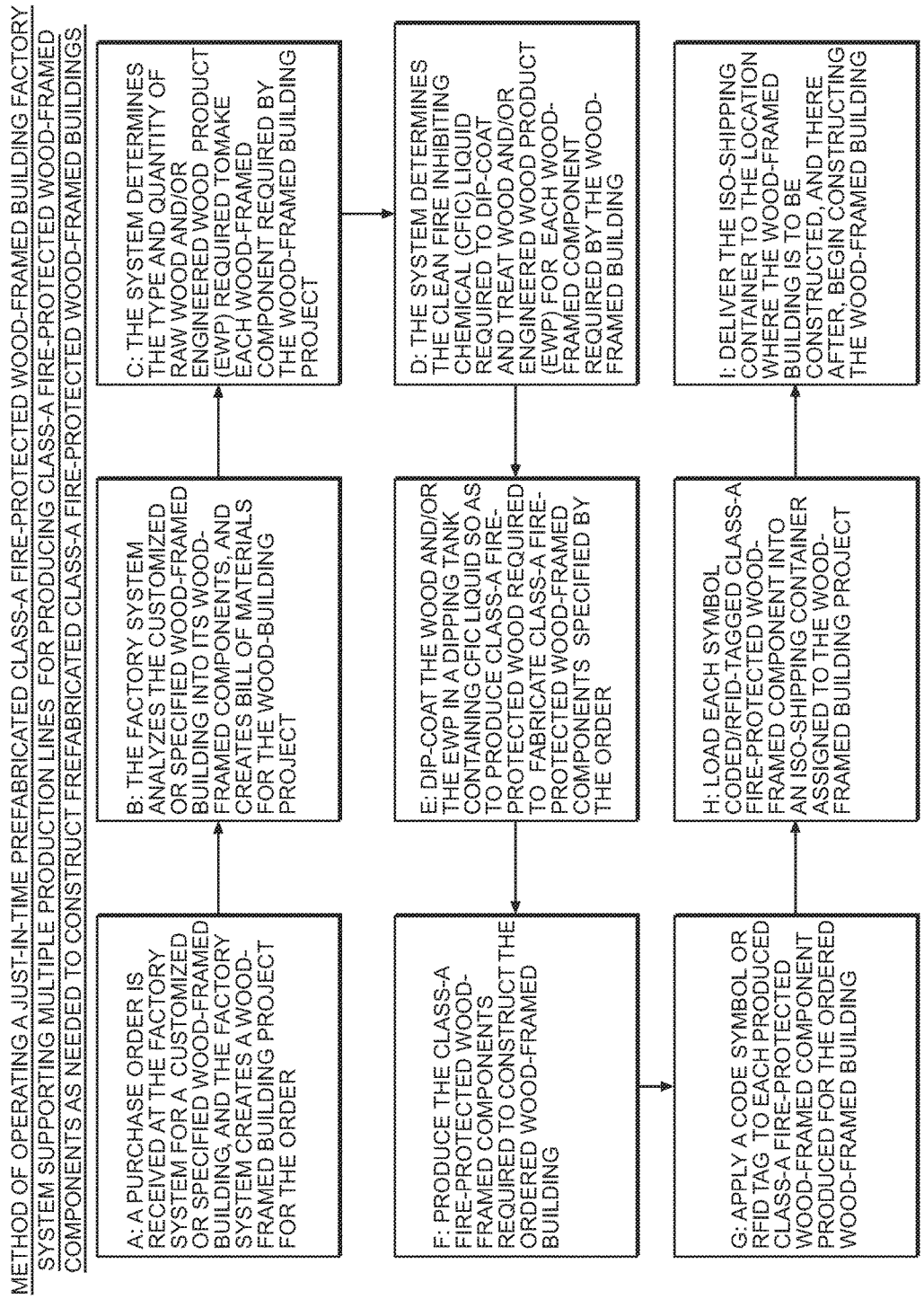
FIG. 71 is a flow chart describing the primary steps involved in carrying out the method of operating a just-in-time (JIT) prefabricated Class-A fire-protected wood-framed building factory system supporting multiple production lines for producing Class-A fire-protected wood-framed components, as needed to construct purchase orders (POs) received for prefabricated Class-A fire-protected wood-framed buildings.

FIG. 71 describes the primary steps involved in carrying out the method of operating a just-in-time prefabricated wood-framed building factory system 130, supporting multiple production lines 131, as illustrated in FIGS. 61 and 62, for producing prefabricated Class-A fire-protected wood-framed building components, as needed to construct prefabricated Class-A fire-protected wood-framed buildings ordered online using the mobile application 153 described herein.

As indicated at Block A in FIG. 71, in response to a purchase order (PO) received at the factory system 130 for a customized or specified wood-framed building, the factory system automatically generates a prefabricated wood-framed building project for the order placed by a customer using the mobile application 153 installed and running on mobile computing system 137A, 137B, or through an equivalent website.

As indicated at Block B in FIG. 71, the factory system 130 analyzes the customized or specified wood-framed building into its wood-framed components, and creates bill of materials (BOM) for the wood-building project.

As indicated at Block C in FIG. 71, the system 130 determines the type and quantity of raw wood and/or engineered wood product (EWP) 141 required to make each wood-framed component required by the wood-framed building project.

As indicated at Block D in FIG. 71, the system 130 determines the supply clean fire inhibiting chemical (CFIC) liquid 142 required to dip-coat and treat wood and/or engineered wood product (EWP) for each wood-framed component required by the wood-framed building.

As indicated at Block E in FIG. 71, the system 130 automatically dip-coats the wood and/or the EWPs in a high-speed dipping tank installed along a production line, as shown in the FIGS. 19A, 23A, 27A and 33A, each containing a controlled supply of CFIC liquid for dip-coating wood pieces at atmospheric pressure, to produce Class-A fire-protected wood required to fabricate Class-A fire-protected wood-framed components for the wood-framed building, specified by the placed purchase order.

As indicated at Block F in FIG. 71, the system produces the Class-A fire-protected wood-framed components required to construct the ordered wood-framed building.

As indicated at Block G in FIG. 71, a code symbol 138A or RFID tag 138B is applied to each produced Class-A fire-protected wood-framed component 132A, 132B, 132C, 132D, 132E produced for the ordered wood-framed building.

As indicated at Block H in FIG. 71, each symbol coded/RFID-tagged Class-A fire-protected wood-framed component 132A, 132B, 132C, 132D, 132E is loaded into an ISO-shipping container 136 assigned to the wood-framed building project.

As indicated at Block H in FIG. 71, the ISO-shipping container 136 is delivered to the location where the wood-framed building is to be constructed. Thereafter, construction of the Class-A fire-protected prefabricated wood-framed building begins at the construction site.

In the event the purchaser of the prefabricated wood-framed building requested on-site application of Class-A fire-protection spray treatment, using CFIC liquid (i.e. Hartindo AF31), a professional fire-protection spray treatment (provider) team will use the system network 100 shown in FIG. 55 to apply, certify, verify and document the Class-A fire protection liquid spray process as described in detail above, in synchronism with the prefabricated builder's schedule. As each predesignated section of the wood-framed building is constructed by assembling pre-fabricated Class-A fire-protected wood-framed building components (e.g. wall panels, floor and roof truss panels, stair components, etc.), the spray technicians will spray treat all exposed interior surface of the completed section of the wood-framed building, and certify, verify and document the spray treatment using the mobile application 153 using mobile computing devices 137 and services supported by the system network 100. Once completed, the prefabricated Class-A fire-protected wood-framed building will be double-protected with Class-A fire-protection, providing the building owner with many benefits, including potentially lower property insurance premiums, in view of the fact that significant risk of total destruction by fire has been significantly reduced or otherwise minimized.

By virtue of the JIT factory system 130, it is now possible to produce, as needed, a custom or pre-specified wood-framed building made from Class-A fire-protected wood-framed building components, thereby minimizing inventory and cost of manufacture, and improving the quality and precision of prefabricated Class-A fire-protected prefabricated wood-framed buildings.

Figure 72:
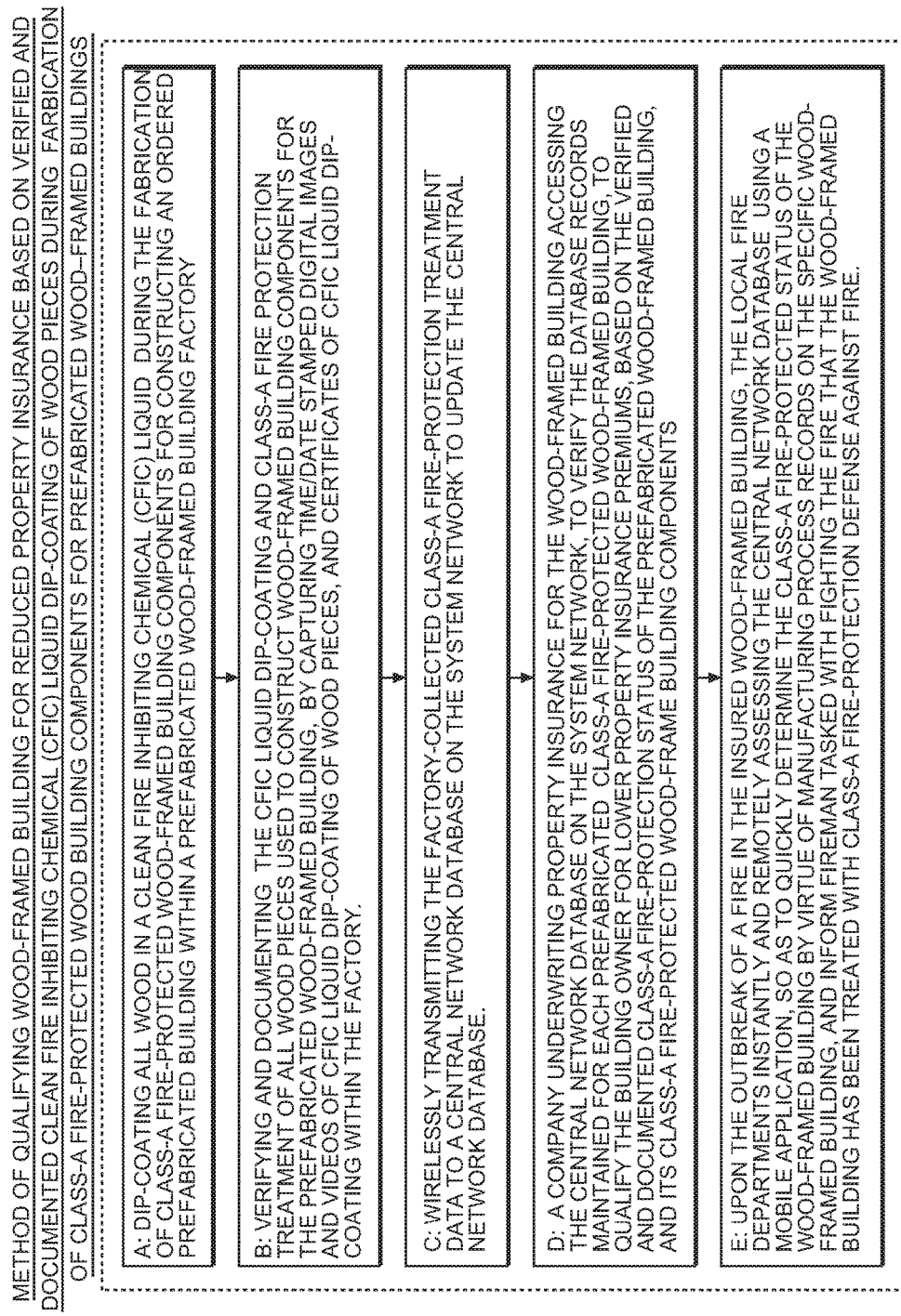
FIG. 72 is a flow chart describing the high-level steps involved in carrying out the method of qualifying a prefabricated wood-framed building for reduced property insurance based on verified and documented dip-coating of wood pieces in clean fire inhibiting chemical (CFIC) liquid during fabrication of Class-A fire-protected wood building components for prefabricated wood-framed buildings.

Method of Qualifying Wood-Framed Building for Reduced Property Insurance Based on Verified and Documented Clean Fire Inhibiting Chemical (CFIC) Liquid Dip-Coating of Wood Pieces During Fabrication of Class-A Fire-Protected Wood Building Components for Prefabricated Wood-Framed Buildings FIG. 72 shows the high-level steps required to practice the method of qualifying a wood-framed building for reduced property insurance based on verified and documented dip-coating of all wood pieces in clean fire inhibiting chemical (CFIC) liquid prior to the fabrication of Class-A fire-protected wood building components for used in constructing prefabricated Class-A fire-protected wood-framed buildings.

As indicated at Block A in FIG. 72, dip-coating all wood in a clean fire inhibiting chemical (CFIC) liquid during the fabrication of Class-A fire-protected wood-framed building components for constructing an ordered prefabricated building within a prefabricated wood-framed building factory 130.

As indicated at Block B in FIG. 72, verifying and documenting the CFIC liquid dip-coating and Class-A fire protection treatment of all wood pieces used to construct wood-framed building components for the prefabricated Class-A fire-protected wood-framed building, by capturing time/date stamping data, and digital images and videos of certificates of CFIC liquid dip-coating within the factory 130.

As indicated at Block C in FIG. 72, the factory-collected Class-A fire-protection treatment verification data is wirelessly transmitted to a central network database 148A on the system network 135 to update the central network database 148A.

As indicated at Block E in FIG. 72, a company underwriting property insurance for the wood-framed building accesses the central network database 148A on the system network 135, to verify the database records maintained for each wood-framed building that has undergone spray-based Class-A fire protection treatment, to qualify the building owner for lower property insurance premiums, based on the verified Class-A fire-protection status of the sprayed-treated wood-framed building.

As indicated at Block E in FIG. 72, upon the outbreak of a fire in the insured wood-framed building/property, the local fire departments instantly and remotely assess the central network database 148A using a mobile application 153, so as to quickly determine Class-A fire-protected status of the wood-framed building by virtue of CFIC liquid spray treatment of the wood-framed building during the construction phase, and inform fireman tasked with fighting the fire that the wood-framed building has been treated with Class-A fire-protection defense against fire.

Modifications to the Present Invention which Readily Come to Mind

The illustrative embodiments disclose the use of clean fire inhibiting chemicals (CFIC) from Hartindo Chemicatama Industri, particular Hartindo AAF21 and AAF31 and Dectan chemical, for applying and forming CFIC-coatings to the surface of wood, lumber, and timber, and other engineering wood products. However, it is understood that alternative CFIC liquids will be known and available to those with ordinary skill in the art to practice the various methods of Class-A fire-protection according to the principles of the present invention.

These and other variations and modifications will come to mind in view of the present invention disclosure.

While the on-site applied spray of CFIC liquid was shown for newly constructed prefabricated Class-A fire-protected wood-framed buildings, it is understood that this method of Class-A fire-protection treatment also can be practiced on older buildings having: (i) open unfinished attic spaces disposed above roof-trusses with open, unfinished ceiling surfaces, wall and floor surfaces, where bare interior wood surfaces are exposed and at high-risk to fire; and (ii) open unfinished basement spaces, where wall panels are open, exposed and at high-risk to fire. In such environments, the Class-A fire-protection spray-treatment method of the present invention can be practiced with excellent results.

While several modifications to the illustrative embodiments have been described above, it is understood that various other modifications to the illustrative embodiment of the present invention will readily occur to persons with ordinary skill in the art. All such modifications and variations are deemed to be within the scope and spirit of the present invention as defined by the accompanying Claims to Invention.

What is claimed is:

1. A method of producing a pre-fabricated Class-A fire-protected wood-framed building in a factory environment supporting one or more production lines for producing prefabricated Class-A fire-protected wood-framed building components designed for construction of a pre-fabricated Class-A fire-protected wood-framed building on a building construction site, said method comprising the steps of:
   (a) receiving an order for a prefabricated Class-A fire-protected wood-framed building characterized by a set of design specifications;
   (b) analyzing the set of design specifications for said pre-fabricated Class-A fire-protected wood-framed building, into a set of design specifications for prefabricated Class-A fire-protected wood-framed building components to be fabricated in said factory environment in accordance with a prefabricated wood-framed building project;

(c) determining the type and quantity of wood and/or engineered wood products (EWPs) required to fabricate each said prefabricated Class-A fire-protected wood-framed building component specified by said pre-fabricated wood-framed building project;

(d) determining a supply of clean fire inhibiting chemical (CFIC) liquid required to treat pieces of wood and/or engineered wood products (EWPs) to be used to fabricate each Class-A fire-protected wood-framed building component required by said prefabricated Class-A fire-protected wood-framed building;

(e) coating the pieces of wood and/or the EWPs along a production line in said factory environment, using said supply of CFIC liquid so as to produce pieces of Class-A fire-protected wood and/or Class-A fire-protected EWPs required to fabricate the prefabricated Class-A fire-protected wood-framed building components for said prefabricated Class-A fire-protected wood-framed building;

(f) as each treated piece of wood and/or EWP is coated with said CFIC liquid in said factory environment to produce pieces of Class-A fire-protected wood and/or Class-A fire-protected EWPs, certifying and marking each said treated piece of wood and/or EWP as being coated with said CFIC liquid for inspection and documentation purposes;

(g) fabricating each prefabricated Class-A fire-protected wood-framed building component in said factory environment, using one or more of said pieces of Class-A fire-protected wood and/or Class-A fire-protected EWPs;

(h) during fabrication of each pre-fabricated Class-A fire-protected wood-framed building component in said factory environment, applying an identifying tag to each produced Class-A fire-protected wood-framed building component being produced for the ordered prefabricated Class-A fire-protected wood-framed building in accordance with the pre-fabricated wood-framed building project;

(i) during fabrication of each said prefabricated Class-A fire-protected wood-framed building component in said factory environment, capturing and collecting digital photographs and/or videos visually showing an indication of Class-A fire-protection stamped or posted on each said pre-fabricated Class-A fire-protected wood-framed building component;

(j) uploading said digital photographs and/or videos including wood-treatment and fire-protection information with time/date and location stamping, to an information server maintained on a computer network; and (k) during construction of said prefabricated Class-A fire-protected wood-framed building on a building construction site, remotely located from said factory environment, accessing said digital photographs and/or videos, including wood-treatment and fire-protection status information with time/date and location stamping, from said information server maintained on said computer network, so as to provide visual evidence to one or more entities involved with said prefabricated Class-A fire-protected wood-framed building, indicating that each said prefabricated Class-A fire-protected wood-framed building component has been coated with said CFIC liquid and provided with Class-A fire-protection while being fabricated in said factory environment.

2. The method of claim 1, wherein said identifying tag is selected from a group consisting of a bar code identifier, an RFID tag, and a barcoded/RFID tag.

3. The method of claim 1, wherein when reading said identifying tag with a mobile tag reader, said digital photographs and/or video information including wood-treatment and fire-protection status information, relating to the corresponding Class-A fire-protected wood-framed building component, is automatically accessed from said information server for review and consideration.

4. The method of claim 1, wherein step (e) comprises dip-coating the pieces of wood and/or the EWPs in a dipping tank containing said supply of said CFIC liquid for dip-coating the wood pieces at atmospheric pressure, so as to produce pieces of Class-A fire-protected wood and/or Class-A fire-protected EWPs required to fabricate said prefabricated Class-A fire-protected wood-framed components for said prefabricated Class-A fire-protected wood-framed building.

5. The method of claim 1, wherein said entities comprises a group consisting of builders, property owners, building inspectors, and insurance companies.

6. The method of claim 1, wherein said CFIC liquid comprises an aqueous solution having chemical molecules that infuse into the surface of said wood so that, when said aqueous solution dries, the chemical molecules in said CFIC liquid are present on the surface of the coated wood and ready to interfere with free radicals driving combustion in any fire that may break out about said coated wood during construction of said prefabricated Class-A fire-protected wood-framed building from said prefabricated Class-A fire-protected wood-framed building components.

7. The method of claim 1, wherein said digital photographs and/or videos, including wood-treatment and fire-protection status information with time/date and location stamping, provide factory-collected Class-A fire-protection treatment certification data to said entities for certifying that said prefabricated Class-A fire-protected building components have been coated with said CFIC liquid.

8. The method of claim 1, wherein upon the outbreak of a fire during the construction of said prefabricated Class-A fire-protected wood-framed building on said building construction site, a mobile computing device is used to remotely access said information server, and retrieve information to quickly confirm the Class-A fire-protected status of said prefabricated Class-A fire-protected wood-framed building components provided by CFIC liquid treatment of said pieces of wood and/or EWPs during fabrication in said factory environment.

9. The method of claim 1, wherein each identifying tag comprises a barcoded/RFID-tagged inspection label including a bar code symbol and RFID tag that has a unique building-component identifier encoded into the barcode symbol and RFID tag identifier, and wherein said building-component identifier is used to access said digital photographs and/or videos, including wood-treatment and fire-protection status information with time/date and location stamping, stored in said information server on said computer network.

10. A method of producing pre-fabricated Class-A fire-protected wood-framed building components in a factory environment for use in constructing Class-A fire-protected wood-framed buildings on building construction sites, said method comprising the steps of:

(a) specifying a set of prefabricated Class-A fire-protected wood-framed building components to be fabricated in a factory environment supporting one or more production lines;

(b) determining the type and quantity of wood and/or engineered wood products (EWPs) required to fabricate each said prefabricated Class-A fire-protected wood-framed building component;

(c) determining the supply of clean fire inhibiting chemical (CFIC) liquid required to treat pieces of wood and/or engineered wood products (EWPs) to be used to fabricate each said prefabricated Class-A fire-protected wood-framed building component;

(d) coating the pieces of wood and/or the EWPs along a production line in said factory environment, using a supply of CFIC liquid so as to produce pieces of Class-A fire-protected wood and/or Class-A fire-protected EWPs required to fabricate said prefabricated Class-A fire-protected wood-framed building components;

(e) as each treated piece of wood and/or EWP is coated with said CFIC liquid in said factory environment to produce said pieces of Class-A fire-protected wood and/or Class-A fire-protected EWPs, certifying and marking each treated piece of wood and/or EWP as being coated with said CFIC liquid for inspection and documentation purposes;

(f) fabricating each said prefabricated Class-A fire-protected wood-framed building component in said factory environment, using one or more of said pieces of Class-A fire-protected wood and/or Class-A fire-protected EWPs;

(g) during fabrication of each said pre-fabricated Class-A fire-protected wood-framed building component in said factory environment, applying an identifying tag to each produced Class-A fire-protected wood-framed building component being produced for use in constructing a prefabricated Class-A fire-protected wood-framed building in accordance with a pre-fabricated wood-framed building project;

(h) during fabrication of each said prefabricated Class-A fire-protected wood-framed building component in said factory environment, capturing and collecting digital photographs and/or videos visually showing an indication of Class-A fire-protection stamped or posted on each said pre-fabricated Class-A fire-protected wood-framed building component;

(i) uploading said digital photographs and/or videos including wood-treatment and fire-protection information with time/date and location stamping, to an information server maintained on a computer network; and (j) during construction of a Class-A fire-protected wood-framed building on a building construction site using a plurality of said prefabricated Class-A fire-protected wood-framed building components, accessing said digital photographs and/or videos, including wood-treatment and fire-protection status information with time/date and location stamping, from said information server maintained on said computer network, so as to provide visual evidence to one or more entities involved with said Class-A fire-protected wood-framed building, indicating that each said prefabricated Class-A fire-protected wood-framed building component to be used on said building construction site, has been coated with said CFIC liquid and provided with Class-A fire-protection while being fabricated in said factory environment.

11. The method of claim 10, wherein said identifying tag is selected from a group consisting of a bar code identifier, an RFID tag, and a barcoded/RFID tag.

12. The method of claim 10, wherein when reading said identifying tag with a mobile tag reader, said digital photographs and/or video information including wood-treatment and fire-protection status information relating to the corresponding prefabricated Class-A fire-protected wood-framed building component, is automatically accessed from said information server for review and consideration.

13. The method of claim 10, wherein step (d) comprises dip-coating the pieces of wood and/or the EWPs in a dipping tank containing said supply of said CFIC liquid for dip-coating wood pieces at atmospheric pressure, so as to produce pieces of Class-A fire-protected wood and/or Class-A fire-protected EWPs required to fabricate said prefabricated Class-A fire-protected wood-framed components.

14. The method of claim 10, wherein said entities comprise a group consisting of builders, property owners, building inspectors, and insurance companies.

15. The method of claim 10, wherein said CFIC liquid comprises an aqueous solution having chemical molecules that infuse into the surface of said wood so that, when said aqueous solution dries, the chemical molecules in said CFIC liquid are present on the surface of the coated wood and ready to interfere with free radicals driving combustion in any fire that may break out about said coated wood during construction of said prefabricated Class-A fire-protected wood-framed building.

16. The method of claim 10, wherein said digital photographs and/or videos, including wood-treatment and fire-protection status information with time/date and location stamping, provide factory-collected Class-A fire-protection treatment certification data to said entities for certifying that said prefabricated Class-A fire-protected building components have been coated with said CFIC liquid.

17. The method of claim 10, wherein upon the outbreak of a fire during the construction of said prefabricated Class-A fire-protected wood-framed building on said building construction site, a mobile computing device is used to remotely access said information server, and retrieve information to quickly confirm the Class-A fire-protected status of said prefabricated Class-A fire-protected wood-framed building components provided by CFIC liquid treatment of said the pieces of wood and/or EWPs during fabrication in said factory environment.

18. The method of claim 10, wherein each identifying tag comprises a barcoded/RFID-tagged inspection label including a bar code symbol and RFID tag that has a unique building-component identifier encoded into the barcode symbol and RFID tag identifier, and wherein said building-component identifier is used to access said digital photographs and/or videos, including wood-treatment and fire-protection status information with time/date and location stamping, stored in said information server on said computer network.

* * * * *